US011592056B2

(12) United States Patent
Rossberger

(10) Patent No.: US 11,592,056 B2
(45) Date of Patent: Feb. 28, 2023

(54) POWER TRANSMISSION ELEMENTS, TORQUE MEASURING DEVICE AND FREEWHEEL ASSEMBLY

(71) Applicant: TQ-Systems Gmbh, Seefeld (DE)

(72) Inventor: Antonius Georg Rossberger, Sindelsdorf (DE)

(73) Assignee: TQ-Systems GmbH

(*) Notice: Subject to any disclaimer, the term of this patent is extended or adjusted under 35 U.S.C. 154(b) by 0 days.

(21) Appl. No.: 17/667,124

(22) Filed: Feb. 8, 2022

(65) Prior Publication Data

US 2022/0163063 A1 May 26, 2022

Related U.S. Application Data

(63) Continuation of application No. 16/462,744, filed as application No. PCT/IB2017/057452 on Nov. 28, 2017, now Pat. No. 11,286,979.

(30) Foreign Application Priority Data

Nov. 28, 2016 (DE) .......................... 102016122845.1

(51) Int. Cl.
*G01L 5/00* (2006.01)
*F16C 19/38* (2006.01)
(Continued)

(52) U.S. Cl.
CPC ............ *F16C 19/381* (2013.01); *F16C 19/12* (2013.01); *G01L 5/0009* (2013.01);
(Continued)

(58) Field of Classification Search
CPC ...... F16C 19/381; F16C 19/12; G01L 5/0009; G01M 13/027; G01M 13/04; G01M 15/06
See application file for complete search history.

(56) References Cited

U.S. PATENT DOCUMENTS 499,694 A 6/1893 Wright
541,713 A 6/1895 Bolton
(Continued)

FOREIGN PATENT DOCUMENTS

AU 372767 11/1983
CA 2011232 9/1990
(Continued)

OTHER PUBLICATIONS

TQ-Systems GmbH; Office Action for Japanese patent application No. 2021-024839, dated May 30, 2022, 4 pgs.
(Continued)

*Primary Examiner* — Octavia Davis Hollington
(74) *Attorney, Agent, or Firm* — Taylor English Duma LLP

(57) ABSTRACT

A measuring device with a crankshaft and a load cell for determining a radial force acting on the crankshaft having a receiving sleeve for receiving a bearing ring and a fastening ring for attaching the load cell in a transmission housing. Axial support areas are provided on the fastening ring for axially supporting the outer ring of the first bearing. Moreover, measuring regions for receiving radial forces of the receiving sleeve are provided which connect the receiving sleeve with the fastening ring. Strain sensors are attached to at least two of the measuring regions. An evaluation electronics is connected to the strain sensors.

22 Claims, 81 Drawing Sheets

(51) Int. Cl.
*F16C 19/12* (2006.01)
*G01M 13/027* (2019.01)
*G01M 13/04* (2019.01)
*G01M 15/06* (2006.01)

(52) U.S. Cl.
CPC .......... *G01M 13/027* (2013.01); *G01M 13/04* (2013.01); *G01M 15/06* (2013.01)

(56) References Cited

U.S. PATENT DOCUMENTS

| | | | |
|---|---|---|---|
| 550,474 | A | 11/1895 | Bolton |
| 573,230 | A | 12/1896 | Monkiewicz |
| 618,190 | A | 1/1899 | Sturgess |
| 1,423,028 | A | 7/1922 | Ernest |
| 1,670,144 | A | 5/1928 | Ewart |
| 1,877,338 | A | 9/1932 | Kottlowski |
| 2,210,240 | A | 8/1940 | Herrick |
| 2,326,235 | A | 8/1943 | Fritz |
| 2,852,954 | A | 9/1958 | Hobbs |
| 2,941,421 | A | 6/1960 | Plotti |
| 2,966,808 | A | 1/1961 | Grudin |
| 3,068,719 | A | 12/1962 | Singelmann |
| 3,148,560 | A | 9/1964 | Woodward, Jr. |
| 3,726,158 | A | 4/1973 | Brown |
| 3,861,242 | A | 1/1975 | Adams et al. |
| 3,893,532 | A | 7/1975 | Perlowin |
| 3,950,950 | A | 4/1976 | Doerner et al. |
| 4,023,440 | A | 5/1977 | Kennington et al. |
| 4,060,006 | A | 11/1977 | Abel et al. |
| 4,194,415 | A | 3/1980 | Kennington et al. |
| 4,223,757 | A | 9/1980 | Olander |
| 4,227,092 | A | 10/1980 | Campagnuolo et al. |
| 4,235,129 | A | 11/1980 | Takasu |
| 4,307,630 | A | 12/1981 | Osborn et al. |
| 4,429,595 | A | 2/1984 | Butterfield |
| 4,471,672 | A | 9/1984 | Butterfield et al. |
| 4,491,033 | A | 1/1985 | Carlson et al. |
| 4,518,308 | A | 5/1985 | Grzybowski et al. |
| 4,526,064 | A | 7/1985 | Carden et al. |
| 4,567,790 | A | 2/1986 | Butterfield et al. |
| 4,574,659 | A | 3/1986 | Arndt |
| 4,583,962 | A | 4/1986 | Bytzek et al. |
| 4,584,904 | A | 4/1986 | Distin, Jr. et al. |
| 4,604,916 | A | 8/1986 | Distin, Jr. |
| 4,715,247 | A | 12/1987 | Honda et al. |
| 4,729,756 | A | 3/1988 | Zimmer |
| 4,807,494 | A | 2/1989 | Lew |
| 4,900,165 | A | 2/1990 | Kun et al. |
| 5,123,300 | A | 6/1992 | Himmelein et al. |
| 5,286,237 | A | 2/1994 | Minegishi |
| 5,445,572 | A | 8/1995 | Parker |
| 5,456,139 | A | 10/1995 | Aubin |
| 5,480,016 | A * | 1/1996 | Kurz ................ F16F 15/1207 464/68.4 |
| 5,662,008 | A | 9/1997 | Aubin et al. |
| 5,678,671 | A | 10/1997 | Leimbach et al. |
| 5,772,573 | A | 6/1998 | Hao |
| 5,860,331 | A | 1/1999 | Hashimoto et al. |
| 5,954,611 | A | 9/1999 | Mills et al. |
| 5,970,822 | A | 10/1999 | Jung et al. |
| 6,012,347 | A | 1/2000 | Hasegawa |
| 6,026,711 | A | 2/2000 | Tortora et al. |
| 6,148,684 | A | 11/2000 | Gardiner |
| 6,152,249 | A | 11/2000 | Li et al. |
| 6,258,007 | B1 | 7/2001 | Kristjansson |
| 6,296,072 | B1 | 10/2001 | Turner |
| 6,328,006 | B1 | 12/2001 | Heer |
| 6,998,730 | B2 | 2/2006 | Tharp |
| 7,249,534 | B1 | 7/2007 | Devenyi |
| 7,377,243 | B2 | 5/2008 | Meintschel et al. |
| 7,421,990 | B2 | 9/2008 | Taye et al. |
| 7,631,553 | B2 | 12/2009 | Heim et al. |
| 8,191,439 | B2 | 6/2012 | Kobayashi et al. |
| 8,485,064 | B2 | 7/2013 | Kanai |
| 8,656,809 | B2 | 2/2014 | Bayer et al. |
| 9,017,198 | B2 | 4/2015 | Hoebel |
| 9,140,342 | B2 | 9/2015 | Hoebel et al. |
| 9,228,651 | B2 | 1/2016 | Waide |
| 10,247,287 | B2 | 4/2019 | Hoebel et al. |
| 10,371,240 | B2 | 8/2019 | Rossberger |
| 11,118,667 | B2 * | 9/2021 | Rossberger .......... B62M 11/145 |
| 11,280,394 | B2 | 3/2022 | Hoebel et al. |
| 11,286,979 | B2 | 3/2022 | Rossberger |
| 2003/0089186 | A1 | 5/2003 | Bogelein et al. |
| 2003/0089194 | A1 | 5/2003 | Ruttor et al. |
| 2003/0121363 | A1 | 7/2003 | Poehlau |
| 2003/0220165 | A1 | 11/2003 | He et al. |
| 2004/0059331 | A1 | 3/2004 | Mullaney |
| 2006/0027201 | A1 | 2/2006 | Ryou |
| 2006/0046889 | A1 | 3/2006 | Christensen |
| 2006/0135305 | A1 | 6/2006 | Erez et al. |
| 2006/0283289 | A1 | 12/2006 | Baudendistel et al. |
| 2007/0039414 | A1 | 2/2007 | Takemura |
| 2007/0051187 | A1 | 3/2007 | McDearmon |
| 2007/0101820 | A1 | 5/2007 | Bulatowicz |
| 2007/0158497 | A1 | 7/2007 | Edelson et al. |
| 2008/0161142 | A1 | 7/2008 | Shiozaki et al. |
| 2008/0251302 | A1 | 10/2008 | Lynn |
| 2008/0254929 | A1 | 10/2008 | Wesling et al. |
| 2009/0284089 | A1 | 11/2009 | Wingett et al. |
| 2010/0012407 | A1 | 1/2010 | Oba et al. |
| 2010/0024593 | A1 | 2/2010 | Schmidt et al. |
| 2011/0039650 | A1 | 2/2011 | Rosemeier et al. |
| 2011/0088496 | A1 | 4/2011 | Cho et al. |
| 2011/0187179 | A1 | 8/2011 | Zwarts et al. |
| 2012/0046140 | A1 | 2/2012 | Shelef et al. |
| 2012/0270692 | A1 | 10/2012 | Hoebel |
| 2013/0276575 | A1 | 10/2013 | Hoebel |
| 2013/0288848 | A1 | 10/2013 | Carter et al. |
| 2014/0018208 | A1 * | 1/2014 | Takaishi ................ B60K 23/08 477/36 |
| 2015/0276036 | A1 | 10/2015 | Hoebel |
| 2016/0245386 | A1 | 8/2016 | Rossberger |
| 2016/0356374 | A1 | 12/2016 | Hoebel |
| 2019/0257401 | A1 | 8/2019 | Hoebel et al. |
| 2020/0063793 | A1 | 2/2020 | Rossberger |
| 2021/0332869 | A1 | 10/2021 | Rossberger |
| 2022/0163104 | A1 | 5/2022 | Hoebel et al. |

FOREIGN PATENT DOCUMENTS

| | | |
|---|---|---|
| CN | 102365474 | 2/2012 |
| DE | 8513367 | 6/1986 |
| DE | 3738521 | 12/1988 |
| DE | 102009003695.4 | 3/2009 |
| DE | 102009033790.3 | 7/2009 |
| DE | 202009011082.6 | 9/2009 |
| DE | 202010000318.0 | 3/2010 |
| DE | 102014115043 | 4/2016 |
| EP | 0316713 | 5/1989 |
| EP | 0984201 | 3/2000 |
| EP | 2672147 | 12/2013 |
| JP | 48-031368 | 4/1972 |
| JP | S4831368 | 4/1973 |
| JP | S59187152 | 10/1984 |
| JP | S61547 | 1/1986 |
| JP | 1261537 | 10/1989 |
| JP | H02271144 | 11/1990 |
| JP | H10-100372 | 4/1998 |
| JP | H11-79627 | 3/1999 |
| JP | 11227665 | 8/1999 |
| JP | 2005330990 | 12/2005 |
| JP | 2006522294 | 9/2006 |
| JP | 2007155076 | 6/2007 |
| JP | 2007205397 | 8/2007 |
| JP | 2008174069 | 7/2008 |
| KR | 20100070607 | 6/2010 |
| WO | 1999037017 | 7/1999 |
| WO | 2004088166 | 10/2004 |
| WO | 2006119033 | 11/2006 |
| WO | 2010113115 | 10/2010 |
| WO | 2012046216 | 4/2012 |
| WO | 2014060974 | 4/2014 |

(56) References Cited

FOREIGN PATENT DOCUMENTS

| WO | 2014060975 | 4/2014 |
|---|---|---|
| WO | 2014147583 | 9/2014 |
| WO | 2018096521 | 5/2018 |
| WO | 2019229574 | 12/2019 |

OTHER PUBLICATIONS

TQ-Systems GmbH; Office Action for Chinese patent application No. 201980036472.3, dated Jun. 6, 2022, 6 pgs.
Hoebel, Rudi; Chinese Office Action for serial No. 201180057084.7, filed Oct. 7, 2010, dated Mar. 30, 2015, 8 pgs.
Hoebel, Rudi; Extended European Search Report for serial No. 11830282.7, filed May 7, 2013, dated Mar. 16, 2018, 18 pgs.
Hoebel, Rudi; International Preliminary Report on Patentability for PCT/IB2011/054431, filed Oct. 7, 2011, dated Apr. 9, 2013, 7 pgs.
Hoebel, Rudi; International Search Report and Written Opinion for PCT/IB2011/054431, filed Oct. 7, 2011, dated Jun. 8, 2012, 11 pgs.
Hoebel, Rudi; Issue Notification for U.S. Appl. No. 13/857,277, filed Apr. 5, 2013, dated Sep. 2, 2015, 1 pg.
Hoebel, Rudi; Non-Final Office Action for U.S. Appl. No. 13/857,277, filed Apr. 5, 2013, dated Dec. 4, 2014, 17 pgs.
Hoebel, Rudi; Notice of Allowance for U.S. Appl. No. 13/857,277, filed Apr. 5, 2013, dated May 19, 2015, 11 pgs.
Hoebel, Rudi; Australian Patent Examintion Report for serial No. 2010231573, filed Mar. 30, 2010, dated Apr. 24, 2014, 5 pgs.
Hoebel, Rudi; Chinese Office Action for serial No. 201080015450, filed Mar. 30, 2010, dated Apr. 2, 2014, 7 pgs.
Hoebel, Rudi; Chinese Office Action for serial No. 201080015450, filed Mar. 30, 2010, dated Sep. 25, 2014, 8 pgs.
Hoebel, Rudi; Corrected Notice of Allowability for U.S. Appl. No. 13/260,917, filed Jul. 4, 2012, dated Jan. 8, 2015, 13 pgs.
Hoebel, Rudi; European Search Report for serial No. 10/758,136, published on Feb. 8, 2012, dated Jul. 30, 2012, 20 pgs.
Hoebel, Rudi; International Preliminary Report on Patentability for PCT/IB2010/051383, filed Mar. 30, 2010, dated Oct. 4, 2011, 5 pgs.
Hoebel, Rudi; International Search Report and Written Opinion for PCT/IB2010/051383, filed Mar. 30, 2010, dated Feb. 1, 2011, 6 pgs.
Hoebel, Rudi; Issue Notification for U.S. Appl. No. 13/260,917, filed Jul. 4, 2012, dated Apr. 8, 2015, 1 pg.
Hoebel, Rudi; Japanese Office Action for serial No. 2012502862, published Sep. 20, 2012, dated Jan. 16, 2014, 5 pgs.
Hoebel, Rudi; Non-Final Office Action for U.S. Appl. No. 13/260,917, filed Jul. 4, 2012, dated Aug. 12, 2014, 13 pgs.
Hoebel, Rudi; Notice of Allowance for U.S. Appl. No. 13/260,917, filed Jul. 4, 2012, dated Dec. 24, 2014, 16 pgs.
Hoebel, Rudi; Issue Notification for U.S. Appl. No. 14/666,968, filed Mar. 24, 2015, dated Aug. 17, 2016, 1 pg.
Hoebel, Rudi; Notice of Allowance for U.S. Appl. No. 14/666,968, filed Mar. 24, 2015, dated May 18, 2016, 29 pgs.
Hoebel, Rudi; Restriction Requirement for U.S. Appl. No. 14/666,968, filed Mar. 24, 2015, dated Feb. 26, 2016, 8 pgs.
Hoebel, Rudi; Final Office Action for U.S. Appl. No. 15/241,413, filed Aug. 19, 2016, dated Feb. 28, 2018, 12 pgs.
Hoebel, Rudi; Issue Notification for U.S. Appl. No. 15/241,413, filed Aug. 19, 2016, dated Mar. 13, 2019, 1 pg.
Hoebel, Rudi; Non-Final Office Action for U.S. Appl. No. 15/241,413, filed Aug. 19, 2016, dated Oct. 16, 2017, 26 pgs.
Hoebel, Rudi; Notice of Allowance for U.S. Appl. No. 15/241,413, filed Aug. 19, 2016, dated Nov. 16, 2018, 10 pgs.
Hoebel, Rudi; Office Action for Japanese patent application No. 2017-225779, filed Nov. 24, 2017, dated Dec. 17, 2018, 7 pgs.
Hoebel, Rudi; Restriction Requirement for U.S. Appl. No. 15/241,413, filed Aug. 19, 2016, dated Jul. 25, 2017, 8 pgs.
TQ-Systems GMBH; Office Action for European application No. 13177924.1, filed Jul. 25, 2013, dated Dec. 17, 2018, 11 pgs.
Hoebel, Rudi; Final Office Action for U.S. Appl. No. 16/289,703, filed Mar. 1, 2019, dated Apr. 26, 2021, 22 pgs.
Hoebel, Rudi; Non-Final Office Action for U.S. Appl. No. 16/289,703, filed Mar. 1, 2019, dated Jan. 7, 2021, 46 pgs.
Hoebel, Rudi; Notice of Allowance for U.S. Appl. No. 16/289,703, filed Mar. 1, 2019, dated Nov. 19, 2021, 13 pgs.
Hoebel, Rudi; Requirement for Restriction/Election for U.S. Appl. No. 16/289,703, filed Mar. 1, 2019, dated Sep. 28, 2020, 6 pgs.
TQ Systems GMBH; Office Action for Japanese patent application No. 2019-141004, filed Jul. 31, 2019, dated Mar. 24, 2020, 9 pgs.
TQ-Systems GMBH; Notice of Allowance for Japanese patent application No. 2019-141004, dated Dec. 21, 2020, 4 pgs.
Rossberger, Antonius Georg; International Preliminary Report on Patentability for PCT/IB2014/059999, filed Mar. 20, 2013, dated Sep. 22, 2015, 17 pgs .
Rossberger, Antonius Georg; International Search Report for PCT/IB2014/059999, filed Mar. 20, 2013, dated Jul. 8, 2014, 44 pgs.
Rossberger, Antonius Georg; Non-Final Office Action for U.S. Appl. No. 14/778,404, filed May 17, 2016, dated May 30, 2018, 11 pgs.
Rossberger, Antonius Georg; Notice of Allowance for U.S. Appl. No. 14/778,404, filed May 17, 2016, dated Mar. 20, 2019, 7 pgs.
ALFRED Boge;"Vieweg Taschenlexikon Technik: Maschinenbau, Elektrotechnik, Datentechnik" In: Vieweg Taschenlexikon Technik: Maschinenbau, Elektrotechnik, Datentechnik, Vieweg +Teubner Verlag , pp. 339-339, Dec. 31, 2003 (Dec. 31, 2003).
Rossberger, Antonius Georg; International Preliminary Report on Patentability for PCT/IB2017/057452, filed Nov. 28, 2017, dated Jan. 22, 2019, 35 pgs.
Rossberger, Antonius Georg; Non-Final Office Action for U.S. Appl. No. 16/462,744, filed May 21, 2019, dated Apr. 26, 2021, 55 pgs.
Rossberger, Antonius Georg; Notice of Allowance for U.S. Appl. No. 16/462,744, filed May 21, 2019, dated Nov. 8, 2021, 17 pgs.
TQ Systems GMBH; Office Action for Chinese application No. 201780073655.3, dated Jun. 29, 2020, 5 pgs.
TQ-SYSTEMS GmbH; Office Action for Japanese patent application No. 2019-528689, dated Sep. 21, 2021, 5 pgs.
Rossberger, Antonius Georg; International Preliminary Report on Patentability for PCT/IB2019/054085, filed May 17, 2019, dated Dec. 1, 2020, 45 pgs.
Rossberger, Antonius Georg; International Search Report and Written Opinion for PCT/IB2019/054085, filed May 17, 2019, dated Sep. 25, 2019, 53 pgs.
TQ Systems, Inc; Office Action for Chinese patent application No. 201980036472.3, dated Nov. 3, 2021, 18 pgs.
Hoebel, Rudi; Australian Patent Examination Report for serial No. 2011311151, filed Oct. 7, 2011, dated Jun. 6, 2014, 2 pgs.
Rossberger, Antonius Georg; International Search Report and Written Opinion for PCT/IB2017/057452, filed Nov. 28, 2017, dated Aug. 7, 2018, 33 pgs.
TQ-Systems GMBH; Office Action for European patent application No. 21167754.7, dated Sep. 29, 2022, 17 pgs.
TQ-Systems GMBH; Summons to Attend Oral Proceedings for European patent application No. 19735628.0, mailed Oct. 12, 2022, 18 pgs.

* cited by examiner

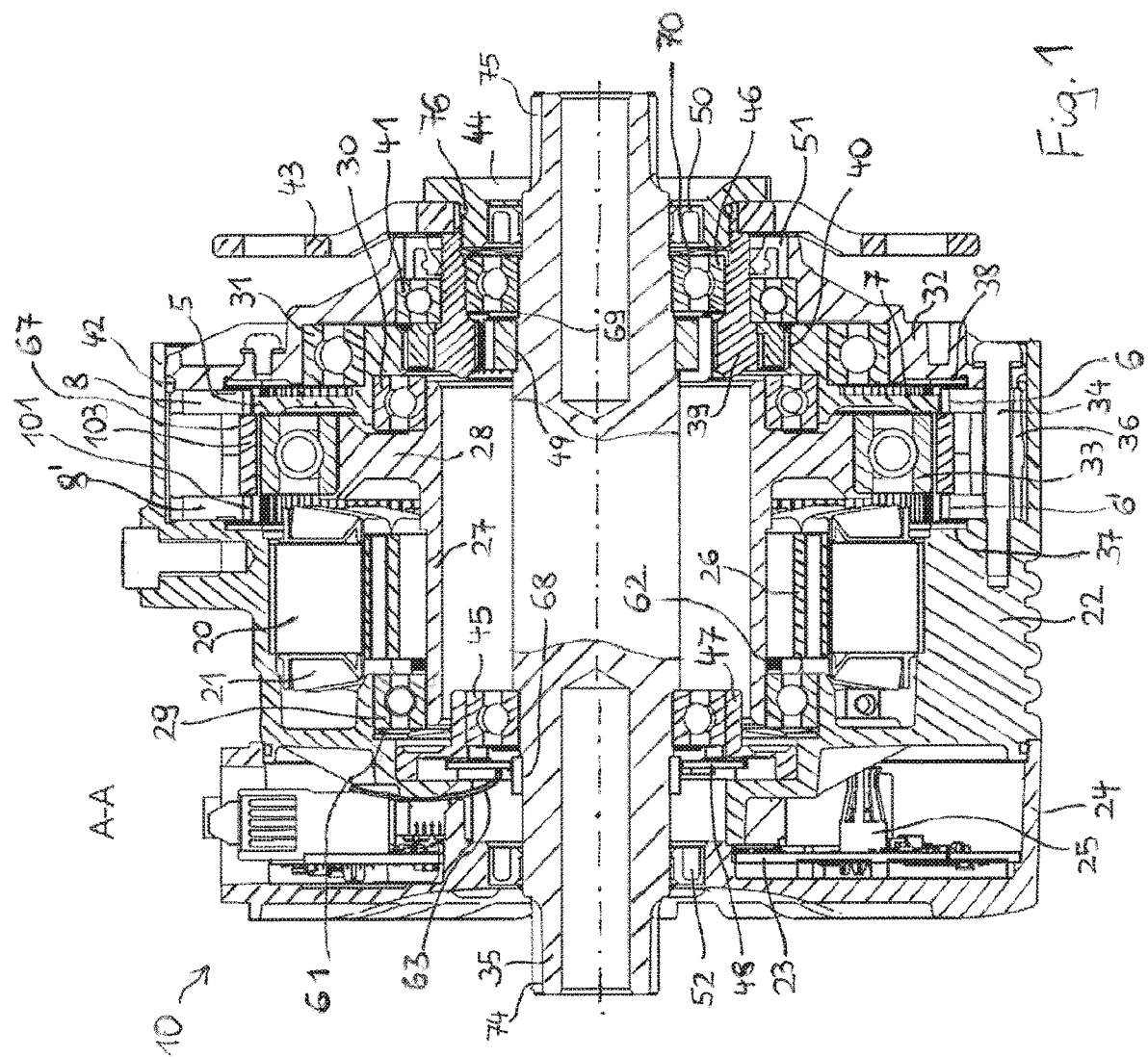

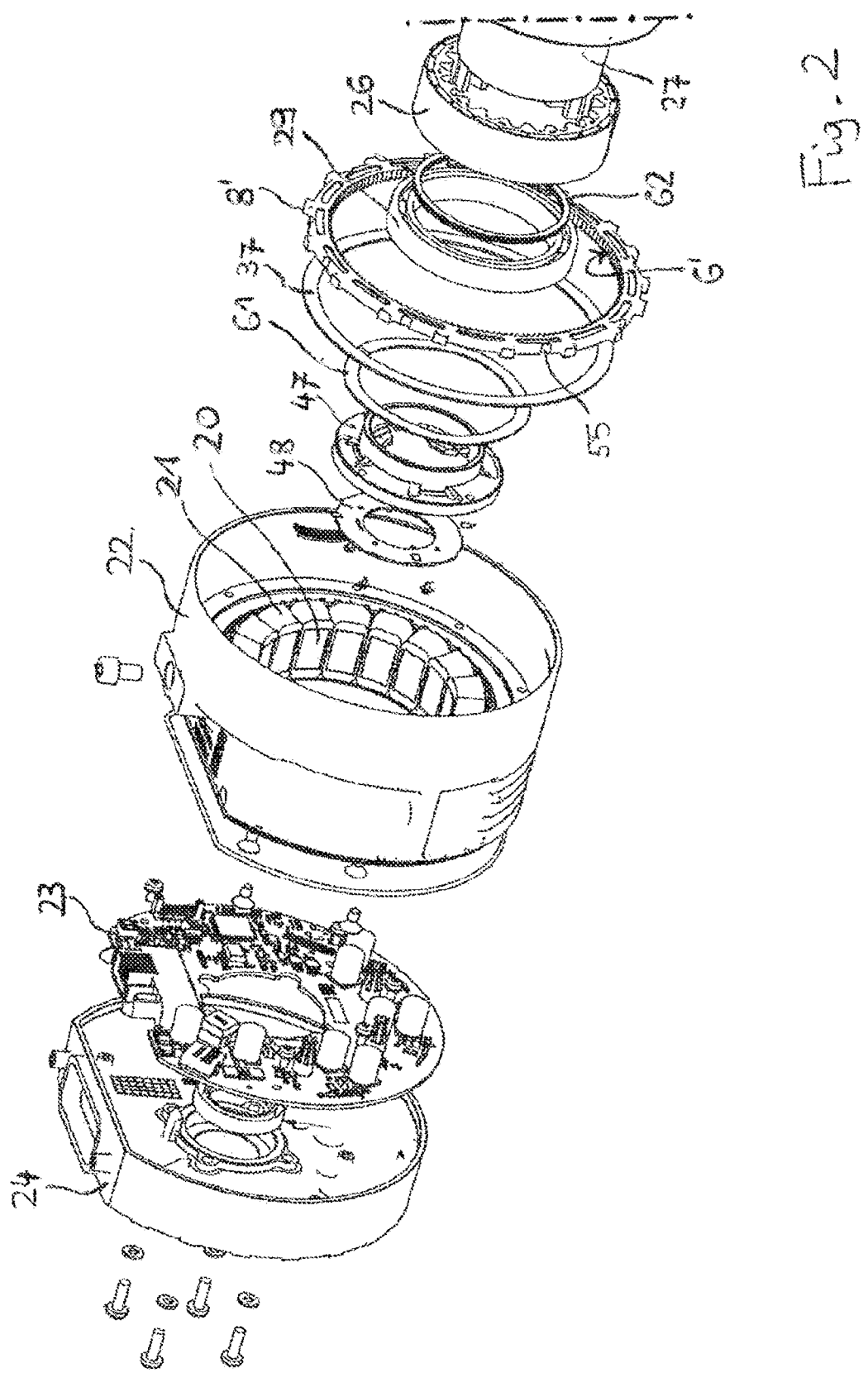

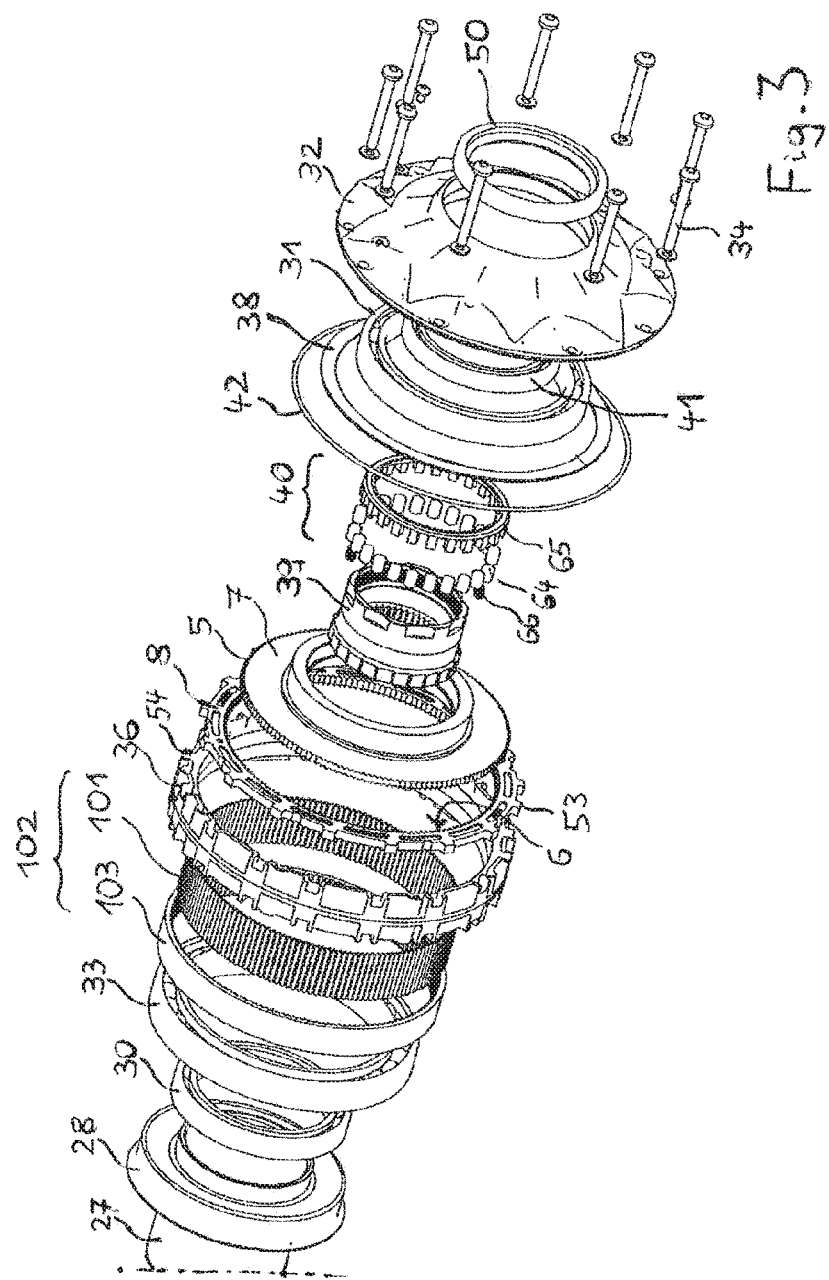

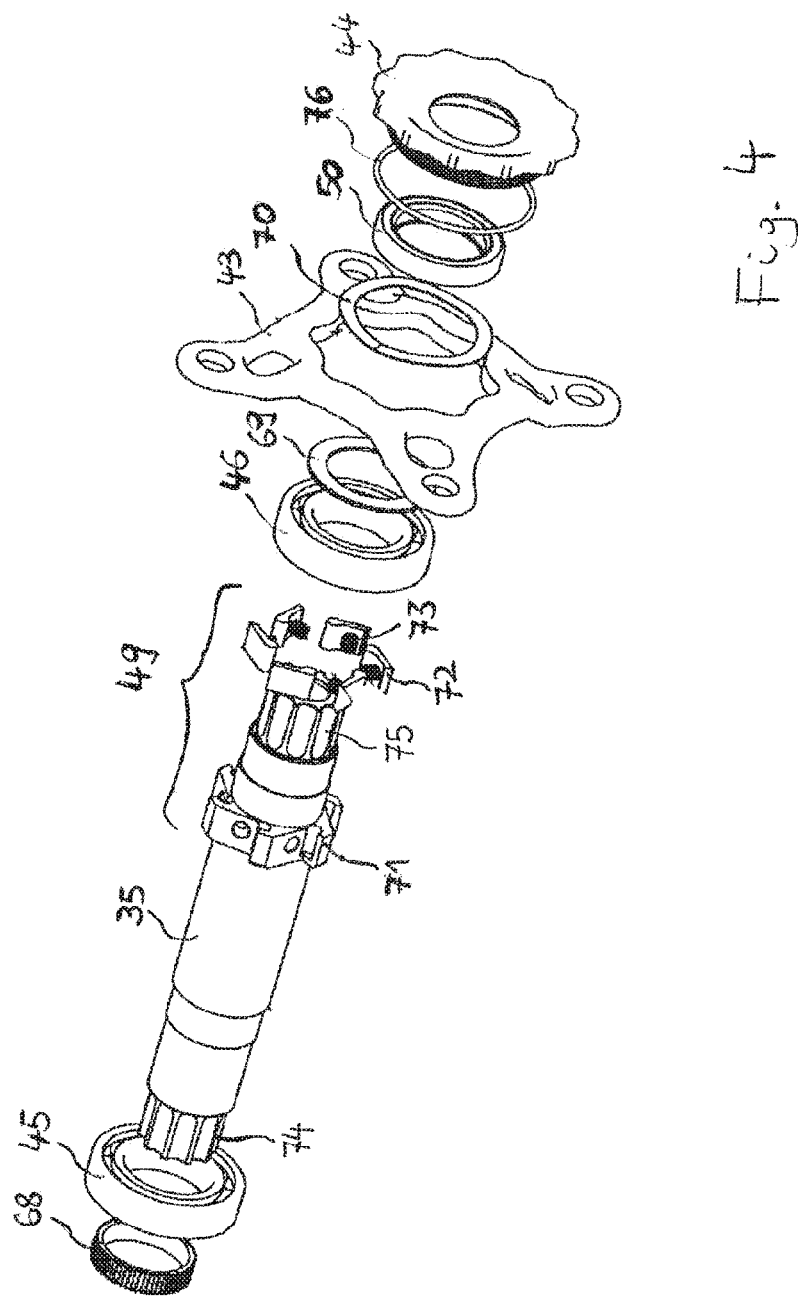

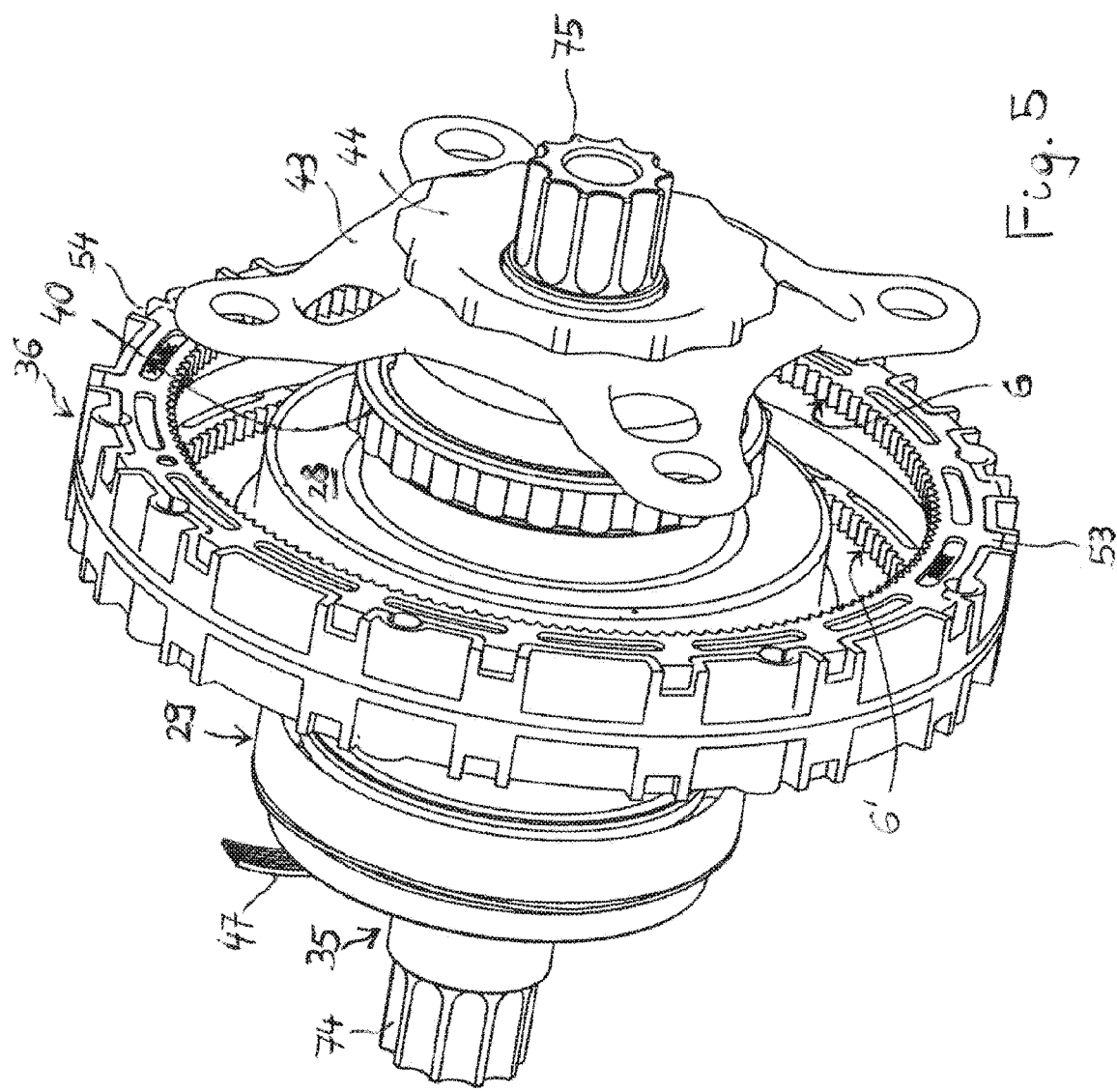

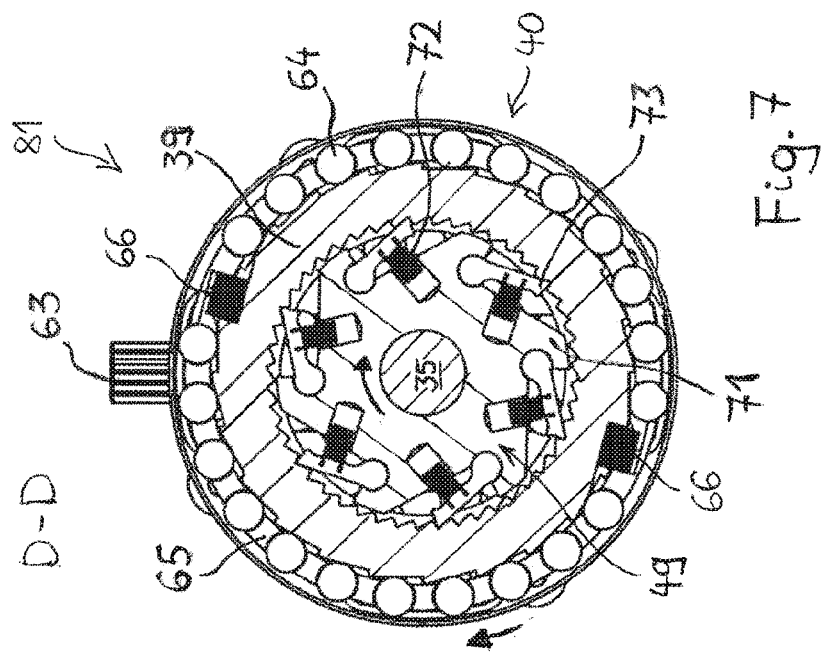
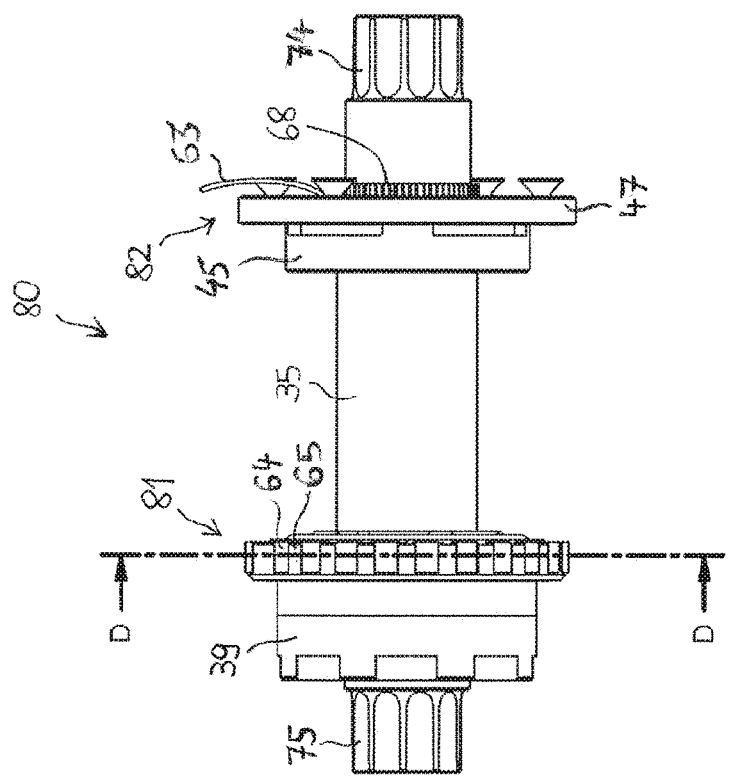

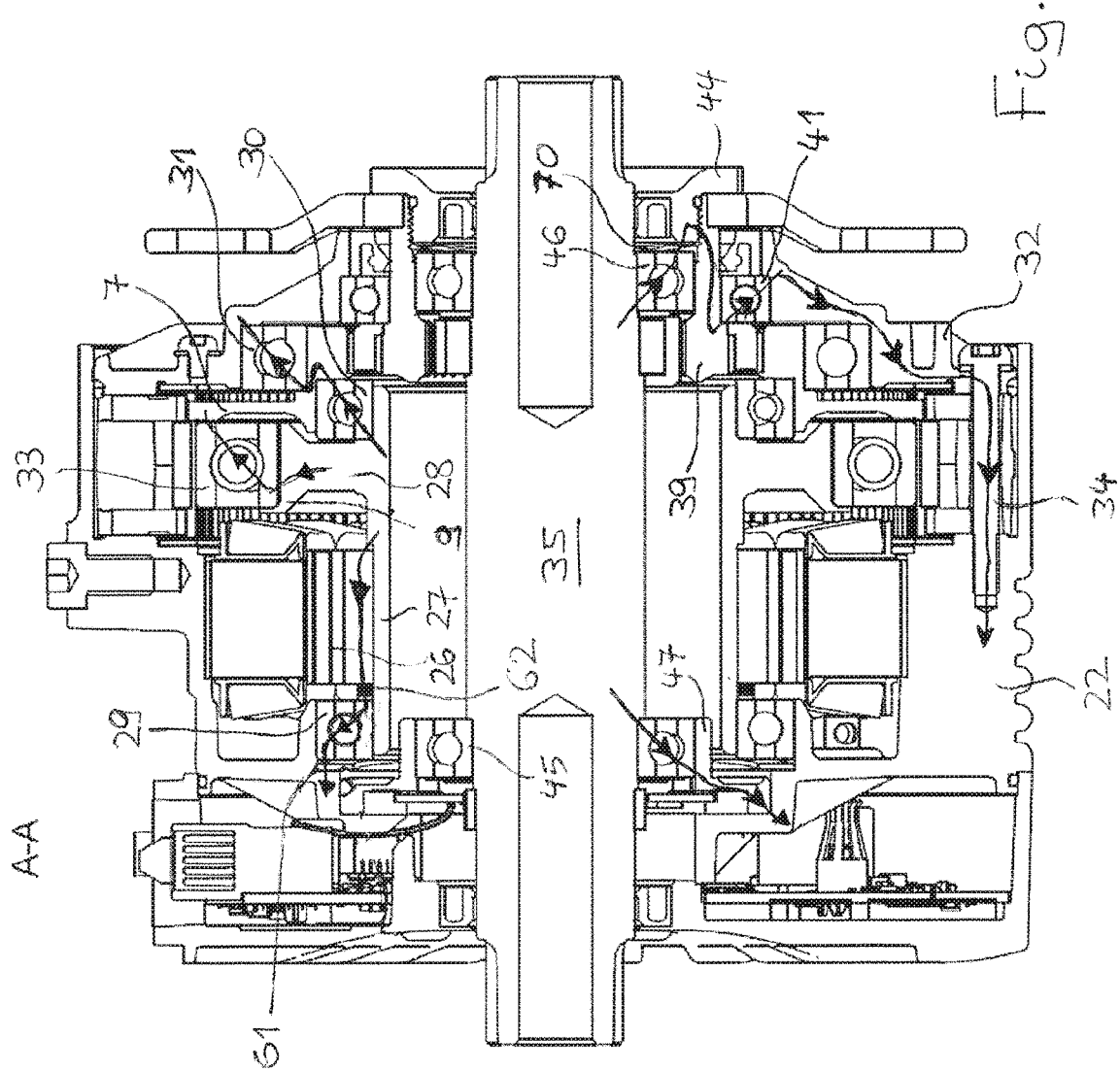

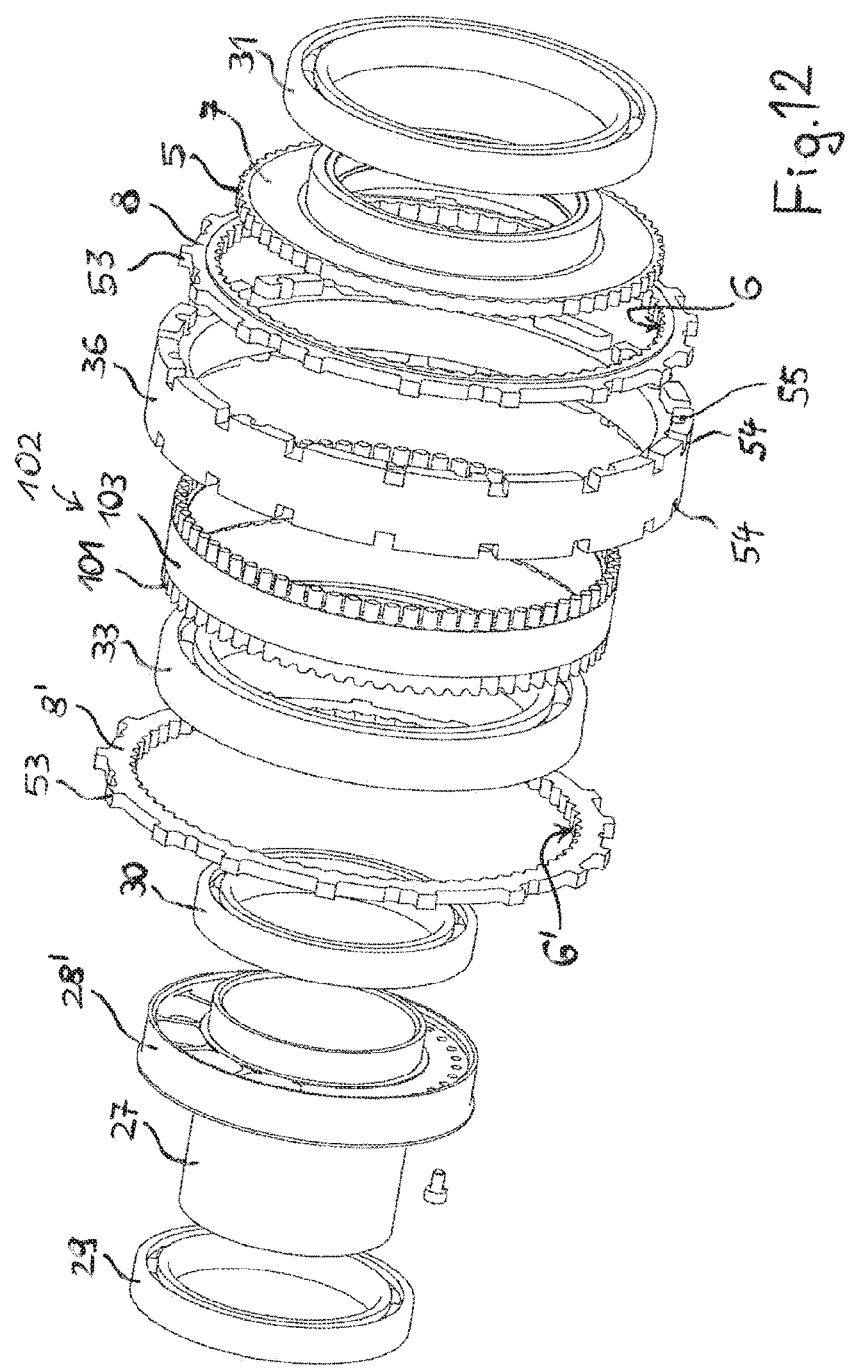

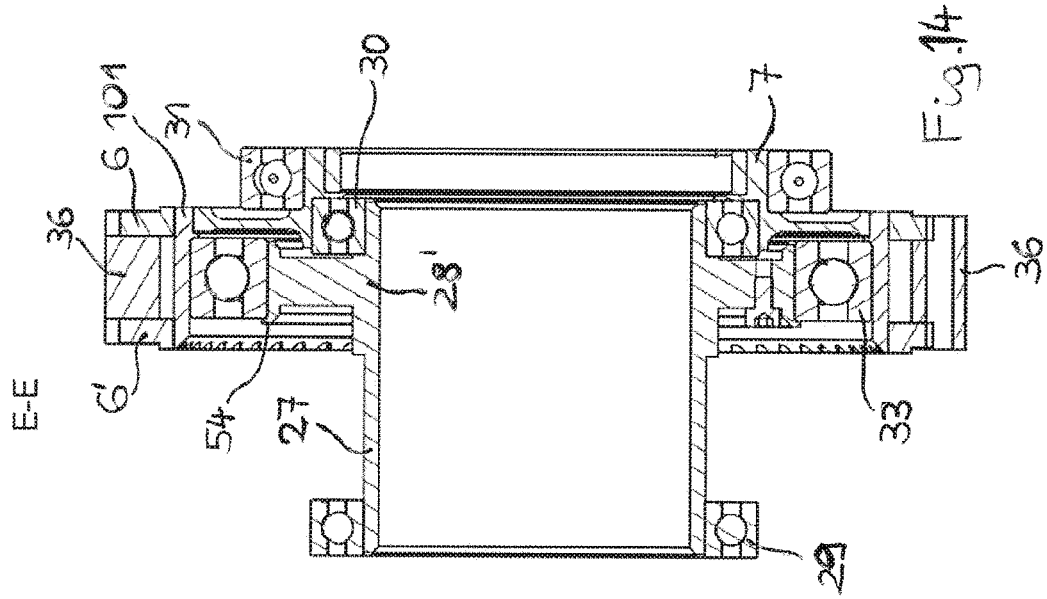
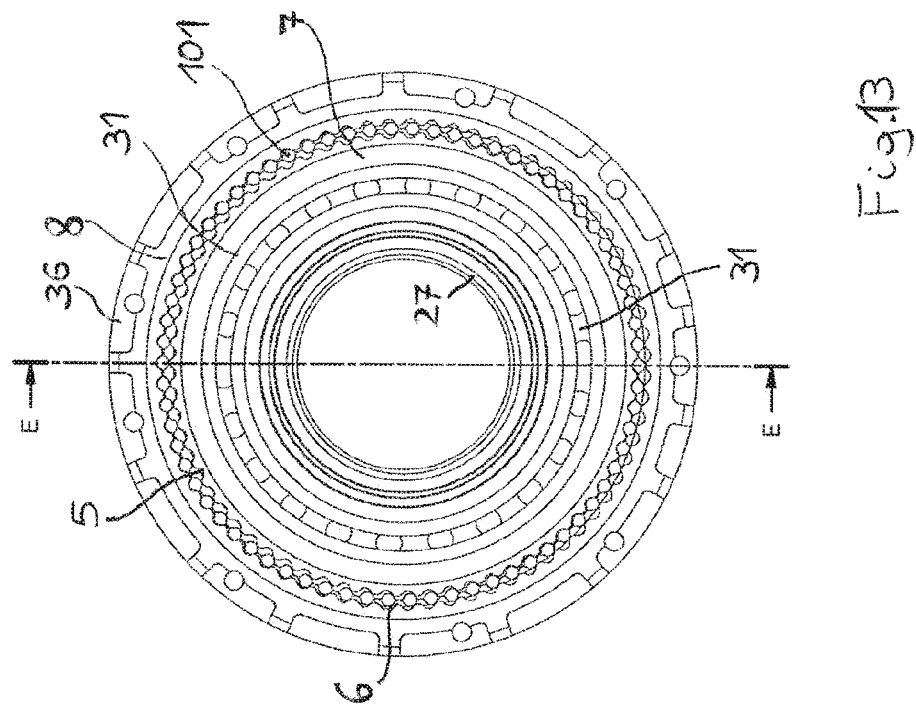

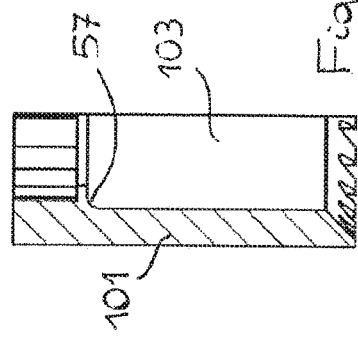
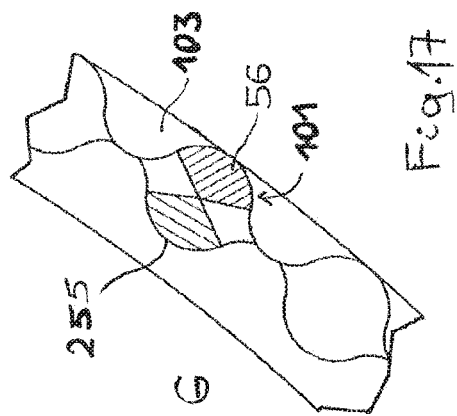
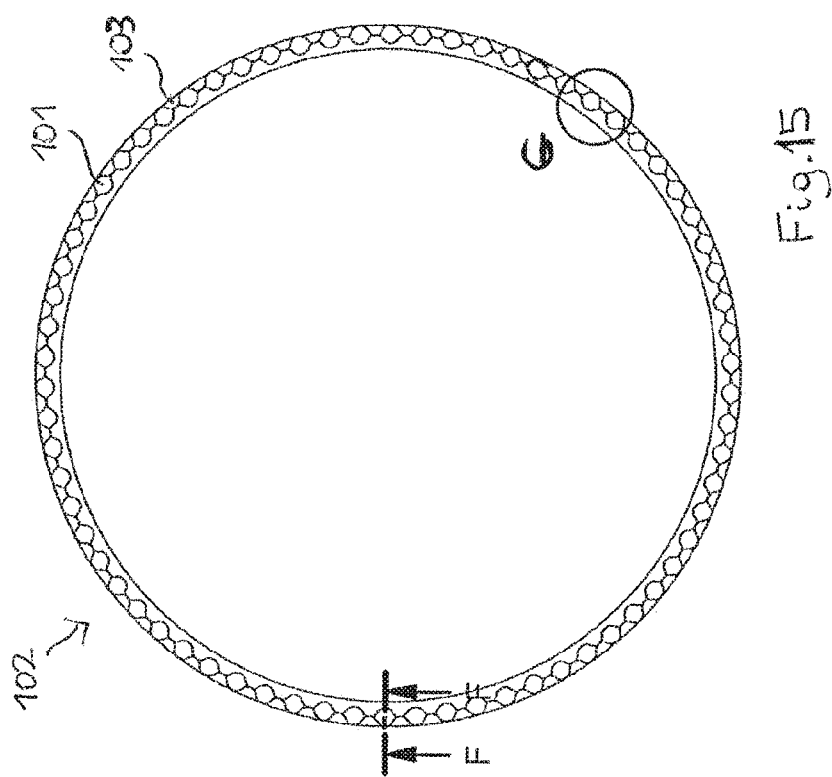

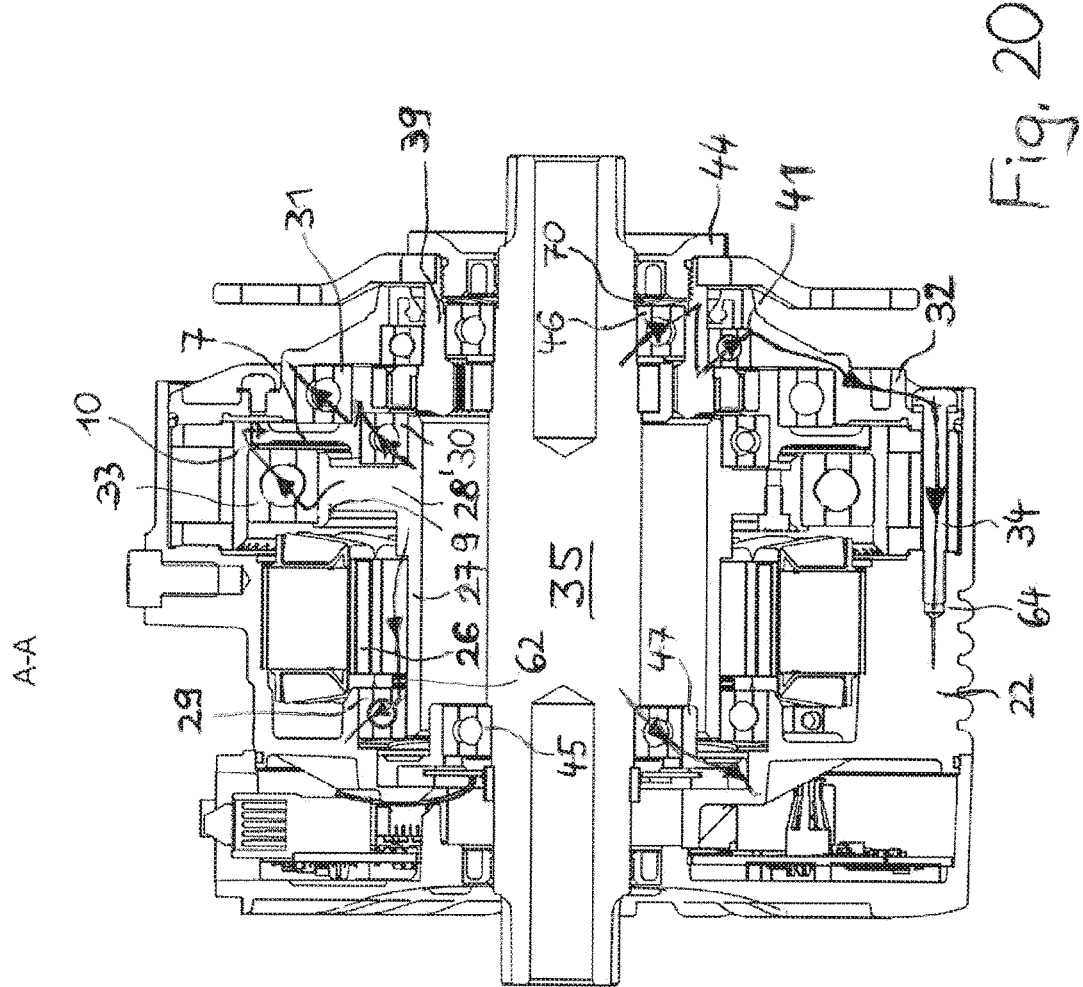

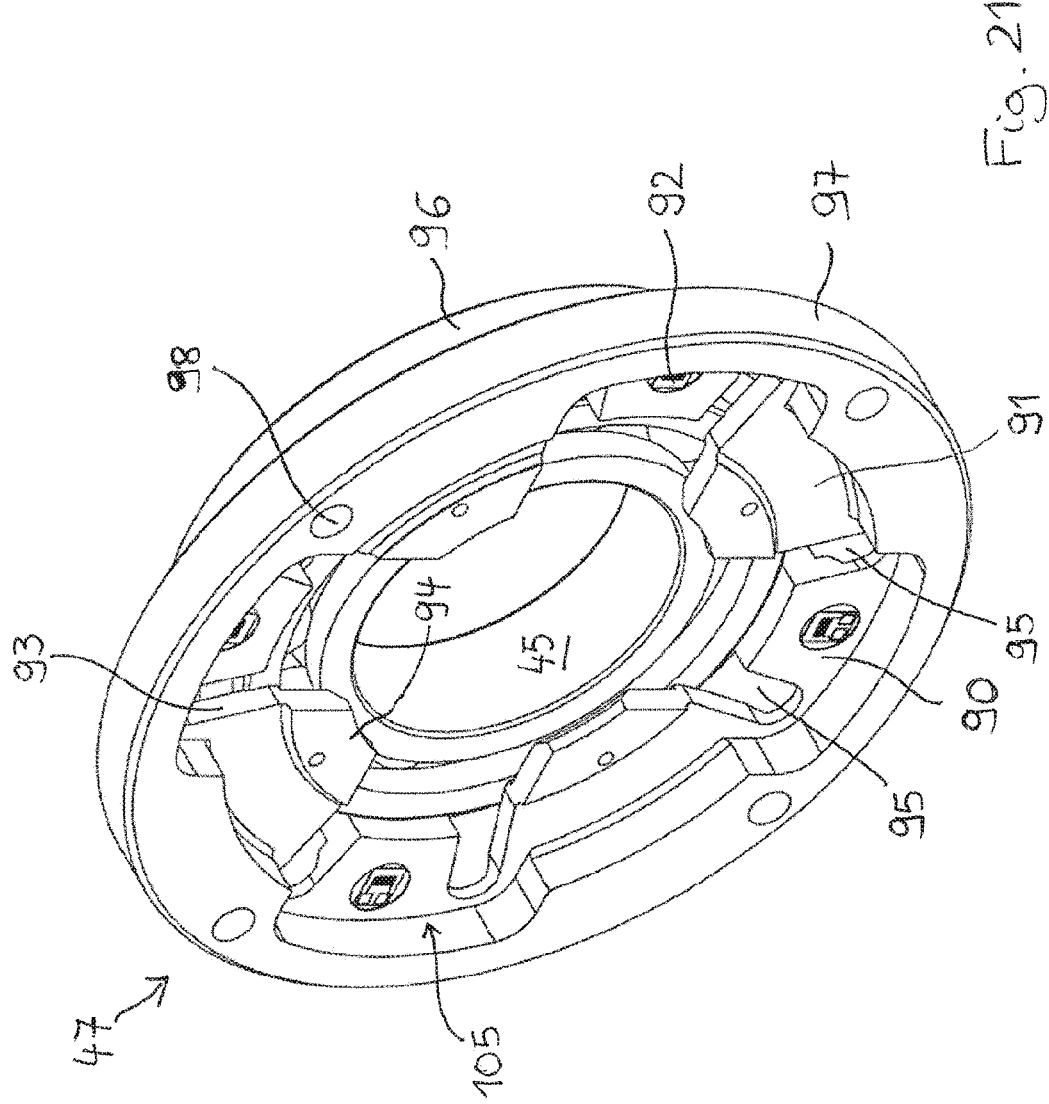

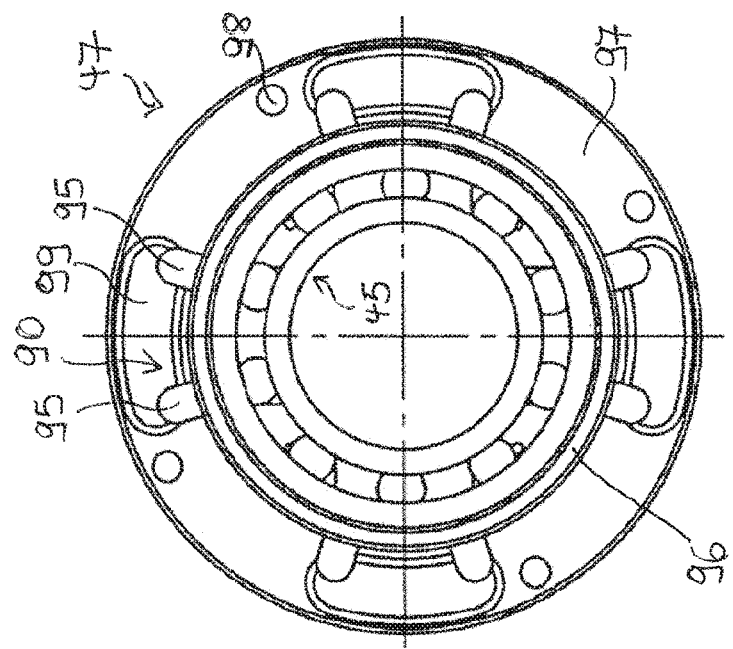
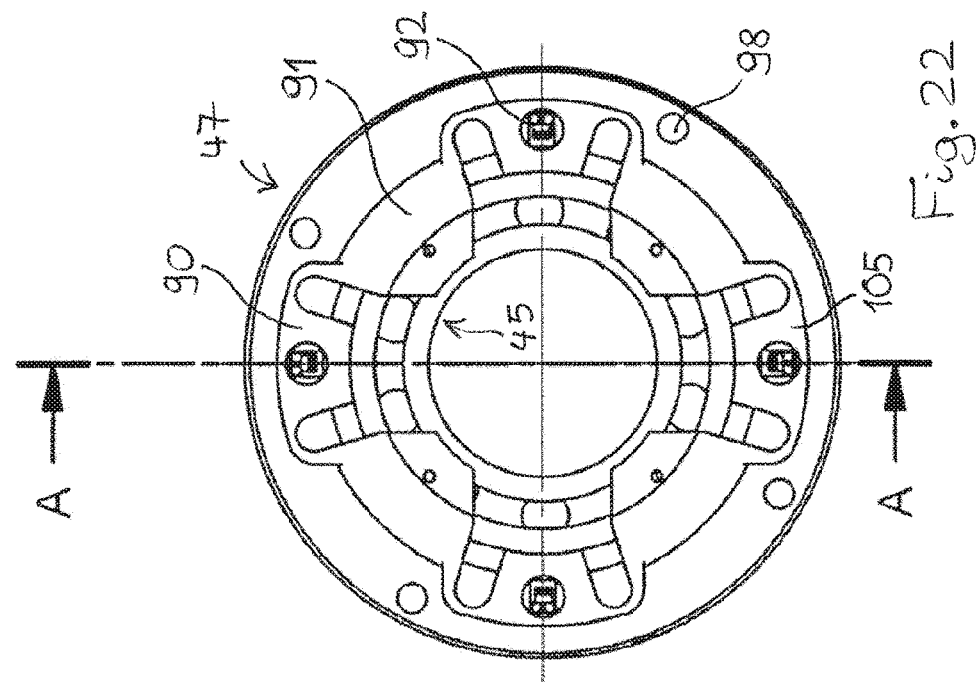

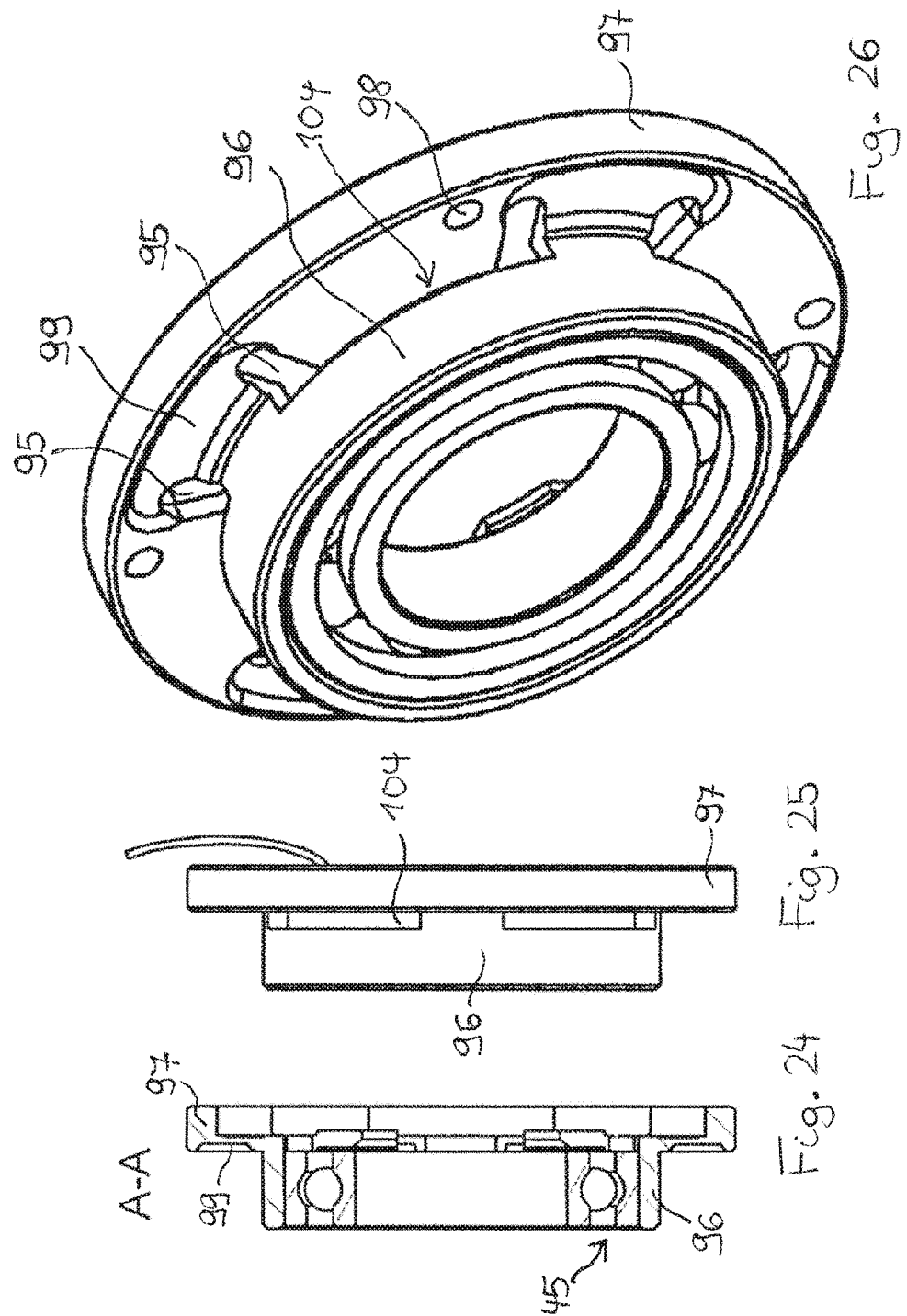

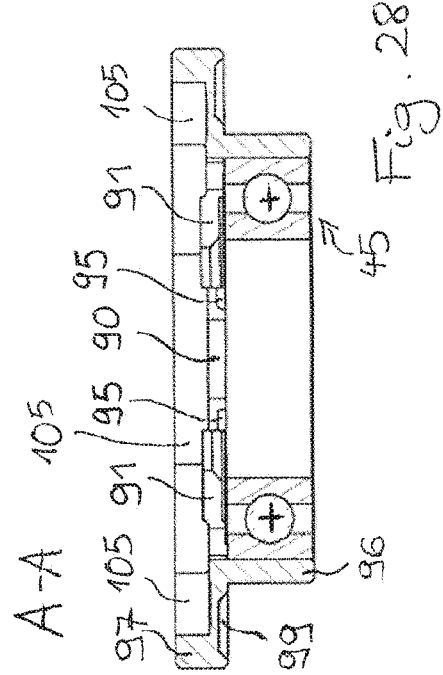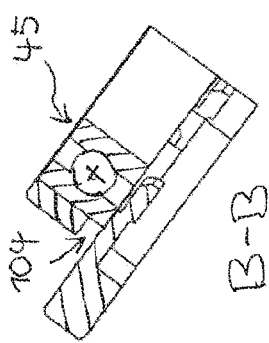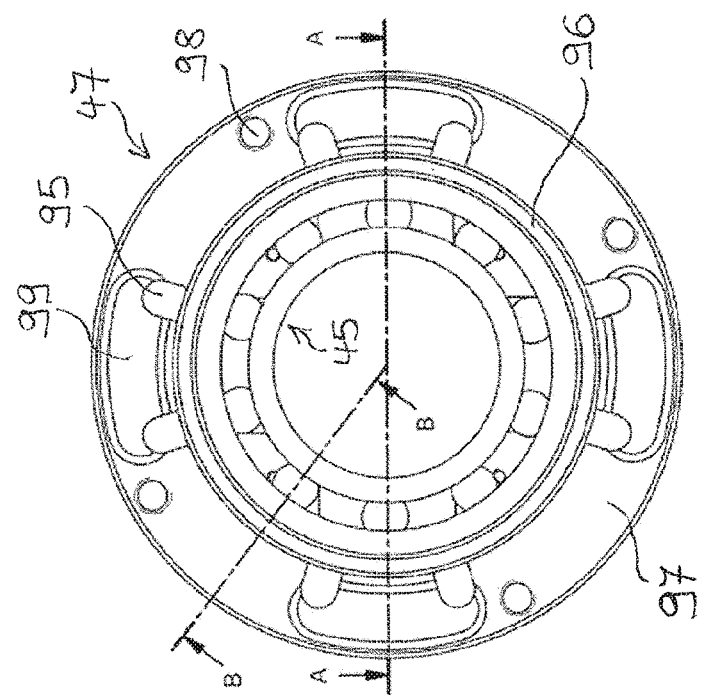

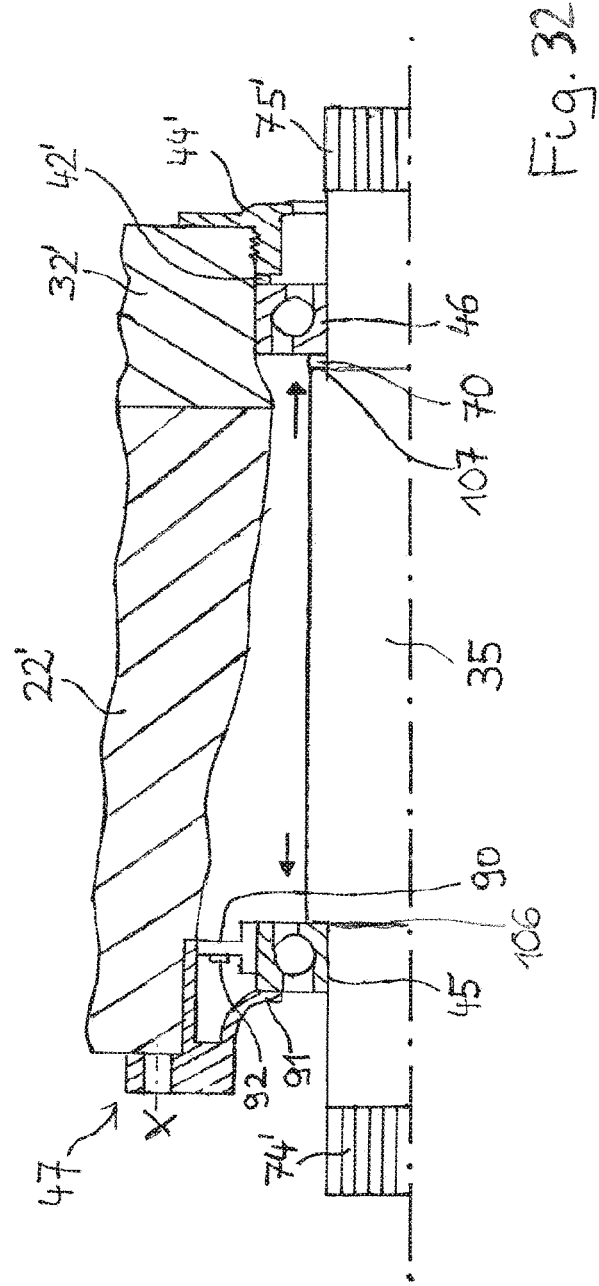

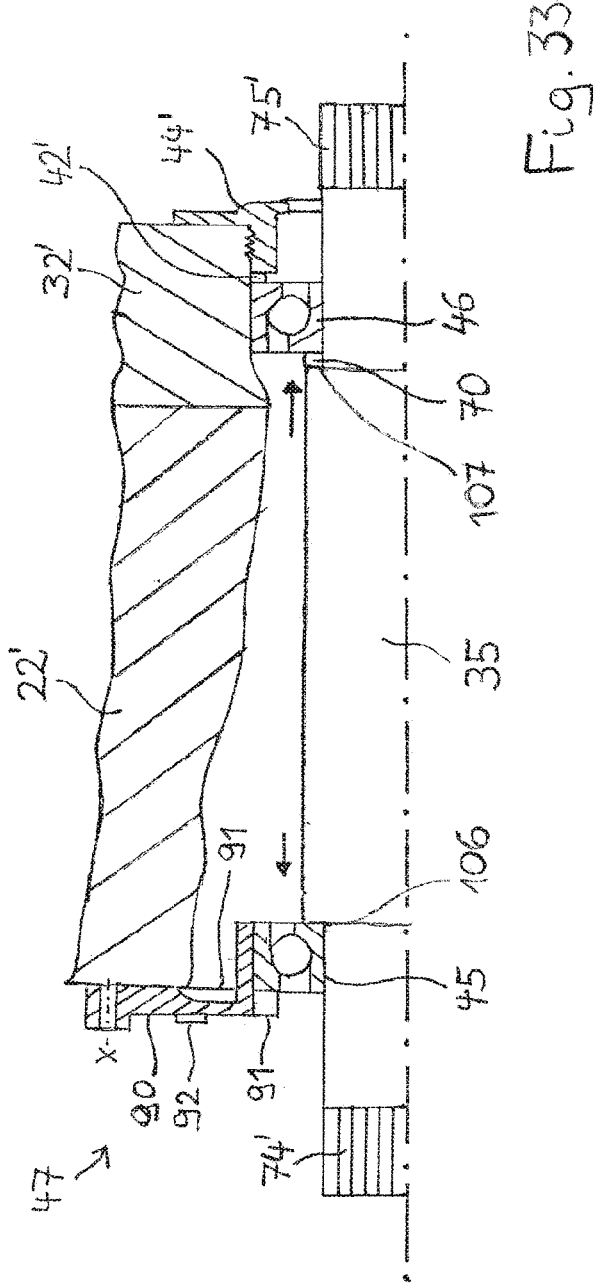

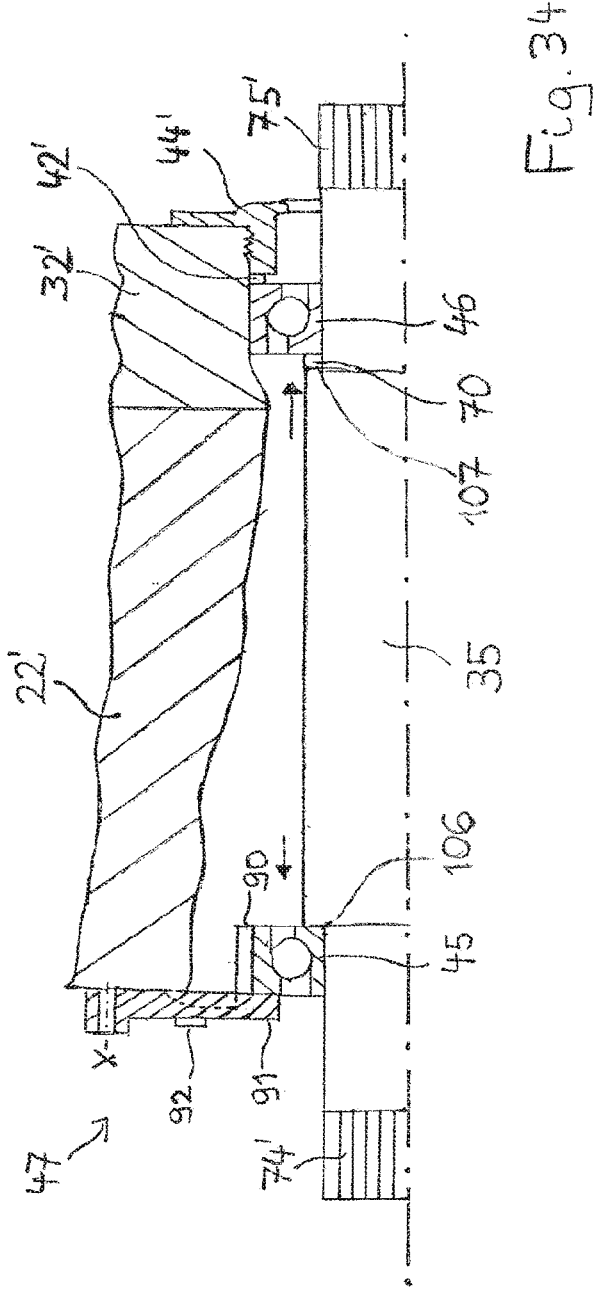

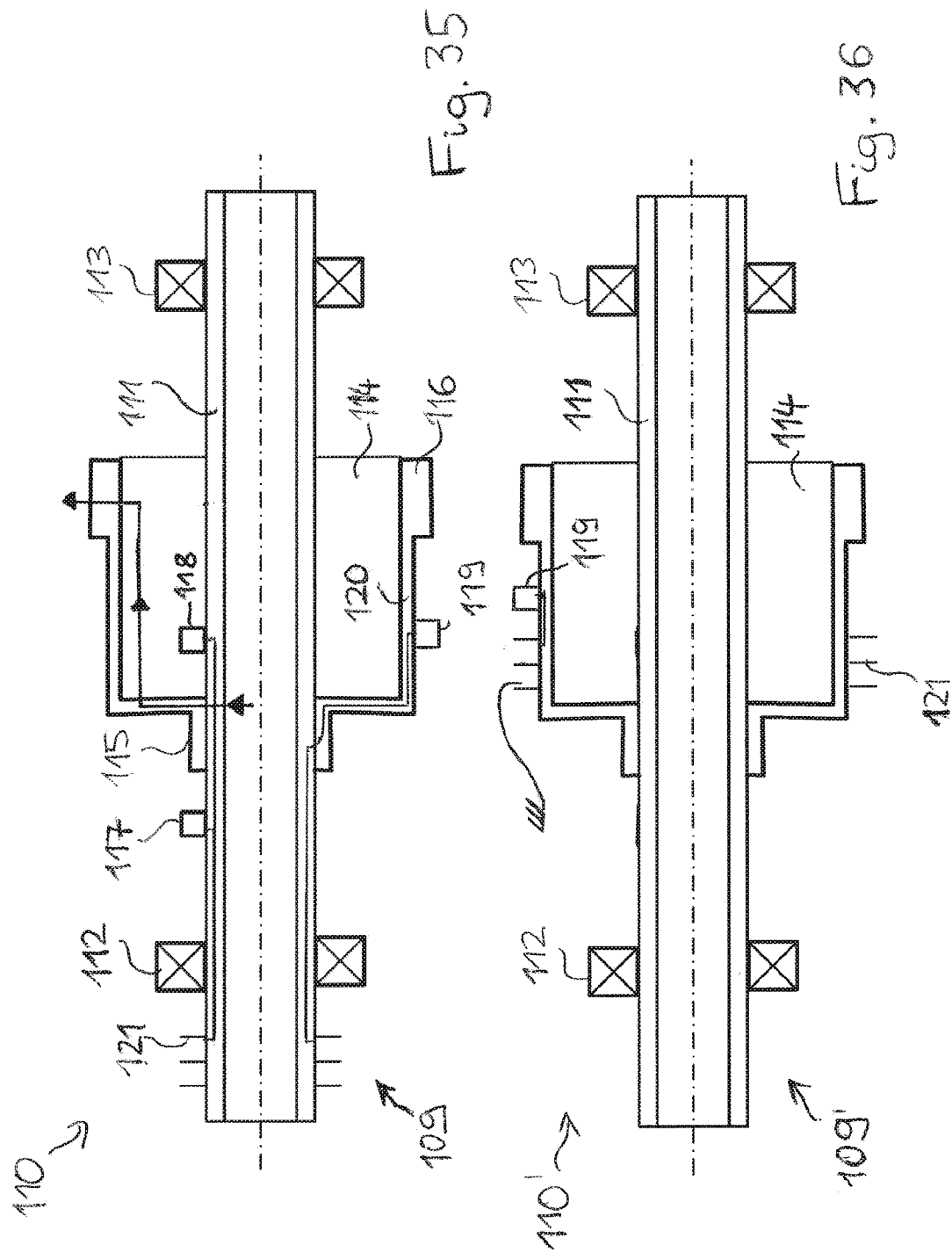

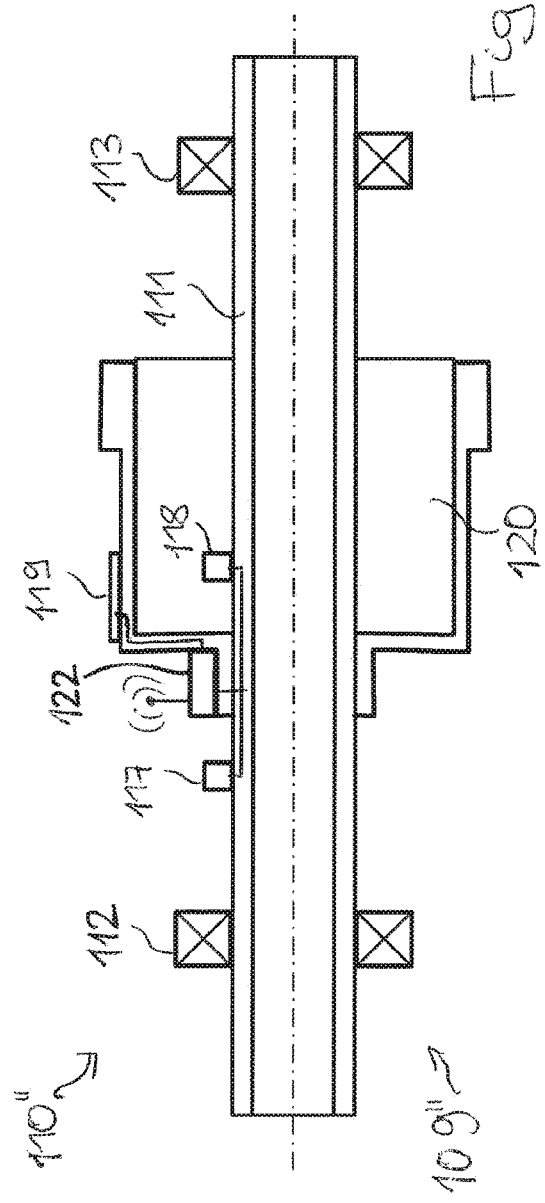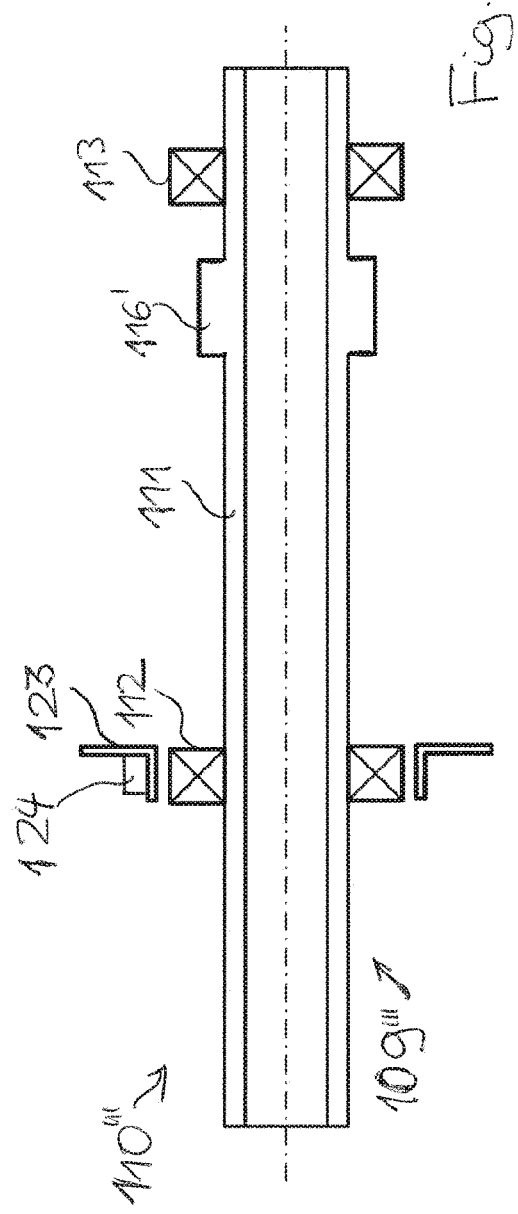

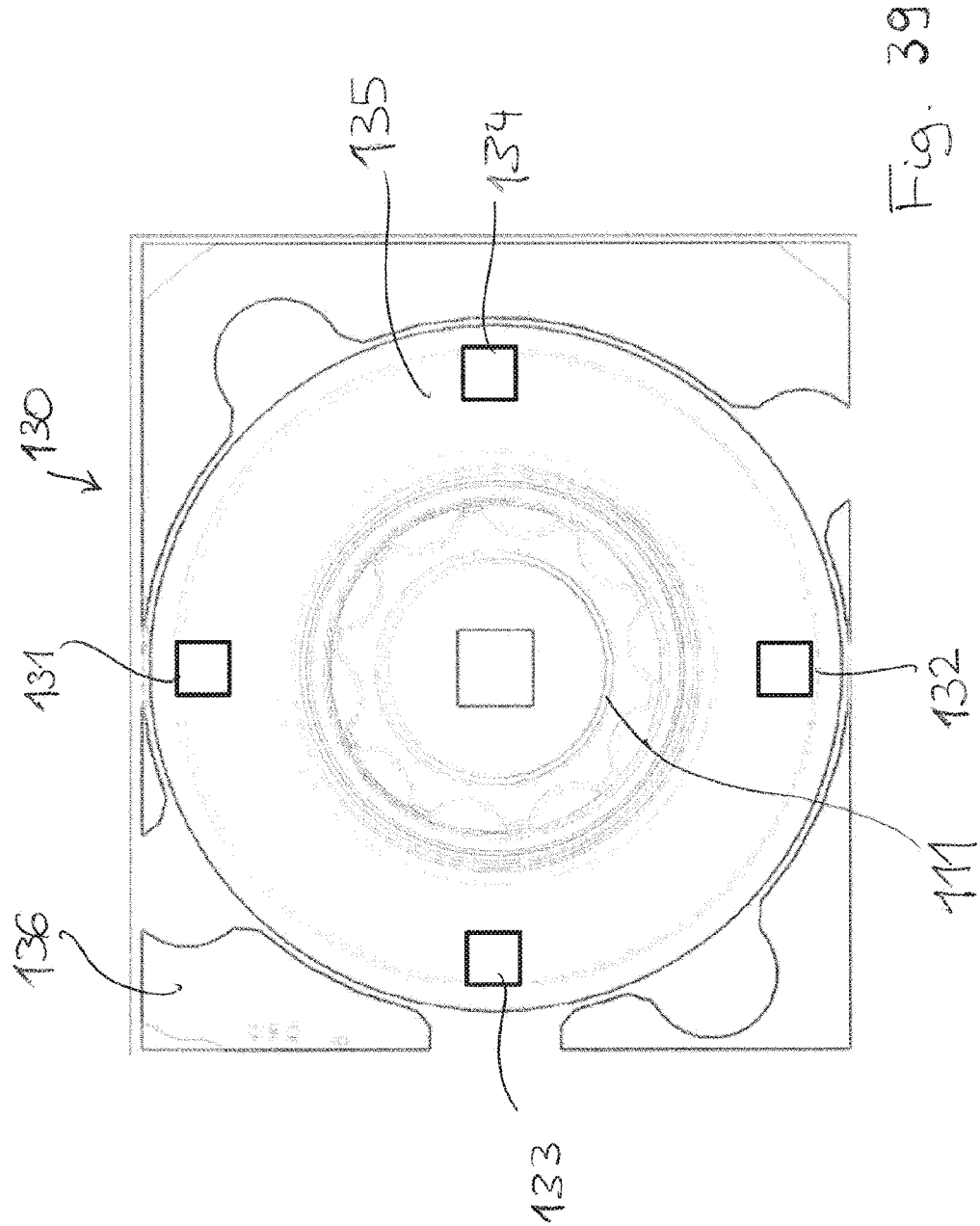

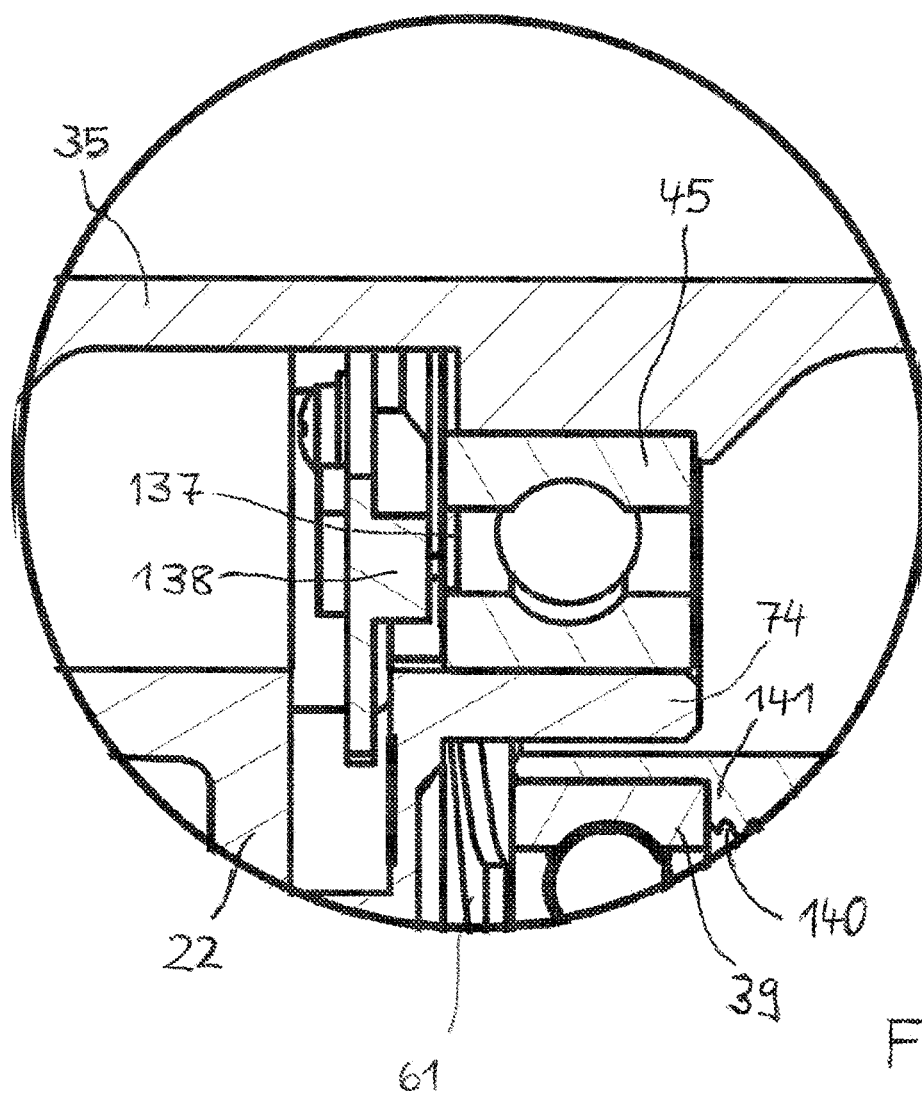

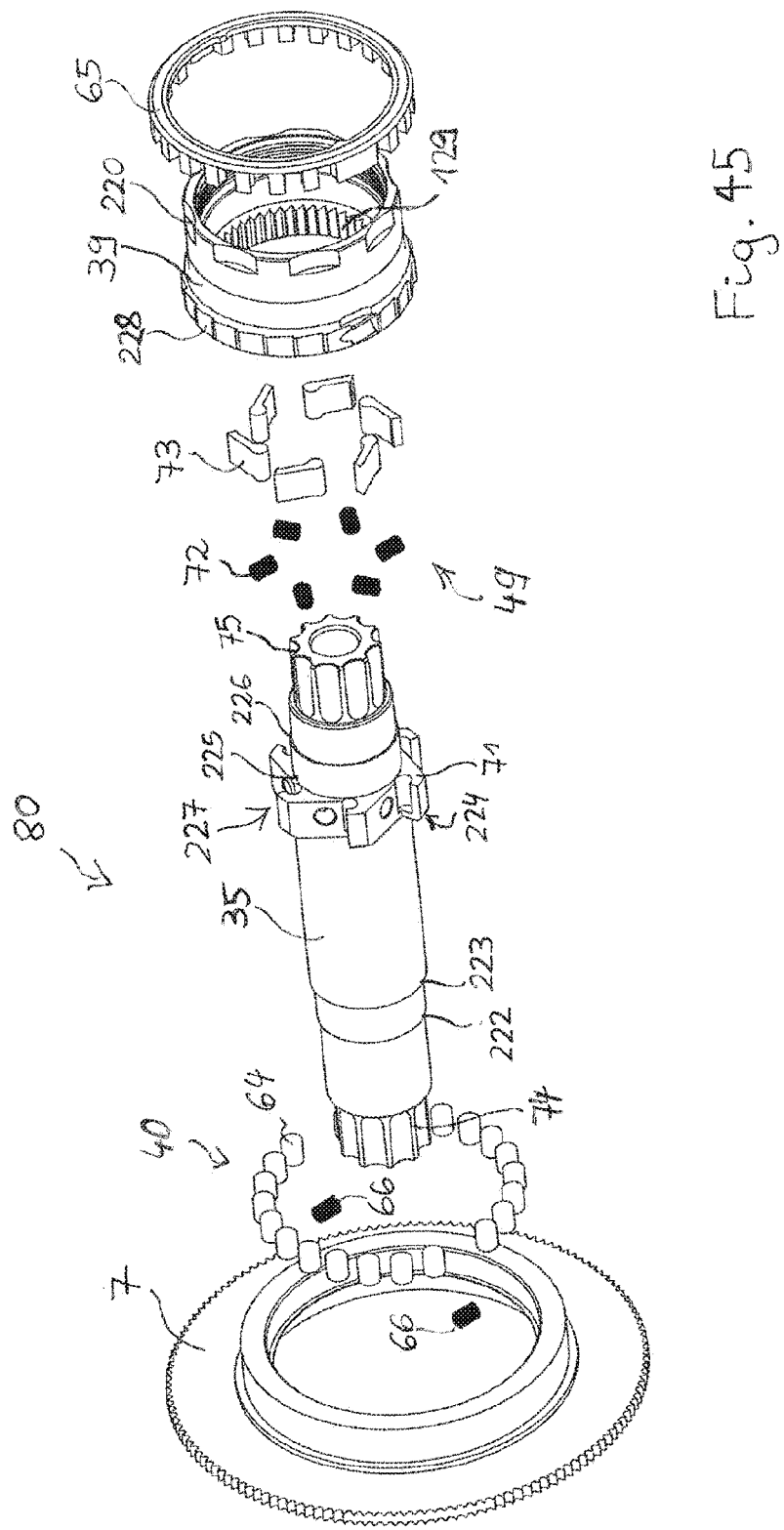

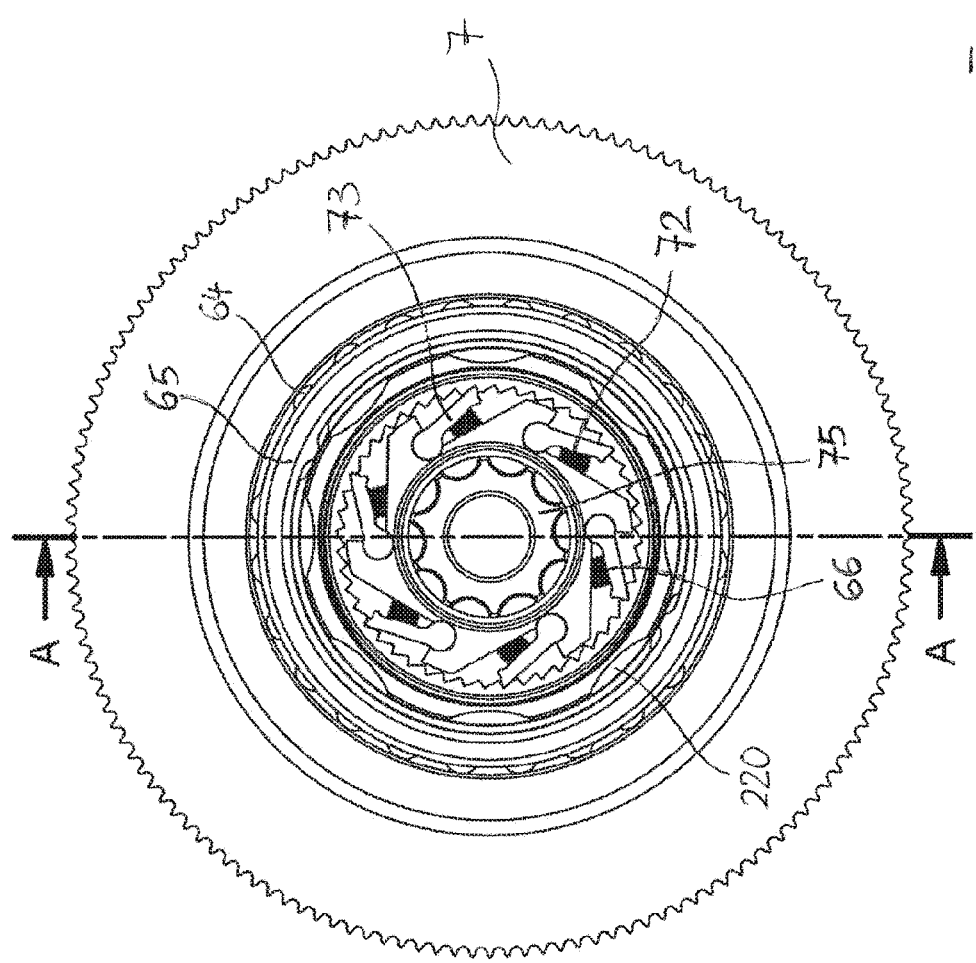

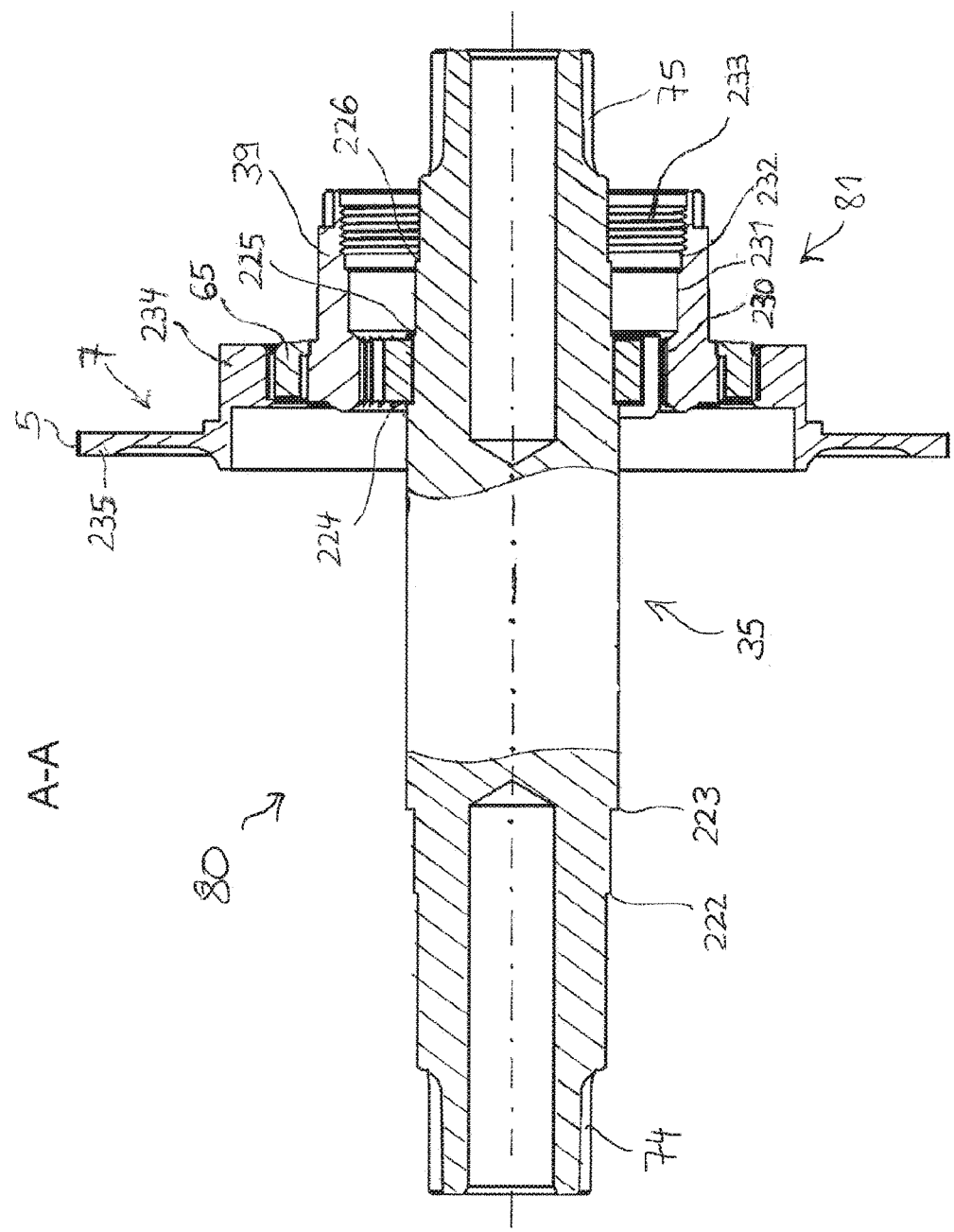

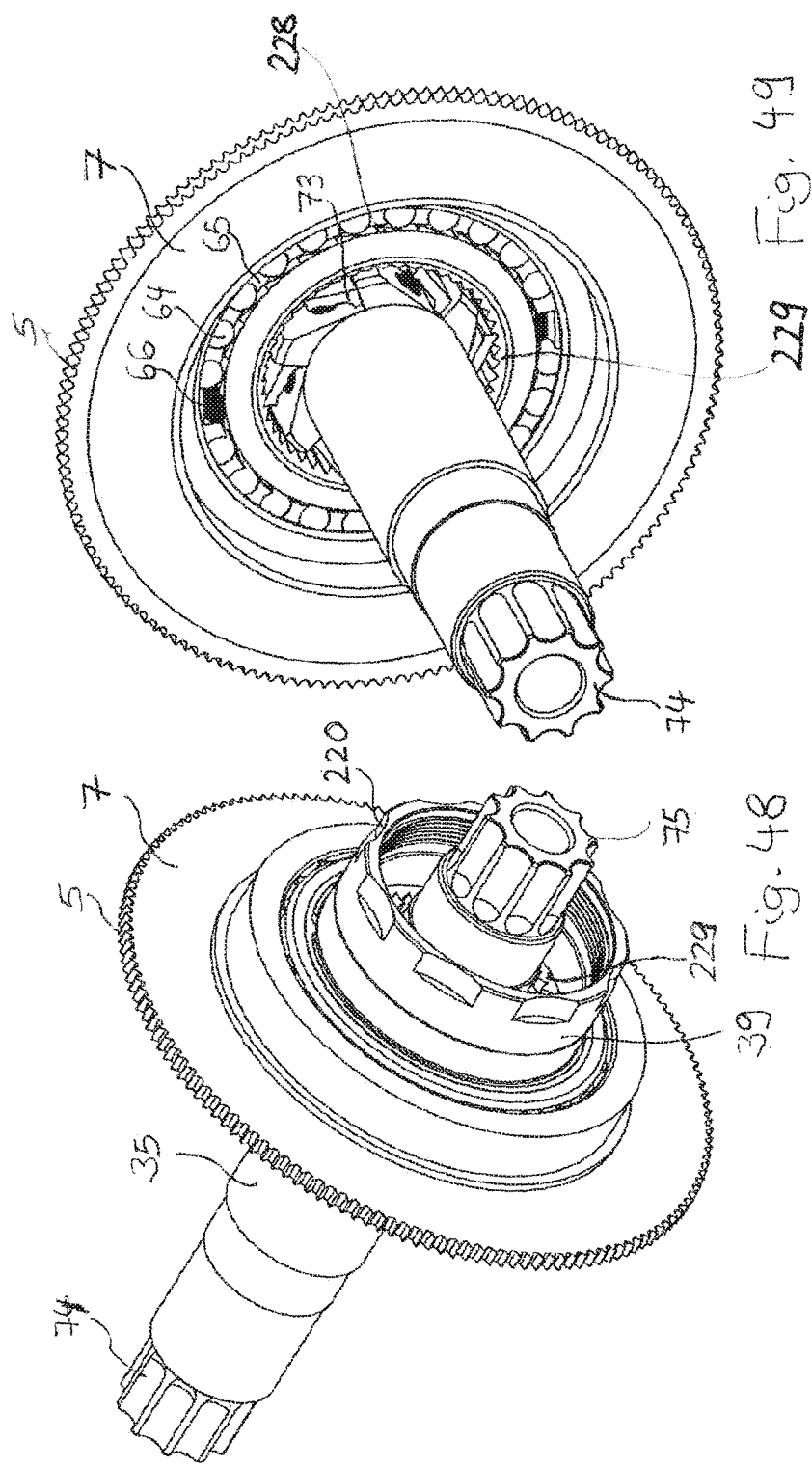

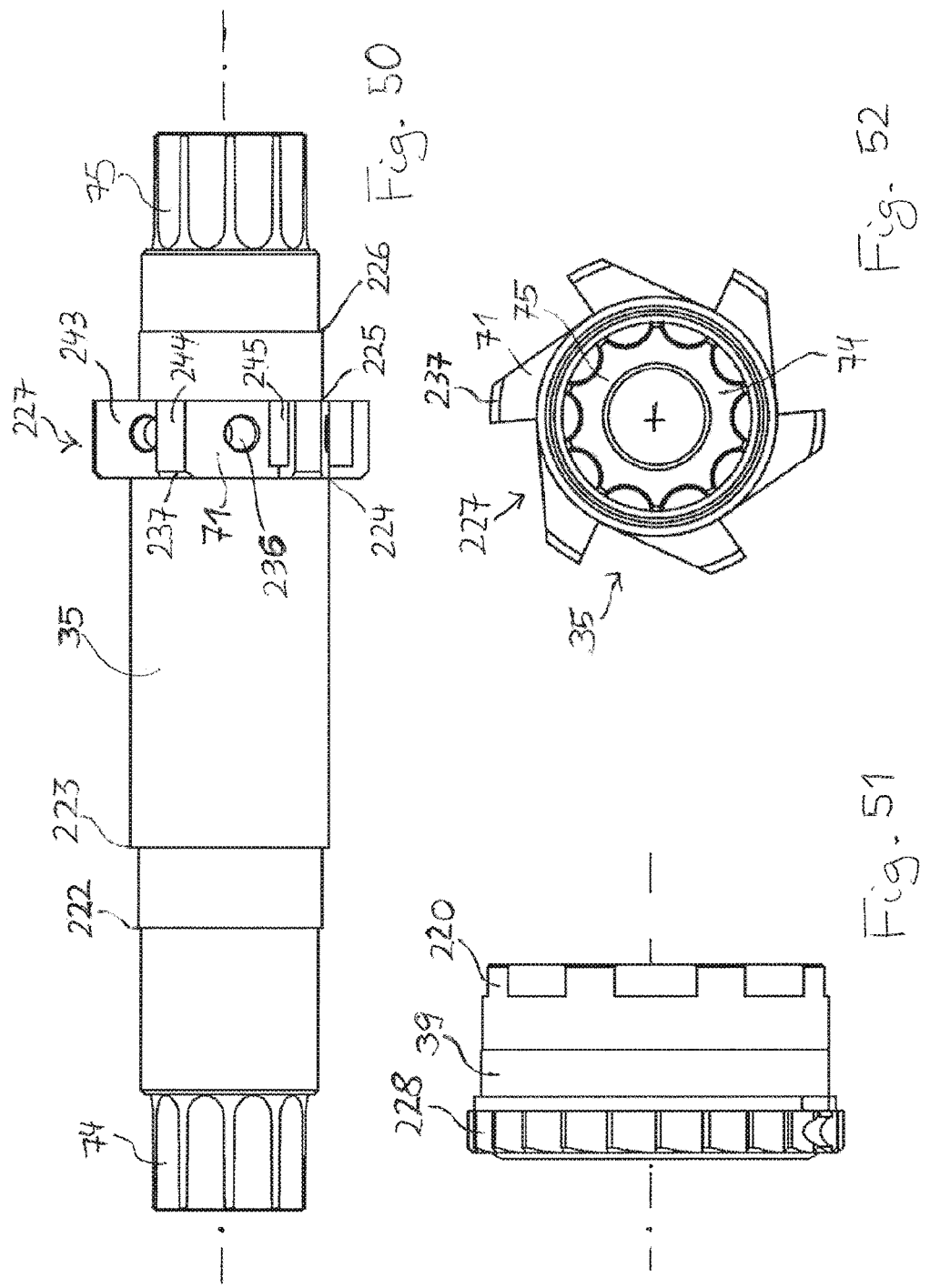

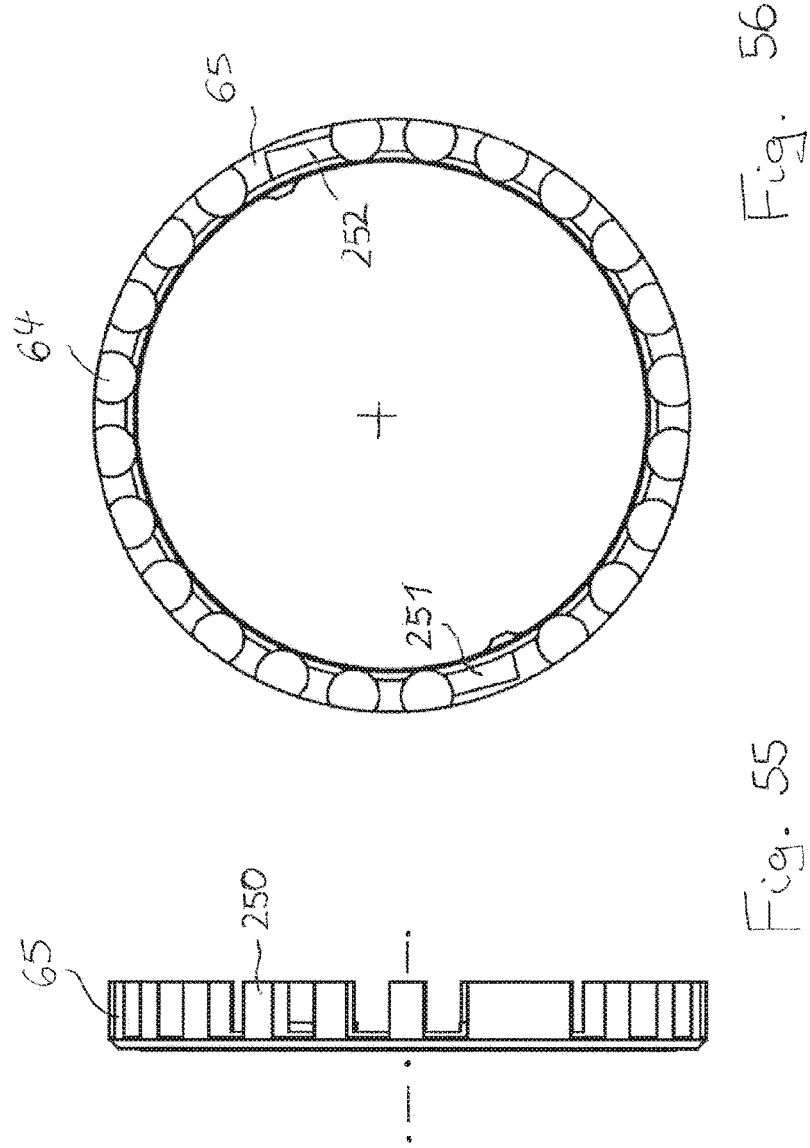

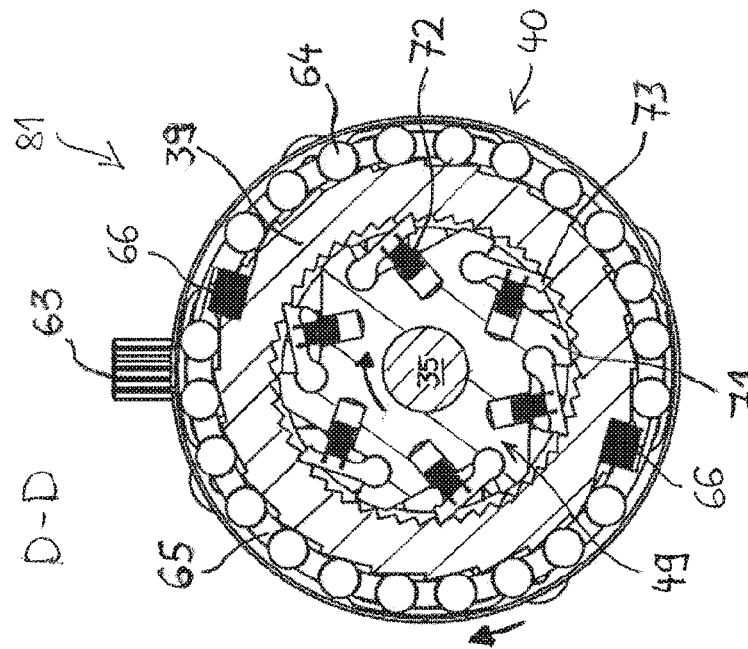
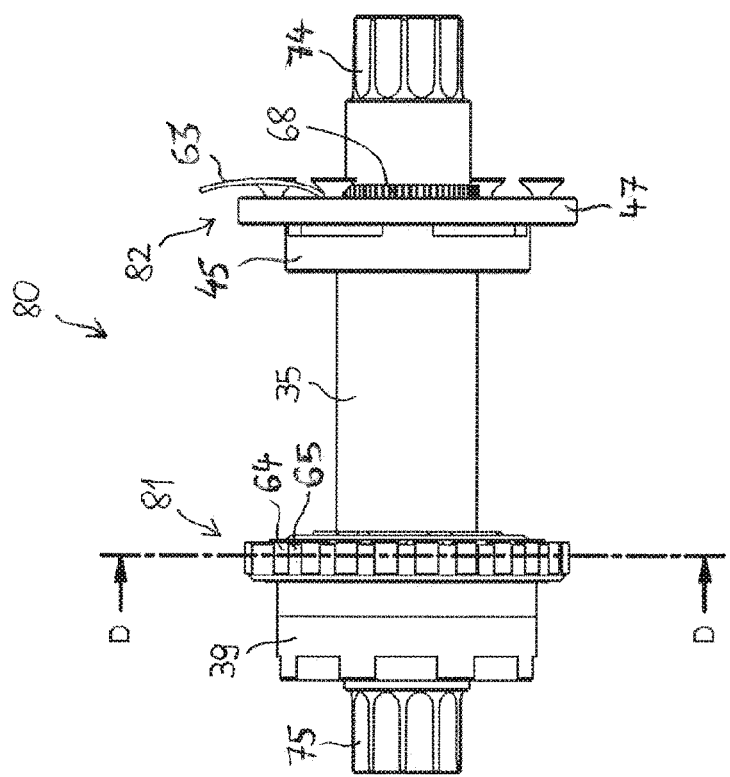

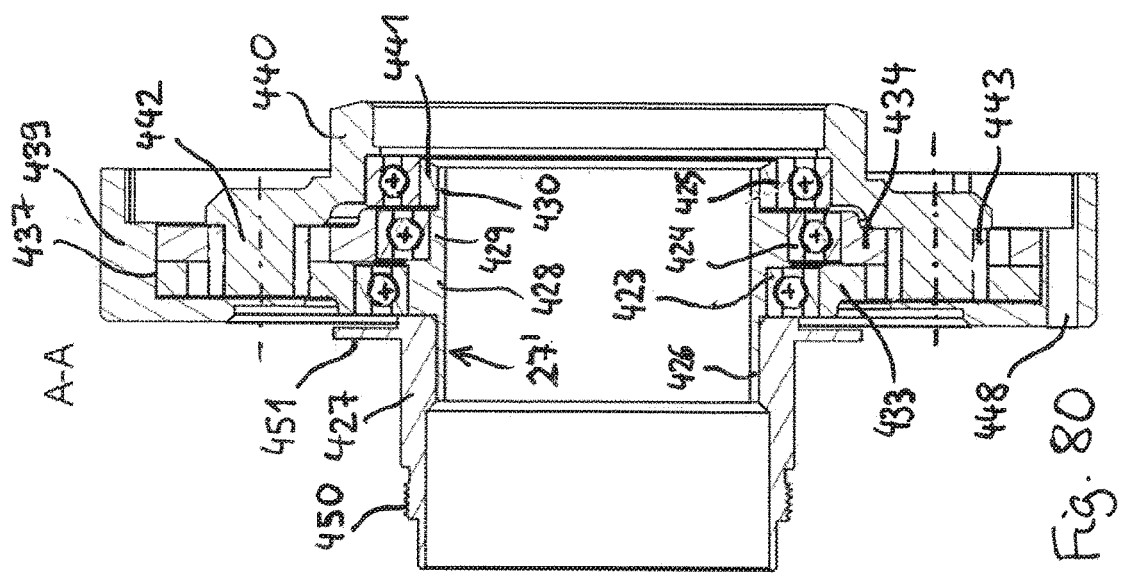
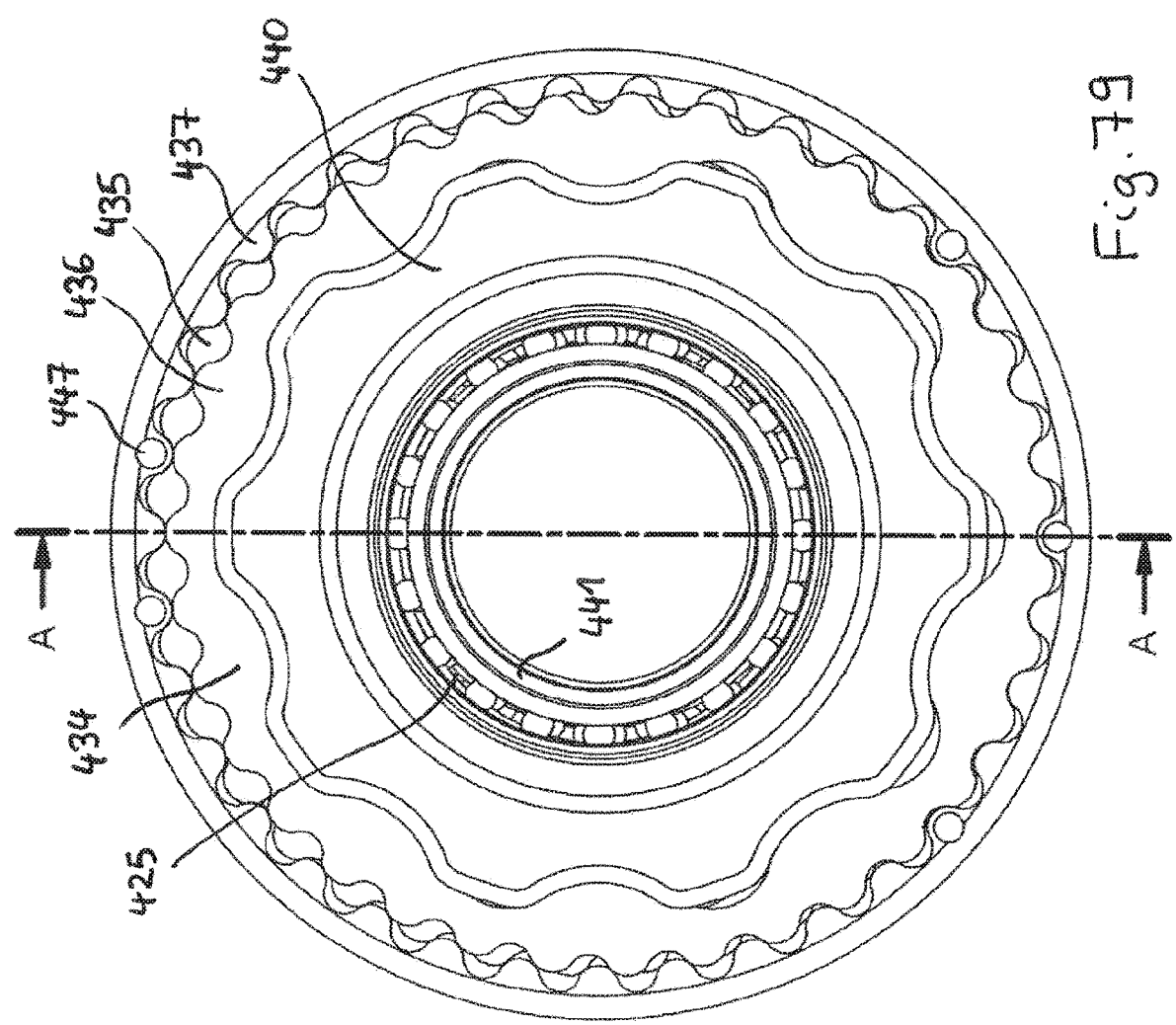

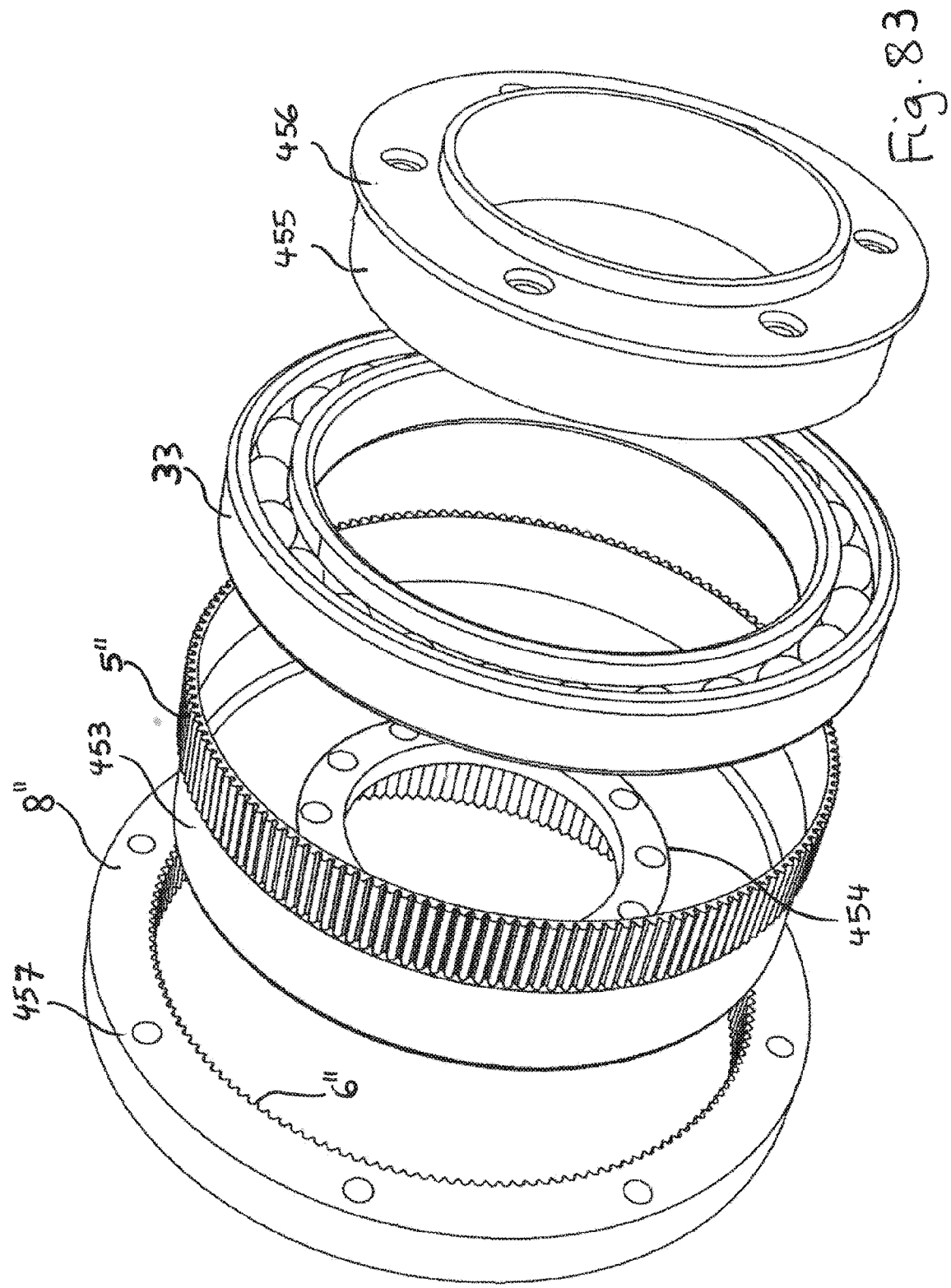

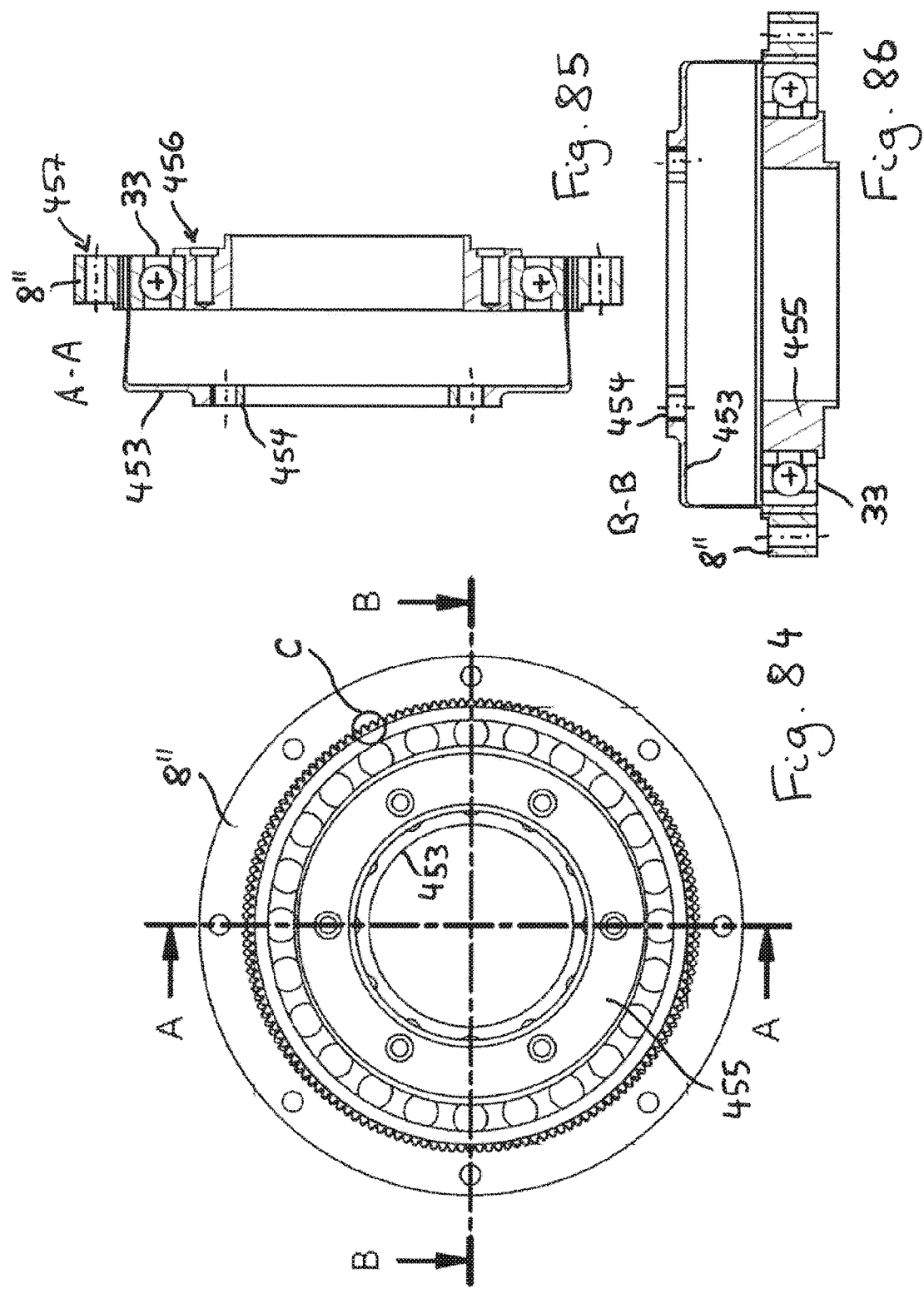

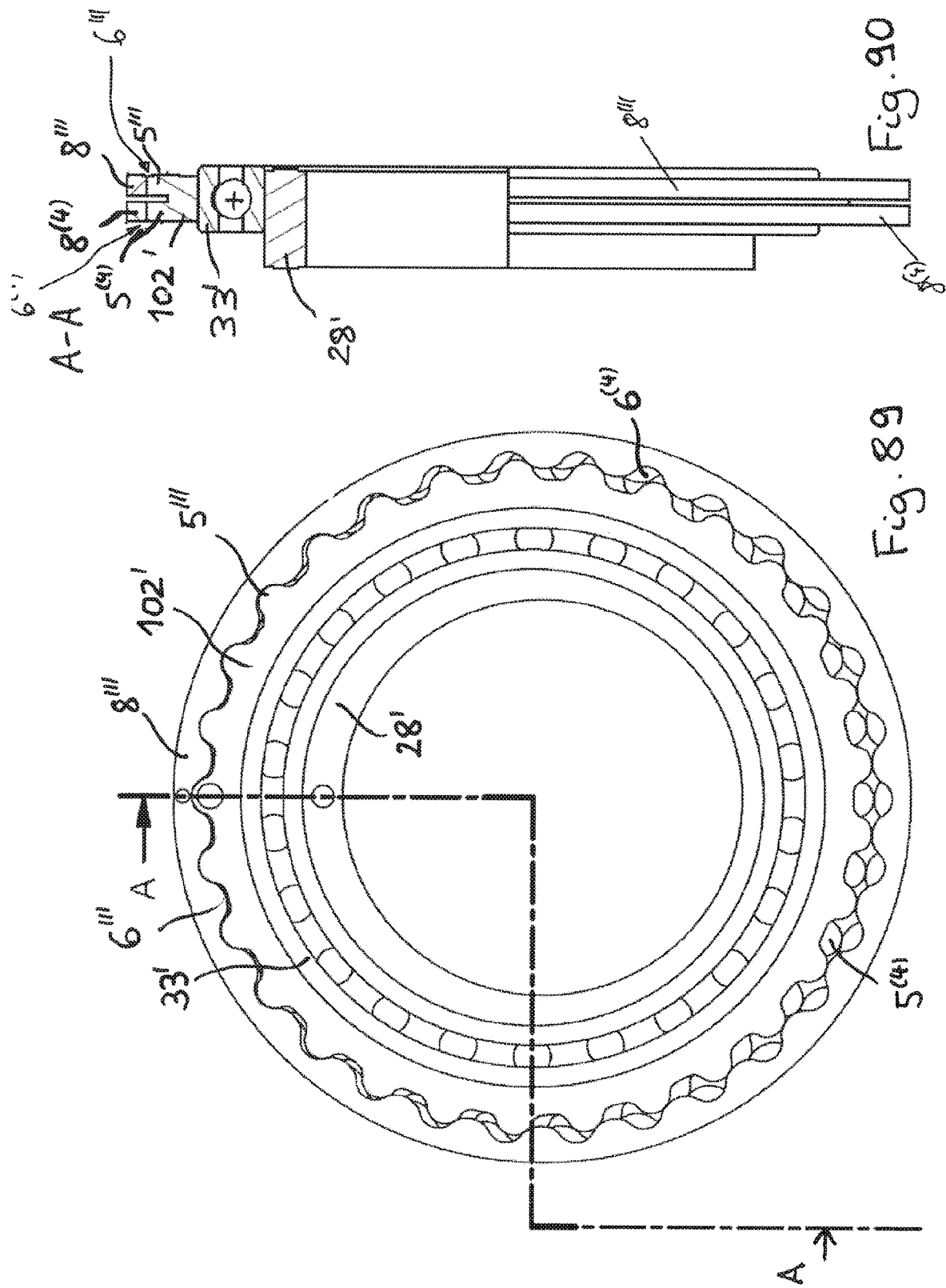

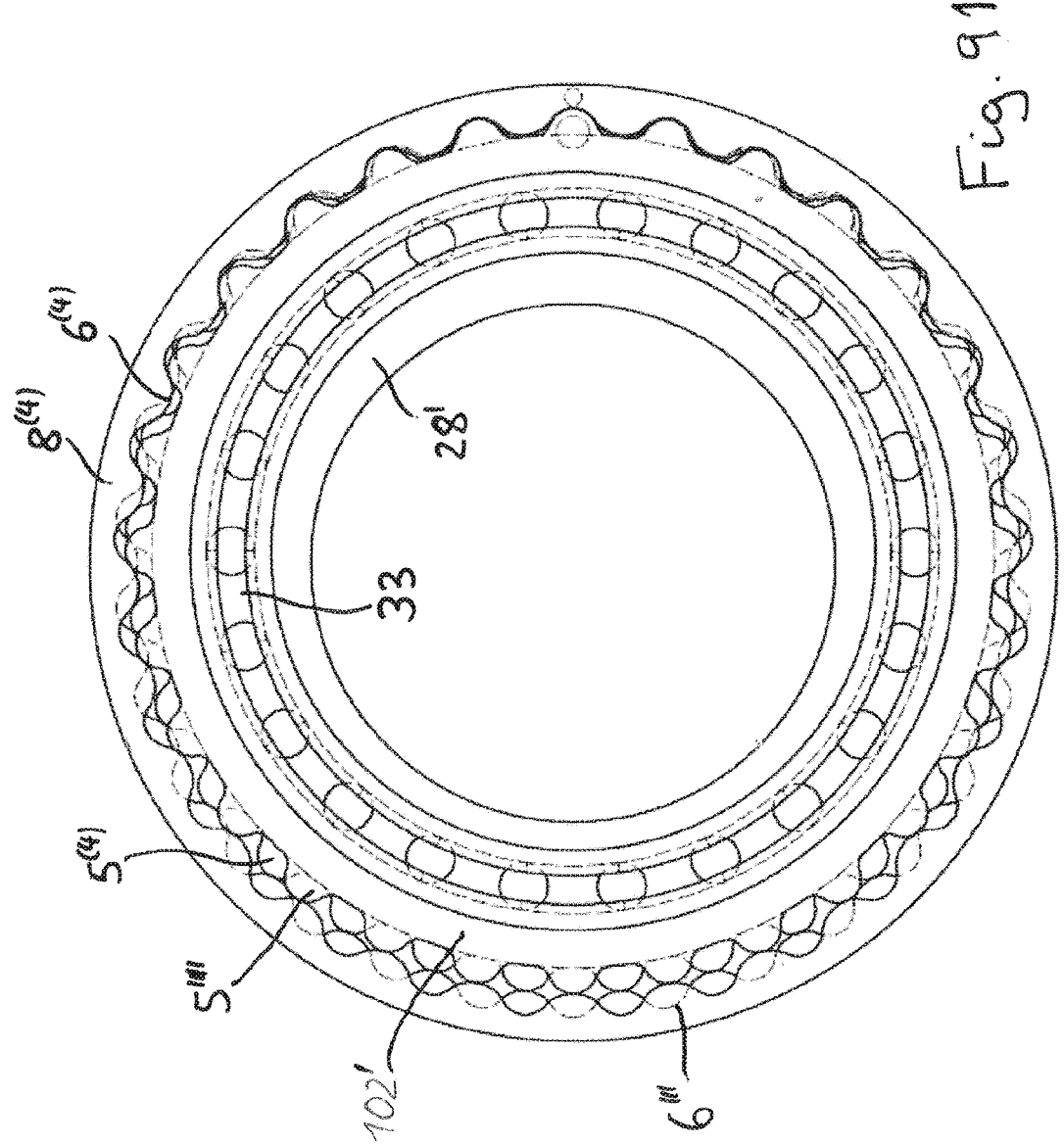

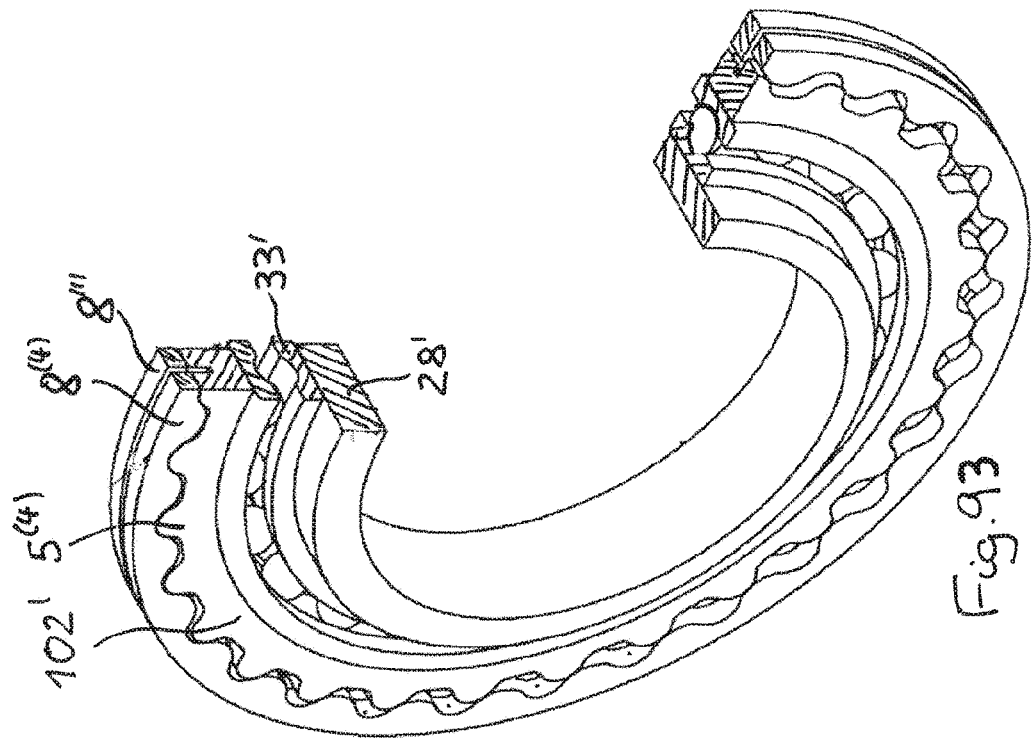
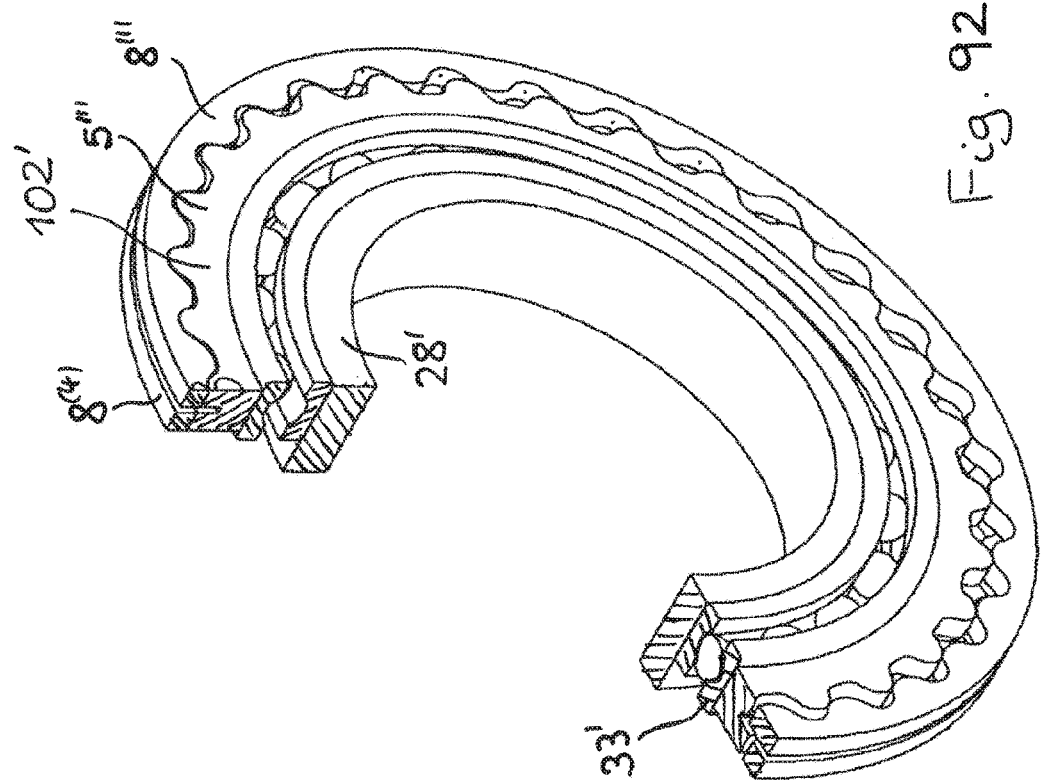

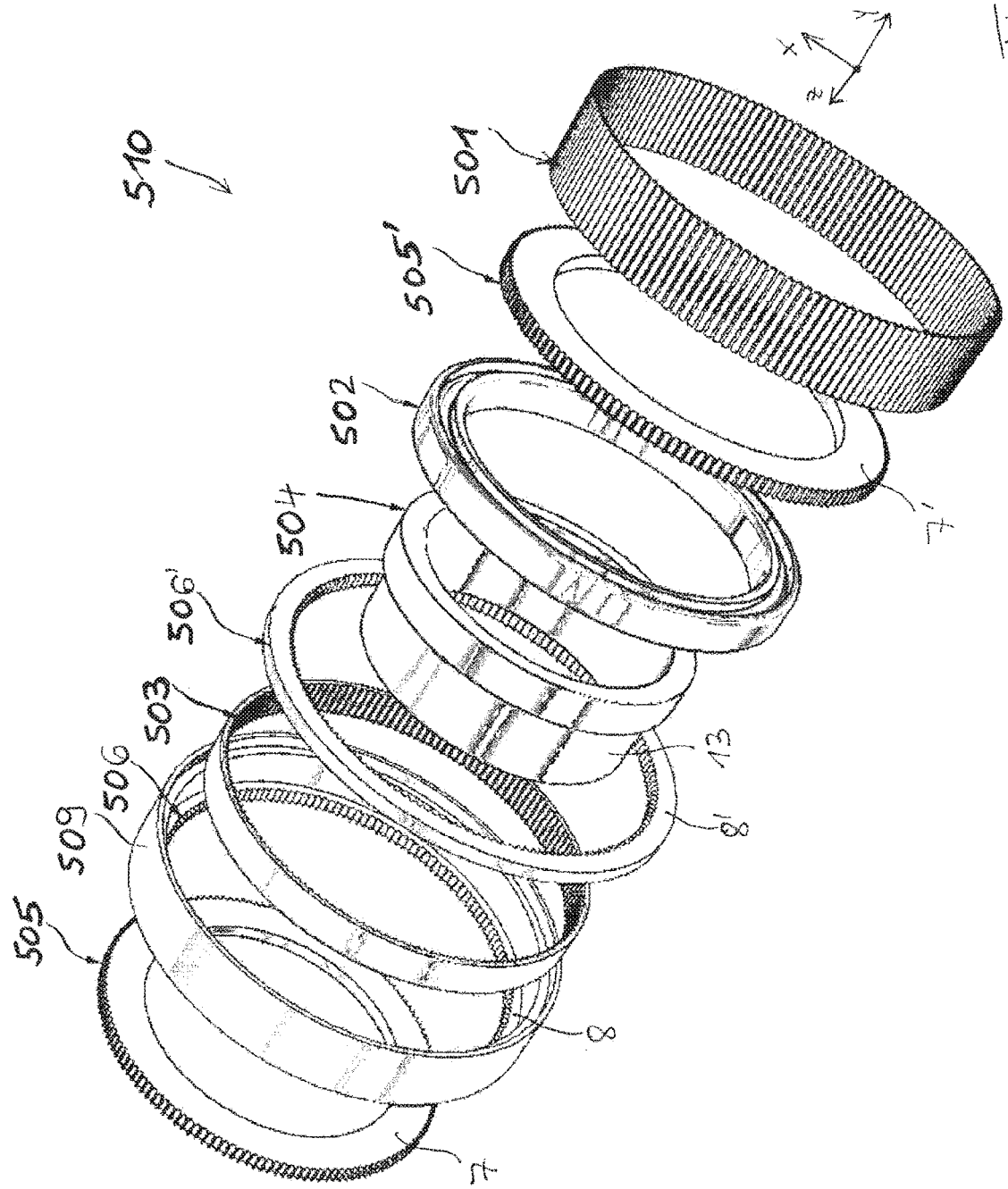

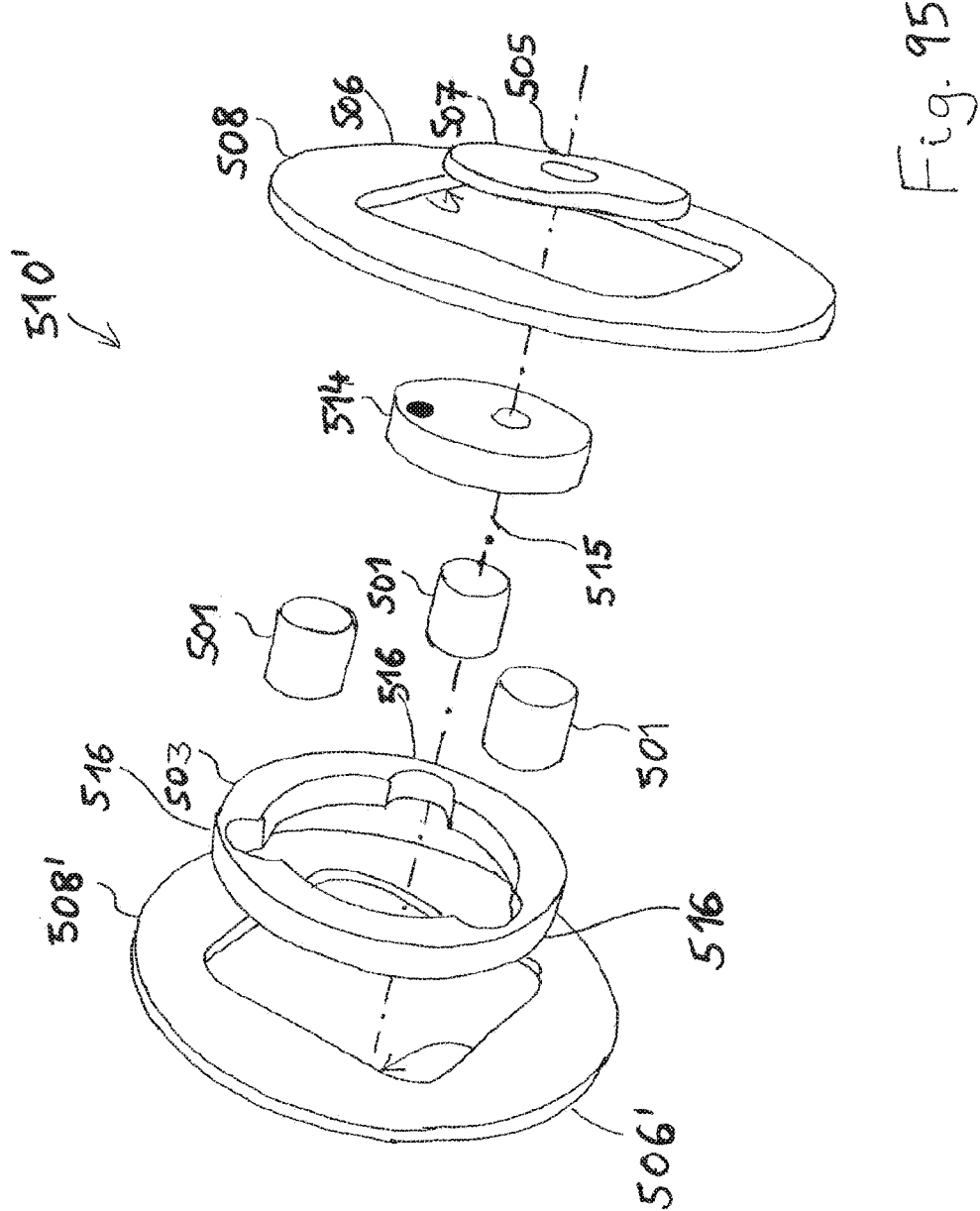

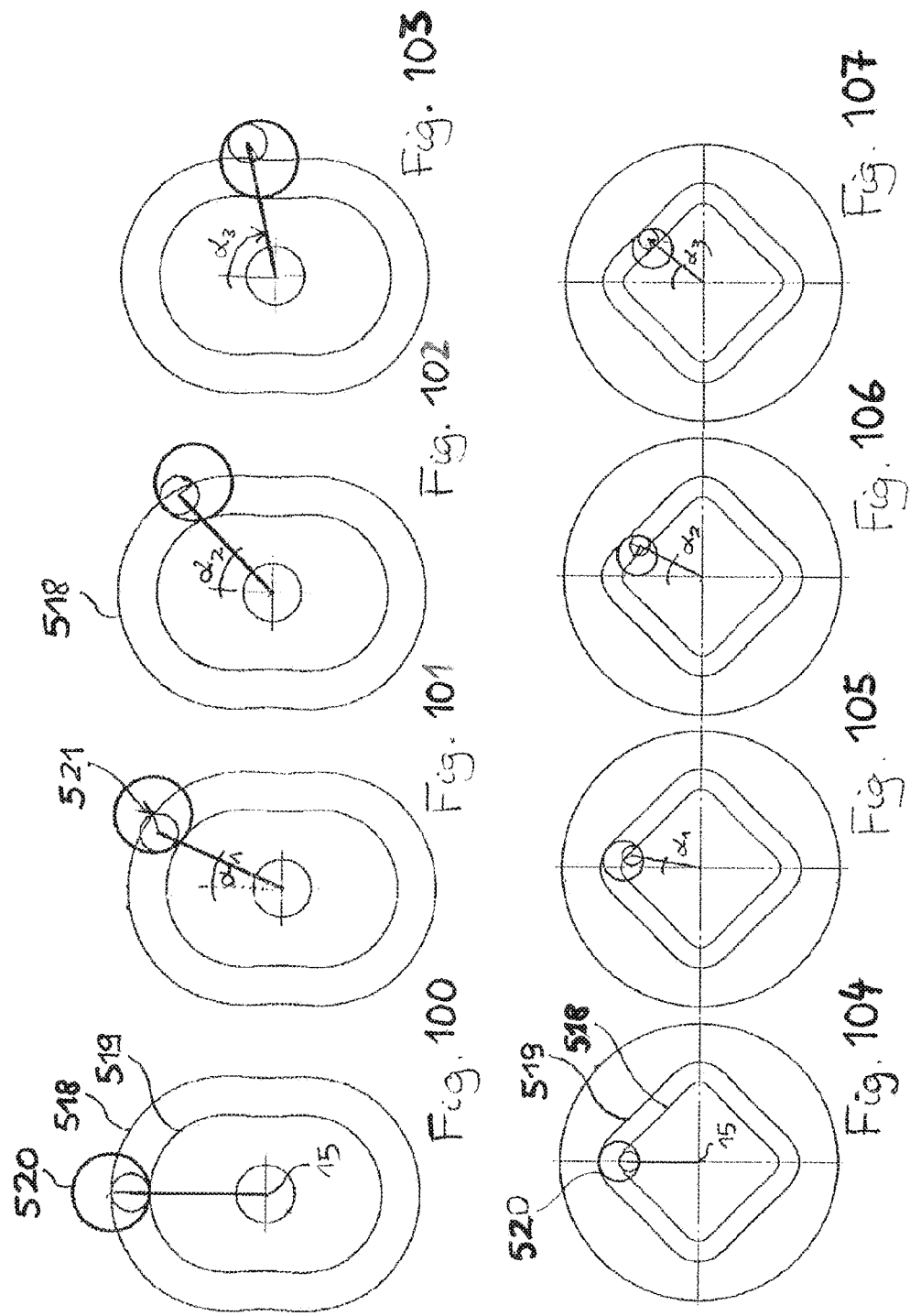

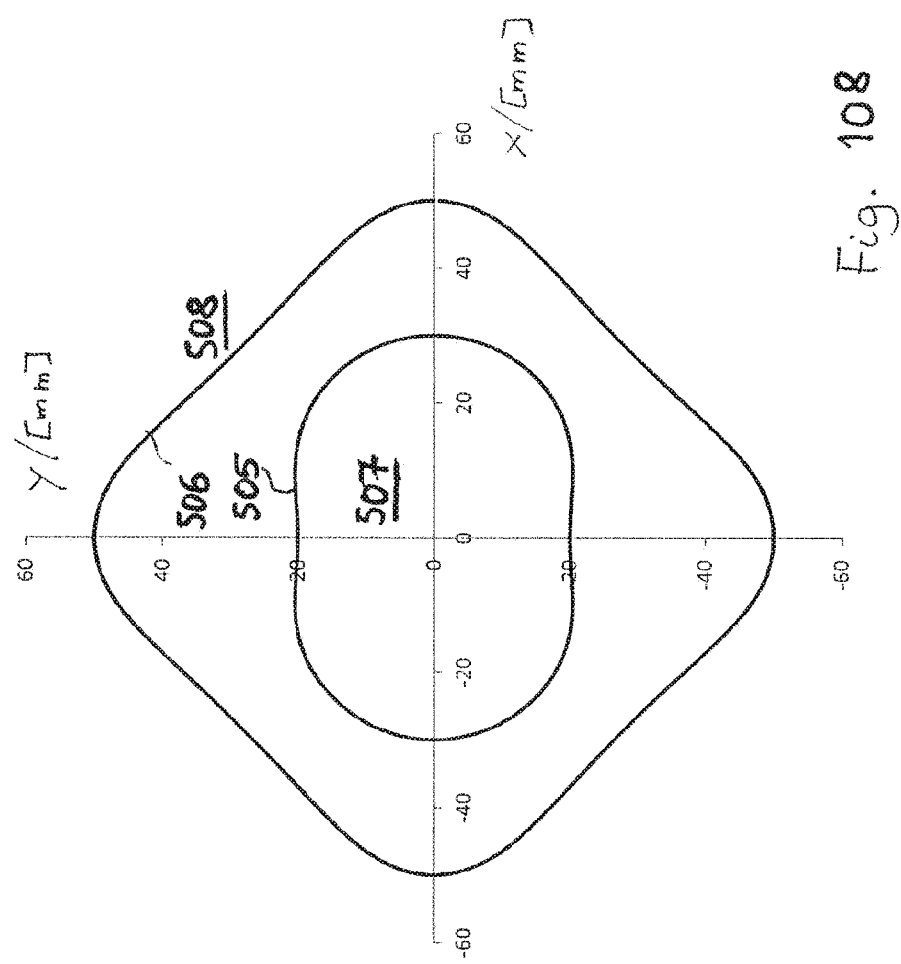

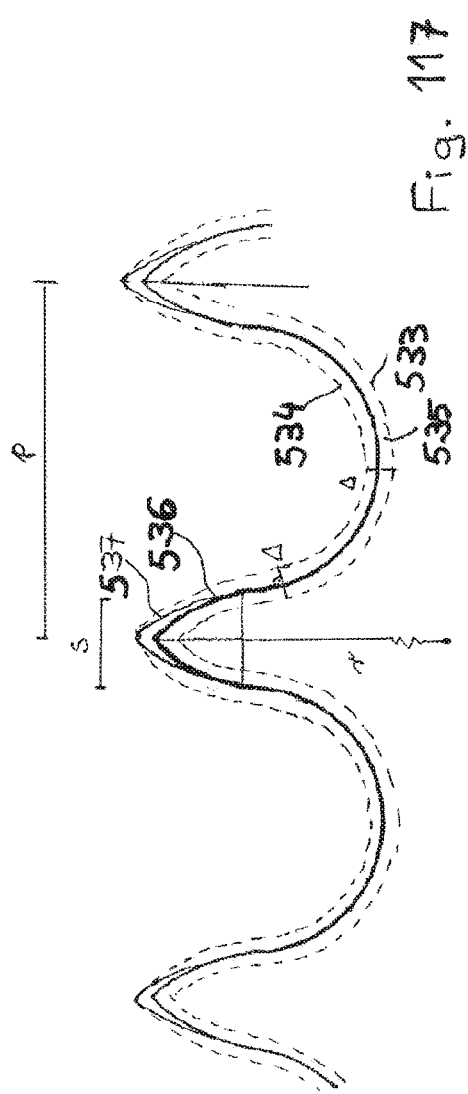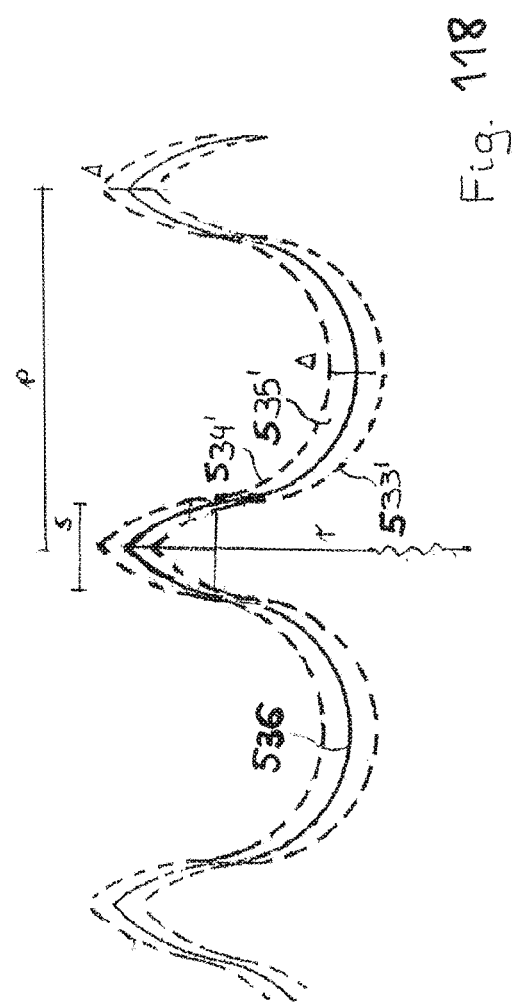

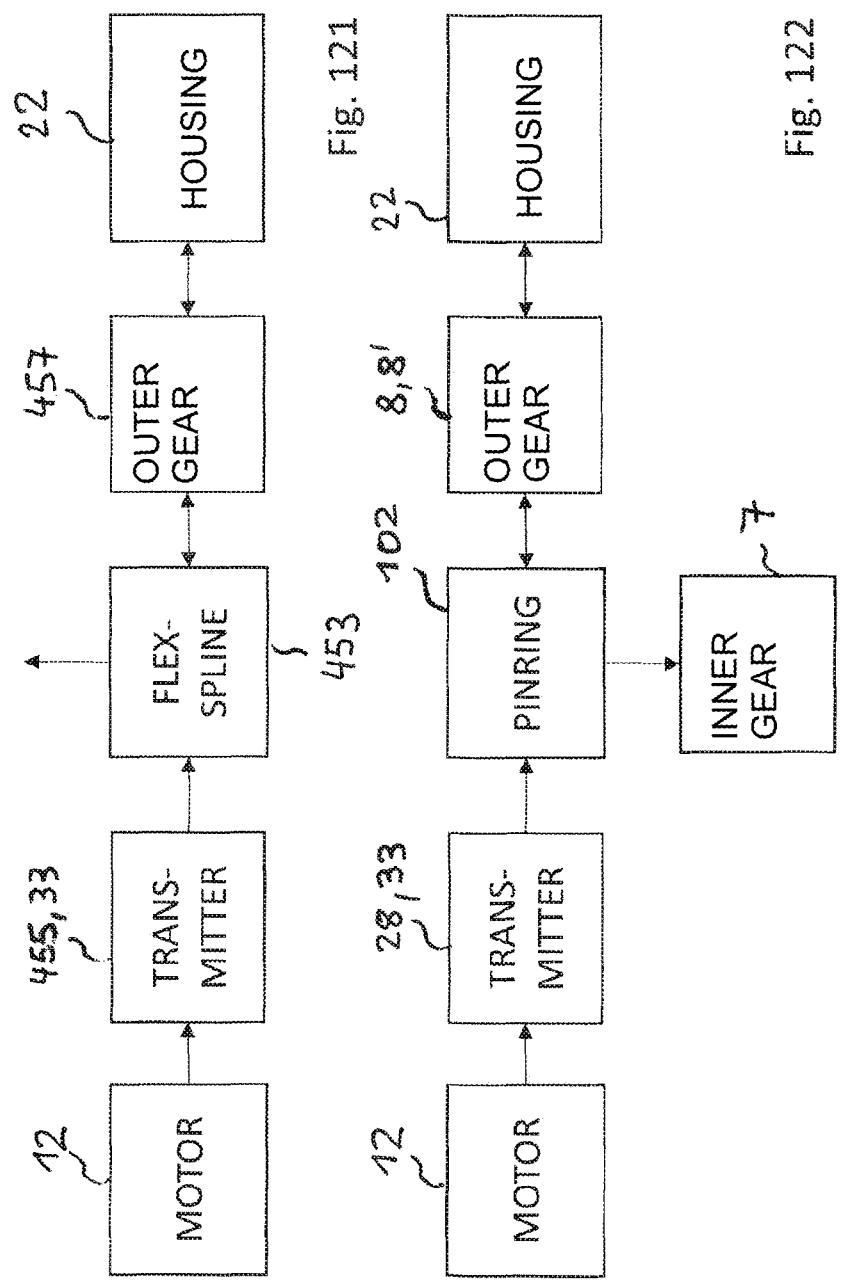

POWER TRANSMISSION ELEMENTS, TORQUE MEASURING DEVICE AND FREEWHEEL ASSEMBLY

CROSS-REFERENCE TO RELATED APPLICATIONS

The present application is a continuation of U.S. application Ser. No. 16/462,744, filed May 21, 2019, which is hereby specifically incorporated by reference herein in its entirety.

TECHNICAL FIELD

The present description discloses in a first aspect a load cell for determining a radial force acting on a crankshaft.

BACKGROUND

US 2007/051187 discloses a load sensing bearing assembly which comprises a flange arrangement with spring regions which serve for determining radial forces, thrust forces and tilting moments on an outer ring of a bearing.

U.S. Pat. No. 4,900,165 A discloses a bearing support system which receives an axial thrust load of a bearing of a shaft in a controlled manner by retaining the bearing with a slotted inner ring which is supported with a radially spaced outer ring by means of a plurality of circumferentially spaced supports which are radially stiff and axially flexible.

US 2011/187179 A1 discloses a wheel bearing unit, having a first element which comprises a cylindrical section which is supported by a bearing arrangement and which comprises a radially extending flange section and having a second element which comprises flaps for centering a wheel rim.

SUMMARY

The present description discloses in a first aspect a load cell for determining a radial force acting on a crankshaft. The load cell comprises a cylindrical receiving sleeve for receiving a ring of a bearing, and a fastening ring for attaching the load cell in a transmission housing. The ring may in particular be an outer ring of a rolling bearing. The fastening ring of the load cell is connected to the receiving ring via connecting areas or measuring regions. The measuring regions are provided for receiving radial forces of the receiving sleeve, which are transmitted from the ring of the bearing to the measuring regions.

Strain sensors are mounted in at least two of the measuring regions, for example as glued strain gauges. Furthermore, the load cell comprises axial support areas, which are provided on the fastening ring for axial support of the outer ring of the bearing or for receiving axial forces. Here, axial forces are aligned parallel to the longitudinal direction of the receiving sleeve and radial forces perpendicular thereto.

In particular, the load cell may be configured to receive a bearing which is located radially inside the receiving sleeve, wherein an outer ring of the bearing is in contact with an inner surface of the receiving sleeve and the measuring regions and the axial support areas may join radially inwardly to the fastening ring.

The axial support areas are separated from the measuring regions by radial slots, wherein the axial support areas are separated from the receiving sleeve by a circumferential slot.

In particular, the measuring regions may comprise measuring lugs formed as angle brackets, wherein the angle brackets may in particular comprise a radial region and an axial region adjoining the radial region. This shape is well suited for producing a controlled deformation under the action of radial forces.

The radial region is connected to the fastening ring and the axial region is connected to the receiving sleeve. In particular, the radial region may be arranged to the axial region at an angle of approximately 90 degrees.

According to a further embodiment, the axial region is flush with a cylindrical inner surface of the receiving sleeve.

In particular, the axial support lugs may be configured such that they project radially inwardly over an inner surface of the receiving sleeve. As a result, a bearing can be introduced into the receiving sleeve such that a ring of the bearing, in particular an outer ring, abuts against the projecting region and the axial forces acting on the bearing are transferred to the load cell and transferred via the fastening region.

According to a further embodiment, at least one of the strain sensors is configured as a strain gauge. According to a further embodiment, a strain sensor is attached to each of the measuring regions, in particular the strain sensor may each be attached to a radial region of the measuring region.

According to a further embodiment, at least two of the measuring regions comprise lowered areas for attaching the strain sensors, whereby the strain sensors can be easily positioned and protected from damage.

According to a special embodiment, the load cell comprises four measuring regions, which are arranged at intervals of 90 degrees. As a result, on the one hand, a good support of the bearing received in the load cell can be achieved and, on the other hand, a measurement of defined radial forces can be made possible, from which a torque acting on a crankshaft can be calculated, the crankshaft being supported by the bearing.

In particular, the fastening ring may comprise fastening regions in which fixing holes are provided, which are suitable for screwing the fastening ring to a housing.

Furthermore, the fastening ring may comprise recesses, wherein the measuring regions are arranged in the recesses. In this case, the measuring lugs, the slots that delimit the measuring lugs and the axial support areas may particularly be dimensioned such that an angular range which comprises the measuring lugs and the slots delimiting the measuring lugs corresponds approximately to an angular range of the axial support areas.

According to an embodiment, an angular extent of the measuring regions in a circumferential direction is less than or equal to 30 degrees. As a result, a good deformability can be achieved, and the applied radial force corresponds to a well-defined direction.

In particular, the load cell may be made integrally of metal, which elastically deforms and provides good stability and stability of shape. Here, "metal" refers to a metallic material and includes, in particular, metal alloys.

In a further aspect, the present description discloses a measuring device for determining a force acting on a crankshaft. The measuring device comprises a crankshaft with a bearing arranged on the crankshaft and with the load cell described above. The receiving sleeve of the load cell is arranged on an outer ring of the bearing, and the axial support areas of the load cell are supported in an axial direction on the outer ring of the bearing.

Furthermore, an evaluation electronics is connected to the strain sensors of the load cell, which is configured to determine a force acting on the crankshaft from signals of the strain sensors. The crankshaft may in particular be a pedal shaft, but for example also a crankshaft of a piston engine.

Furthermore, the present description discloses a transmission arrangement with the aforementioned measuring device. The transmission arrangement comprises a transmission housing and a crankshaft, wherein the crankshaft is mounted in the transmission housing via a first bearing and a second bearing.

The first bearing is received in the transmission housing via the load cell of the measuring device. The load cell is in turn received in the transmission housing via the fastening ring. The receiving sleeve receives an outer ring of the first bearing and the axial support areas are supported on the outer ring of the first bearing.

In the transmission arrangement, in particular the crankshaft may comprise a first step and a second step for supporting the bearings. The step scan be formed, for example, in that the crankshaft has a larger diameter in the middle than at its two ends. In particular, an inner ring of the first bearing of the measuring device may rest against the first step of the pedal shaft and an inner ring of the second bearing may rest against the second step of the crankshaft such that an X-arrangement of an obliquely mounted bearing is formed.

In the X-arrangement of the bearings arranged on the crankshaft forces acting on the crankshaft are transferred outwards via the bearings. As a result, a load cell can be arranged further outside in the vicinity of an evaluation electronics. In addition, a force acting on an output shaft arranged on the output side bearing also acts outwards. Thereby, the output shaft can be kept at a distance from a rotor shaft, which is arranged at a drive side of the output shaft.

For receiving axial forces, the first bearing of the measuring device and the second bearing of the measuring device may be configured specifically as single-row angular contact ball bearings. According to an embodiment, the second bearing is supported by a wave spring on the second step of the pedal shaft or on the housing.

According to a further embodiment, the second bearing is supported by a spacer disk on the second step of the pedal shaft or on the housing.

Furthermore, the present description discloses a transmission arrangement having the above features, further comprising a motor and a reduction gear connected to the motor, and a hollow output shaft connected to the reduction gear.

In this transmission arrangement, the crankshaft is configured as pedal shaft, and the first bearing and the second bearing are each configured as rolling bearings. The pedal shaft is passed through the hollow output shaft, and a freewheel is provided between the pedal shaft and the hollow output shaft for decoupling the pedal shaft from the hollow output shaft.

Furthermore, the present description discloses an electrically driven vehicle with the aforementioned transmission arrangement. Here, the motor is configured as an electric motor, and a battery of the electrically driven vehicle is connected to the electric motor.

In another aspect, the present description discloses a harmonic pin ring transmission with an input shaft and an output shaft. In particular, the input shaft may be configured as a hollow shaft, which is suitable as a rotor shaft of an electric motor, and the output shaft may be configured as a hollow shaft, which is located in the flow of forces after the below-mentioned inner gear.

In this transmission, a cam disk which serves to press a traction mechanism to outer gears, is formed in one piece with a hollow drive shaft, wherein the hollow drive shaft may in particular form a rotor of an electric motor.

The transmission comprises a first outer gear and an inner gear concentrically disposed with respect to the first outer gear in a first axial plane. A second outer gear is disposed in a second axial plane and a traction mechanism extends between the first outer gear and the inner gear. In other words, an axial region of the traction mechanism is located in a space formed between the outer gear and the inner gear.

A revolving transmitter lifts the traction mechanism from an outer circumference of the inner gear and presses it against an inner circumference of the first outer gear and against an inner circumference of the second outer gear. The transmitter comprises a hollow drive shaft and a cam disc. The cam disk and a pin retaining ring of the pin ring are arranged in a third axial plane, which is located between the first axial plane and the second axial plane. The cam disk is formed in one piece with the hollow drive shaft.

According to an advantageous embodiment, the traction mechanism is configured as a pin ring, wherein pins or projections protrude on two opposite sides of a central region, wherein the central region is arranged in the third axial plane. In particular, the central region may be made flexible and corresponds to a pin retaining ring. Furthermore, the central region of the pin ring may comprise an inner bearing surface for bearing on a cam disk and an outer bearing surface for bearing on a gear part, such as a support ring.

In operation, the revolving transmitter lifts the pins from an outer circumference of the inner gear and presses the pins against an inner circumference of the first outer gear and against an inner circumference of the second outer gear.

According to another embodiment, a circumference of the cam disk is configured to have an oval shape, such as a circular shape superimposed by a sine wave or an ellipse. According to another embodiment, a circumference of the cam disk has a circular shape and is arranged eccentrically to a transmission central axis.

In particular, a rolling bearing may be arranged radially between the cam disk and the traction mechanism to avoid forces along the circumference, wherein the rolling bearing is advantageously deformable for an oval cam disk.

In particular, the transmitter may essentially consist of lightweight aluminum and may be manufactured in one piece with a hollow shaft which forms a rotor of an electric motor.

In particular, if the transmitter comprises an eccentric disc or an eccentrically arranged circular disc, the transmitter may comprise a ring which is connected with the hollow drive shaft via connecting struts.

In another aspect, the present description discloses a harmonic pin ring transmission having a support ring.

The transmission comprises the following components. A first outer gear, an inner gear disposed concentrically with respect to the first outer gear in a first axial plane, and a second outer gear disposed in a second axial plane.

Further, the transmission comprises a traction mechanism extending between the first outer gear and the inner gear, and a revolving transmitter which lifts the traction mechanism from an outer circumference of the inner gear, presses it against an inner circumference of the first outer gear and against an inner circumference of the second outer gear.

The transmitter comprises a hollow drive shaft and a cam disk, wherein the cam disk and a pin retaining ring of the pin ring are arranged in a third axial plane, which is located between the first axial plane and the second axial plane. Further, the first outer gear is formed by a first outer ring, and the second outer gear is formed by a second outer ring, wherein the first outer ring and the second outer ring are inserted into a support ring. In particular, the second outer ring may be identical in construction to the first outer ring and/or may be mirror symmetrical.

Furthermore, the first outer ring and the second outer ring may each be made of plastic such as PA66 or polymethyl methacrylate (PMMA) by injection molding. It is particularly possible to form the outer gears of plastic, when the pins of a pin ring abut all teeth of the outer gear toothing, so that there is a uniform distribution of the load. By a suitable dimensioning of the pins of a pin ring and a suitably selected toothing each of the pins can abut either on the internal toothing of the outer gear or on the external toothing of the inner gear.

In particular, the first outer ring and the second outer ring may each comprise radially outwardly projecting journals which are distributed over the circumference of the respective outer ring, wherein the support ring comprises matching recesses into which the journals are inserted.

According to another embodiment, grooves are formed in the first outer ring and the second outer ring, which are respectively distributed over the circumference of the first outer ring and the second outer ring, and the support ring is formed as a region of a transmission housing comprising journals which engage in the grooves. This embodiment is particularly suitable for a geared motor.

The support ring which receives the outer gears may be made of lightweight aluminum, in particular it may be made by an aluminum die-casting process.

According to a further embodiment, the support ring comprises two subrings, which abut each other in an axial direction. In this way, the housing parts mutually support each other in the axial direction.

For easier connecting to the transmission housing, the first outer ring, the second outer ring and the support ring may have matching and aligned screw holes. In particular, the outer gears or outer rings and the support ring may be connected to the transmission housing by screws being passed through screw holes of a transmission cover and through the matching screw holes of the first outer ring, the support ring and the second outer ring and screwed into a thread of a transmission housing of the harmonic pin ring transmission.

In another aspect, the present description discloses a harmonic transmission with a traction mechanism, and more particularly a harmonic pin ring transmission with a pin ring comprising a freewheel device.

The transmission comprises an input shaft for applying a driving force of a motor and an output shaft for transmitting an output force. Furthermore, the transmission comprises a first outer gear, an inner gear, which is arranged concentrically with respect to the first outer gear in a first axial plane, and a second outer gear, which is arranged in a second axial plane, and a traction mechanism, which extends between the first outer gear and the inner gear.

Furthermore, the transmission comprises a revolving transmitter which lifts the traction mechanism from an outer circumference of the inner gear, presses it against an inner circumference of the first outer gear and presses it against an inner circumference of the second outer gear.

The transmitter comprises a hollow drive shaft and a cam disk, wherein the cam disk and the traction mechanism are arranged in a third axial plane, which is located between the first axial plane and the second axial plane. When using a pin ring, a pin retaining ring of the pin ring or a portion of a one-piece pin ring, which corresponds to a pin retaining ring, is arranged in the third axial plane.

Furthermore, the transmission optionally comprises a hollow output shaft, which is supported in the inner gear via a motor freewheel, and a pedal shaft, which is supported in the hollow output shaft via a pedal shaft freewheel. The pedal shaft is received in a transmission housing of the transmission. The pedal shaft comprises a receiving region or an interface for the motor freewheel on an outer circumference. At an inner circumference opposite to the outer circumference, the pedal shaft comprises a receiving region for the pedal shaft freewheel.

In particular, the motor freewheel may be configured as a clamp roller freewheel and the pedal shaft freewheel may be configured as a pawl freewheel. According to a further exemplary embodiment, both the motor freewheel and the pedal shaft freewheel are configured as clamp roller freewheels.

The output shaft or hollow output shaft extends in the axial direction on the output side of the hollow drive shaft, wherein a ball bearing is arranged between the hollow output shaft and the pedal shaft, and wherein the hollow output shaft comprises a fastening region for an output member such as a gear or pulley.

Furthermore, the present description discloses a freewheel assembly having an outer clamp roller freewheel and an inner pawl freewheel.

The freewheel assembly comprises a hollow drive shaft, a hollow output shaft and a pedal shaft. In this arrangement, the pedal shaft, the hollow output shaft and the hollow drive shaft are arranged concentrically with each other. The hollow output shaft is arranged radially inside the hollow drive shaft and the pedal shaft is arranged radially inside the hollow output shaft.

Further, the hollow output shaft comprises a stair-shaped pawl engagement region on an inner circumference and comprises a stair-shaped clamp roller rolling region on an outer circumference which is radially opposite to an inner circumference.

The pedal shaft comprises a star-shaped receiving region for pawls, wherein the star-shaped receiving region comprises pawl seats being evenly distributed over the circumference for receiving pawls and spring seats being arranged adjacent to the pawl seats for receiving springs.

In this arrangement, steps of the stair-shaped pawl engagement region and steps of the stair-shaped clamp roller rolling region formed on the pedal shaft are aligned such that a drive direction of the outer clamp roller freewheel coincides with a drive direction of the inner pawl freewheel.

The outer clamp roller freewheel comprises, inter alia, the hollow drive shaft and the stair-shaped clamp roller rolling region of the hollow output shaft and the inner pawl freewheel comprises, inter alia, the pedal shaft and the stair-shaped pawl engagement region.

In the present description, "radially inward" with respect to a hollow shaft refers to the inner circumference or its imaginary extension. In this case, the component does not need to be completely within the hollow shaft in the axial direction.

According to a further embodiment, the stair-shaped clamp body rolling region on the outer circumference of the hollow output shaft and the stair-shaped pawl engagement region on the inner circumference of the hollow output shaft are located essentially in the same axial plane. As a result, a tilting moment on the hollow output shaft can be avoided and space can be saved in the axial direction.

According to a further embodiment, the hollow drive shaft of the freewheel assembly comprises a disk-shaped region with an external toothing, which is provided on an outer circumference of the disk-shaped region. The disk-shaped region need not be formed as a solid disk, but may for example be formed as a disk which is perforated or comprises other interruptions or as a ring with a strut. The disk-shaped region serves to receive an output torque. For example, it can be configured as an inner gear of a harmonic pin ring transmission.

According to a further embodiment, the hollow output shaft comprises an annular thickening at a first end and comprises a fastening region for an output means, in particular for a chainring adapter, at a second end opposite the first end.

According to a further embodiment, the outer circumference of the hollow output shaft of the freewheel assembly comprises a steplike bearing region for a rolling bearing. Accordingly, the inner circumference of the hollow output shaft may also comprise a steplike bearing region for a rolling bearing.

According to a further embodiment, the hollow output shaft comprises an internal thread on an output side end.

According to a further embodiment, the freewheel assembly comprises pawls which are rotatably mounted in the pawl seats and spring elements which are arranged in the spring seats and are in contact with the pawls.

Furthermore, the freewheel assembly comprises a freewheel cage with webs and clamp rollers arranged between the webs, wherein the freewheel cage and the clamp rollers are arranged radially between the clamp roller rolling region of the hollow output shaft and an inner circumference of the hollow drive shaft.

According to a further embodiment, the pawl seats are cylindrically shaped, closed at one end by a wall and are open at an opposite end.

According to a further embodiment, the stair-shaped clamp body rolling region and the freewheel cage each comprise at least two receiving regions for spring elements, such as helical springs, wherein in each case a spring element is arranged between a receiving region of the clamp body rolling region and a receiving region of the freewheeling cage.

Furthermore, the pedal shaft may comprise a force sensor unit, wherein the force sensor unit comprises a metal load cell and a drive-side pedal shaft ball bearing and wherein the load cell is arranged on the pedal shaft ball bearing.

According to a further embodiment, the load cell of the freewheel assembly comprises an inner annular portion which is fastened on an outer annular portion via fastening lugs, which may be in particular four fastening lugs arranged at a 45° spacing. The pedal shaft ball bearing is inserted into the inner annular portion.

According to a further embodiment, the inner portion and the outer portion of the load cell are offset radially to each other, wherein the fastening lugs are laterally bounded by radial slots, and wherein at least two of the fastening lugs comprise a strain sensor. The fastening lugs are suitable for receiving radial forces and are also referred to as measuring lugs.

Furthermore, an axial thickness of the outer ring may be reduced in the region of the fastening lugs, so that the fastening lugs are set back relative to an annular fastening region which serves for fastening to a transmission housing.

Furthermore, the present application discloses a pedal shaft for a freewheel assembly, the pedal shaft comprising a first fastening region for a pedal crank at a first end and a second fastening region for a pedal crank at a second end opposite thereto. Furthermore, the pedal shaft comprises a star-shaped receiving region for pawls in the vicinity of the first end.

According to a particular embodiment, the star-shaped receiving region comprises steps, the steps each comprising a first side surface, a second side surface, a pawl support region inclined in a predefined direction relative to the circumferential direction by approximately 45°, and a spring seat. Furthermore, the steps comprise an upper surface that is substantially parallel to the circumference of the shaft.

In addition, the steps comprise an end region with a pawl seat, wherein the pawl seat is at least partially cylindrical, axially open to one side and closed to an axially opposite side. In particular, there may be six steps.

In another aspect, the present description discloses a harmonic transmission, in particular a harmonic pin ring transmission, having an output shaft which comprises integrated interfaces for freewheels.

The harmonic transmission comprises an input shaft and an output shaft and further comprises the following features.

A first outer gear and an inner gear disposed concentrically with respect to the first outer gear in a first axial plane. A second outer gear is arranged in a second axial plane. Furthermore, a traction mechanism is provided, which extends between the first outer gear and the inner gear, for example a pin ring.

A revolving transmitter is connected to the input shaft. In operation, the transmitter lifts the traction mechanism from an outer circumference of the inner gear and presses it against an inner circumference of the first outer gear and against an inner circumference of the second outer gear.

The transmitter comprises a hollow drive shaft and a cam disk, wherein the cam disk and, if the traction mechanism is configured as a pin ring, a pin retaining ring of the pin ring are arranged in a third axial plane located between the first axial plane and the second axial plane.

Furthermore, the harmonic transmission comprises a hollow output shaft, which is supported in the inner gear via a motor freewheel, and a pedal shaft, which is supported in the hollow output shaft via a pedal shaft freewheel. The pedal shaft is received in a transmission housing of the harmonic transmission. Further, the pedal shaft comprises a receiving region or an interface for the motor freewheel on an outer circumference and a receiving region for the pedal shaft freewheel on an inner circumference radially opposite to the outer circumference.

According to an embodiment, the engine freewheel is configured as a clamp roller freewheel and the pedal shaft freewheel is configured as a pawl freewheel.

The output shaft extends in axial direction on the output side of the hollow drive shaft, wherein a ball bearing is arranged between the hollow output shaft and the pedal shaft, and wherein the hollow output shaft comprises a fastening region for an output element, in particular an output element such as a gear or pulley for connection to a traction mechanism.

In another aspect, the present description discloses a harmonic pin ring transmission having an input shaft and an output shaft, the transmission having the following components.

In the transmission, a first outer gear and an inner gear are provided, wherein the inner gear is arranged concentrically with respect to the first outer gear in a first axial plane. A second outer gear is arranged in a second axial plane. A pin ring with pins extends between the first outer gear and the inner gear.

A revolving transmitter is arranged in the area of the inner gear and the outer gears. In operation, the revolving transmitter lifts the pins of the pin ring from an outer circumference of the inner gear and presses the pins against an inner circumference of the first outer gear and against an inner circumference of the second outer gear.

The transmitter comprises a hollow drive shaft and a cam disk, wherein the cam disk and a central region of the pin ring are arranged in a third axial plane, which is located between the first axial plane and the second axial plane.

The pin ring is made of one piece. In particular, the pin ring may be made of metal. The pins of the pin ring will be formed by projections protruding from two axially opposite sides of a central region of the pin ring, the central region comprising a smooth, cylindrical inner bearing surface for bearing on a bearing and a smooth, cylindrical outer surface.

According to a further embodiment, the projections are cylindrical on a first side of the two opposite sides and the projections are partially cylindrical on a second of the two opposite sides, wherein a cylindrically formed region is located in the radial direction on the outside of the pin ring.

According to a further embodiment, the projections comprise on a first side of the two opposite sides an inner rounded engagement region in the radial direction on the inside of the pin ring and an outer rounded engagement region in the radial direction on the outside of the pin ring. Furthermore, the projections comprise on a second of the two opposite sides an outer rounded engagement region.

According to a further embodiment, a bearing such as a rolling or ball bearing or a flexible rolling or ball bearing is arranged between the cam disk and the pin ring, and wherein the pin ring comprises on an inner side a shoulder for supporting the bearing.

In another aspect, the present description discloses a one-piece pin ring for a harmonic pin ring transmission which is formed in one piece and made of metal. The pin ring comprises pins that are formed by projections that protrude from two axially opposite sides of a central region of the pin ring.

In this case, the central region comprises a smooth, cylindrical inner bearing surface for bearing on a bearing and a smooth, cylindrical outer bearing surface for bearing on a support cylinder.

According to a further embodiment, the projections are cylindrical on a first side of the two opposite sides and the projections are partially cylindrical on a second of the two opposite sides. A cylindrically formed region is located in the radial direction on the outside of the pin ring.

According to a further embodiment, the projections comprise on a first side of the two opposite sides an inner rounded engagement region in the radial direction on the inside of the pin ring and an outer rounded engagement region in the radial direction on the outside of the pin ring. Furthermore, the projections comprise on a second of the two opposite sides an outer rounded engagement region.

According to a further embodiment, a tangentially arranged web is located between the projections in each case on the first of the opposite two sides, wherein an outer boundary line of a cross section of the projections smoothly merges into an outer boundary line of the web. Herein, "smooth" can be understood to refer to a continuous first derivative when averaging over surface roughness.

According to a further embodiment, a bearing such as a rolling or ball bearing, or a flexible rolling or ball bearing is arranged between the cam disk and the pin ring. In this case, the pin ring comprises on an inner side a shoulder for supporting the bearing.

In another aspect, the present description discloses a harmonic transmission with an obliquely mounted bearing.

The transmission comprises a first outer gear and an inner gear concentrically disposed with respect to the first outer gear in a first axial plane and a second outer gear disposed in a second axial plane.

A traction mechanism extends between the first outer gear and the inner gear. Furthermore, a revolving transmitter is provided, which lifts the traction mechanism from an outer circumference of the inner gear and presses it against an inner circumference of the first outer gear and against an inner circumference of the second outer gear.

The transmitter comprises a hollow drive shaft and a cam disk, wherein the cam disk and a pin retaining ring of the pin ring are arranged in a third axial plane, which is located between the first axial plane and the second axial plane.

A pedal shaft is arranged radially inside the output shaft, wherein the pedal shaft is mounted in the motor housing via a drive-side pedal shaft ball bearing and a load cell consisting of metal or a metal alloy.

According to a further embodiment, the load cell comprises an inner annular portion which is attached to an outer annular portion via fastening lugs, wherein the pedal shaft ball bearing is inserted into the inner annular portion. In particular, these may be four fastening lugs spaced 45 degrees apart. The fastening lugs are also referred to as measuring lugs.

The outer annular portion is inserted into a cylindrical portion of the motor housing. The inner portion and the outer portion are radially offset from each other. Furthermore, the fastening lugs are bounded laterally by radial slots and a material recess is provided radially outside of the measuring lugs. As a result, among other things, the thickness of the measuring lugs is reduced, whereby a deformability of the measuring lugs is facilitated.

On a surface of at least two of the measuring straps, strain sensors, such as strain gauges, may be applied on at least two of the measuring straps.

Furthermore, a wave spring may be arranged between the load cell and the drive-side rotor ball bearing, which can serve, inter alia, the compensation of tolerances.

In another aspect, the present description discloses a harmonic pin ring transmission with a crank gear formed as a planetary gear. The harmonic pin ring transmission comprises an input shaft and an output shaft, which are also referred to as drive shaft and driven shaft.

Furthermore, the transmission comprises a first outer gear and an inner gear, which is arranged concentrically with respect to the first outer gear in a first axial plane, and a second outer gear, which is arranged in a second axial plane.

A traction mechanism extends between the first outer gear and the inner gear. A revolving transmitter is provided to lift the traction mechanism from an outer circumference of the inner gear and to press it against an inner circumference of the first outer gear. The transmitter comprises a hollow drive shaft and a cam disk, wherein the cam disk is arranged in a third axial plane located between the first axial plane and the second axial plane.

Furthermore, a pedal shaft is arranged radially inside the output shaft, and a planetary gear and a pedal shaft freewheel are arranged in the flow of forces between the pedal shaft and the output shaft.

According to an embodiment, a planet carrier of the planetary gear is connected to the pedal shaft, a ring gear of the planetary gear comprises a connection region for connection to a transmission housing and a sun gear of the planetary gear is mounted on the pedal shaft. The pedal shaft freewheel is disposed between a hollow shaft of the planetary gear which is connected to the sun gear and the output shaft.

According to another embodiment, the pedal shaft freewheel is arranged between the crankshaft and a planet carrier of the planetary gear, wherein a ring gear of the planetary gear is rotatably mounted in the harmonic transmission and wherein a sun gear of the planetary gear is adapted for attachment to a stationary housing part of the harmonic transmission.

Furthermore, the present description discloses a tension shaft transmission, wherein the tooth geometry can be designed in particular so that there is a complete tooth engagement between the inner and outer teeth. This is the case even if the transmitter comprises an eccentric disk instead of an oval cam disk.

The tension shaft transmission has two main types, namely: first, a design with driven cup-shaped tensioning shaft, which comprises a fastening region for an output shaft and second, a design with movable second outer gear and cylindrical tensioning shaft.

The tension shaft transmission comprises an outer gear with internal toothing, the outer gear comprising a fastening region for attachment to a transmission housing, and a tensioning shaft having an external toothing, the tensioning shaft being concentrically disposed with respect to the outer gear in an axial plane.

A revolving transmitter is configured to be suitable for attachment to a rotating input shaft and to be capable of, during operation, pressing the tensioning shaft against the internal toothing of the outer gear. For this purpose, the transmitter is disposed within the tensioning shaft and an outer circumference of the transmitter is suitable for pressing the tensioning shaft.

The transmitter comprises a hollow drive shaft and a cam disk, which preferably comprises a circular circumference arranged eccentrically to the central axis of the outer gear or an oval or elliptical circumference arranged centered to the central axis of the outer wheel, wherein a ball bearing is arranged on the circumference of the cam disk which in the case of the oval or elliptical circumference is preferably a flexible ball bearing. However, the toothing of the outer gear specified below is particularly suitable for an oval transmitter and causes in this case a particularly good meshing.

A cross section of the tooth crests of the external toothing of the tensioning shaft corresponds essentially to a sector of a circle. Thus, the cross section of the tooth crests corresponds to a cross section of a portion of cylindrical pins and preferably essentially to a semicircle.

With respect to a central axis of the outer gear, the internal toothing of the outer gear is essentially defined by an outer equidistant to the gear trajectory that is defined by the formulas $x(t)=r1*cost(t)+r2*cos((n+1)*t)+r3*cos((n+3)*t)$ and $y(t)=r1*sin(t)r2*sin((n+1)*t)+r3*sin((n+3)*t)$, wherein n+1 is the number of teeth of the internal toothing of the outer gear, wherein the radii r1, r2 and r3 are greater than zero, and wherein for the scale of the radii r2>r3 and r1>r2+r3 applies. Further conditions for the parameters n and t and for the radii are given below in the description in connection with this toothing.

The coordinates x and y relate to a Cartesian coordinate system arranged perpendicular to the central axis of the outer gear with its origin in the central axis of the outer gear or the transmission.

In particular, the tensioning shaft may be formed in a cup shape, wherein at the bottom of the cup shape, a fastening region is formed for fastening an output shaft. This can also be done in such a way that the tensioning shaft is formed integrally with the output shaft.

Furthermore, a central circular opening may be formed at the bottom of the cup shape, wherein the fastening region of the tensioning shaft comprises fastening holes arranged around the central circular opening. This embodiment may be advantageous in particular for a geared motor.

According to an alternative embodiment, the tensioning shaft has the shape of a circular cylinder, wherein the transmission comprises a second rotatably arranged outer gear which comprises a fastening region for fastening an output shaft, wherein the internal toothing of the outer gear is determined by the same construction or formula as the internal toothing of the first outer gear.

The expression "essentially", in particular with respect to a toothing, may for example refer to max. 5% or 10% deviation with respect to the distances mentioned in the description with reference to FIGS. 117, 118.

Alternatively, the shape of the outer gear toothing can also be specified by explicitly specifying the epicyclic construction, according to which the tooth surface of the internal toothing of the outer gear is determined by a radial distance from a central axis of the inner gear as a function of a cycle angle. In this case, the radial distance from the central axis in turn is determined by an inner equidistant to a gear trajectory, wherein a location on the gear trajectory is determined in each case by the vector sum of a cycle vector, a first epicycle vector and a second epicycle vector.

Further, a tail of the cycle vector is located on the central axis, a tail of the first epicycle vector in the tip of the cycle vector, and a tail of the second epicycle vector in the tip of the first epicycle vector.

Furthermore, an epicycle angle of the first epicycle vector is n+1 times the cycle angle and an epicycle angle of the second epicycle vector n+3 times the cycle angle, where n is a number of pins of the harmonic pin ring transmission which is at least four.

Furthermore, a length of the cycle vector is greater than the sum of the lengths of the first epicycle vector and the second epicycle vector, and a length of the first epicycle vector is greater than a length of the second epicycle vector.

Furthermore, the present description discloses a two-stage reduction gear comprising an outer gear fixedly secured to the transmission housing with a first internal toothing, wherein the outer gear comprises a fastening region for attachment to a transmission housing.

An outer gear rotatably mounted on the transmission housing is provided with a second internal toothing, wherein the outer gear comprises a fastening region for attachment to an output shaft.

A two-part or two-section, but nevertheless one-piece pin ring is arranged concentrically to the outer gears, wherein the two-part one-piece pin ring comprises a first external toothing and a second external toothing. The first external toothing of the two-part one-piece pin ring engages in the internal toothing of the stationary outer gear. The second external toothing of the two-part one-piece pin ring engages in the internal toothing of the rotatable outer gear.

A revolving transmitter is configured to press the two-part one-piece pin ring against the internal toothing of the stationary outer gear and against the internal toothing of the rotatable outer gear. A ball bearing is arranged on a circumference of the revolving transmitter.

In particular, to achieve a high reduction, the number of teeth of the internal toothing of the stationary outer gear may be greater than the number of teeth of the first external toothing, and the number of teeth of the internal toothing of the rotatable outer gear may be greater than the number of teeth of the second external toothing, wherein further, the number of teeth of the stationary outer gear is greater than the number of teeth of the rotatable outer gear and the number of teeth of the first external toothing is greater than the number of teeth of the second external toothing.

Furthermore, the transmitter may comprise a circular ring arranged eccentric to the axis of the stationary outer gear. The eccentric transmission offers a specifically simple and robust design that does not require a deformable bearing.

In particular, a cross section of the tooth crests of the first external toothing and a cross section of the tooth crests of the second external toothing may essentially correspond to a sector of a circle, preferably a semicircle. Thus, the toothing geometry corresponds to cylindrical pins, which is particularly favorable in the eccentric transmission.

Furthermore, a cross section of the tooth crests of the first external toothing and a cross section of the tooth crests of the second external toothing may essentially correspond to an inner equidistant, in particular at a distance of a pin radius, a gear trajectory defined by the formula $x(t)=r1*\cos(t)+r2*\cos(nt)$ and $y(t)=r1*\sin(t)+r2*\sin(nt)$, wherein the following applies for the radii r1, r2: $r1>0$, $r2>0$ and $r1>r2$. In particular, the toothing may correspond to this form along the entire circumference, and not only in the region of the tooth crests.

The same applies to the toothing of the pin ring. Thus, a cross section of the tooth crests of the first external toothing and a cross section of the tooth crests of the second external toothing may essentially correspond to an outer equidistant, in particular at the distance of a pin radius, to the gear trajectory that is defined by the formula $x(t)=r1*\cos(t)+r2*\cos(nt)$ and $y(t)=r1*\sin(t)-r2*\sin(nt)$, wherein the following applies for the radii r1, r2: $r1>0$, $r2>0$ and $r1>r2$, and where r1, r2 and n have the same values as for the outer gear toothing. In particular, this toothing form may apply to the toothing along the entire circumference, and not only in the region of the tooth crests.

Furthermore, the present description discloses a load cell for determining a radial force acting on a crankshaft with a receiving sleeve for receiving a ring of a bearing, a fastening ring for attaching the load cell in a transmission housing, and axial support areas provided on the fastening ring for axially supporting the ring of the bearing.

Furthermore, measuring regions for receiving radial forces of the receiving sleeve are provided which connect the receiving sleeve with the fastening ring, wherein strain sensors are attached to at least two of the measuring regions.

Furthermore, the present description discloses a freewheel assembly having an outer transmission freewheel and an inner pedal shaft freewheel. The freewheel assembly comprises a hollow drive shaft, a hollow output shaft, and a pedal shaft. The pedal shaft, the hollow output shaft and the hollow drive shaft are arranged concentrically with each other.

Furthermore, the hollow output shaft is disposed radially inside the hollow drive shaft, and the pedal shaft is disposed radially inside the hollow output shaft, wherein the pedal shaft freewheel is arranged between the pedal shaft and the hollow output shaft. The transmission freewheel is arranged opposite the pedal shaft freewheel on the hollow output shaft. The hollow output shaft comprises adapted areas on an inner side and on an outer side in the region of the respective freewheel.

Thus, the double freewheel can be integrated in the drive in a space-saving manner in the region of the pedal shaft without the need for a separate outer ring or inner ring. In this case, the outer freewheel may in particular be a clamp roller freewheel and the inner freewheel may particularly be a pawl freewheel. However, both freewheels may also be clamp roller freewheels. Other combinations are also possible.

Furthermore, the present description discloses a one-piece pin ring, which is preferably used in conjunction with an eccentric transmission.

According to a first embodiment, the one-piece pin ring is made of metal, wherein a pin retaining ring and an arrangement of pins, which protrude in axial direction on two opposite sides of the pin retaining ring, are made in one piece.

In particular, the pins may be connected to each other in the circumferential direction, which provides additional stability and can enable a more efficient production.

Furthermore, the pins may be formed on a first of the two opposite sides as half pins, which are suitable for engagement in an internal toothing, and the pins on a second of the opposite sides may be formed as whole pins, which are suitable for engagement in an internal toothing and for engagement in an external toothing opposite the internal toothing. Thus, weight and material can be saved.

In a further embodiment, the one-piece pin retaining ring comprises a smooth inner circumference on an inner side and comprises rounded bulges on an outer side, which are made in one piece with the pin retaining ring. This embodiment is suitable for example for a two-stage reduction gear with eccentric.

Furthermore, at least one head region of the rounded bulges may comprise a semicircular cross section. Thus, the same toothings can be used, which are also suitable for a pin ring with cylindrical pins.

Furthermore, the present description discloses a support ring assembly for a reduction gear having a first outer gear and a second outer gear comprising a support ring, a first outer gear having a first internal toothing and a second outer gear having a second internal toothing, wherein the first outer gear and the second outer gear are inserted into the support ring on opposite sides, and wherein the support ring comprises a fastening region, for example axial bores, for attachment to a transmission housing.

In particular, the first outer gear and the second outer gear may be made of plastic. Furthermore, the first outer gear and the second outer gear may each be connected with the support wheel via a pin-groove connection, so that they can be easily assembled.

Furthermore, the present description discloses a one-piece rotor-transmitter element for a reduction gear comprising a hollow shaft comprising a fastening region on a first side for fastening a rotor package, and comprising a cam disk on a second side opposite to the first side, wherein an outer circumference of the cam disk is configured as a receiving area for a ball bearing.

In particular, the one-piece rotor-transmitter element may be made of aluminum. In addition, the hollow shaft of the one-piece rotor-transmitter element may be dimensioned such that a pedal shaft can be passed through the hollow shaft.

In a further embodiment, the cam disk comprises a circular circumference arranged eccentrically relative to the central axis of the hollow shaft. In an alternative embodiment, the cam disk comprises an oval circumference relative to the central axis of the hollow shaft.

Furthermore, the present description discloses crank gears that provide a speed-up transmission. According to a first embodiment, the crank gear comprises a drive shaft, in particular a crankshaft or pedal shaft with a planetary gear arranged on the drive shaft, wherein a planet carrier of the planetary gear is fixedly connected to the drive shaft, a ring gear of the planetary gear comprises a fastening region for attachment to a transmission housing and a receiving region for a torque sensor, and a sun gear of the planetary gear is configured as a ring gear, which is arranged concentrically to the drive shaft, and wherein the sun gear is connected to a hollow output shaft of the planetary gear, which is rotatably mounted on the drive shaft.

According to a second embodiment, the crank gear comprises a drive shaft, in particular a crankshaft or pedal shaft, with a planetary gear arranged on the drive shaft, wherein a planet carrier of the planetary gear is mounted on the drive shaft via a freewheel, a sun gear of the planetary gear comprises a fastening region for attachment to a transmission housing and a receiving region for a torque sensor, and a ring gear of the planetary gear comprises a receiving region for a ball bearing for supporting on a transmission housing.

According to a third embodiment, the crank gear comprises a drive shaft, in particular a crankshaft or pedal shaft, with a planetary gear arranged on the drive shaft, wherein a planet carrier of the planetary gear comprises a fastening region for attachment to a transmission housing, wherein a hollow shaft of the planetary gear is fixedly connected to the drive shaft is, and wherein a sun gear of the planetary gear is configured as a hollow shaft which is arranged concentrically to the drive shaft and rotatably mounted on the drive shaft.

Furthermore, the present description discloses a cycloidal gear, the cycloidal gear comprising the following components: a transmission housing, an outer gear having an internal toothing which is fixed to the transmission housing, and an input shaft arranged concentric with the outer gear, wherein the input shaft comprises a drive-side eccentric disk, on which a first ball bearing is arranged, and an output-side eccentric disk, on which a second ball bearing is arranged.

A drive-side inner gear with an external toothing is mounted on the first ball bearing and an output-side inner gear with an external toothing is mounted on the second ball bearing. The drive-side inner gear and the output-side inner gear are disposed inside the outer gear, and the external toothings of the drive-side inner gear and the output-side outer gear respectively engage with the internal toothing of the outer gear.

In particular, the cycloidal gear may comprise a crankshaft, which is mounted within the input shaft, and the load cell described above, which is mounted on the crankshaft on the drive side.

Furthermore, the input shaft may be configured as a one-piece rotor transmitter element described above.

According to another embodiment, the cycloidal gear comprises a crankshaft mounted within the input shaft, and wherein the crankshaft comprises one of the planetary gears described above, wherein the crankshaft forms the drive shaft of the planetary gear.

According to a further embodiment, a third ball bearing is disposed on the input shaft on the output side of the output side eccentric disk, wherein a driven pulley is arranged on the third ball bearing, wherein the driven pulley comprises carrier pins which engage in axially successively arranged openings of the drive side inner gear and the output side inner gear, wherein an output shaft is formed radially inside on the driven pulley.

In this case, an output shaft is formed radially inside on the driven pulley, wherein the third ball bearing is arranged on an inner shoulder of the output shaft. Furthermore, an inner gear ball bearing is arranged diagonally opposite with respect to the centers of the bearings in the axial direction to the third ball bearing on an outer shoulder of the output shaft, wherein the inner gear ball bearing is supported on a housing cover of the transmission housing.

According to a further alternative embodiment, at least one of the inner gears comprises a first toothing and a second external toothing. The cycloidal gear further comprises a rotatable outer gear having an internal toothing, wherein the second external toothing engages in the internal toothing of the rotatable outer gear, and wherein the rotatable outer gear comprises a fastening region for mounting an output shaft. Thus, a two-stage reduction can be provided.

Further, the internal toothing may be formed by an inner surface of the outer gear or formed by an arrangement of stationary pins on which rollers are arranged.

Disclosed is a load cell for determining a radial force acting on a crankshaft, the load cell comprising: a receiving sleeve for receiving a ring of a bearing; a fastening ring for attaching the load cell in a transmission housing; axial support areas provided on the fastening ring for axially supporting the ring of the bearing; and measuring regions for receiving radial forces of the receiving sleeve and which connect the receiving sleeve with the fastening ring, wherein strain sensors are attached to at least two of the measuring regions.

Also disclosed is a transmission arrangement comprising a measuring device for determining a force acting on a crankshaft, the measuring device comprising: a crankshaft with a bearing arranged on the crankshaft; a load cell comprising: a receiving sleeve for receiving a ring of a bearing; a fastening ring for attaching the load cell in a transmission housing; axial support areas provided on the fastening ring for axially supporting the ring of the bearing; and measuring regions for receiving radial forces of the receiving sleeve and which connect the receiving sleeve with the fastening ring, wherein strain sensors are attached to at least two of the measuring regions, wherein the receiving sleeve of the load cell is arranged on an outer ring of the bearing, and wherein the axial support areas of the load cell are supported in an axial direction on the outer ring of the bearing; and an evaluation electronics which is connected to the strain sensors of the load cell.

Additionally, disclosed is a measuring device for determining a force acting on a crankshaft, the measuring device comprising a crankshaft with a bearing arranged on the crankshaft, a load cell for determining a radial force acting on a crankshaft, the load cell comprising: a receiving sleeve for receiving a ring of the bearing, a fastening ring for attaching the load cell in a transmission housing, axial support areas provided on the fastening ring for axially supporting the ring of the bearing, measuring regions for receiving radial forces of the receiving sleeve and which connect the receiving sleeve with the fastening ring, wherein strain sensors are attached to at least two of the measuring regions, wherein the receiving sleeve of the load cell is arranged on an outer ring of the bearing, and wherein the axial support areas of the load cell are supported in an axial direction on the outer ring of the bearing, an evaluation electronics which is connected to the strain sensors of the load cell.

BRIEF DESCRIPTION OF THE DRAWINGS

The subject matter of the description will be explained in more detail below with reference to the figures below.

Wherein

FIG. 1 is a cross-sectional view of a harmonic pin ring transmission,

FIG. 2 shows a drive-side part of an exploded view of the transmission of FIG. 1, FIG. 3 shows an output-side part of an exploded view of the transmission of FIG. 1, FIG. 4 is an exploded view of an inner portion of the transmission of FIG. 1, FIG. 5 shows a perspective view of a transmission assembly of the transmission of FIG. 1, FIG. 6 shows a bottom bracket bearing assembly of the transmission of FIG. 1, FIG. 7 is a cross-sectional view of a bottom bracket bearing assembly shown in FIG. 6, FIG. 10 shows a transmission of axial forces into the housing according to the mounting concept of the transmission of FIGS. 1 to 9, FIG. 11 a cross-sectional view of a harmonic pin ring transmission with an eccentric disk, FIG. 12 is an exploded view of the transmission of FIG. 11, FIG. 13 is a side view of a subassembly of the transmission of FIG. 11, FIG. 14 is a cross-sectional view of the subassembly of FIG. 13, FIG. 15 shows an output side plan view of a pin ring of the transmission of FIG. 11, FIG. 16 shows a cross section through the pin ring of FIG. 15, FIG. 17 shows a partial view of the pin ring of FIG. 15, FIG. 20 shows a torque curve in the transmission of FIG. 11, FIG. 21 shows a perspective view, seen from the drive side, of a load cell, FIG. 22 is a plan view, seen from the drive side, of the load cell, FIG. 23 is a plan view, seen from the output side, of the load cell, FIG. 24 is a cross-sectional view of the load cell along the cross-sectional line A-A of FIG. 22, FIG. 25 shows a side view of the load cell, FIG. 26 is a perspective view of the load cell seen from the output side, FIG. 27 shows a plan view of the load cell seen from the output side, FIG. 28 is a cross-sectional view along intersection line A-A of FIG. 27, FIG. 29 is a cross-sectional view along intersection line B-B of FIG. 27, FIG. 32 shows a cross-sectional view of an obliquely mounted bearing with a load cell, FIG. 33 shows a first cross-sectional view of an obliquely mounted bearing with a load cell, FIG. 34 shows a further cross-sectional view of an obliquely mounted bearing with a load cell, FIG. 35 shows a first embodiment of a torque sensor, FIG. 36 shows a second embodiment of a torque sensor, FIG. 37 shows a third embodiment of a torque sensor, FIG. 38 shows a fourth embodiment of a torque sensor, FIG. 39 shows a fifth embodiment of a torque sensor with two pairs of opposing strain gauges at a 90 degree interval, FIG. 44 shows a detail enlargement of the HPD transmission shown in in FIG. 43 in the area of the load cell, FIG. 45 is an exploded view of a freewheel assembly, FIG. 46 shows an output-side view of the freewheel assembly of FIG. 44 with the side cover removed, FIG. 47 is a cross-sectional view of the free wheel assembly of FIG. 45 pedal shaft and transmission inner gear, FIG. 48 shows an output-side perspective view of the freewheel assembly of FIG. 45 with the side cover removed, FIG. 49 shows a drive-side perspective view of the freewheel assembly of FIG. 45 with the side cover removed, FIG. 50 is a side view of the pedal crank of the freewheel assembly of FIG. 45, FIG. 51 is a side view of the freewheel assembly of FIG. 45 with output shaft, FIG. 52 shows a top view of the pedal shaft in the axial direction, FIG. 55 shows a freewheel cage of the transmission freewheel, FIG. 56 shows a clamping body ring of the transmission freewheel, FG. 57 shows a side view of the freewheel assembly with output shaft and sensor arrangement, FIG. 58 shows a further cross-sectional view of the freewheel assembly along the cross-sectional line D-D of FIG. 57, FIG. 79 is a side view of the cycloidal gear of FIG. 77 on the output side, FIG. 80 shows a cross section of the cycloidal gear shown in FIG. 77 along the intersection line A-A of FIG. 79, FIG. 83 shows an exploded view of the tension shaft transmission of FIG. 82, FIG. 84 shows a drive-side side view of the tension shaft transmissionof FIG. 82, FIG. 85 shows a cross section along the cross-sectional line A-A of FIG. 84, FIG. 86 shows a cross section along the cross-sectional line B-B of FIG. 84, FIG. 89 shows a sie view of a two-stage transmission gearing with a two-part pin ring, FIG. 90 is a cross-sectional view of the two-stage reduction gearing taken along the cross-sectional line A-A of FIG. 89, FIG. 91 is the side view of FIG. 89, in which components hidden in the view of FIG. 89 are indicated by dashed lines, FIG. 92 is an output side of a three-quarter section of the two-stage reduction gearing of FIG. 82, FIG. 93 shows an output-side perspective view of the three-quarter section of FIG. 92, FIG. 94 shows an HPD-F transmission with an oval cam disk, FIG. 95 shows an HPD-E transmission with a single eccentric disk, FIG. 100 shows an application of the epicyclic construction of FIG. 98 in a first angular position, FIG. 101 shows the epicyclic construction of FIG. 100 in a second angular position, FIG. 102 shows the epicyclic construction of FIG. 100 in a third angular position, FIG. 103 shows the epicyclic construction of FIG. 100 in a fourth angular position, FIG. 104 shows an application of the epicyclic construction of FIG. 97 in a first angular position, FIG. 105 shows the epicyclic construction of FIG. 11 in a second angular position, FIG. 106 shows the epicyclic construction of FIG. 11 in a third angular position, FIG. 107 shows the epicyclic construction of FIG. 11 in a fourth angular position, FIG. 108 shows a tooth geometry for the transmission of FIG. 2 according to the construction of FIG. 3 and FIG. 4, FIG. 117 shows a tolerance range of a tooth profile defined by envelopes, and FIG. 118 shows a tolerance range of a tooth profile defined by profile displacements, FIG. 121 shows a schematic drawing of a strain wave drive FIG. 122 shows a schematic drawing of a harmonic pin ring drive.

DETAILED DESCRIPTION

In the following description, details are provided to illustrate the embodiments of the specification. However, it should be apparent to those skilled in the art that the embodiments can be implemented without such details.

Figure 9:
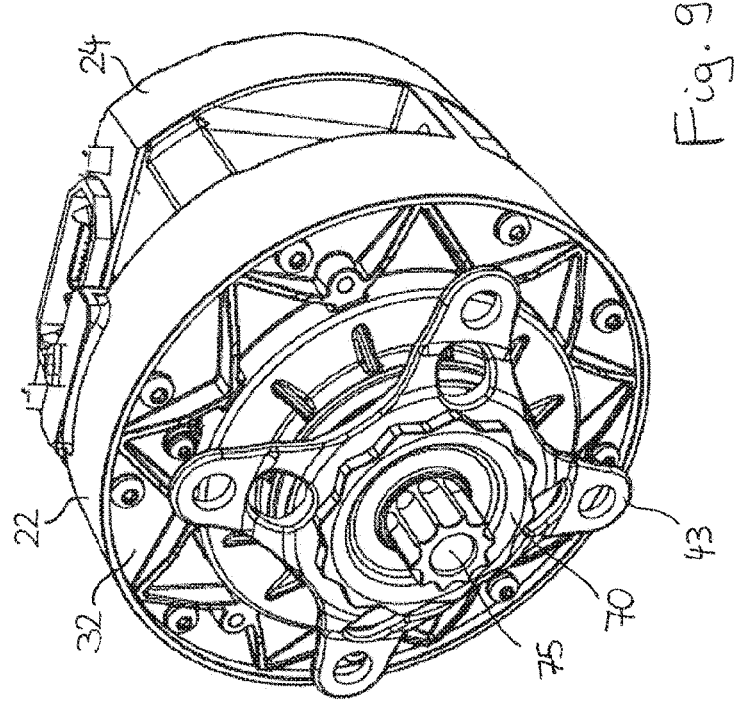
FIG. 9 shows an output-side perspective view of the transmission of FIG. 1 in the assembled state.

FIG. 1 shows a cross-sectional view of a harmonic pin ring gear 10. The cross-sectional plane A-A of FIG. 1 is marked in FIG. 9. In FIG. 1, the left side corresponds to a drive side and the right side corresponds to an output side of the harmonic pin ring gear 10. According to the usual arrangement of the drive on the right side, the viewing direction of FIG. 10 is directed in the direction of travel.

A stator 20 of a stator assembly of the harmonic pin ring gear 10 is disposed in a motor housing 22. The stator 20 comprises three separate coils 21 for connection to three phases of a three-phase inverter. The three coils of the stator 20 are connected to the three-phase inverter via three terminals 25, one of which is shown in FIG. 1.

The three-phase inverter is configured as a power electronics, which is arranged on a printed circuit board 23, wherein the printed circuit board 23 is arranged in a cooling cover 24, which is mounted on the motor housing 22 on the drive side. The printed circuit board 23 is configured as an annular disk, which is located outside of cylindrical protruding portions of the motor housing and the cooling cover, so that the motor electronics located thereon is sealed against oil and grease of the transmission.

A pedal shaft 35 extending centrally through the motor housing 22 is stepped on the output side and comprises three steps whose diameter increases from outside to inside and on each of which the shaft seal 50, the output side pedal shaft ball bearing 46 and the pedal shaft freewheel 49 are arranged. The diameter of the pedal shaft 35 is also stepped on the drive side and comprises two steps, wherein on the outer step, the shaft seal and a sensor ring 68 are arranged, and on the inner step, the ball bearing 45 is arranged. The stair-shape of the pedal shaft is also shown in the perspective view of FIG. 4.

An outer rotor shaft 26 equipped with permanent magnets is disposed radially inside the stator 20. This outer rotor shaft is also referred to as a "rotor package". The outer rotor shaft 26 comprises on its inner side an elastic region which is plugged onto an inner rotor shaft 27. On the inner rotor shaft 27 an eccentrically arranged oval cam disk 28 is formed on the output side, which is shown in more detail in FIG. 3.

The inner rotor shaft 27 is supported in the motor housing 22 on the drive side to the outside by a drive-side rotor ball bearing 29. Namely, an outer ring of the drive-side rotor ball bearing 29 is disposed in a cylindrical recess of the motor housing 22.

Furthermore, the inner rotor shaft 27 is mounted on the output side in an output-side rotor ball bearing 30 radially outwardly in an inner gear 7. A hollow shaft of the inner gear 7 is connected integrally with an annular portion of the inner gear 7 on the output side, which comprises an external toothing 5.

The hollow shaft of the inner gear 7 is in turn mounted radially outwardly via an inner gear ball bearing 31 on a housing cover 32 which is screwed to the motor housing 22 by screws 33. The inner gear ball bearing 31 is offset from the output side rotor ball bearing 30 in the axial direction to the output side and is offset in the radial direction to the outside. In addition, the inner gear ball bearing 31 overlaps with the output side rotor ball bearing 30 in the axial direction.

On the cam disk 28 of the inner rotor shaft 27, a flexible ball bearing or a thin section ball bearing 33 is clamped, in which an inner ring and an outer ring are deformable. A pin retaining ring 103 with pins 101 bears on the flexible ball bearing 33, wherein the pins 101 are held in cylindrical recesses on the inside of a pin retaining ring. According to the embodiment of FIG. 1, the pins 101 are connected to each other. The pins 101 of the pin ring 103 protrude the flexible ball bearing 33 and the pin retaining ring 103 in axial direction on both sides. For the sake of simplicity, the pin ring assembly comprising the pin retaining ring 103 and the pins 101 will also be referred to below as pin ring 102.

The cam disk 28 and the flexible ball bearing 33 together form a transmitter arrangement, which converts a torque into a radial force. Instead of a flexible ball bearing with flexible inner and outer ring, a wire-race bearing or a flexible ball bearing without outer ring, or a different kind of flexible rolling bearing can be used.

The housing cover 32 is screwed to the motor housing with fastening screws 34 on the output side of the motor housing. Furthermore, a drive side outer gear 8' and an output side outer gear 8 are inserted into a support ring 36 and screwed to the support ring 36 by the screws 34. The support ring 36 is divided in the axial direction into two mutually mirror-symmetrical halves, which together form a raceway 67 for the pin retaining ring 103.

The drive side outer gear 8' and the output side outer gear 8 are arranged in the axial direction outside the cam disk 28 and the flexible ball bearing 33. In the radial direction, the drive side outer gear 8' is opposite to the areas of the pins 101 which protrude the pin retaining ring 103 on the drive side in the axial direction. In the radial direction, the output side outer gear 8 is opposite to the areas of the pins 101 which protrude the pin retaining ring 103 on the output side in the axial direction.

On the drive side, a drive side spacer disk 37 is arranged in the motor housing 22 such that it faces the drive side end faces of the pins 101 in the axial direction. Similarly, on the output side, an output side spacer disk 38 is arranged in the motor housing 22 such that it faces the output side end surfaces of the pins 101 in the axial direction.

An output shaft 39 is disposed radially inside the hollow shaft of the inner gear 7, wherein a transmission freewheel 40 is disposed between the hollow shaft of the inner gear 7 and the output shaft 39. The output shaft 39 is mounted radially outwardly in an output side output ball bearing 41, which is inserted into a cylindrical recess or shoulder of the housing cover 32. The output side region of the output shaft 39 protrudes the housing cover 32 in the axial direction. A chainring adapter 43 is mounted on the output shaft 39 and is held via a round output nut 44 which is screwed into an internal thread of the output shaft 39.

The pedal shaft 35 is disposed partially in the interior of the rotor shaft 27 and partially in the interior of the output shaft 39 and concentric with the rotor shaft 27 and the output shaft 39. The pedal shaft 35 is mounted via a drive side pedal shaft ball bearing 45 radially outward in a load cell 47, which in turn is inserted into the motor housing 22. A printed circuit board 48, also referred to as a "PCB force sensor", with evaluation electronics is fastened to the load cell 47 and a connector of the printed circuit board 48 is guided radially outwards via a ribbon cable 63 and connected to the electronics on the printed circuit board 23.

The load cell 47 comprises strain gauges that generate electrical signals that correspond to a deformation of the load cell 47 serving as a suspension of the drive side pedal shaft ball bearing. The load cell 47 comprises four webs, which are arranged at 45 degrees spacing in the circumferential direction and which are connected to a ring in which the outer ring of the output side bottom bracket ball bearing is inserted. On each of these webs in each case a strain gauge is applied, which is electrically connected to the annular printed circuit board 22.

In the drive side direction of the output side pedal shaft ball bearing 46, a pedal shaft freewheel 49 is arranged between the pedal shaft 35 and the output shaft 39. The transmission freewheel 40, the hollow shaft of the inner gear 7 and the inner gear ball bearing 31 follow radially outwardly. Instead of a single pedal shaft freewheel 49, two adjacent freewheels or a single freewheel and an adjacent rolling bearing, such as a needle bearing can be installed.

On the output side of the output side pedal shaft ball bearing 46, an inner shaft seal ring 50 is inserted between the pedal shaft 35 and the output shaft 39 opposite the output side pedal shaft ball bearing 46. Furthermore, an outer shaft seal ring 51 is disposed opposite the output side output ball bearing 46 between the output shaft 39 and the housing cover 32. Another shaft seal ring 52 is arranged on the drive side between the cooling cover 24 and the pedal shaft 35. An O-ring 42 is inserted radially outward between the output side outer gear 8 and the housing cover 32.

In operation, an input torque is transmitted via the stator 20 by electromagnetic force action to the outer rotor shaft 26 and from there to the inner rotor shaft 27, which is converted by the cam disk 28 and the flexible ball bearing 33 into a radial force. This radial force is converted at the tooth flanks of the internal toothings 6, 6' of the outer gears 8, 8' and the external toothing 5 of the inner gear 7 into an output torque, wherein the inner gear 7 is driven, and the outer gears 8, 8' are fixed to the housing. The output torque is larger than the input torque by the reduction gear ratio.

The inner toothing, which is formed by the external toothing 5 of the inner gear 7, lies opposite the internal toothing 6 of the output side outer gear 8, and thereby provides the output torque, in particular by those pins 101 which abut on both the external toothing 5 and the internal toothings 6, 6'.

FIG. 2 shows an exploded view of the transmission of FIG. 1, in which, viewed from the drive side to the output side, the drive side rotor ball bearing 29, the inner rotor shaft 27, the cam disk 28, the output side rotor ball bearing 30, the second outer gear 8', the flexible ball bearing 33, the pin retaining ring 103 with the pins 101, the support ring 36, the first outer gear 8, the inner gear 7 with the inner gear hollow shaft and the inner gear ball bearing 31 are shown.

The outer gears 8, 8' each comprise journals 53 which project radially outwards from the respective outer gear 8, 8' and are distributed at regular intervals over the circumference of the outer gears 8, 8'. The support ring 36 comprises radial slots 54 on radially opposite sides corresponding to the journals 53 and distributed on the circumference. In addition, screw holes 55 are provided for fastening the outer gears, which, in the embodiment of FIG. 2, are located partially in the outer gears 8, 8' and partially in the support ring 36.

Between the drive side rotor ball bearing 29 and the motor housing 22, a wave spring 61 is arranged on the drive side of the drive side rotor ball bearing 29 and a spacer ring 62 is arranged between the drive side rotor ball bearing 29 and the outer rotor shaft 26 on the output side of the drive side rotor ball bearing 29.

In particular, the support ring 36 may be made of aluminum and the outer gears 8, 8' of plastic, such as polyamide 66 (PA66), wherein the support ring 36 may be made in particular by aluminum die-cast, and the outer gears may be made in particular by a plastic injection molding. Furthermore, the inner rotor shaft 27 may be made of aluminum.

As shown in FIG. 1, the screws 34 extend through the transmission cover 32, the first outer gear 8, the second outer gear 8', and the support ring 36 into the motor housing 22 in the assembled state.

FIG. 3 shows a drive-side part of an exploded view of the transmission of FIG. 1, in which, viewed from the drive side, the cooling cover 24, the printed circuit board 23, the motor housing 22 with the stator 20 and the coil 21 or with the coils 21, the printed circuit board 48, the load cell 47, the wave spring 61, the drive side spacer disk 37, the second outer gear 8' with the internal toothing 6', the drive side rotor ball bearings 29, the spacer ring 62, the outer rotor shaft 26, and a part of the inner rotor shaft 27 are shown.

FIG. 3 shows an output-side part of an exploded view of the transmission of FIG. 1, in which, viewed from the drive side, the inner rotor shaft 27 with the cam disk 28, the output side rotor ball bearing 30, the pin ring 102 with the pin retaining ring 103 and the pins 101, the support ring 36, the output side outer gear 8, the inner gear 7 with the external toothing 5, the output shaft 37, the transmission freewheel 40, the O-ring, the output side spacer disk 38, the inner gear ball bearing 31, the housing cover 32 with the fastening screws 34 and the shaft sealing ring 50 are shown.

As shown in FIG. 3, the transmission freewheel 40 comprises coil springs cylindrical rollers 64 which are arranged in a clamping body cage 65. For pressing the cylindrical rollers 64, coil springs 66 are provided in the clamping body cage 65.

FIG. 4 shows an exploded view of an inner assembly of the transmission of FIG. 1, and in particular the pedal shaft freewheel 49. In detail, FIG. 4, seen from the drive side, shows a sensor ring 68, the drive side pedal shaft ball bearing 45, the pedal shaft 35, the pedal shaft freewheel 49, the output side pedal shaft ball bearing 46, a spacer 69, a chainring adapter 43, a wave spring 70, an inner shaft seal 50, an O-ring 76 and the output nut 44.

As shown in FIG. 4, the pedal shaft freewheel 49 comprises blade-shaped steps 71 which are formed on the pedal shaft 35. Pawls 73 and coil springs 72 are arranged between the steps 71. At both ends of the pedal shaft, fastening regions 74, 75 for pedal cranks are arranged, which are shown in FIG. 1 in cross section.

FIG. 5 shows a perspective view of an inner assembly of the transmission of FIG. 1 in the assembled state. For the sake of clarity, the inner gear 7 and the flexible ball bearing 33 have been omitted in FIG. 5.

FIG. 6 shows a pedal shaft assembly 80 or a pedal shaft unit 80 of the transmission 10 of FIG. 1, wherein the drive side is right and the output side left. The pedal shaft assembly 80 comprises a freewheel assembly 81 and a sensor assembly 82. The viewing direction of the view of FIG. 6 is against the direction of driving in the installed state.

FIG. 7 shows a cross section through the freewheel assembly 81 of FIG. 6 along the intersection line D-D, which is viewed from the output side, wherein in the background the flat cable 63 belonging to the sensor assembly 82 is visible. Furthermore, on the right side of the load cell 47 screw heads of the screws can be seen, with which the annular printed circuit board 23 is screwed to the load cell 47.

The freewheel assembly 81 comprises the pedal shaft freewheel 49 and the transmission freewheel 40, wherein the output shaft 39 is additionally configured as outer ring of the pedal shaft freewheel 49 and as inner ring of the transmission freewheel 40. As shown in FIG. 7, the pedal shaft freewheel 49 is configured as pawl freewheel while the transmission freewheel 40 is configured as a clamp roller freewheel with cylindrical clamp rollers 64. The inner circumference of the output shaft 39 forms a serrated staircase whose steps form stops for the pawls 73, which are pressed by the coil springs 72 to the inner circumference of the output shaft 39.

Similarly, the outer circumference of the output shaft 39 forms a serrated staircase, also referred to as a "star", whose steps form stops for the cylindrical rollers 64 of the transmission freewheel 40. The freewheel cage 65 and thus the cylindrical rollers 64 are pressed by the coil springs 66, which are arranged between the outer circumference of the output shaft 39 and the freewheel cage 65, to the outer circumference of the drive shaft 39.

The steps of the drive shaft 39 are arranged such that a freewheeling direction of the pedal shaft freewheel 49 and a freewheeling direction of the transmission freewheel 40 run in the counterclockwise direction in the view of FIG. 7. This freewheeling direction is in each case reversed to the respective drive direction or locking direction.

Thus, the pedal shaft 35 can drive the output shaft 39 in a clockwise direction, as long as the output shaft 39 does not move faster than the pedal shaft 35 and the outer ring of the transmission freewheel 40, which is formed by an inner portion of the inner gear 5, can drive the output shaft 39 in the clockwise direction as long as the output shaft 39 does not move faster than the outer ring. The drive and locking directions, respectively, of the freewheels 40, 49 are indicated in FIG. 7 in each case by arrows.

FIG. 10 is a simplified cross-sectional view illustrating the load cell 47 used in the transmission of FIG. 1 and the use of an obliquely mounted bearing. For simplicity, the electric motor and the drive train of the electric motor are omitted in this illustration, so that the pedal shaft 35 is mounted directly on a housing cover 32'.

According to FIG. 10, the drive-side pedal shaft ball bearing 45 and the output side pedal shaft ball bearing 46 are each configured as an angular contact ball bearing, which can receive axial forces to a certain extent. Instead of ball bearings, other types of bearings can be provided, which can also receive axial forces in addition to radial forces, such as taper roller bearings. However, this is usually more expensive than the use of ball bearings.

The load cell 47, which is mounted on the pedal shaft 35 via the bearing 45, comprises support lugs 91 and measuring lugs 90. The support lugs 91 are supported in the axial direction on an outer ring of the ball bearing and the measuring lugs 90 are supported in the radial direction on the outer ring. Strain gauges are attached to at least two of the 90 measuring lugs. The inner ring of the ball bearing 45 abuts towards the center of the pedal shaft 35 on a shoulder or on a step of the pedal shaft 35.

The inner ring of the ball bearing 46 abuts towards the center of the pedal shaft 35 via a wave spring 70 on a shoulder of the pedal shaft 35. The outer ring of the ball bearing 46 abuts on the transmission cover 44' via a spacer disk.

In operation, a rider transmits radial forces via a pedal crank to the pedal shaft 35. These radial forces are received by the measuring lugs 90 and lead to a deformation of the measuring lugs 90, which is determined by the strain gauges. In contrast, axial forces on the outer ring of the ball bearing 45 do not lead to a deformation of the second lugs. Instead, the axial forces are absorbed by the support lugs 91 of the load cell 47, whereby the ball bearing 45 is held laterally.

Compared to the force of the rider on the load cell, any existing torque through an auxiliary drive does not lead or only slightly leads to a deformation of the second lugs. Thus, the contribution of the rider can be determined separately. In addition, an angular position sensor can be provided, with the help of which the position of the pedal cranks can be determined and thereby the lever arm of the pedals. By a suitable calculation model, which is implemented by a stored program and/or a circuit, the torque provided by the rider can be reconstructed from the measured radial forces.

FIG. 10 illustrates a transmission of axial forces in the housing according to the mounting concept of the transmission of FIGS. 1 to 9.

As shown at the bottom right in FIG. 10, an output side axial force of the pedal shaft 35 is transmitted via a shoulder of the pedal shaft 35, the output side pedal shaft ball bearing 46, the wave spring 70, the output nut 44, the internal thread of the output hollow shaft 39, the output hollow shaft 39, a step of the output hollow shaft 39, the output ball bearing 41, the housing cover 32, the screws 34 and the screw thread 60 into the housing 22.

A drive side axial force of the pedal shaft 35 is transmitted via a drive side step 123 of the pedal shaft 35, the drive side pedal shaft ball bearing 45, axial support lugs of the load cell 47 and a mounting ring of the load cell 47 into the housing 22.

As shown at the top right of FIG. 10, an output side axial force of the rotor shaft 28 is transmitted via the output side rotor ball bearing 30, the inner gear 7 and the inner gear ball bearing 31 into the housing cover. From there, the axial force is transmitted via the screws 34 into the housing 22, as shown at the bottom right in FIG. 10.

A drive side axial force of the rotor shaft 27 is transmitted via a shoulder 9 of the rotor shaft 27, the outer rotor shaft 26, the spacer ring 62, the drive-side rotor ball bearing 29 and the wave spring 61 into the housing 22.

Furthermore, an axial force on the ball bearing 33 arranged on the cam disk is transmitted via the inner gear 7 and the ball bearing 31 into the transmission housing 22. The counterforce thereto is transmitted via a step 9 of the cam disk 28 into the rotor shaft 27 and from there via the above-described path into the housing 22.

The inner gear 7 tapers radially inwardly of an outer circumference, so that only the outer ring of the ball bearing 33 abuts against the inner gear 7, which moves essentially synchronously with the pin ring 101 and with the inner gear 7, and not the inner ring of the ball bearing 33, which rotates much faster than the inner gear 7. The width of the wave spring 70 is adjusted such that the chainring adapter 43 does not abut against the housing cover 32.

FIGS. 11 to 20 show a harmonic pin ring transmission with an eccentric cam disk, wherein the eccentric cam disk is an eccentrically arranged circular disk.

Figure 11:
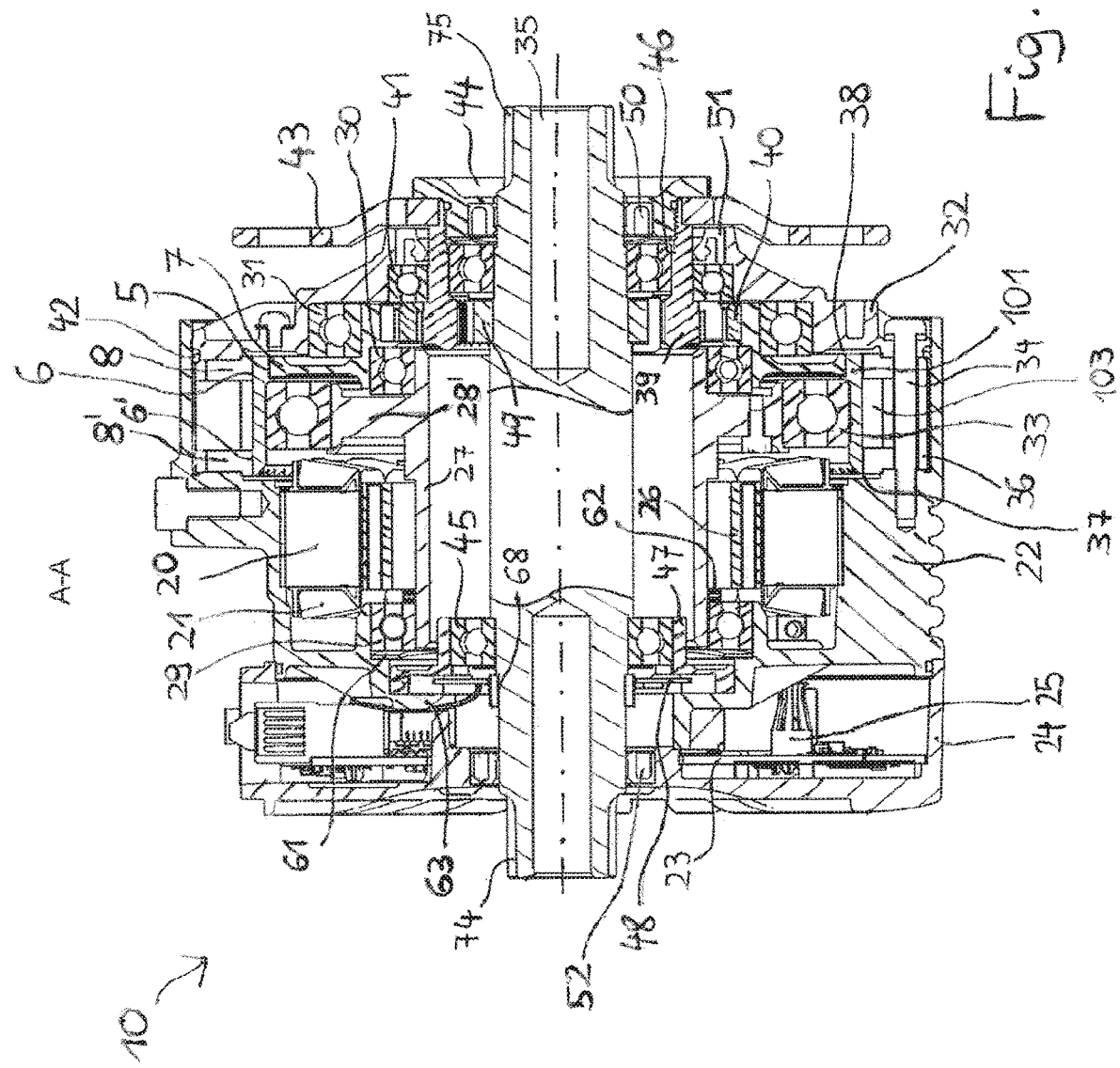
Figure 19:
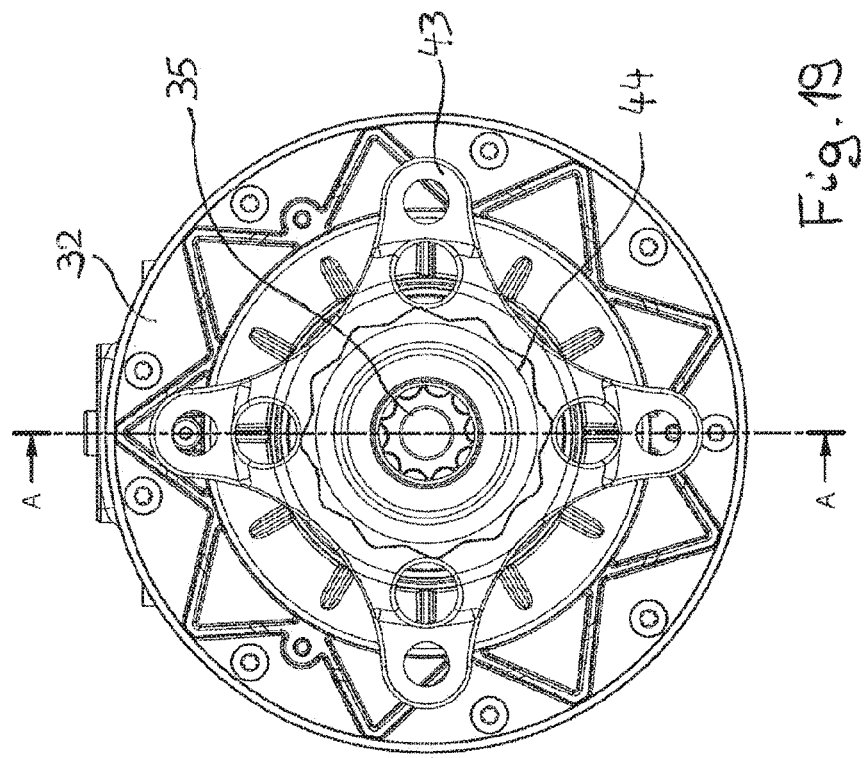
FIG. 19 shows an output-side plan view of the transmission of FIG. 11.

FIG. 11 shows a cross-sectional view of a harmonic pin ring transmission 10. The cross-sectional plane A-A of FIG. 11 is indicated in FIG. 19. In FIG. 11, the left side corresponds to a drive side and the right side corresponds to an output side of the harmonic pin ring gear 10.

A stator 20 of a stator assembly of the harmonic pin ring transmission 10 is disposed in a motor housing 22. The stator 20 comprises three separate coils 21 for connecting to three phases of a three-phase inverter. The three-phase inverter is configured as a power electronics, which is arranged on a printed circuit board 23, wherein the printed circuit board 23 is arranged in a cooling cover 24, which is mounted on the motor housing 22 on the drive side. The three coils of the stator 20 are connected to the three-phase inverter via three terminals 25, one of which is shown in FIG. 11.

The motor housing 22 and the cooling cover 24 each have cylindrical protruding portions which surround a pedal shaft 35 extending centrally through the motor housing 22. The printed circuit board 23 is formed as a perforated disk, which is located outside of the protruding portions, so that the electronics located thereon is sealed against oil and grease of the transmission.

An outer rotor shaft 26 equipped with permanent magnets is disposed radially inside the stator 20. This outer rotor shaft 26 is also referred to as a "rotor package". The outer rotor shaft 26 comprises on its inner side an elastic region which is plugged onto an inner rotor shaft 27. On the inner rotor shaft 27, an eccentrically arranged circular eccentric disk 28' is formed on the output side, which is shown in more detail in FIG. 12.

On the drive side, the inner rotor shaft 17 is supported in the motor housing 22 to the outside by a drive-side rotor ball bearing 29. Namely, an outer ring of the drive side rotor ball bearing 29 is disposed in a cylindrical recess of the motor housing 22.

Furthermore, the inner rotor shaft 27 is mounted on the output side in an output side rotor ball bearing 30 radially outwardly in an inner gear 7. A hollow shaft of the inner gear 7 is connected integrally with an annular portion of the inner gear 7 on the output side, which comprises an external toothing 5.

The hollow shaft of the inner gear 7 is in turn mounted radially outwardly via an inner gear ball bearing 31 on a housing cover 32 which is screwed to the motor housing 22 by screws 34. The inner gear ball bearing 31 is offset from the output side rotor ball bearing 30 in the axial direction to the output side and is offset in the radial direction to the outside. In addition, the inner gear ball bearing 31 overlaps with the output side rotor ball bearing 30 in the axial direction.

On the eccentric circular disk 28 of the inner rotor shaft 27, a ball bearing 33 is clamped. A pin retaining ring 103 with pins 101 bears on the ball bearing 33, wherein the pins 101 are held in cylindrical recesses on the inside of a pin retaining ring.

The pin ring assembly of pins 101 and pin retaining ring 103 is shown in more detail in FIGS. 15 to 17. According to the embodiment of FIGS. 15 to 17, the pin ring 103, unlike in the embodiment of FIGS. 1 to 10, is formed from one piece and comprises areas corresponding to the pins 101 and the pin retaining ring 103. The one-piece embodiment of the pin ring 103 is particularly well suited for a transmission in which the pin ring is not or only slightly deformed. This is the case, for example, in a transmission with an eccentrically arranged circular disk, which is shown in FIGS. 11 to 20, 61 to 66, 67 and 72. The pins 101 of the pin ring 103 protrude in the axial direction on both sides the flexible ball bearing 33 and the pin retaining ring 103.

The eccentric disc 28' and the ball bearing 33 together form a transmitter assembly which converts a rotary motion into a radial motion which is transmitted by the ball bearing 33 and the pin ring 103 to the pins 101, and which is then converted back again into a rotary motion by the engagement of the pins 101 in the outer gears 8, 8'.

The housing cover 32 is screwed to the motor housing with fastening screws 34 on the output side of the motor housing. Furthermore, a drive side outer gear 8' and an output side outer gear 8 are inserted into a support ring 36 and screwed to the support ring 36 by the screws 34. An O-ring 42 is inserted radially outward between the output side outer gear 8 and the housing cover.

The drive side outer gear 8' and the output side outer gear 8 are arranged in the axial direction outside the eccentric disk 28' and the ball bearing 33. In the radial direction, the drive side outer gear 8' is opposite to the areas of the pins 101 which protrude the pin retaining ring 103 on the drive side in the axial direction. In the radial direction, the output side outer gear 8 is opposite to the areas of the pins 101 which protrude the pin retaining ring 103 on the output side in the axial direction.

On the drive side, a drive side spacer disk 37 is arranged in the motor housing 22 such that it faces the drive side end faces of the pins 101 in the axial direction. Similarly, on the output side, an output side spacer disk 38 is arranged in the motor housing 22 such that it faces the output side end surfaces of the pins 101 in the axial direction.

An output shaft 39 is disposed radially inside the hollow shaft of the inner gear 7, wherein a transmission freewheel 40 is disposed between the hollow shaft of the inner gear 7 and the output shaft 39. The output shaft 39 is mounted radially outwardly in an output side output ball bearing 41, which is inserted into a cylindrical recess or shoulder of the housing cover 32. The output side region of the output shaft 39 protrudes the housing cover 32 in the axial direction. A chainring adapter 43 is mounted on the output shaft 39 and is held via a transmission cover 44 which is screwed into an internal thread of the output shaft 39.

The above-mentioned pedal shaft 35 is disposed partially in the interior of the rotor shaft 27 and partially in the interior of the output shaft 39 and concentric with the rotor shaft 27 and the output shaft 39. The pedal shaft 35 is mounted via a drive side pedal shaft ball bearing 45 radially outward in a load cell 47, which in turn is inserted into the motor housing 22. A printed circuit board 48 with a force sensor is fastened to the load cell 47 and a connector of the printed circuit board 48 is guided radially outwards via a ribbon cable 63 and connected to the electronics on the printed circuit board 23.

In the drive side direction of the output side pedal shaft ball bearing 46, a pedal shaft freewheel 49 is arranged between the pedal shaft 35 and the output shaft 39. The transmission freewheel 40, the hollow shaft of the inner gear 7 and the inner gear ball bearing 31 follow radially outwardly. Instead of a single pedal shaft freewheel 49, two adjacent freewheels or a single freewheel and an adjacent rolling bearing, such as a needle bearing can be installed.

On the output side of the output side pedal shaft ball bearing 46, an inner shaft seal ring 50 is inserted between the pedal shaft 35 and the output shaft 39 opposite the output side pedal shaft ball bearing 46. Furthermore, an outer shaft seal ring 51 is disposed opposite the output side output ball bearing 46 between the output shaft 39 and the housing cover 32. Another shaft seal ring 52 is arranged on the drive side between the cooling cover 24 and the pedal shaft 35.

In operation, an input torque is transmitted via the stator 20 by electromagnetic force action to the outer rotor shaft 26 and from there to the inner rotor shaft 27, which is converted by the eccentric disk 28' and the ball bearing 33 into a radial force. This radial force is converted at the tooth flanks internal toothings 6, 6' of the outer gears 8, 8' and the external toothing 5 of the inner gear 7 into an output torque, wherein the inner gear 7 is driven, and the outer gears 8, 8' are fixed to the housing. The output torque is larger than the input torque by the reduction gear ratio.

The inner toothing, which is formed by the external toothing 5 of the inner gear 7, lies opposite the internal toothing 6 of the output side outer gear 8, and thereby provides the output torque, in particular by those pins 101 which abut on both to the external toothing 5 and to the internal toothings 6, 6'.

FIG. 12 shows an exploded view of the transmission of FIG. 11, in which, viewed from the drive side to the output side, the drive side rotor ball bearing 29, the inner rotor shaft 27, the eccentric disk 28 ', the output side rotor ball bearing 30, the second outer gear 8', the ball bearing 33, the pin retaining ring 103 with the pins 101, the support ring 36, the first outer gear 8, the inner gear 7 with the inner gear hollow shaft and the inner gear ball bearing 31 are shown.

The outer gears 8, 8' each comprise journals 53 which project radially outwards from the respective outer gear 8, 8' and are distributed at regular intervals over the circumference of the outer gears 8, 8'. The support ring 36 comprises radial slots 54 on radially opposite sides corresponding to the journals 53 and distributed on the circumference. In addition, screw holes 55 are provided for fastening the outer gears, which, in the embodiment of FIG. 12, are located partially in the outer gears 8, 8' and partially in the support ring 36.

Between the drive side rotor ball bearing 29 and the motor housing 22, a wave spring 61 is arranged on the drive side of the drive side rotor ball bearing 29 and a spacer ring 62 is arranged between the drive side rotor ball bearing 29 and the outer rotor shaft 26 on the output side of the drive side rotor ball bearing 29.

In particular, the support ring 36 may be made of aluminum and the outer gears 8, 8' of plastic, such as polyamide 66 (PA66), wherein the support ring 36 may be made in particular by aluminum die-cast, and the outer gears may be made in particular by a plastic injection molding. Furthermore, the inner rotor shaft 27 may be made of aluminum.

As shown in FIG. 11, the screws 34 extend through the transmission cover 32, the first outer gear 8, the second outer gear 8', and the support ring 36 into the motor housing 22 in the assembled state.

FIG. 13 shows a side view, viewed from the output side, of an assembled arrangement of inner rotor shaft 27, inner gear 7, pins 101 and outer gear 8. As can be seen in FIG. 13, at a predetermined position of the eccentric disc 28' at a first position, the pins 101 completely abut against the outer internal toothing 6 and at a second position which is opposite the first position, the pins 101 completely abut against the inner external toothing 5.

FIG. 14 shows a cross-sectional view through the arrangement of FIG. 13 along the intersection line E-E. As shown in the cross-sectional view of FIG. 14, the eccentric disc 28' comprises a step 11 on the drive side, through which an inner ring of the ball bearing 33 is held from the drive side.

FIG. 15 shows an output side view of a pin ring 102 for use in the transmission of FIG. 11. FIGS. 16 and 17 show detailed views of the pin ring 102 of FIG. 15, and FIG. 18 shows a drive side view of the pin ring 102 of FIG. 15.

The pin ring 102 comprises a pin retaining ring 103 and pins 101. The pin ring 102 is integrally formed, wherein the pin retaining ring 103 and the pins 101 are each formed by portions of the pin ring 102, which is formed in one piece. The pins 101 are respectively formed differently on an output side and on an opposite drive side.

Namely, the pins on the output side of the pin ring 102, at which the pins 101 engage both the inner gear 7 and the outer gear 8, are lens shaped, wherein two radially opposite regions each comprise a circular segment shaped boundary and two peripherally opposite regions taper. This is best seen in the side view of FIG. 17, which is marked in FIG. 15 with "G".

Figure 18:
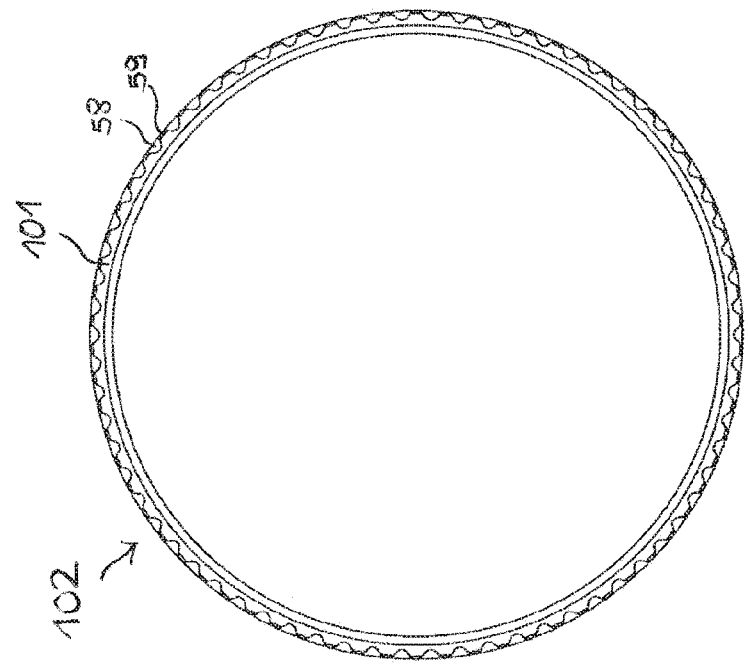
FIG. 18 shows an output-side plan view of the pin ring of FIG. 15.

On the other hand, the pins 101 on the drive side where the pins 101 engage only the second outer gear 8' are formed as "half pins" which respectively form teeth of a comb extending along the circumference of the pin ring 102 as shown in the cross sectional view of FIG. 16 and in the view of FIG. 18.

In the side view of FIG. 17, a first region 255 of a pin 101 is shown, which transmits torque to the inner gear 7, and a second, radially opposite region 56, which transmits torque to the outer gear 8. Tangential transitions between the pins 101 occur due to the regions of the pins 101 tapering along the circumferential direction. As a result, on the one hand, an economical CNC production of the pins 101 can be provided and, on the other hand, a higher tangential rigidity of the pins 101 can be achieved.

According to another manufacturing method, the pin ring is made by transfer molding. According to this method, first a hollow ring is produced, from which the pins 101 are then formed by parting off or milling off. In a shaping by milling, a rotating milling machine can be used, which moves on a circular line, wherein the pins are formed in the radial direction first from the inside, then from the outside.

The transfer molding is further defined, for example, in the standards DIN 8582 and DIN 8583. According to a special method, a workpiece to be formed is first applied to a mandrel. The workpiece to be formed is then deformed from the outside by transfer molding wheels, which are driven by a traverse drive system in a controlled manner, press against the workpiece and thin the material in a controlled manner.

Furthermore, on the output side of the pins 101 a step 57 is formed radially inwardly. As can be seen in FIG. 11, this step 57 bears on the output side on the outer ring of the ball bearing 33 in the installed state of the pin ring 102.

Figure 8:
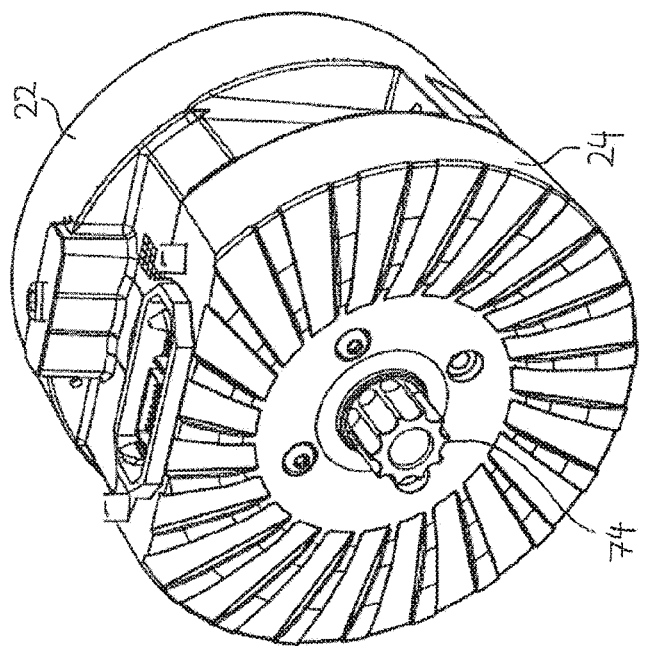
FIG. 8 shows a drive-side perspective view of the transmission of FIG. 1 in the assembled state.

As shown in the drive-side view of the pin ring 102 of FIG. 8, a comb with round recesses 58 and intermediate plateaus 59 is formed on the drive side of the pin ring 102. The intermediate plateaus 59 form an extension of the pins 101 shown in detail in FIG. 17 and can thus be regarded as the drive side region of the pins 101.

FIG. 19 shows an output side view of the assembled transmission of FIG. 11, in which the cross-sectional plane of FIG. 11 is labeled "A".

FIG. 20 illustrates a transmission of axial forces into the housing according to the mounting concept of the transmission of FIGS. 11 to 19.

As shown at the bottom right in FIG. 20, an output side axial force of the pedal shaft 35 is transmitted via a shoulder of the pedal shaft 35, the output side pedal shaft ball bearing 46, the wave spring 70, the output nut 44, the internal thread of the output hollow shaft 39, the output hollow shaft 39, a step of the output hollow shaft 39, the output ball bearing 41, the housing cover 32, the screws 34 and the screw thread 69 into the housing 22.

A drive side axial force of the pedal shaft 35 is transmitted via a drive side step 123 of the pedal shaft 35, the drive side pedal shaft ball bearing 45, axial support lugs of the load cell 47 and a mounting ring of the load cell 47 into the housing 22.

As shown at the top right of FIG. 10, an output side axial force of the rotor shaft 27 is transmitted via the output side rotor ball bearing 30, the inner gear 7 and the inner gear ball bearing 31 into the housing cover. From there, the axial force is transmitted via the screws 34 into the housing 22, as shown at the bottom right in FIG. 20.

A drive side axial force of the rotor shaft 27 is transmitted via a drive side step of the rotor shaft 27, the outer rotor shaft 26, the spacer ring 62, the drive-side rotor ball bearing 29 and the wave spring 61 into the housing 22.

Furthermore, an axial force is transmitted via a shoulder 9 of the cam disk 28 to the ball bearing 33 via a shoulder 10 of the pin ring 100, the inner gear 7 and the ball bearing 31 into the transmission housing 22. The counterforce thereto is transmitted via the step 9 of the cam disk 28 into the rotor shaft 28 and from there via the above-described path into the housing 22.

The inner gear 7 tapers radially inwardly of an outer circumference, so that only the outer ring of the ball bearing 33 abuts against the inner gear 7, which moves essentially synchronously with the pin ring 101 and with the inner gear 7, and not the inner ring of the ball bearing 33, which rotates much faster than the inner gear 7. The width of the wave spring 70 is adjusted such that the chainring adapter 43 does not abut against the housing cover 32.

The embodiments of FIGS. 21 to 44 disclose devices and methods for measuring a torque applied to a pedal shaft of a bicycle assisted by an electric drive.

By measuring the torque on a pedal shaft, the support of an electric motor for an electric bicycle can be adjusted. For this purpose, various methods are known. For example, the torque can be determined without contact by means of a magnetic measurement of the twisting of the pedal shaft. Another method determines a mechanical deformation of the bottom bracket ball bearing suspension. A corresponding device is disclosed for example in the patent application DE 102013220871 A1. According to this device, a single electromagnetic or mechanical sensor is used to determine a horizontal deflection or deformation of the bottom bracket ball bearing suspension.

The present description discloses a load cell for determining a radial force acting on a crankshaft with a receiving sleeve for receiving a ring of a bearing and a fastening ring for attaching the load cell in a transmission housing. Axial support areas are provided on the fastening ring for axially supporting the outer ring of the first bearing. Measuring regions that connect the receiving sleeve with the fastening ring are provided for receiving radial forces of the receiving sleeve.

Strain sensors are attached to at least two of the measuring regions. The strain sensors may be configured in particular as strain gauges, wherein the strain gauges may be glued to a surface of the measuring regions.

The axial support areas and the measuring regions may in particular be configured as lugs or fingers. Furthermore, the measuring regions may be configured as angular lugs. The radial force acting on the crankshaft is indirectly determined by a radial force acting on the receiving sleeve, which in turn is transmitted via a bearing from the crankshaft to the receiving sleeve. The crankshaft may in particular be a pedal shaft.

The load cell can be used in particular in electric bicycles for regulating a motor support, wherein a pedal shaft is supported via the load cell in the axial direction. In a broader sense, the load cell can be used anywhere where a radial force is converted into a rotational movement of the shaft on a shaft, in particular in a bicycle pedal shaft or a piston which is driven by an internal combustion engine or another drive. In this case, the measurement of the radial forces via the load cell may allow a calculation of the torque applied to the shaft. However, the radial forces can also be used to generate control signals without the intermediate step of a torque calculation.

If there is no conversion of radial forces, such as in a gear transmission, a load cell as described herein can also be used to determine an imbalance on the shaft. The load cell is advantageous in particular in the case of a mechanical drive, such as in a pedal shaft, since in this case the applied torque can not readily be determined via a motor power, which is easily possible, for example, with an electric motor.

In a load cell according to the present description, radial and axial forces are decoupled by the fact that axial forces are received by the axial support areas or lugs and radial forces are received by the measuring regions or lugs. Thereby, the load cell can be used in an obliquely mounted bearing, such as in an O-arrangement or an X-arrangement. Additionally, decoupling the radial from the axial forces may allow a more accurate measurement of the radial force component, and thus a more accurate determination of the torque applied to the shaft.

A load cell according to the present description is simple and requires only little space in a transmission, in particular in the axial direction. The total width of the load cell is essentially determined by the width of the bearing and by the width of the axially adjoining fastening region. Therefore, the load cell can be made relatively narrow in the axial direction, for example, it can only have about twice the width of a rolling bearing or less.

The absorption of the axial forces by the load cell is advantageously carried out on the stationary outer ring of the ball bearing and not on the movable inner ring or on the shaft, where the relative movement would lead to friction losses. Thus, the axial support areas advantageously only touch the outer ring of the bearing. The support function of the axial support areas can be achieved in particular in that the axial support areas or lugs protrude radially inwardly over an inner surface of the receiving sleeve, it being sufficient if the axial support areas only protrude inwardly as it corresponds to the width of a bearing ring. The axial support areas may also have a profile for alignment with the bearing ring.

The measuring lugs are expediently configured as angle brackets, wherein an axial region of the angle bracket connected to the receiving sleeve extends in the axial direction and a radial region of the angle bracket connected to the fastening region extends in the radial direction. As such, the angle bracket forms a lever arm which causes bending of the radial portion of the measuring lugs relative to the radial orientation. Due to the bending, a surface of the measuring lugs is stretched or compressed and an axially opposite surface is compressed or stretched. This compression or stretching is detected by the strain gauges applied to one of the two surfaces of the radial region.

The two regions of the angle bracket formed by the measuring lug can also be slightly inclined with respect to the axial or the radial orientation, for example, to allow greater deformation. Advantageously, the measuring lugs are sufficiently thin in the axial direction to allow a good deformation. In this case, the second region may be made thinner than the first region. Furthermore, the second region near the top of the angle bracket may be reinforced to avoid deformation near the top of the angle bracket.

The axial region of the measuring lug is advantageously configured such that it does not protrude beyond the surface of the receiving sleeve, which rests on the rolling bearing. This avoids that a ring of a rolling bearing on which the receiving sleeve rests, abuts the measuring lug and axial forces are transmitted via the measuring lug. In particular, the axial region may be flush with a surface of the receiving sleeve, the surface being a cylindrical inner surface of the receiving sleeve.

According to an exemplary embodiment, the measuring regions comprise measuring lugs formed as angle brackets or are configured as angle-shaped measuring lugs. According to a further exemplary embodiment, the measuring lugs comprise a radial region and an axial region adjoining the radial region. In this case, the radial region is connected to the fastening ring and the axial region is connected to the receiving sleeve, wherein the radial region is arranged to the axial region at an angle of approximately 90 degrees.

According to an advantageous embodiment, four measuring regions or measuring lugs are provided so that the shaft can be supported in four directions. In particular, the measuring lugs can be arranged at a distance of 90 degrees, so that the directions are perpendicular to one another. The measuring lugs are at the same time supporting lugs for radial support. The term "measuring lug" means that the deformation of the measuring lug can be used to measure forces that act on the receiving sleeve in a radial direction.

According to a further embodiment, an angular extent of the measuring lug in the circumferential direction can be suitably selected in order to detect a force in a defined direction and to enable a good deformation. For example, the angular extent of the measuring lug along the circumferential direction may be limited to 30 degrees or less, or 25 degrees or less, wherein 90 degrees correspond to a right angle.

According to an embodiment, the load cell comprises four measuring regions, which are arranged at a distance of 90 degrees. Thus, radial forces can be measured in four mutually perpendicular directions when all four measuring regions or measuring lugs are equipped with strain sensors.

In this case, at least one, several or all of the strain sensors may be formed as strain gauges, which are inexpensive and robust, in particular compared with an optical strain measurement.

In particular, a strain sensor may be attached to each of the measuring ranges or measuring lugs to measure radial forces in as many directions. For ease of attaching the strain gauges, the surfaces of the measuring ranges to which the strain gauges are attached may have recessed areas or pockets for attachment of the strain sensors or strain gauges.

The strain gauges may be arranged close to the fastening region, for example to keep the electrical connection to a printed circuit board attached to the transmission housing as short as possible or because there occurs a greater deformation.

According to a further embodiment, the axial support areas or lugs are separated from the measuring regions by radial slots. Furthermore, the axial support areas or lugs are separated from the receiving sleeve by a circumferential slot. Among other things, the axial support areas and the measuring regions thereby can easily be formed from a workpiece. The load cell may however also be cast in this form. Conveniently, the radial or circumferential slots are straight slots in radial or circumferential direction, respectively. However, the shape may also differ from a straight line.

The direction of the radial slots may deviate from a radial direction, for example, to cause the measuring lug to taper more inwardly. For example, the orientation of the radial slots can be inclined inwards by up to 5 degrees or by up to 10 degrees relative to the radial direction.

For attachment to the transmission housing, according to an embodiment, the fastening ring comprises fastening regions in which fastening holes are provided. The fastening regions may be part of the fastening ring, or may be extensions that protrude from the fastening ring.

Advantageously, the attachment fixes the load cell both in the axial direction and against a rotation in the circumferential direction, whereby the attachment can be released again mechanically. According to another embodiment, this is achieved by a positive connection such as a faucet joint or a snap fit.

Connections that can not be easily untightened again, such as rivet joints or welded joints are also possible. However, they are less suitable for maintenance purposes.

According to a further embodiment, the fastening ring comprises recesses, wherein the measuring regions are arranged in the recesses, wherein the recess can be formed in the radial and in the axial direction. Thereby, it can be avoided, for example, that the measuring lugs directly abut the transmission housing or the thickness of the fastening ring can be adjusted independently of the thickness of the measuring lugs.

According to a further embodiment, an angular extent of the measuring lugs and the slits delimiting the measuring lugs is approximately equal to an angular range of the axial support areas.

According to a further embodiment, an angular extent of the measuring lugs in the circumferential direction is less than or equal to 30 degrees, so that the force can be measured in a defined direction.

The design of a load cell according to the present description is particularly suitable for manufacturing the load cell integrally from metal, for example by casting from a casting mold and mechanical post-processing steps.

In another aspect, the present description discloses a measuring device for determining a force acting on a crankshaft, in particular a pedal shaft. The measuring device comprises a crankshaft with a bearing arranged on the crankshaft, and a load cell according to one of the aforementioned embodiments. In this device, the receiving sleeve of the load cell is arranged on an outer ring of the bearing, wherein the axial support areas of the load cell are supported in the axial direction on the outer ring of the bearing. Furthermore, an evaluation electronics is connected to the strain sensors of the load cell.

Furthermore, the present description discloses a transmission arrangement with the aforementioned measuring device. The transmission arrangement comprises a transmission housing and a crankshaft, in particular a pedal shaft. The crankshaft received or stored directly or indirectly in the transmission housing via a first drive side bearing and a second output side bearing. The bearings can be provided in particular by rolling bearings.

Furthermore, the crankshaft may be passed through a hollow output shaft, wherein in particular for decoupling the pedal shaft from the hollow drive shaft, a freewheel may be arranged between pedal shaft and the hollow drive shaft.

The first bearing is received in the transmission housing via the load cell, wherein the load cell is received in the transmission housing or fastened to the transmission housing via the fastening ring. The receiving sleeve receives an outer ring of the first bearing, wherein the axial support areas are supported on the outer ring of the first bearing.

According to a further exemplary embodiment, the crankshaft of the transmission arrangement comprises a larger diameter in the middle than at its two ends. As a result, a first step and a second step of the crankshaft are formed. An inner ring of the first bearing of the measuring device abuts against the first step of the pedal shaft, and an inner ring of the second bearing abuts against the second step of the pedal shaft. As a result, an X-arrangement of a obliquely mounted bearing is formed and the load cell takes up a portion of the forces of the obliquely mounted bearing.

According to a further embodiment, the first bearing of the measuring device and the second bearing are each formed as a single-row angular contact ball bearings. According to a further embodiment, the first bearing of the measuring device and the second bearing each formed as obliquely mounted cylindrical roller bearing.

According to a further embodiment, the second bearing is supported via a wave spring on the second step of the pedal shaft or on the housing or on a component connected to the housing.

According to a further embodiment, the second rolling bearing is further supported via a spacer disk on the second step of pedal shaft or on the housing or on a component connected to the housing.

Furthermore, the present description discloses a transmission arrangement which further comprises the following features:

a motor, a reduction gear connected to the motor, and a hollow output shaft connected to the reduction gear. In this transmission arrangement, which is suitable for an electric bicycle, wherein the crankshaft is configured as pedal shaft, wherein the first bearing and the second bearing are each configured as rolling bearings, wherein the pedal shaft is passed through the hollow output shaft, and wherein for decoupling the pedal shaft from the hollow output shaft a freewheel is provided between the pedal shaft and the hollow output shaft.

Furthermore, the present description discloses an electrically driven vehicle, in particular an electric bicycle, with the transmission arrangement described above, wherein the motor is configured as an electric motor, and wherein a battery of the electrically driven vehicle is connected to the electric motor.

In the following description, further details are given to describe the exemplary embodiments. It will be apparent to those skilled in the art that the embodiments may be practiced without these details.

FIG. 21 shows a perspective view, viewed from the drive side, of a load cell 47. The load cell 47 comprises four axial support lugs 91 on which an outer ring of a ball bearing 45 is supported in the axial direction, and four measuring lugs 90 arranged between the axial support lugs 91, on each of which a strain gauge 92 is applied. For ease of positioning of the strain gauges 92, the surfaces of the measuring lugs 90 may be recessed.

The axial support lugs 91 comprise an outer portion 93 which rests on an outer ring of the ball bearing and an inner portion 94. The area in which the outer ring of the ball bearing rests can be seen in detail in the cross-sectional view of FIG. 9.

The measuring lugs 90 and the axial support lugs 91 are each laterally separated by a milled radial slot 95. On the output side, the measuring lugs 90 transition into a receiving sleeve 96, which receives the outer ring of the ball bearing 45. This receiving sleeve 96 is best seen in FIG. 26.

On the drive side, the lugs 90, 91 transition into an outer ring 97. The regions of the outer ring 97 facing the measuring lugs 90 and the radial slots 95 each comprise, in the radial direction, a circumferential slot 105 which has approximately half the radial extent of the measuring lugs 90. A first radial slot 95, a circumferential slot 105, and a second radial slot 95 together form a confining slot which extends in an angled U-shape and which separates the axial support lug 91 from the receiving sleeve 96 and from the adjacent measuring lugs.

The outer ring 97 comprises four fastening holes 98, with which the load cell 47 can be secured to a transmission housing, not shown in FIG. 1, wherein a front side of the outer ring 97 rests against the transmission housing. An attachment of the load cell 47 to the transmission housing is shown by way of example in FIGS. 12 to 14.

FIG. 22 shows a plan view, seen from the drive side, of the load cell 47 with the ball bearing 45 arranged in the load cell 47.

FIG. 23 shows a plan view, seen from the output side, of the load cell 47 with the ball bearing 45 arranged in the load cell 47. As shown in FIG. 23, the measuring lugs 90 comprise portions 99 on the output side end face of the outer ring 97 that are slightly recessed with respect to the output side end face of the outer ring 97. As a result, the thickness of the measuring lugs can be reduced, resulting in a greater deformation.

FIG. 24 shows a cross-sectional view of the load cell 47 along the cross-sectional line A-A of FIG. 22, in which the recessed areas 99, the sleeve 96 and the outer ring 97 are visible.

FIG. 25 shows a side view of the load cell 47, in which slots 104 can be seen, which lie opposite the support lugs 91, and through which the support lugs 91 are separated from the sleeve 96.

FIG. 26 shows a perspective view of the load cell 47, viewed from the output side.

FIG. 27 shows a top view of the load cell 47, viewed from the output side.

FIG. 28 shows a cross-sectional view of the load cell 47 taken along the intersection line A-A of FIG. 26.

FIG. 29 shows a cross-sectional view taken along the intersection line B-B of FIG. 26.

Figure 30:
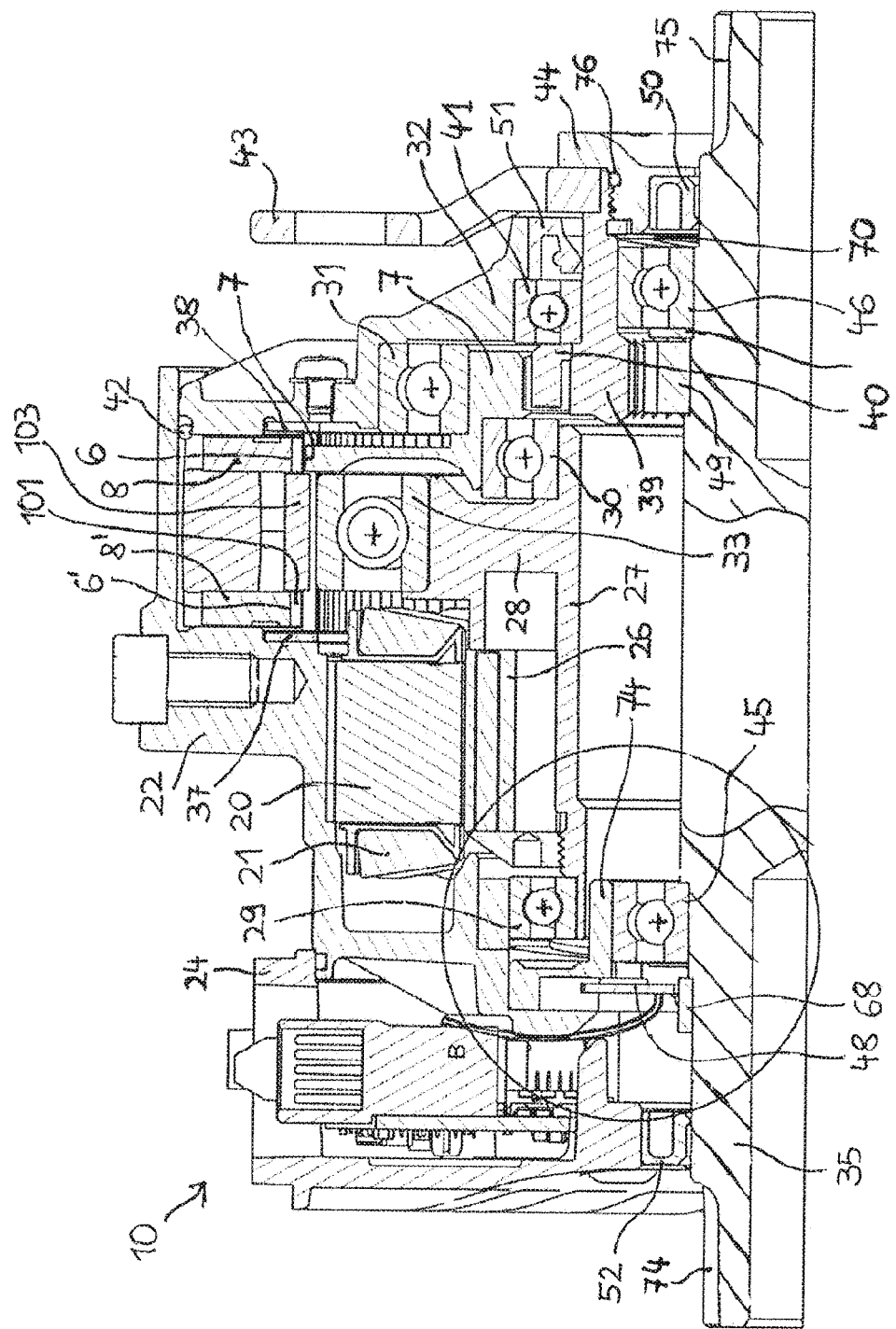
FIG. 30 shows a harmonic pin ring transmission with the load cell of FIG. 21.

FIG. 30 shows a harmonic pin ring transmission in which the load cell 47 of FIG. 21 is incorporated and which will be described in detail below. In FIG. 30, the left side corresponds to a drive side and the right side corresponds to an output side of the harmonic pin ring gear 10. According to the usual arrangement of the drive on the right side, the viewing direction of FIG. 10 is directed in the direction of travel.

A stator 20 of a stator assembly of the harmonic pin ring gear 10 is disposed in a motor housing 22. The stator 20 comprises three separate coils 21 for connection to three phases of a three-phase inverter. The three coils of the stator 20 are connected to the three-phase inverter via three terminals 25, one of which is shown in FIG. 30.

The three-phase inverter is configured as a power electronics, which is arranged on a printed circuit board 23, wherein the printed circuit board 23 is arranged in a cooling cover 24, which is mounted on the motor housing 22 on the drive side. The printed circuit board 23 is configured as an annular disk, which is located outside of cylindrical protruding portions of the motor housing and the cooling cover, so that the motor electronics located thereon is sealed against oil and grease of the transmission.

A pedal shaft 35 extending centrally through the motor housing 22 is stepped on the output side and comprises three steps whose diameter increases from outside to inside and on each of which the shaft seal 50, the output side pedal shaft ball bearing 46 and the pedal shaft freewheel 49 are arranged. The diameter of the pedal shaft 35 is also stepped on the drive side and comprises two steps, wherein on the outer step, the shaft seal and a sensor ring 68 are arranged, and on the inner step, the ball bearing 45 is arranged.

An outer rotor shaft 26 equipped with permanent magnets is disposed radially inside the stator 20. This outer rotor shaft is also referred to as a "rotor package". The outer rotor shaft 26 comprises on its inner side an elastic region which is plugged onto an inner rotor shaft 27. On the inner rotor shaft 27 an eccentrically arranged oval cam disk 28 is formed on the output side.

The inner rotor shaft 27 is supported in the motor housing 22 on the drive side to the outside by a drive-side rotor ball bearing 29. Namely, an outer ring of the drive-side rotor ball bearing 29 is disposed in a cylindrical recess of the motor housing 22.

Furthermore, the inner rotor shaft 27 is mounted on the output side in an output-side rotor ball bearing 30 radially outwardly in an inner gear 7. A hollow shaft of the inner gear 7 is connected integrally with an annular portion of the inner gear 7 on the output side, which comprises an external toothing 5.

The hollow shaft of the inner gear 7 is in turn mounted radially outwardly via an inner gear ball bearing 31 on a housing cover 32 which is screwed to the motor housing 22 by screws 33. The inner gear ball bearing 31 is offset from the output side rotor ball bearing 30 in the axial direction to the output side and is offset in the radial direction to the outside. In addition, the inner gear ball bearing 31 overlaps with the output side rotor ball bearing 30 in the axial direction.

On the cam disk 28 of the inner rotor shaft 27, a flexible ball bearing or a thin section ball bearing 33 is clamped, in which an inner ring and an outer ring are deformable.

A pin retaining ring 103 with pins 101 bears on the flexible ball bearing 33, wherein the pins 101 are held in cylindrical recesses on the inside of a pin retaining ring. According to the embodiment of FIG. 30, the pins 101 are connected to each other. The pins 101 of the pin ring 103 protrude the flexible ball bearing 33 and the pin retaining ring 103 in axial direction on both sides. For the sake of simplicity, the pin ring assembly comprising the pin retaining ring 103 and the pins 101 will also be referred to below as pin ring 102.

The cam disk 28 and the flexible ball bearing 33 together form a transmitter arrangement, which converts a torque into a radial force. Instead of a flexible ball bearing with flexible inner and outer ring, a wire-race bearing or a flexible ball bearing without outer ring, or a different kind of flexible rolling bearing can be used.

The housing cover 32 is screwed to the motor housing with fastening screws 34 on the output side of the motor housing. Furthermore, a drive side outer gear 8' and an output side outer gear 8 are inserted into a support ring 36 and screwed to the support ring 36 by the screws 34. The support ring 36 is divided in the axial direction into two mutually mirror-symmetrical halves, which together form a raceway 67 for the pin retaining ring 103.

The drive side outer gear 8' and the output side outer gear 8 are arranged in the axial direction outside the cam disk 28 and the flexible ball bearing 33. In the radial direction, the drive side outer gear 8' is opposite to the areas of the pins 101 which protrude the pin retaining ring 103 on the drive side in the axial direction. In the radial direction, the output side outer gear 8 is opposite to the areas of the pins 101 which protrude the pin retaining ring 103 on the output side in the axial direction.

On the drive side, a drive side spacer disk 37 is arranged in the motor housing 22 such that it faces the drive side end faces of the pins 101 in the axial direction. Similarly, on the output side, an output side spacer disk 38 is arranged in the motor housing 22 such that it faces the output side end surfaces of the pins 101 in the axial direction.

An output shaft 39 is disposed radially inside the hollow shaft of the inner gear 7, wherein a transmission freewheel 40 is disposed between the hollow shaft of the inner gear 7 and the output shaft 39. The output shaft 39 is mounted radially outwardly in an output side output ball bearing 41, which is inserted into a cylindrical recess or shoulder of the housing cover 32. The output side region of the output shaft 39 protrudes the housing cover 32 in the axial direction. A chainring adapter 43 is mounted on the output shaft 39 and is held via a round output nut 44 which is screwed into an internal thread of the output shaft 39.

The motor housing 22 is sealed towards the transmission cover 32 by an O-ring 42 and towards the cooling cover 24 by a further O-ring 77.

FIG. 21 shows a detail of the pin-ring transmission of FIG. 19 in the region of the load cell 47. As shown in FIG. 11, a sensor ring 68 is disposed on the pedal shaft 35. In use, the sensor ring 68 may be used to determine a position or a velocity of the pedal shaft 35.

For the sake of simplicity, it is assumed in the following that the load cell is oriented such that the measuring lugs are respectively arranged vertically and horizontally to the road surface, i.e. parallel to the pedaling movement of the rider and perpendicular thereto. Other orientations are possible as well.

The load cell described above can be used in particular in a transmission of an electric bicycle to determine a measurement of the force exerted on a pedal shaft and thus a required motor assistance. The load cell does without moving parts and takes up little space, especially in the axial direction, which allows better use of the available space. In an electric bicycle, the space is limited and thus the use of the load cell there may be particularly advantageous. In particular, the axial space is severely limited by the predetermined optimum distance of the pedal cranks.

During operation, a rider exerts forces on the pedals, in particular on the down pedal. As a result, a downward force acts on the pedal shaft on the side of the kicked pedal. Furthermore, a forward force acts on the pedal shaft on the side of the kicked pedal. Due to the lever arm on the bearing of the pedal shaft, a respective counteracting force acts on the opposite side of the pedal shaft.

When pedaling, the left pedal and the right pedal are alternately kicked. Thus, with uniform cadence, a periodically alternating force occurs in the vertical direction and also in the horizontal direction. The amplitude of this force is correlated with the torque applied to the pedal shaft. When the measuring lugs are arranged vertically and horizontally, respectively, the vertical force on the pedal shaft is detected by strain gauges of the vertically aligned pair of measuring lugs and the horizontal force on the pedal shaft is detected by strain gauges of the horizontally aligned pair of measuring lugs.

The electrical signal of a strain gauge is approximately equal and opposite to a signal of a radially opposite strain gauge. Thus, with an array of radially opposed strain gauges, the measurement amplitude can be doubled. This can be achieved by a subtractive superposition of the signals, which can be done by analog electronics or after digitization of the signal.

The signals of the strain gauges are transmitted via connecting lines to an evaluation electronics, which is arranged on a printed circuit board which is fixed to the transmission housing. According to a simple evaluation, an average torque is determined from one or more temporally adjacent maximum deflections of the signals of the strain gauges in accordance with a calibration curve which is stored in a permanent memory of the evaluation electronics and an output signal is generated therefrom which correlates in a simple way with the torque exerted on the pedal shaft, for example by proportional dependence.

According to a more elaborate evaluation, the further time development of the signals is also included in the electronic evaluation and an output signal is generated therefrom by means of previously stored data in the memory, such as calibration curves and parameters. Furthermore, a current angular position and/or a rotational speed of the pedal shaft may be determined and included in the electronic evaluation.

The output signal can then be forwarded to a further part of the evaluation electronics, which determines a required motor assistance of an electric motor of an electrically operated bicycle and generates a corresponding motor control signal. This motor control signal in turn may depend on other parameters such as the angle of inclination of the vehicle, the current speed, a battery status or even certain driving situations that are derived from these parameters, such as driving over a curbstone, starting from a standstill, or starting on a slope.

On the one hand, a calibration can be carried out by directly calculating a calibration curve and other calibration parameters from the component properties and storing them in the memory. On the other hand, a calibration can also be carried out by attaching a further sensor which measures the actual deformation of the pedal shaft and thus the torque applied to the pedal shaft while at the same time a periodic pedal force is applied by a test device to the pedals of the pedal shaft.

Calibration parameters are determined from the correlation of the applied pedal force and the actual torque. These calibration parameters can then be stored in the memory of the evaluation electronics for all electric bicycles of the same model. It is also possible to store calibration parameters for different models in the same memory, wherein another stored information indicates the currently used model of the electric bicycle.

For the purpose of calibration, a measurement of the torque applied to the pedal shaft can also be carried out without a sensor mounted directly on the pedal shaft, in that the torque at the output shaft or at downstream transmission elements is measured.

FIGS. 32 to 34 illustrate the absorption of radial and axial forces by two pedal shaft ball bearings, which are mounted on the pedal shaft in X-arrangement, and by a load cell 47. The viewing direction of FIGS. 21 to 24 is in the direction of travel.

Figure 31:
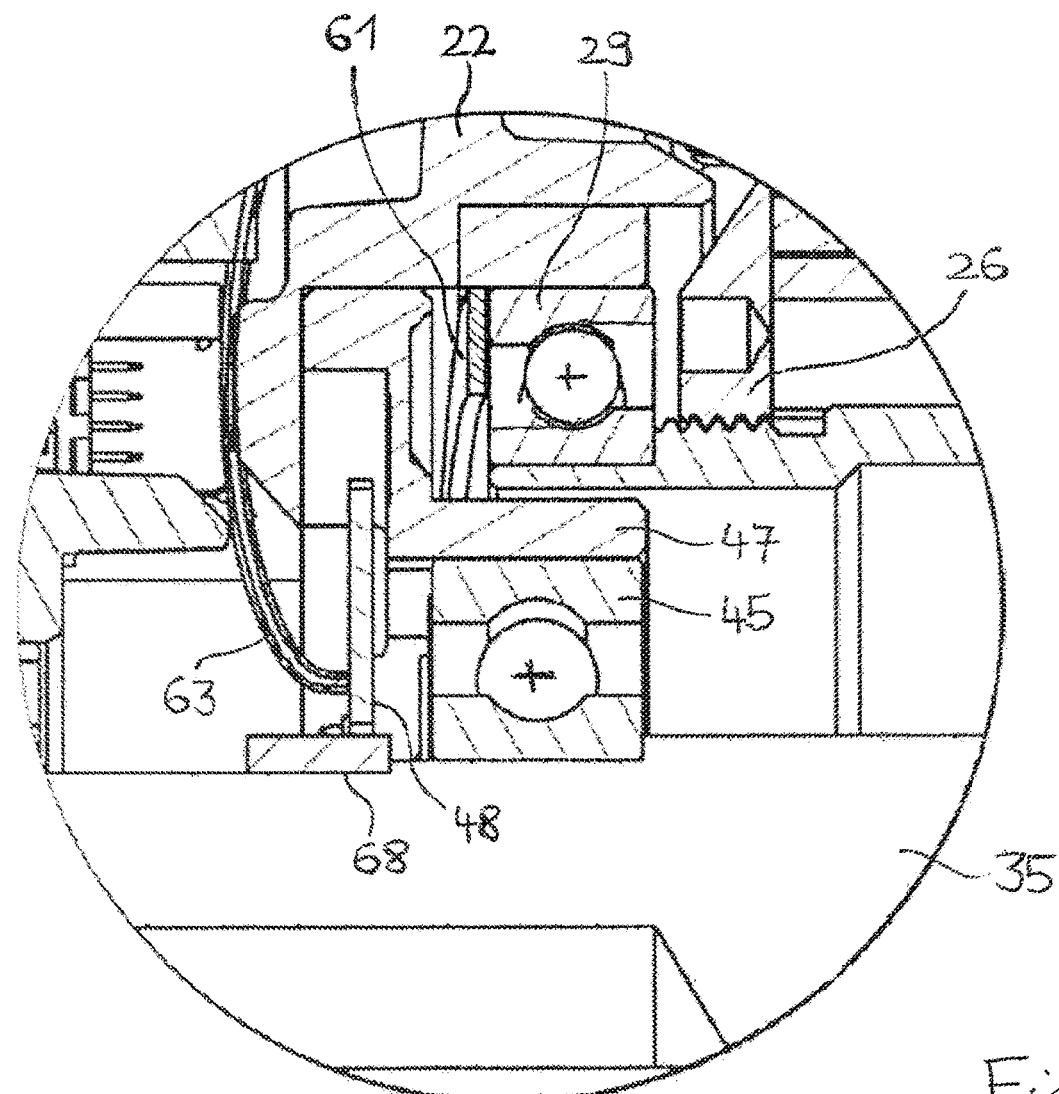
FIG. 31 shows a section of the pin ring transmission of FIG. 30.

According to FIG. 32, the load cell 47 is fixed by screws which are tensile-loaded. However, the load cell can also be attached to an opposite side of a transmission housing, as shown in FIGS. 30 and 31. In this case, the forces directed axially outward are received directly by the transmission housing.

FIG. 32 shows a transmission arrangement with a load cell 47 according to a first embodiment, wherein the load cell 47 is supported on a drive-side ball bearing 45 of an obliquely mounted bearing.

The obliquely mounted bearing comprises a pedal shaft 35, which has a larger diameter at the center than at its both ends, whereby a drive-side step 106 and an output side step 107 are formed. An inner ring of a drive-side ball bearing 45 is supported in the axial direction on the drive-side step 106 and an inner ring of an output side ball bearing 46 is supported in the axial direction via a ring on the output side step 107 of the pedal shaft 35.

This inwardly supported arrangement of the ball bearings 45, 46 on the shaft is also referred to as "X-arrangement". The ball bearings 45, 46 of the obliquely mounted bearing are configured as single-row angular contact ball bearings, with the higher side of the respective inner ring pointing towards the center of the pedal shaft 35.

A support lug of the load cell 47 shown in cross-section is supported in the axial direction on the output side step of the pedal shaft 35. A measuring lug 90 located behind it, to which a strain gauge 92 is attached, is supported in the radial direction on an outer ring of the drive side ball bearing 45.

FIGS. 33 and 34 show a similar arrangement to FIG. 32, in which a radial portion of the measuring lugs 90 and the support lugs 91 lie in the same plane. For clarification, the sectional plane of FIG. 13 extends through a support lug 91 and the sectional plane of FIG. 34 through a measuring lug 90 of the load cell 47. As shown in FIG. 34, an axial cross section of the measuring lug 90 in the region of the strain gauge 92 is narrower than the axial cross section of the support lug 91.

As a result, a larger deformation in the region of the strain gauge 92 can be achieved. The thinning of the cross section can be achieved for example by milling.

FIGS. 35 to 52 show further embodiments of a force measuring sensor for a pedal shaft. The force measuring sensor can be used to determine radial forces on a suspension of a pedal shaft. Indirectly, this can be used to determine a torque that a rider exerts on the pedal shaft. The corresponding device for determining the radial forces is for this reason also referred to below as a torque measuring device.

FIG. 35 shows a further embodiment of a torque measuring device 110 which is arranged in a bottom bracket bearing 109. The bottom bracket bearing 190 includes a pedal shaft 111 with fastening regions (not shown here) for pedal cranks.

A cup-shaped sleeve 114 is disposed on the bottom bracket bearing 111 between a first rolling bearing 112 and a second rolling bearing 113. The cup-shaped sleeve 114 is fixed at an end face 115 to the pedal shaft 111. At an end opposite the end face, the sleeve 114 comprises a torque transmitting portion 116.

A first strain gauge 117 is disposed between the sleeve 114 and the first rolling bearing 112 on the pedal shaft 111. A second strain gauge 118 is disposed within the sleeve 114 on the pedal shaft 111, and a third strain gauge 119 is disposed on an outer surface 120 of the sleeve 114.

The strain gauges 117, 118, 19 are each separately electrically connected to a slip ring 121, which is arranged on the outside of the pedal shaft 111. A torque flow from the pedal shaft 111 via the sleeve 114 is indicated in FIG. 15 by arrows.

FIG. 36 shows a second embodiment of a torque measuring device 110'. In contrast to the first embodiment, slip rings 121 to which a strain gauge 119 is connected on the outer surface 120 of the sleeve 114 are disposed on the outer surface 120 of the sleeve 114.

FIG. 37 shows a third embodiment of a torque measuring device 110". In contrast to the previous embodiments of FIGS. 35 and 36, strain gauges 117, 118 and 119 are connected to a transmitter 122.

FIG. 38 shows a fourth embodiment of a torque measuring device 110'''. According to this embodiment, a strain gauge 124 is disposed on an outer ring of the right ball bearing 112. Alternatively, a strain gauge can also be arranged on an intermediate ring.

Figure 40:
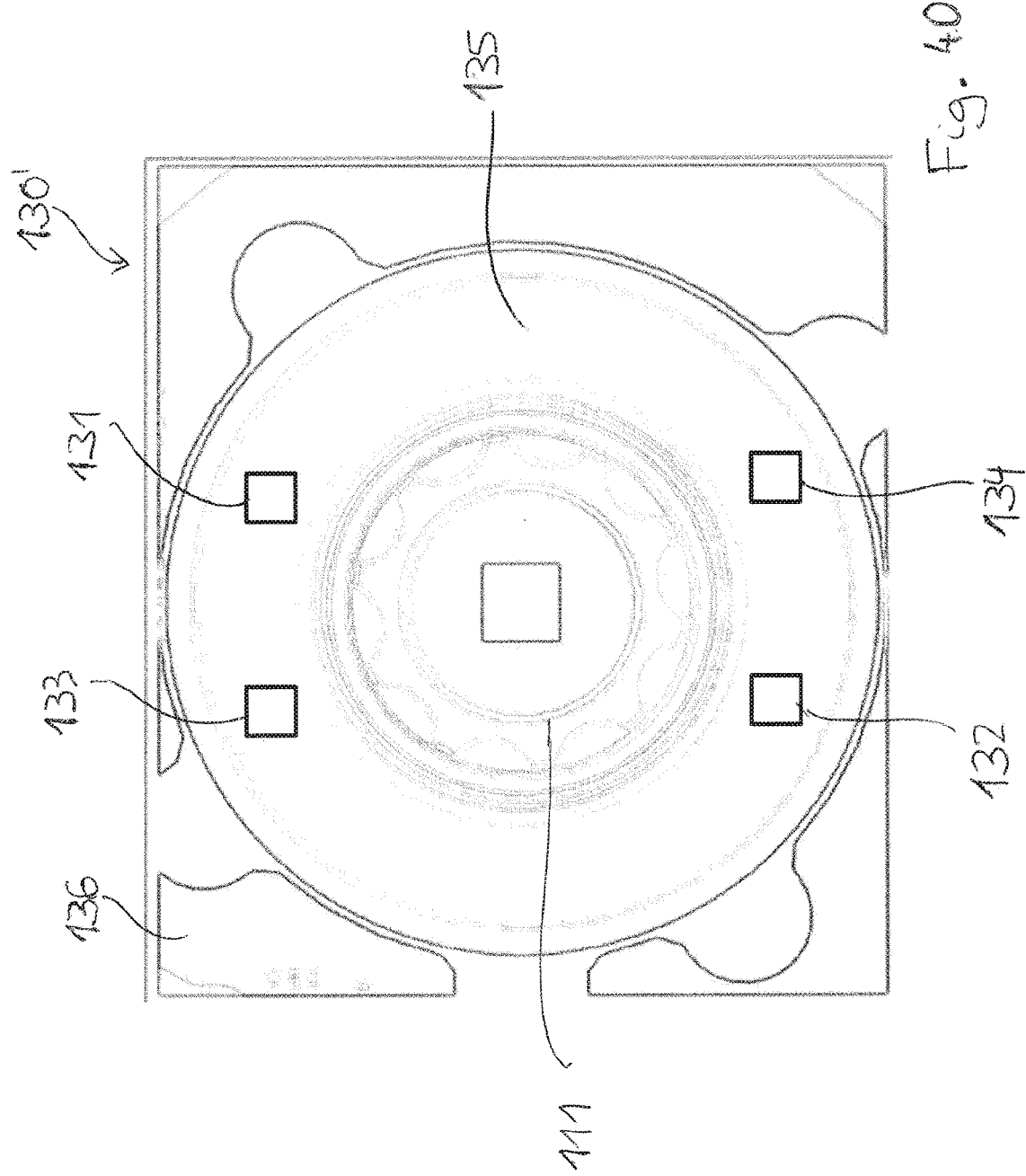
FIG. 40 shows a fifth embodiment of a torque sensor with two adjacent pairs of opposing strain gauges.

FIGS. 39 and 40 show another embodiment of a torque measuring device 130 in which a deformation on a transmission housing is measured.

In the torque measuring device 130, a first pair of radially opposed strain gauges 131, 132 is arranged on a housing 135 and a second pair of radially opposed strain gauges 133, 134 is arranged on the housing 135 and offset by 90 degrees from the first pair of strain gauges 131, 132.

Furthermore, a printed circuit board 136 is arranged on the housing 35, on which an evaluation logic for the signals of the strain gauges 31, 32, 33, 34 is provided. By displacing the individual strain gauges by 90 degrees, the arrangement can be installed in any orientation or angular position. This does not exclude that there are preferential orientations that are better suited than others.

FIG. 40 shows another embodiment of a torque measuring device 130' which is similar to the embodiment of FIG. 39. Unlike the embodiment of FIG. 39, the second pair of strain gauges is offset only slightly from the first pair of strain gauges, for example by approximately 10 degrees.

Figure 41:
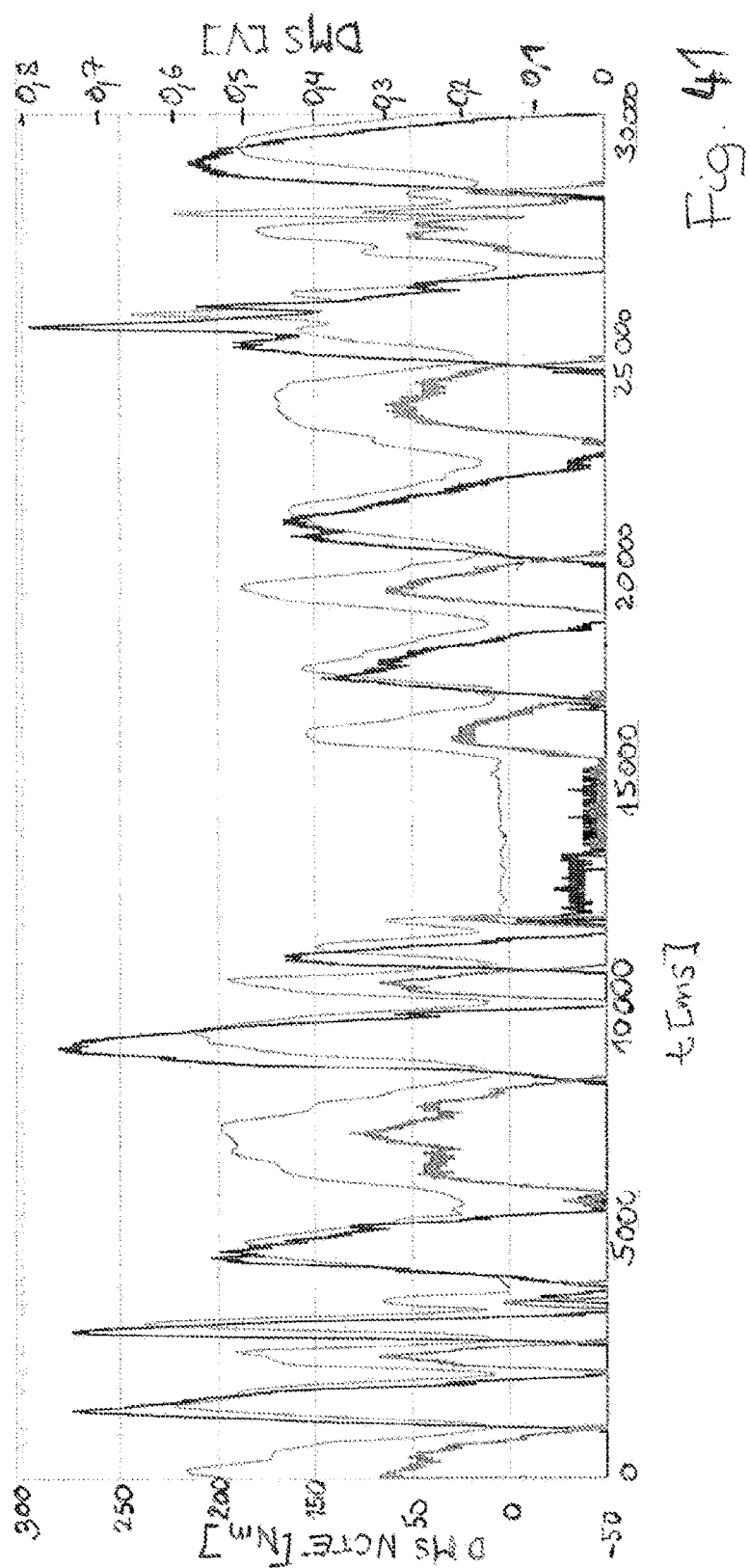
FIG. 41 shows a sequence of measurement values of a force measuring device according to FIG. 38.

FIG. 41 shows a first sequence of measurement values of a torque sensor according to FIG. 39.

Figure 42:
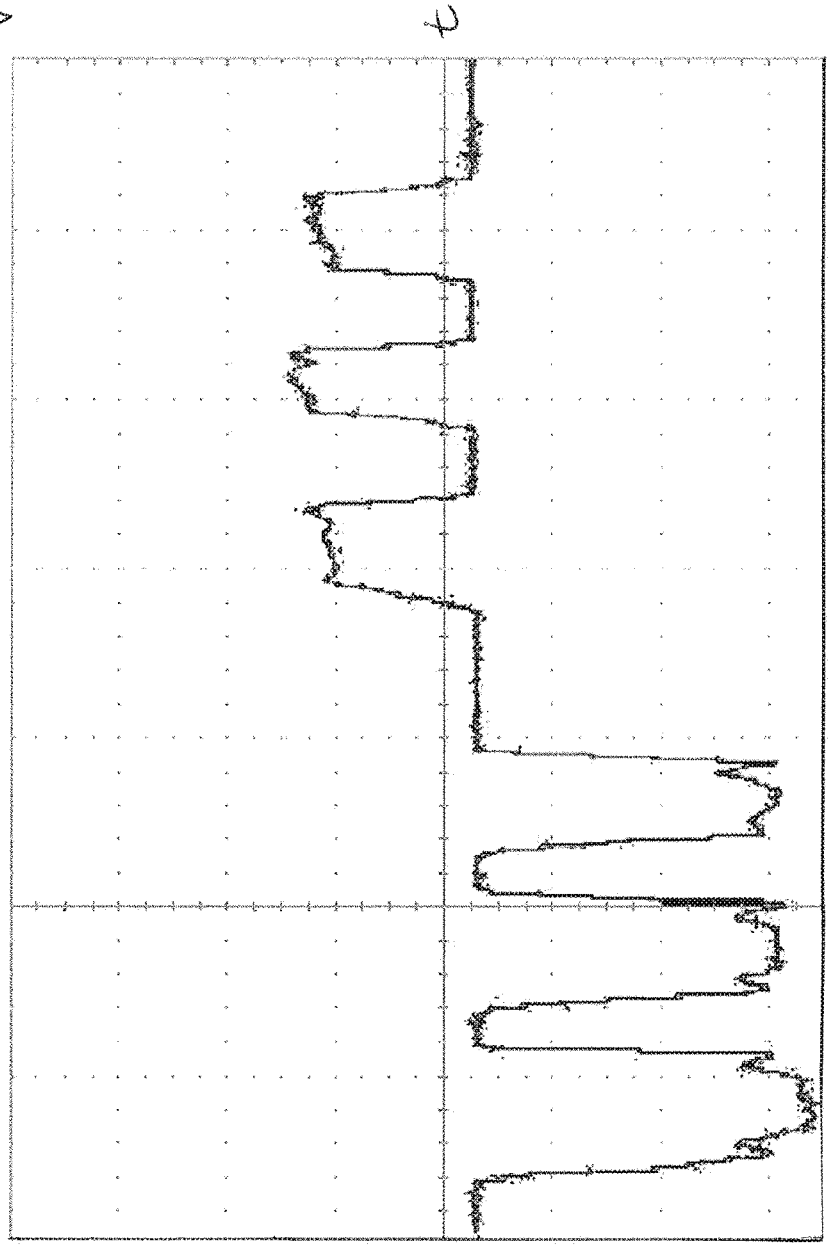
FIG. 42 shows a further sequence of measurement values of a force measuring device according to FIG. 37 compared to a direct torque measurement at a deformable cell.

FIG. 42 shows a further sequence of measurement values of a torque sensor according to FIG. 39. In this case, a value range of the measurement signal in millivolts is plotted on the right-hand axis and a value range of a force derived from the measurement signal in Newton-meters is plotted on the left-hand axis.

Figure 43:
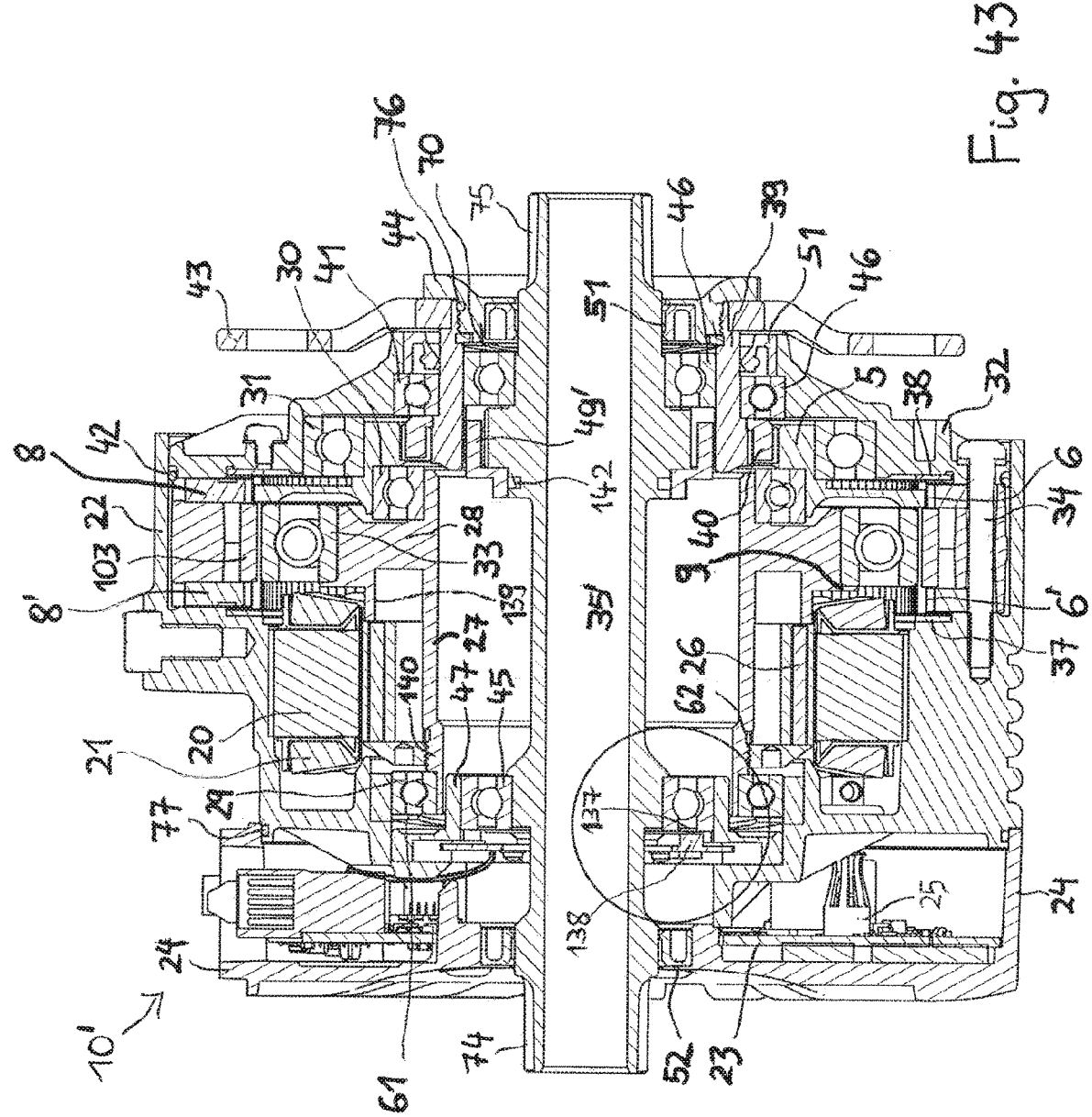
FIG. 43 is a cross-sectional view of another HPD transmission with a load cell similar to the HPD transmission of FIG. 29.

FIG. 43 shows a cross-section of another HCD transmission 10' with a load cell 47 similar to the transmission 10 of FIG. 30.

Unlike the transmission of FIG. 40, a magnetic transmitter ring 137 is integrated in a side cover of the ball bearing 45 connected to the inner ring of the ball bearing 45. A rotational speed sensor 138 lying opposite the transmitter ring 137 in the axial direction registers changes in the magnetic field caused by the rotation of the transmitter ring 137. In particular, the transmitter ring 137 may be magnetized such that north and south poles alternate, so that the rotational movement of the transmitter ring 137 generates a periodically variable field at the location of the rotational speed sensor 138.

Furthermore, the pedal shaft 35 is configured as a hollow shaft, which comprises an enlarged circumference only in the areas in the vicinity of the steps. The outer rotor shaft 26 is screwed onto a thread 140 of the inner rotor shaft 27. The inner rotor shaft 27 comprises a drive side step 141, on which the ball bearing 29 is supported. The cam disk 28 comprises an annular protrusion 139, by which the cam disk 28 is supported on the drive side in the axial direction on the outer rotor shaft 26.

Thus, the axial position of the outer rotor shaft 26 is supported in the output side direction by the thread 140 of the inner rotor shaft 27 and in the output side direction by the protrusion 139 of the cam disk 28. A first drive side power flow runs from the cam disk 28 via the outer rotor shaft 26 and the thread 140 into an output side region of the pedal shaft 35. A second drive side power flow runs from a drive side step 141 of the inner rotor shaft 27 via the ball bearing 29 and the wave spring 61 into the transmission housing 22.

Unlike the transmission of FIG. 30, a pedal shaft freewheel 49' is configured as a clamp roller freewheel in the embodiment of FIG. 43, similar to the motor freewheel 40. A clamp roller retaining ring of the clamp roller freewheel 49' is placed on a step of the pedal shaft 35 and supported by an O-ring 142.

FIG. 44 shows an enlarged region of FIG. 43 in the region of the load cell 47.

Although the above description contains many details, these should not be construed to limit the scope of the embodiments, but only as an illustration of anticipated embodiments. In particular, the above-mentioned advantages of the embodiments should not be construed to limit the scope of the embodiments, but only as an illustration of possible effects when the described embodiments are put into practice. Accordingly, the scope of the embodiments should be determined by the claims and their equivalents rather than by the examples described.

FIGS. 45 to 60 show a pedal shaft assembly and a harmonic pin ring transmission with such a pedal shaft assembly.

The subject matter of the present description will be further with reference to the following figures The following description mentions details for describing the embodiments of the present description, such as the shape and number of parts of the freewheels. It should be apparent to those skilled in each case, if the embodiments can be implemented without these details in practice.

FIG. 45 shows an exploded view of a pedal shaft assembly 80, in which from a drive side to an output side, an inner gear 7, coil springs 66 of an external or transmission freewheel 40, cylindrical clamp rollers 64 of the transmission freewheel 40, a pedal shaft 35, coil springs 72 of an inner or pedal shaft freewheel 49, pawls 73 of the pedal shaft freewheel 49, an output shaft 39 and a freewheel cage 65 of the transmission freewheel 49 are shown.

The output side of the pedal shaft assembly 80 is here to be understood as the side on which a receiving region 220 of the output shaft 39 for an output is located. Accordingly, the drive side is the side opposite the output side.

The radius of the pedal shaft 35 is stepped such that two steps 222, 223 are formed on the drive side and three steps 224, 225, 226 are formed on the output side. The steps 222, 223, 224, 225, 226, which are best seen in FIG. 3, form receiving areas for further transmission elements, which are not shown in FIG. 45. Furthermore, a star arrangement 227 with spikes 71 is formed on the output side on the third step.

The transmission freewheel 40 is also referred to as "motor freewheel", which is useful for differentiation when the pedal shaft 35 is connected to the output shaft 39 via an intermediate gear such as a planetary gear.

The outside of the output shaft 39 comprises a stair-shaped rolling region 228 for the clamp rollers 64 and recesses for the coil springs 66 on the drive side. The inside of the output shaft 39 or the hollow output shaft 39 comprises a stair-shaped stop portion 229 for the pawls 73 radially opposite to the stair-shaped rolling region 128

Furthermore, the output shaft 39 comprises a receiving region 220 for an output means (not shown in FIG. 45) on the output side wherein the output means may be in particular a chainring adapter, and comprises an internal thread for fixing a transmission cover (not shown in FIG. 45) radially opposite to the receiving region for the output means.

FIG. 46 shows a side view of the pedal shaft assembly 80 from the output side, in which a side cover of the freewheels is removed for ease of illustration of the transmission freewheel 40 and the pedal shaft freewheel 49. In this view, seen from the inside outward, the output side receiving region 75 for a pedal crank (not shown in FIG. 46), the star arrangement 227 with the pawls 73 and the coil springs 66, the stair-shaped stop portion 229 of the pedal shaft freewheel 49, the receiving region for the output means, the freewheel cage 65 of the transmission freewheel 40, the pinch rollers 64 of the transmission freewheel, the outer ring 65 of the transmission freewheel 40, and the inner gear 7 of a harmonic pin ring gear (not shown in FIG. 46) are shown.

FIG. 47 shows a cross-sectional view of the pedal shaft assembly 80 of FIG. 45 taken along the cross-sectional line shown in FIG. 46. As shown in FIG. 3, an inner radius of the output shaft 39 configured as a hollow shaft is stepped and forms three steps 230, 231, 232. The outermost step of the output shaft 39 comprises the internal thread 233. The second outermost step of the output shaft 39 and the opposite second outermost step of the pedal shaft 35 serve to receive a ball bearing, not shown in FIG. 47.

On the inner gear 7, a hollow shaft 234 is formed on the output side, which at the same time forms an outer ring of the transmission freewheel 40. Furthermore, the inner gear 7 comprises a disk-shaped region 235 with an external toothing 5 on the drive side.

On the drive side, an annular thickening is formed on a side edge of the output shaft 39, with which the drive shaft 39 is inserted into the hollow shaft 134 of the inner gear 7. A radius of the outer side of the output shaft 39 is also stepped, wherein the radially outermost step is adapted in the radial direction for receiving the freewheel cage 65. The further steps of the outer side of the output shaft 39 are configured for receiving a ball bearing (not shown here) including a shaft seal and for receiving an output means (not shown here).

FIG. 48 shows a perspective view, seen from the output side, of the pedal shaft assembly 80 of FIG. 45, in which a side cover is removed and in which the stop region of the pedal shaft freewheel 49, the freewheel cage 65 and the clamp rollers 64 are partially visible.

FIG. 49 shows a further perspective view of the transmission assembly of FIG. 45 viewed from the drive side, and in which in particular the inner stair-shaped portion 229, the pawls 73, the coil springs 72 and the outer stair-shaped portion 228 of the pedal shaft freewheel 49 and the clamp rollers 64, the freewheel cage 65 and the coil springs 66 of the transmission freewheel 40 can be seen.

FIG. 50 shows a side view of the pedal shaft 35 of the pedal shaft assembly 80 of FIG. 45, particularly showing the crankshaft receiving areas 74, 75, the stair-shape of the circumference of the pedal shaft 35, and the star assembly 227.

As shown in FIGS. 50 and 52, the spikes 71 of the star assembly 227, of which four spikes 71 are visible in FIG. 50, each comprise a rolling region 243, an end portion 244, and a pawl receiving region 245. The spikes 71 each comprise a bore 236 for receiving the coil spring 72 (not shown in FIG. 50), wherein the bore 136 is aligned perpendicular to the rolling region 233. The bore 236 is slightly offset from a center of the rolling region 243 toward the pawl receiving region 245.

FIG. 51 shows a side view of the output shaft 35, in which in particular the rolling region 233 with the receiving region for the coil spring 72 (not shown in FIG. 7), the step 228 of the outer circumference and the receiving region 220 for the output means are shown.

52 shows a side view of the pedal shaft 35 seen along the central axis of the pedal shaft 35 from the drive side, in which in particular the receiving region 75 for a pedal crank, the output-side stair-shape of the outside diameter of the pedal shaft 35 and the star arrangement 227 are shown. The end portions 234 of the spikes 71 comprise a chamfer 237 on one side.

During operation, the coil springs 72 press the pawls 73 outwardly against the stair-shaped portion 229 of the inside of the output shaft 39, so that the tip of the pawl 73 engages an opposing step when the pedal shaft 35 moves in a drive direction which is given by the orientation of the pawls 73 and the orientation of the steps, faster than the drive shaft 39.

If the pedal shaft 35 moves slower in the drive direction than the drive shaft 39 or even in the opposite direction to the drive shaft 39, the pawls 73 slide along the steps and are pressed inwards against the spring force of the coil springs 72 until the next step is reached. At the transition of two steps, the pawl 73 jumps to the outside by the action of the coil spring 72 and causes in this way a characteristic click.

The click of the pedal shaft freewheel 49 can fulfill a warning function in that passers-by are made aware of an electric bicycle that drives relatively quietly, unlike a moped or scooter. Furthermore, it allows a function control due to the noise and can meet the expectation of customers who are used to an idling noise.

Figure 53:
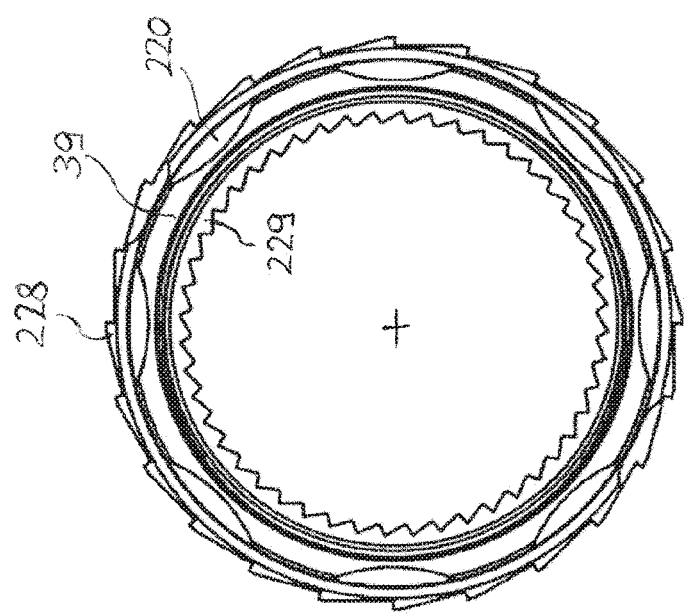
FIG. 53 shows an output-side top view of the output shaft.

FIG. 53 shows an output side view of the output shaft 39. A drive direction is predetermined by the direction of the step heels and points in the clockwise direction in the view of FIG. 53. In this case, less inclined step portions of the inner 229 form the step heels and the more inclined step heels form step stops.

The steps are aligned so that the drive direction corresponds to the direction of travel when the output is provided in the conventional way in the direction of travel on the right. However, the output can also be provided inversely in the direction of travel left. This is particularly possible in the case of three- or four-wheelers. In this case, the direction of the steps must be reversed with respect to the arrangement of FIG. 9 in order to allow a drive in the direction of travel.

In the case of three- or four-wheelers, a switchable freewheel may also be expedient, or an additional drive connection such as a switchable clutch which allows reverse drive of the motor, for example to drive backwards onto a ramp, in particular if the vehicle is equipped to carry loads.

Figure 54:
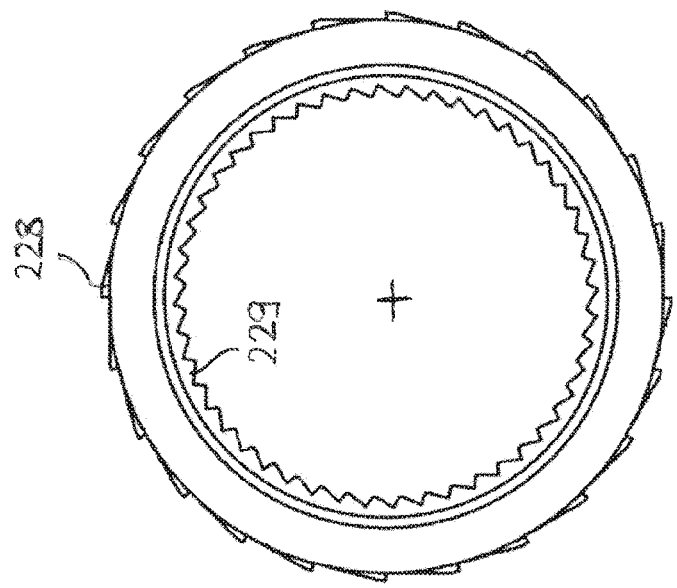
FIG. 54 shows a drive-side top view of the output shaft.

FIG. 54 shows the plan view corresponding to FIG. 53 on the output shaft 35 from the drive side.

FIG. 11 shows a side view of the freewheel cage 65, wherein the viewing direction is perpendicular to the central axis of the pedal shaft 35. FIG. 12 shows a side view of the transmission freewheel 40, in which the clamp rollers 64 and the freewheel cage 65 are partially shown.

The freewheel cage 65 comprises webs 150 uniformly distributed on the circumference and two opposite receiving regions 251, 252 for the coil springs 66, which are aligned with the recesses of the output shaft 39.

FIG. 57 shows a side view of a pedal shaft assembly 80 which comprises an inner portion of the freewheel assembly 81 shown in FIG. 1 and a sensor assembly not shown in FIG. 1.

FIG. 58 is a cross-sectional view taken along the cross-sectional line D-D shown in FIG. 13.

Figure 59:
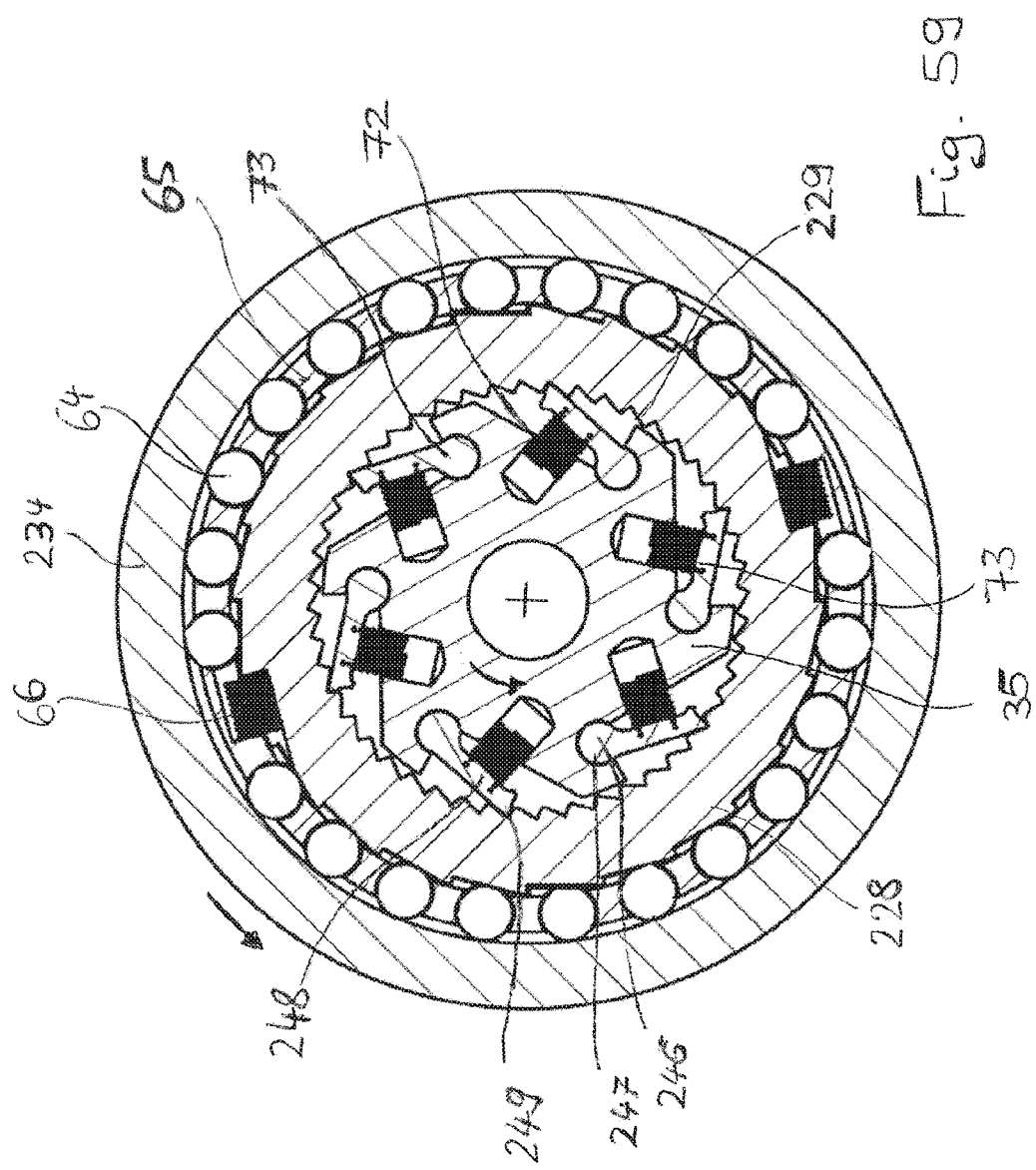
FIG. 59 shows a cross-sectional view, seen from the output side, of the freewheel assembly of FIG. 57.

FIG. 59 is a cross-sectional view similar to the cross-sectional view of FIG. 14, but in which the viewing direction is directed from the drive side. In this case, the hollow shaft portion 235 of the inner gear 7, which is not shown in FIG. 58, is additionally shown, which forms the outer ring of the transmission freewheel 40.

The pawls 73 of the pedal shaft freewheel 49 comprise on one side a cylindrical hinge portion 246 which engages in a mating round hinge portion 247 of the stair-shaped portion. Furthermore, the pawls comprise a plate-shaped portion 248, which merges at one end into the hinge portion 247 and is chamfered to a pointed edge 249 at an end opposite thereto.

During assembly or maintenance of the pedal shaft freewheel 49, the pawls 73 can be easily inserted from the output side in the round hinge portion 247 formed from the pedal shaft 35 without the need for further components such as an axle to form the required hinge.

The two springs 66 of the transmission freewheel 40 push, via the freewheel cage 65, all the clamp rollers 64 almost in the end or traction position shown in FIG. 59. As a result, the clamp rollers 64 come into contact with the outer ring formed by the hollow shaft portion 234 of the inner gear 7 and can be moved to the end position by relative movement of the outer ring. In this case, the individual webs of the cage 65 may be formed elastically, and thereby compensate for a non-uniform contact pressure on the individual clamp rollers 64.

However, if the outer ring of the transmission freewheel 40 moves slower than the output shaft 39 in the drive direction, the clamp rollers 64 roll towards the bottom of the steps and are thereby lifted from the outer ring, so that the frictional connection with the inner gear 7 is removed.

Figure 60:
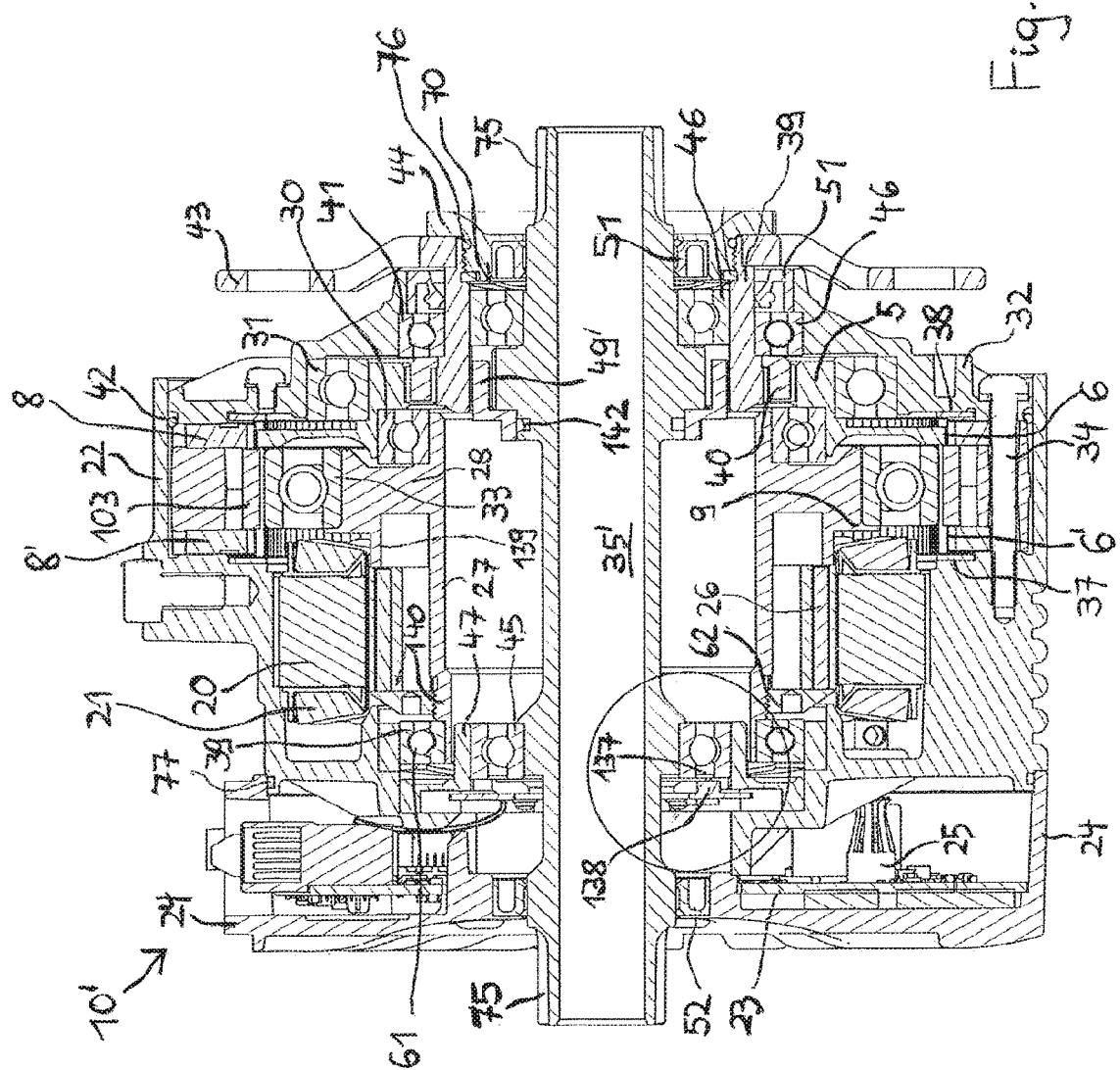
FIG. 60 is a cross-section of a harmonic pin ring transmission with a clamp roller freewheel.

FIG. 60 shows a cross section of a harmonic pin ring gear 10', in which a pedal shaft freewheel 49' is configured as a clamp roller freewheel. Accordingly, in this embodiment, there is no step-shaped engagement region for pawls on the inside of the output shaft.

A clamp roller retaining ring of the clamp roller freewheel 49' is placed on a step of the pedal shaft 35 and is supported by an O-ring 262.

FIGS. 61 to 66 show a geared motor with a harmonic pin ring transmission having an eccentric disk.

Figure 61:
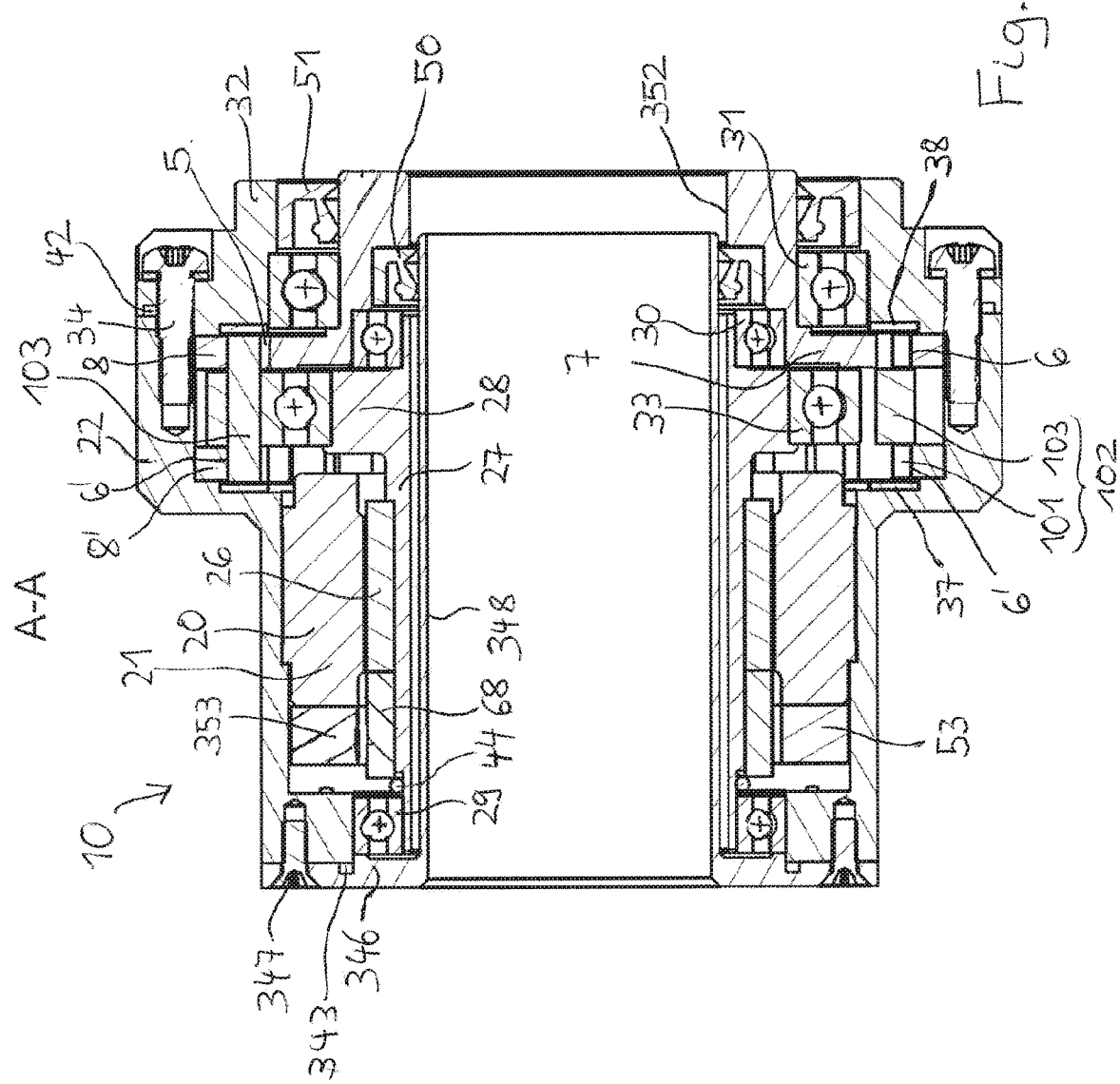
FIG. 61 is a cross-sectional view of a geared motor with a harmonic pin ring transmission taken along the intersection line of FIG. 61.
Figure 62:
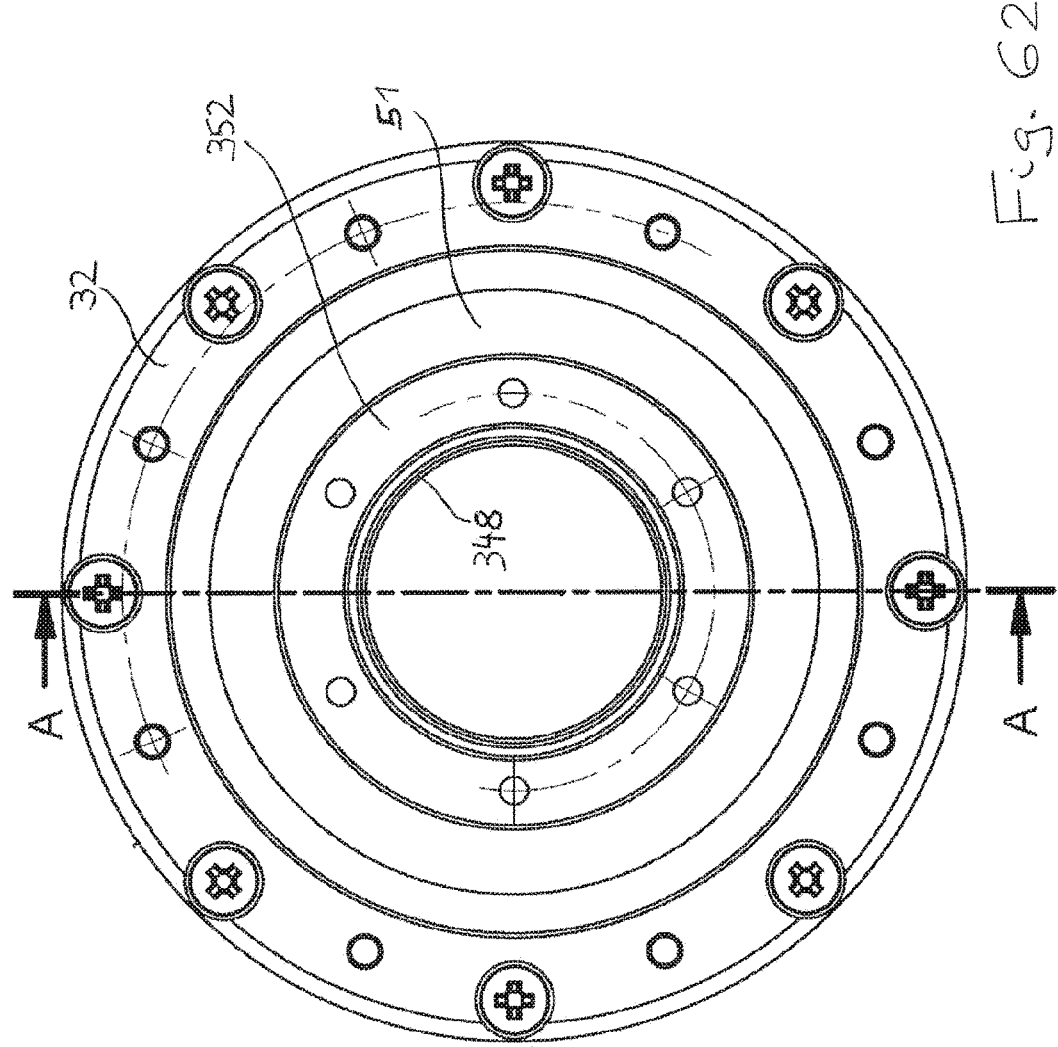
FIG. 62 shows a side view of the geared motor on the output side.

FIG. 61 shows a cross-sectional view of a harmonic pin ring transmission 10. The cross-sectional plane A-A of FIG. 61 is indicated in FIG. 62. In FIG. 61, the left side corresponds to a drive side and the right side corresponds to an output side of the harmonic pin ring gear 10.

A stator 20 of a stator assembly of the harmonic pin-ring transmission 10 is disposed in a motor housing 22. The stator 20 comprises a stator coil 21 (not shown in FIG. 61) for connection to a power supply.

An outer rotor shaft 26 equipped with permanent magnets is disposed radially inside the stator 20 on an inner rotor shaft 27. On the inner rotor shaft 27, an eccentrically arranged circular eccentric disc 28' or an eccentric circular disc 28' is formed on the output side, which is shown in more detail in the exploded view of FIG. 64.

On the drive side, the inner rotor shaft 27 is supported to the outside by a drive side rotor ball bearing 29 in the motor housing 22. An outer ring of the drive side rotor ball bearing 29 is arranged in a cylindrical recess of the motor housing 22. On the drive side, a sensor ring 68 is disposed on the inner rotor shaft 27 axially adjacent to the outer rotor shaft 26, which is opposed to a Hall sensor 353 disposed in the motor housing 22.

On the output side, the inner rotor shaft 27 is supported in an output side rotor ball bearing 30 radially outward in an inner gear 7. A hollow shaft of the inner gear 7 is connected integrally with an annular portion of the inner gear 7 on the output side, which comprises an external toothing 5.

On the output side, a housing cover 32 is screwed by screws 34 to the motor housing 22. On the opposite drive side, an inner housing 346 is screwed to the motor housing 22 by screws 347. The inner housing comprises a support cylinder 348.

The hollow shaft 52 of the inner gear 7 is in turn mounted radially outwardly via an inner gear ball bearing 31 on the housing cover 32. The inner gear ball bearing 31 is offset from the output side rotor ball bearing 30 in the axial direction to the output side and is offset in the radial direction relative to the output side rotor ball bearing 30 to the outside. In addition, the inner gear ball bearing 31 overlaps with the output side rotor ball bearing 30 in the axial direction.

On the eccentric circular disk 28 of the inner rotor shaft 27, a transmitter ball bearing 33 is arranged. The eccentric disk 28' and the transmitter ball bearing 33 together form a transmitter arrangement which converts a torque into a radial force. On the transmitter ball bearing 33 a pin retaining ring 103 with pins 101 is mounted, wherein the pins 101 are held in cylindrical recesses on the inside of the pin retaining ring 103. The pins 101 of the pin ring 103 protrude the ball bearing 33 and the pin retaining ring 103 in the axial direction on both sides. For the sake of simplicity, the pin-ring arrangement of pin retaining ring 103 and pins 101 will also be referred to below as pin ring 102.

A drive side outer gear 8' and an output side outer gear 8 are inserted into webs 349 of the motor housing 22. The webs 49 of the motor housing 22 are shown in the exploded view of FIG. 63. Between the motor housing 22 and the housing cover 32, an O-ring 42 is disposed on the output side radially outward. Another O-ring 343 is disposed on the drive side between a step of the inner rotor shaft 27 and the drive side rotor ball bearing 29.

The drive side outer gear 8' and the output side outer gear 8 are arranged in the axial direction outside the eccentric disk 28' and the transmitter ball bearing 33. In the radial direction, the drive side outer gear 8' is opposite to the areas of the pins 101 which protrude the pin retaining ring 103 on the drive side in the axial direction. In the radial direction, the output side outer gear 8 is opposite to the areas of the pins 101 which protrude the pin retaining ring 103 on the output side in the axial direction.

On the drive side, a drive side spacer disk 37 is arranged in the motor housing 22 such that it faces the drive side end faces of the pins 101 in the axial direction. Similarly, on the output side, an output side spacer disk 38 is arranged in the motor housing 22 such that it faces the output side end surfaces of the pins 101 in the axial direction. The hollow shaft 352 of the inner gear 7 comprises screw holes (not shown in FIG. 61) for connecting an output.

Between the inner cylinder 348 of the inner housing 46 and the housing cover 32, an inner shaft seal 50 is inserted. Furthermore, an outer shaft seal 51 is disposed opposite the output side pedal shaft ball bearing 46 between the hollow shaft of the inner gear 7 and the housing cover 32.

In operation, an input torque is transmitted via the stator 20 by electromagnetic force action to the outer rotor shaft 26 and from there to the inner rotor shaft 27, which is converted by the eccentric disk 28' and the flexible ball bearing 33 into a radial force. This radial force is converted at the tooth flanks of the internal toothings 6, 6' of the outer gears 8, 8' and the external toothing 5 of the inner gear 7 into an output torque, wherein the inner gear 7 is driven, and the outer gears 8, 8' are fixed to the housing. The output torque is larger than the input torque by the reduction gear ratio.

The inner toothing, which is formed by the external toothing 5 of the inner gear 7, lies opposite the internal toothing 6 of the output side outer gear 8, and thereby provides the output torque, in particular by those pins 101 which abut on both the external toothing 5 and the internal toothings 6, 6'.

Figure 63:
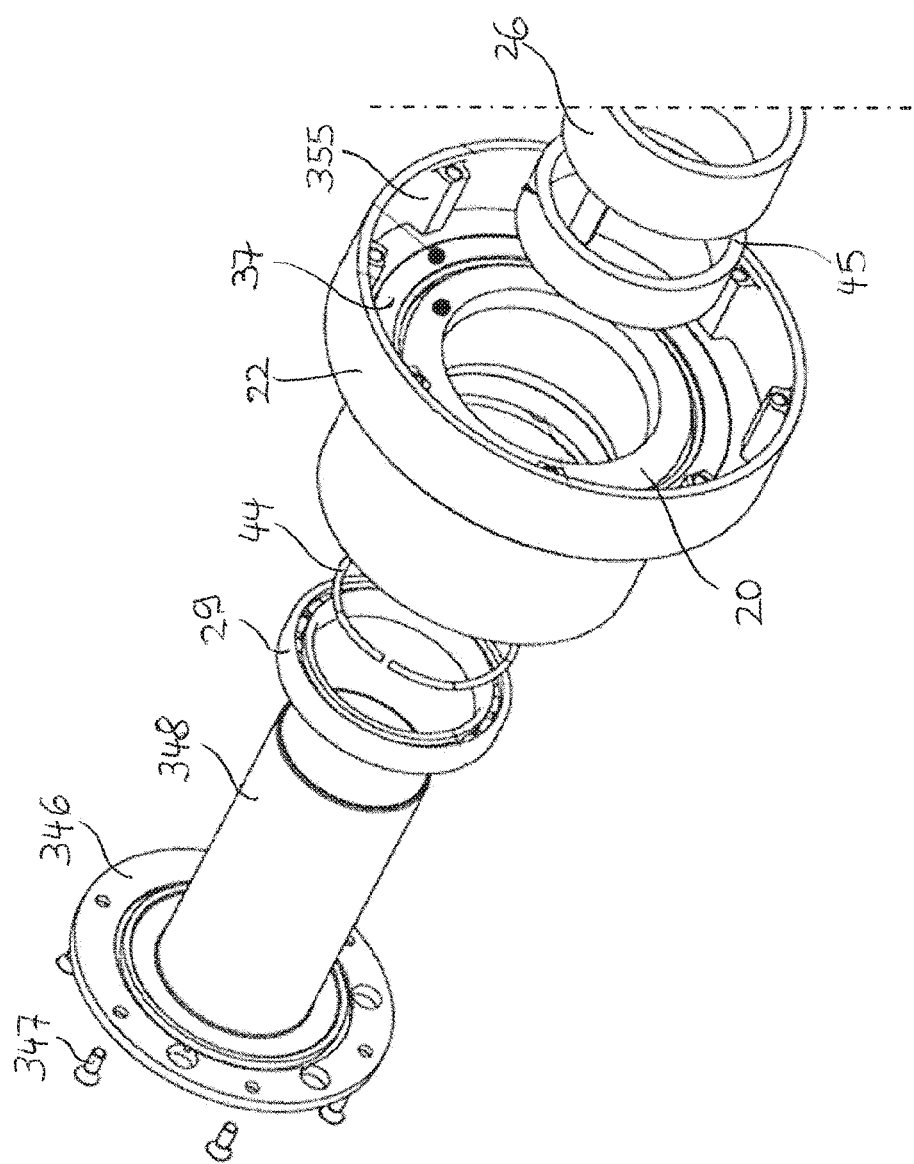
FIG. 63 shows a drive-side part of an exploded view of the geared motor of FIG. 60.

FIG. 63 shows a drive side part of an exploded view of the transmission of FIG. 61, in which, viewed from the drive side to the output side, the inner housing 346 with the inner cylinder 348, the drive side rotor ball bearing 29, the round-wire wave spring 44, the motor housing 22 with the drive side spacer disk 37, the sensor ring 68 and the rotor shaft 26 are shown.

Figure 64:
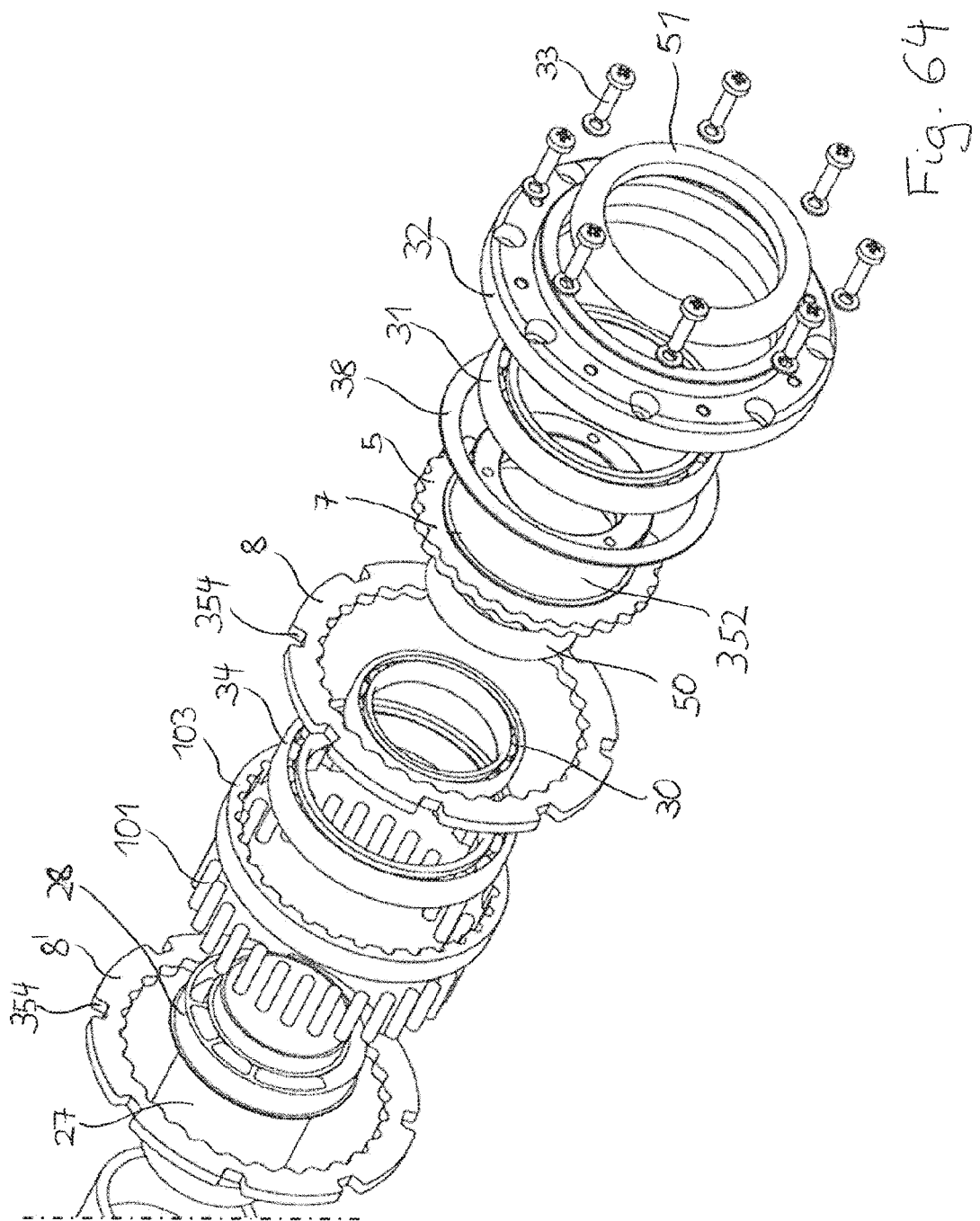
FIG. 64 shows an output-side part of the exploded view of the geared motor of FIG. 60.
Figure 65:
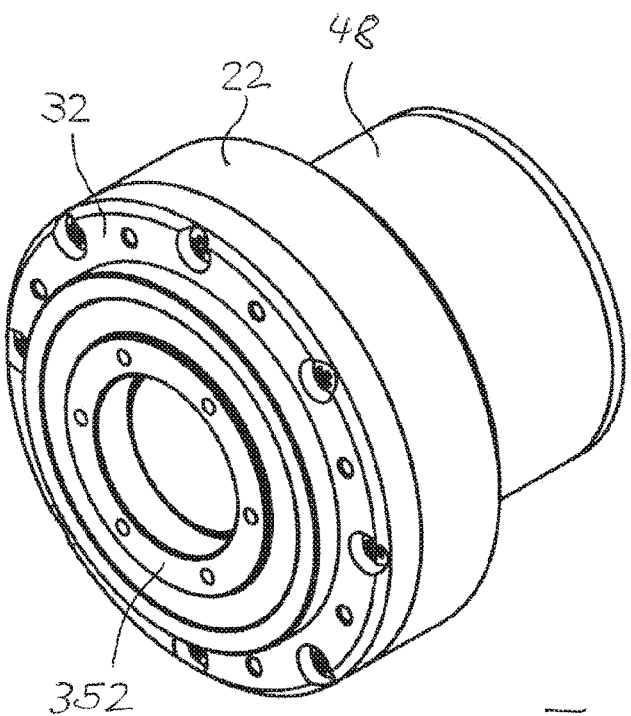
FIG. 65 shows a perspective view of the geared motor of FIG. 60 seen from the output side.
Figure 66:
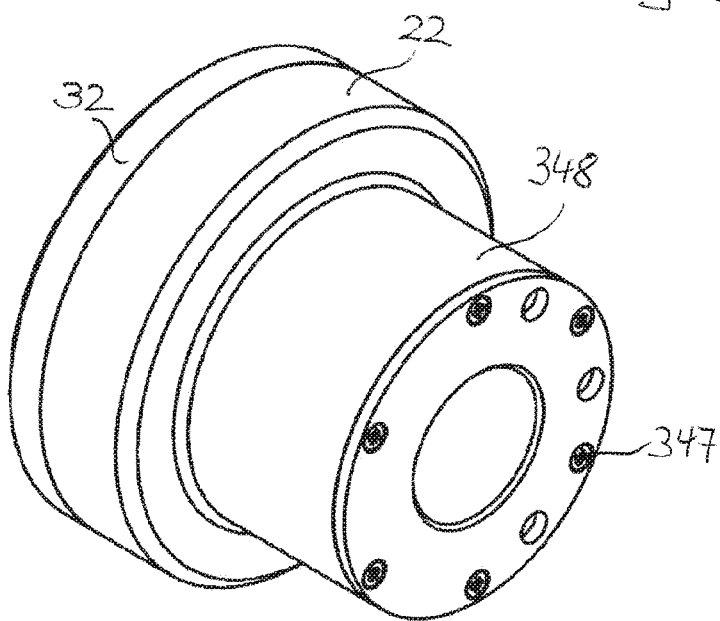
FIG. 66 shows a perspective view of the geared motor of FIG. 60 seen from the output side.

FIG. 64 shows an output side part of an exploded view of the transmission of FIG. 61, in which, seen from the drive side to the output side, the rotor shaft 26 with the eccentric disc 28', the second outer gear 8', the pin ring 102 with the pins 101 and the pin retaining ring 103, the transmitter ball bearing 34, the output side rotor ball bearing 30, the first outer gear 8, the shaft seal 50, the inner gear with the inner gear hollow shaft, the driven side spacer disk 38, the inner gear ball bearing 31, the transmission cover 32 and the shaft seal 51 are shown.

The outer gears 8, 8' each comprise grooves 354 which are radially directed radially inwardly from the circumference of the respective outer gear 8, 8' and are distributed at regular intervals over the circumference of the respective outer gear 8, 8'. The motor housing 2 comprises circumferentially spaced journals 355 corresponding to the grooves 354.

As shown in FIG. 61, in the assembled state, the screws 34 extend through the transmission cover 32, the first outer gear 8, the second outer gear 8', and the support ring 36 into the motor housing 22.

FIGS. 67 to 76 show a harmonic pin ring transmission with a crank gear. The crank gear is a planetary gear, which is arranged on the pedal shaft and transmits the cadence of a rider into the fast. The planetary gear can also be formed switchable, in particular if the planetary gear includes further gear stages, which are not shown in FIGS. 67 to 76, as it is the case for example in a Ravigneaux or Lepelletier planetary gear.

In the simplest case, the shifting allows a choice between a 1 to 1 transmission and a speed-up transmission. The shifting of the crank gear can be done manually via an operating element or automatically. In the case of an automatic shifting, the shifting can take place on the basis of measured values of a torque sensor.

Compared to the embodiments of FIGS. 1 to 40, the bottom bracket bearing sensor unit is replaced by a crank gear. By transmitting the planetary gear into the fast, a secondary transmission to the rear wheel can be made smaller. This in turn makes it possible to rotate the output shaft faster, so that the motor and/or the reduction gear can be made smaller or deliver more power with the same dimension.

Furthermore, the planetary gear can be used to measure the torque on the pedal shaft or pedal crank by measuring the support force of an element fixed to the housing of the planetary gear, for example by glued strain gauges.

If the sun gear is fixed to the housing and the ring gear is driven, as in the embodiment of FIGS. 72 to 76, for example a speed-up transmission of 1.59:1 can be provided, which in turn allows reducing the output motor power by a factor of 0.63. If the ring gear is fixed to the housing and the sun gear is driven, as in the embodiment of FIGS. 67 to 71, for example a speed-up transmission of 3:1 can be provided. Thus, the output torque of the motor can even be reduced by a factor of 0.33.

The transmission of the planetary gear can be used for example to increase the power density, which, however, can also increase the motor speed and thus the motor noise. Furthermore, the planetary gear can be used as a basis for a motor with integrated change speed gear. In this case, the change speed gear can be dimensioned correspondingly smaller or the necessary space for the change speed gear can be made available due to an increased motor power density.

FIGS. 67 to 71 show a harmonic pin ring transmission with a planetary gear arranged on a pedal shaft, in which a drive takes place via a planet carrier which is positively connected to the pedal shaft, and in which an output takes place via a sun gear.

FIGS. 72 to 76 show a harmonic pin ring transmission with a planetary gear arranged on a pedal shaft, in which a drive takes place via a planet carrier rotatably mounted on the pedal shaft, and in which an output takes place via a ring gear rotatably mounted in the transmission housing.

The transmissions are similar to the harmonic pin ring transmission of FIG. 11, which comprises an eccentric disk. However, the crank gears of FIGS. 67 to 76 may be combined with other reduction gears as well. In particular, the crank gears of FIGS. 67 to 76 may be combined with a harmonic pin ring transmission that is similar to the transmission of FIG. 1 and comprises an oval shaped cam disk and a flexible ball bearing.

For the sake of clarity, not all of the components already shown in FIG. 1 or in FIG. 11 have been provided with reference numerals in FIGS. 69 to 76 again.

Figure 67:
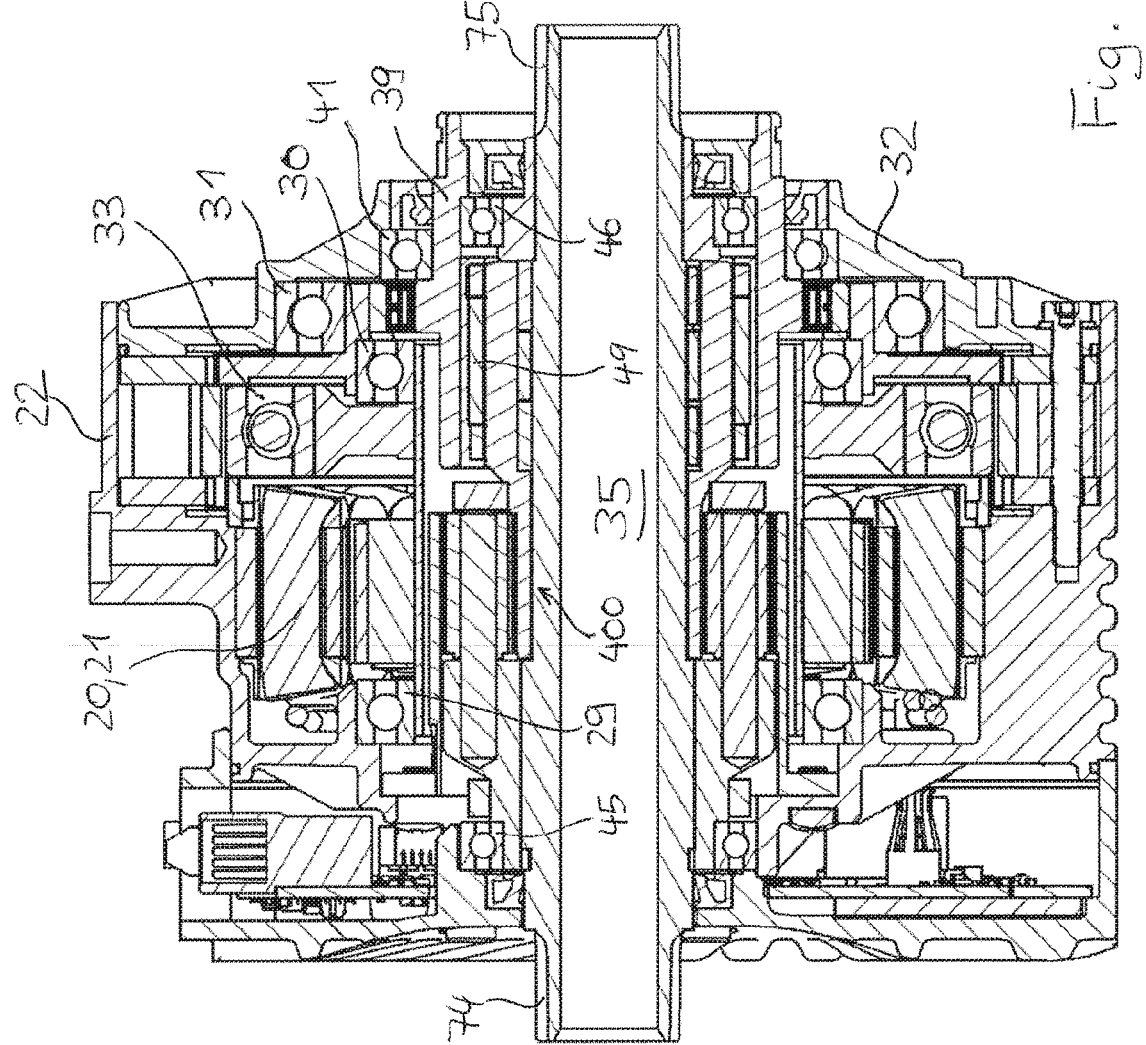
FIG. 67 shows a harmonic pin ring transmission with a planetary gear arranged on a pedal shaft, in which an output takes place via a planet carrier.
Figure 68:
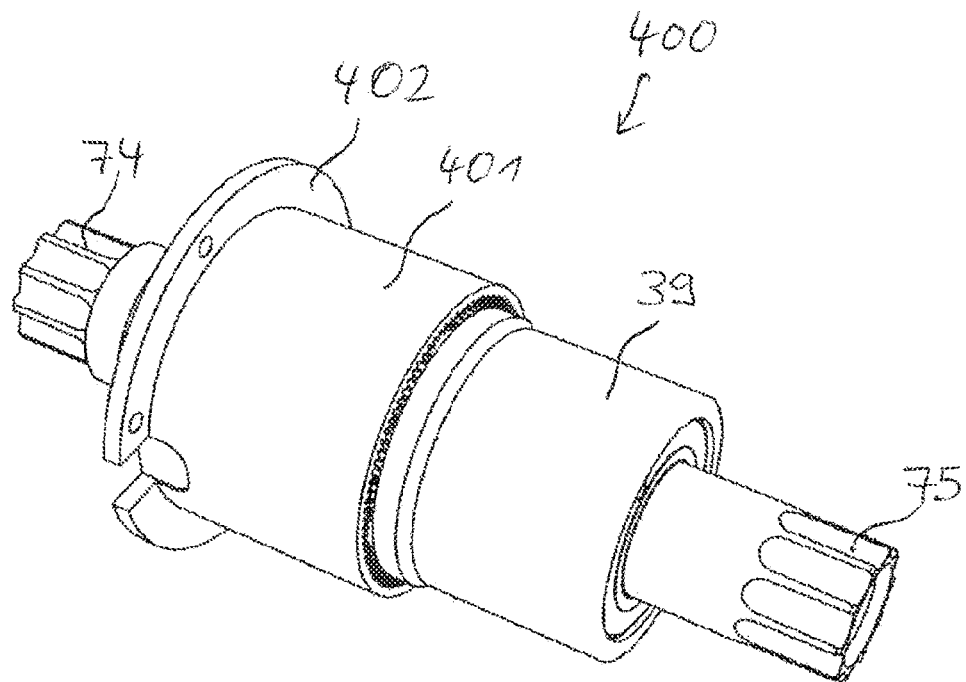
FIG. 68 shows a perspective view of the planetary gear assembly of FIG. 67.
Figure 69:
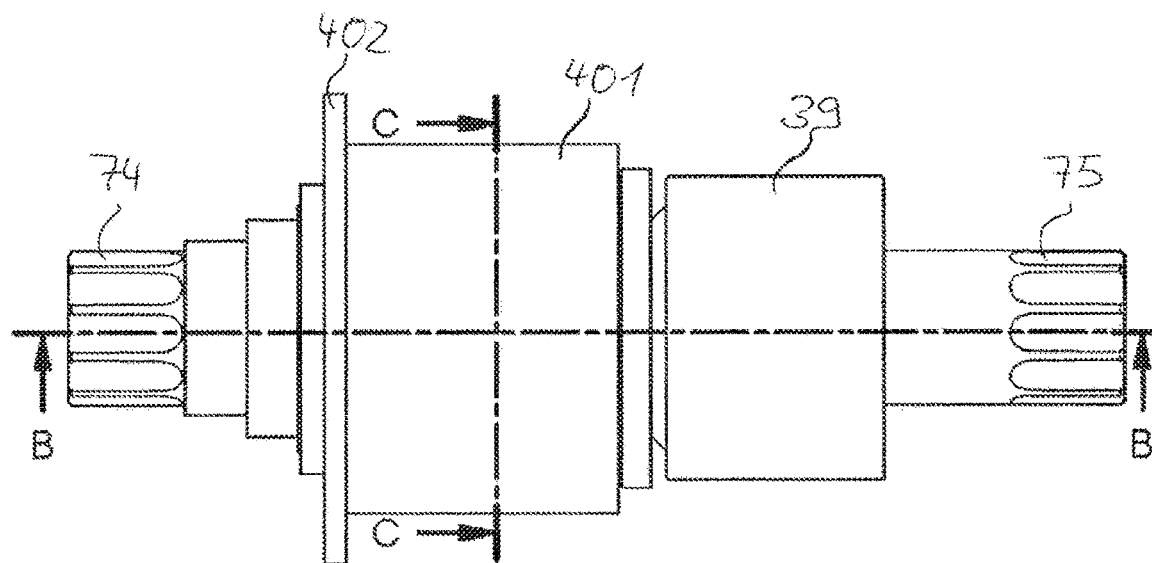
FIG. 69 shows a side view of the planetary gear assembly of FIG. 68.

FIG. 68 shows a perspective view of a planetary gear assembly 400 of FIG. 67, in which a ring gear 401, a mounting sleeve 402 of the ring gear 401 and an output shaft 39 can be seen. FIG. 69 shows a side view of the planetary gear assembly 400 of FIG. 68.

Figure 70:
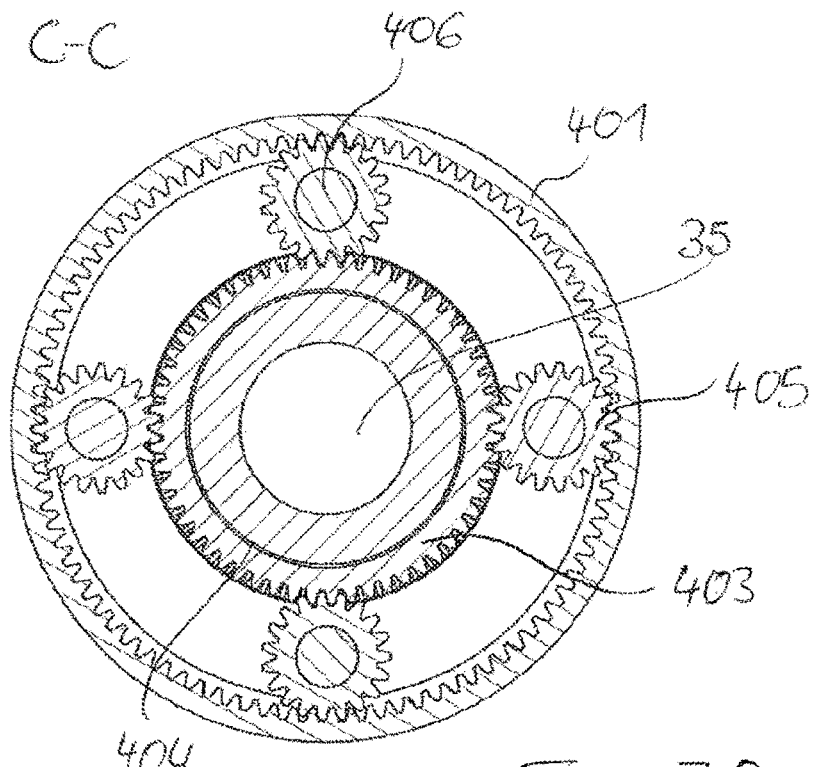
FIG. 70 shows a cross section along the intersection line C-C of FIG. 69.

FIG. 70 shows a cross-section of the planetary gear assembly 400 taken along intersection line C-C of FIG. 69. A sun gear 403 is configured as a hollow shaft which is separated by a gap 404 from the pedal shaft 35 so that the sun gear 403 can rotate relative to the pedal shaft 35. Planet gears 405 are respectively disposed on planetary axes 406, wherein a rolling bearing or a sliding bearing, which is formed by a sliding film, is arranged between the planet gears 405.

Figure 71:
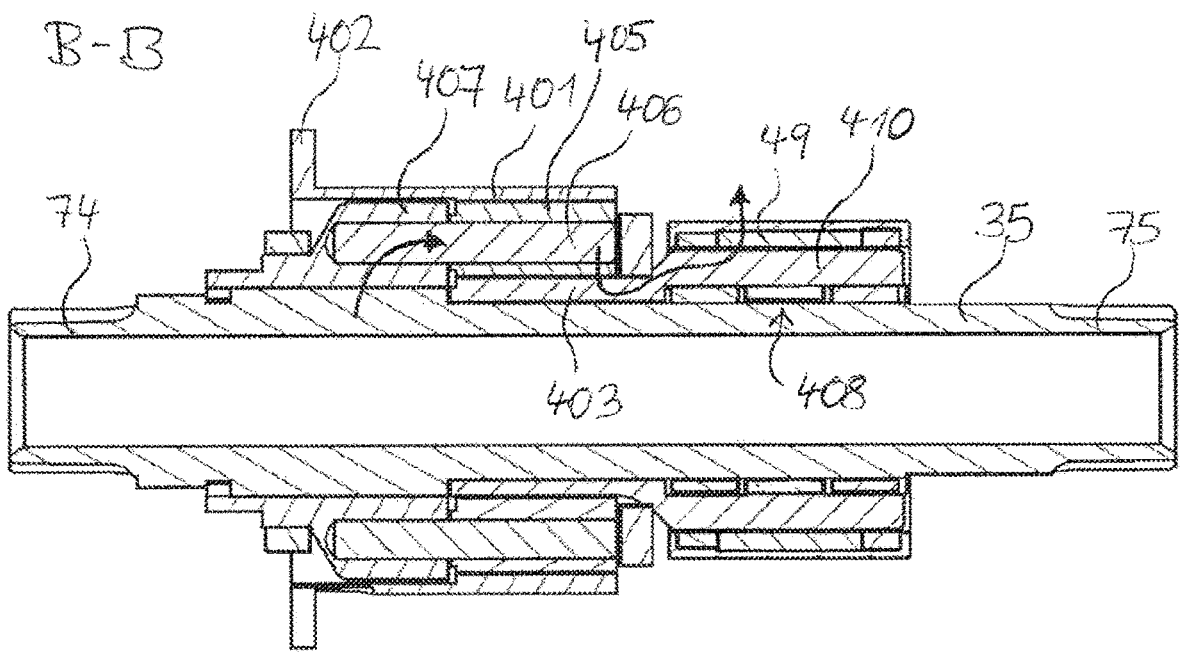
FIG. 71 shows a cross section along the intersection line B-B of FIG. 69.

FIG. 71 shows a cross-section of the planetary gear assembly 400 taken along intersection line B-B of FIG. 69. In this cross-sectional view is further shown that the planetary axes 406 are disposed in a planet carrier 407, which is positively connected to the pedal shaft 35.

The sun gear 403 is integrally connected to another hollow shaft 410, which comprises a slightly larger diameter than the sun gear 403, which is dimensioned such that a rolling bearing 408, which comprises two needle bearings in the embodiment of FIG. 71, can be arranged between the hollow shaft 410 and the pedal shaft 35. On the second hollow shaft 410, a pedal shaft freewheel 49 is arranged.

A torque flow from the pedal shaft 35 to the output shaft is indicated in FIG. 71 by arrows. As shown in FIG. 67, the fastening flange 402 of the ring gear is fixed to the transmission case 22. The stationary ring gear absorbs the opposing forces caused by the rider's pedaling motion.

According to a further embodiment, deformation sensors such as strain gauges, which are connected to an evaluation electronics, are mounted on the ring gear 401. For a more accurate measurement, a portion of the ring gear, in which the deformation sensors are mounted, may be made thinner.

Figure 72:
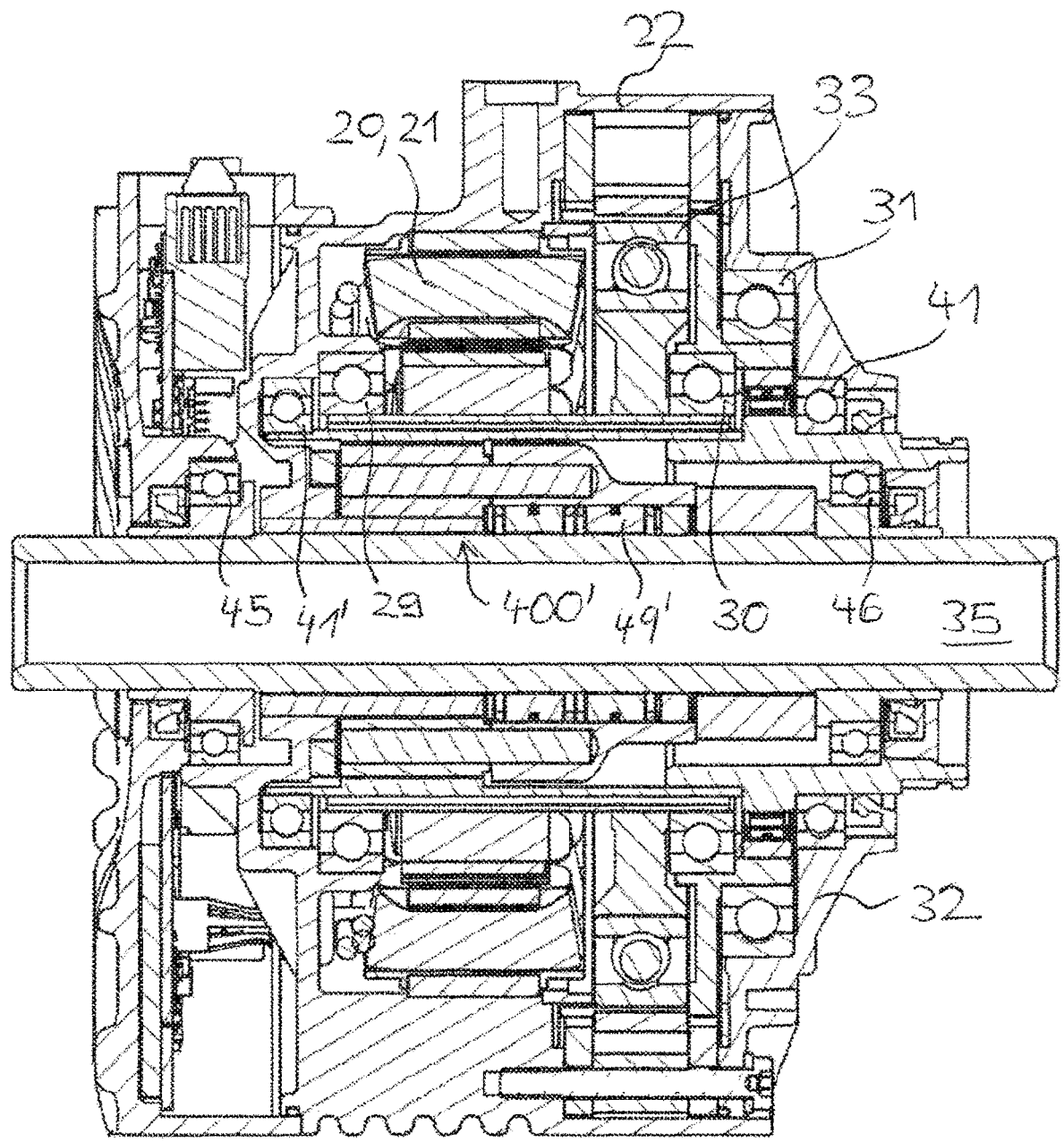
FIG. 72 shows a harmonic pin ring transmission with a planetary gear arranged on a pedal shaft, in which an output takes place via a ring gear.

FIG. 72 shows a harmonic pin ring transmission with a planetary gear arranged on a pedal shaft 35 in which an output takes place via a ring gear.

Figure 73:
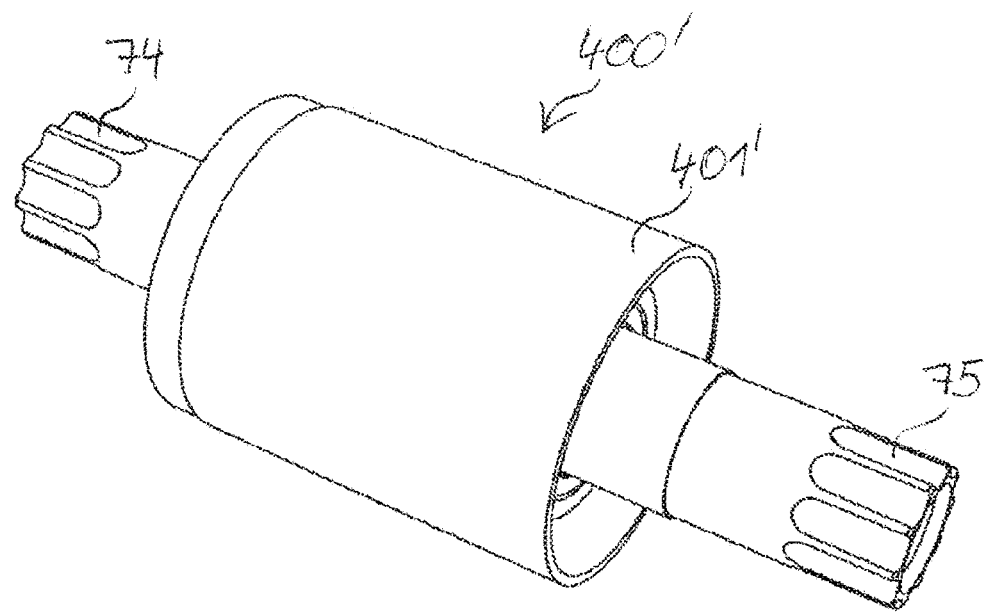
FIG. 73 shows a perspective view of the planetary gear assembly of FIG. 67.
Figure 74:
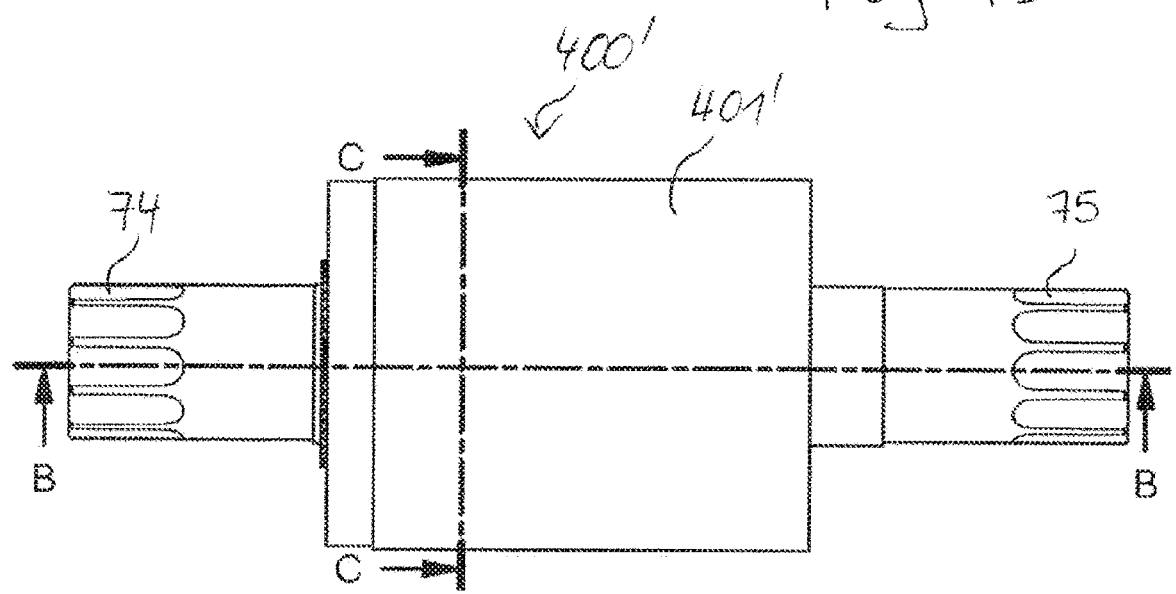
FIG. 74 shows a side view of the planetary gear assembly of FIG. 68.

FIG. 73 is a perspective view of the planetary gear assembly 400' of FIG. 67. FIG. 74 shows a side view of the planetary gear assembly 400' of FIG. 68.

Figure 75:
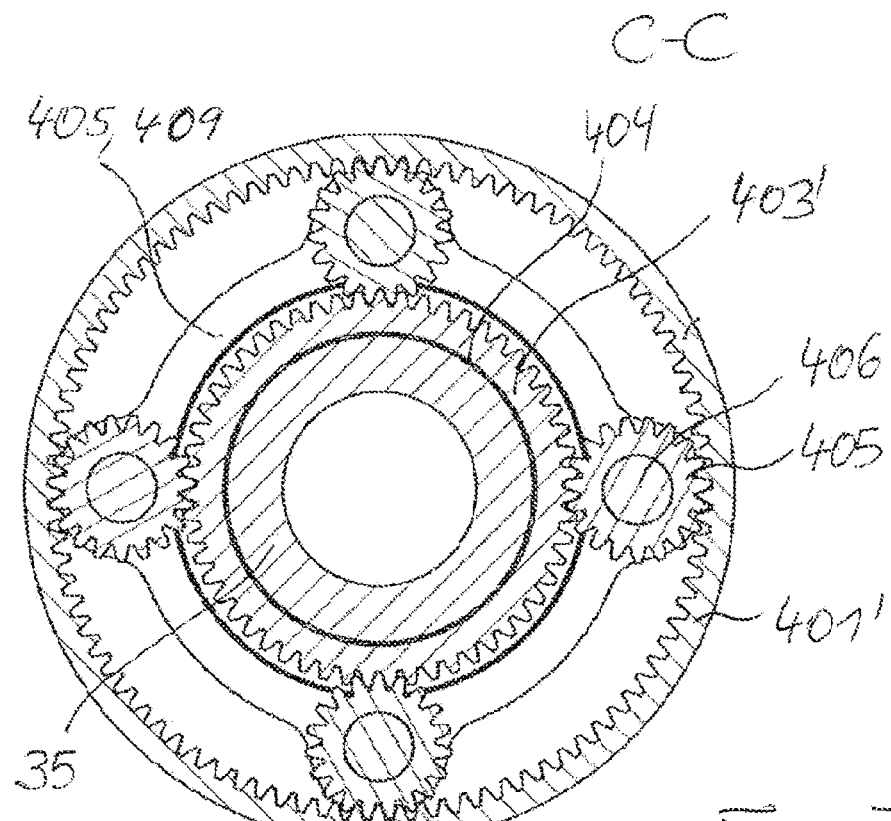
FIG. 75 shows a cross section along the intersection line C-C of FIG. 74.

FIG. 75 shows a cross section along the intersection line C-C of FIG. 74. A sun gear 403' is separated from the pedal shaft by a gap 404. As shown in FIG. 72, the sun gear 403' is connected to the transmission case 22 via a fastening region. In particular, this fastening region may be configured as a load cell. The planet gears 405 are rotatably mounted on planetary axes 406 disposed in a planet carrier 405.

Figure 76:
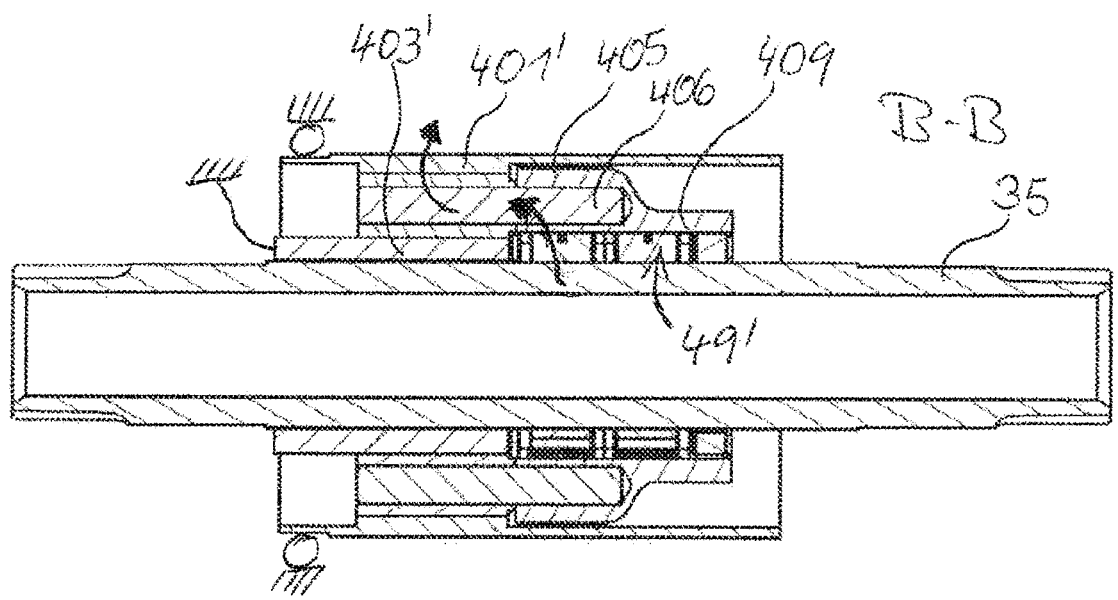
FIG. 76 shows a cross section along the intersection line B-B of FIG. 74.

FIG. 76 shows a cross section taken along intersection line B-B of FIG. 74. As shown in FIG. 76, a portion of the planet carrier 405 is formed as a hollow shaft 409 which is disposed on the pedal shaft 35 via a pedal shaft freewheel 49'.

According to a further embodiment, which is not shown here, a hollow shaft of a planetary gear arranged on the pedal shaft is fixed to the housing on the drive side, a hollow shaft of the planetary gear is fixedly connected to the pedal shaft, and a sun gear is coupled to an output shaft via a pedal shaft freewheel. To this end, an attachment of the hollow shaft may be guided around the planetary gear from a drive side. Here and in the other crank gears the pedal shaft may also generally be a crankshaft, such as a crankshaft of an internal combustion engine, or a drive shaft of a drive. Just like the two crank gears mentioned above, this crank gear also provides a speed-up transmission.

In addition, a reversal of rotation direction arises, which may be favorable in cases where, unlike an electric bicycle without reverse gear, a direction of rotation of a load is set in opposite direction to the direction of rotation of the crankshaft or drive shaft of the crank gear, so that in these cases no further reversal of rotation direction is necessary.

FIGS. 77-81 show a cycloidal gear according to the present description and a motor gear unit with the cycloidal gear.

Figure 77:
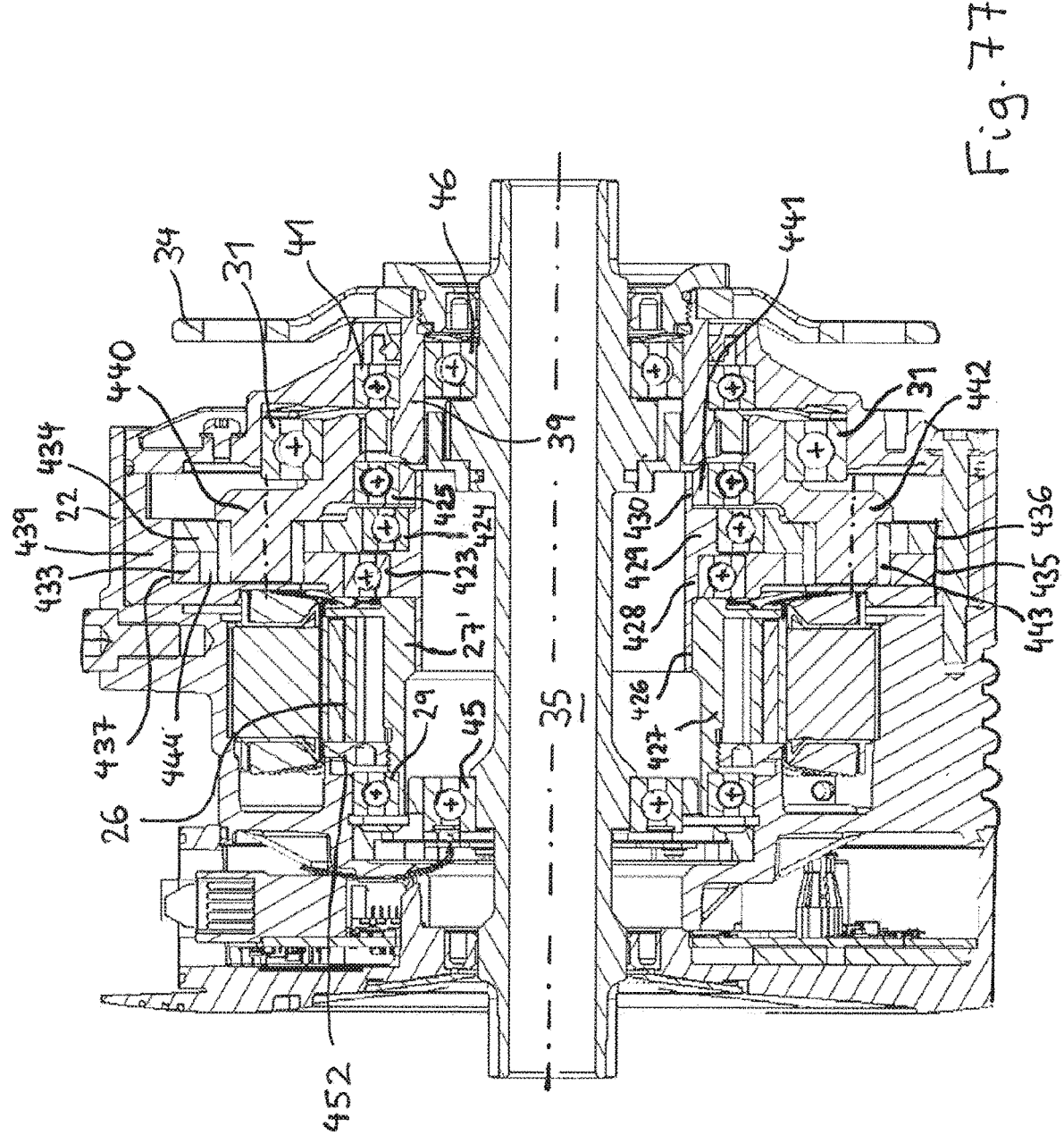
FIG. 77 is a cross-sectional view of a motor gear unit for an electric bicycle with cycloidal gear.

FIG. 77 is a cross-sectional view of a motor gear unit for an electric bicycle in which a cycloidal gear is used as a reduction gear.

Components which have already been explained in the description of the previous figures, in particular FIGS. 1 to 3 and 10 to 14, will not be described again here. Like the transmissions shown in FIGS. 1 and 10, the cycloidal gear comprises a three-bearing arrangement in which an output element is formed in one piece with a hollow output shaft and is supported on two diagonally opposite bearings inwardly on a housing cover and to the outside on an inner hollow shaft. Thus, only three bearings are required to support the rotor shaft, the output element and the hollow output shaft.

In the three-bearing arrangement, the outer bearings of the rotor shaft can be further apart. This is the case in particular in a motor gear unit for an electric bicycle, in which a limited axial space is utilized better by using fewer bearings. Thus, a leverage effect of an outer tilting moment on the bearings and on the rotor shaft is smaller, and the rotor shaft can be constructed as a thin cylinder. This is the case with many such engine gear units.

In the cycloidal gear of FIG. 77, the output element on which the hollow output shaft is formed, is formed by an output pulley with carrier pins and carrier rollers arranged thereon. In the motor gear unit shown in FIG. 1 and FIG. 10, it is formed by an output inner gear on which a hollow output shaft is formed.

An inner rotor shaft 27' of the cycloidal gear is formed of a drive shaft 426 and a rotor shaft 427 mounted thereon. The drive shaft 426 comprises drive side circular eccentric disk 428, an output side circular eccentric disk 429 and a centered circular disk 430, which are formed on the drive shaft 426 and which are arranged next to one another. The output side eccentric disk 429 is offset from the drive side eccentric disk 428 by 180 degrees.

On the drive side eccentric disk 428, a first ball bearing 423 is arranged, on which a drive side inner gear 433 is mounted. An output side inner gear 434 is mounted on the output side eccentric disk 429 via a second ball bearing 424. The drive side inner gear 433 and the output side inner gear 434 are identical in construction and each comprise an external toothing 435, 436, which engages in each case in an opposite internal toothing 437 of an outer gear 439 stationarily connected to the housing.

An output disk 440 is mounted on a third ball bearing 425 via a ring 441 disposed on the centered circular disk 430. The output pulley 440 comprises carrier pins 442 which are arranged at regular intervals on the output pulley 441 and which engage in circular openings 444 of the two inner gears 433, 434. The carrier pins 442 are provided with rollers 443 which are rotatably mounted on the carrier pins 442.

The drive shaft 426 of the inner rotor shaft 27' acts as a hollow drive shaft 426 of the cycloidal reduction gear.

On the rotor shaft 427 of the inner rotor shaft 27', a pressure disk 451 and a thread 450 opposite the pressure plate are formed. As can be seen in the cross-sectional drawing of FIG. 80, a pressure ring 452 is screwed onto the thread, so that the rotor packet 26 or the outer rotor shaft 26 is clamped between the pressure ring and the retaining ring. This corresponds to the arrangement of FIG. 30 and differs from the arrangement of FIG. 1, in which the rotor packet is held between a spacer arranged on the inner rotor shaft and a shoulder of the inner rotor shaft.

The drive side inner gear 433 and the output side inner gear 434 are also referred to as "cam disks". Instead of the internal toothing 437 of the outer gear 439, a stationary pin ring can also be provided, which is indicated in FIG. 79. This stationary pin ring may have rollers, so that friction and shear forces are reduced and a rolling movement is possible.

Figure 78:
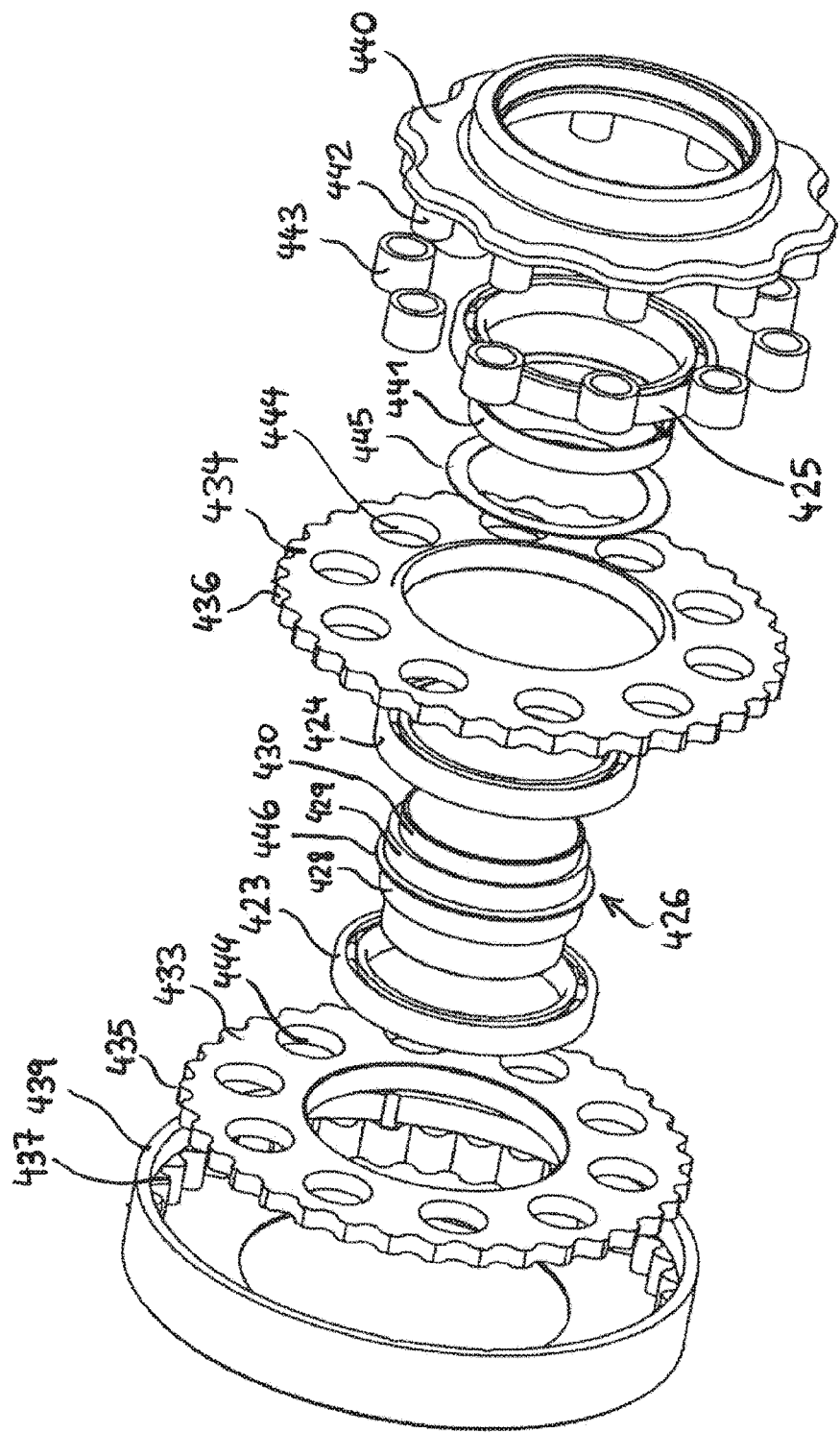
FIG. 78 is an exploded view of the motor gear unit of FIG. 77.

The exploded view of FIG. 78 shows, viewed from left to right, the outer gear 439 with the internal toothing 437, the output side inner gear 433, the first ball bearing 423, the inner rotor shaft 27' on which the drive side eccentric disk 428, the output side eccentric disk 429 and the centered circular disk 430 are arranged, the second ball bearing 424, the output side inner gear 434, a spacer 445, the ring 441, the third ball bearing 425, the carrier rollers 443 and the carrier pins 442 arranged on the output pulley 440, and the output pulley 440.

Furthermore, FIG. 78 shows a ridge 446 which is provided between the drive side 428 and the output side eccentric disk 429.

The side view of FIG. 79, seen from inside to outside, shows the ring 441, the third ball bearing 425, the output pulley 440, the output side inner gear 434 with the external toothing 436, the external toothing 435 of the drive side inner gear 433, and the internal toothing 437 of the outer gear 439. Stationary pins 447 are indicated in two positions, which may be provided instead of the internal toothing of the outer gear 439.

The cross-sectional view of FIG. 80 shows a cross section through the cycloidal gear of the motor gear unit of FIG. 77, in which the inner rotor shaft 27' with the drive side eccentric disk 428 and the drive side inner gear 433 mounted thereon, the output side eccentric disk 429 and the output side inner gear 434 mounted thereon, the centered circular disk 430 and the output disk 440 mounted thereon with the carrier pins 442 and the carrier rollers 443, and the outer gear 439 with the internal toothing 437 are shown.

In the lower part of FIG. 80, a fastening opening 448 of the outer gear 439 is shown. As shown in the cross section of FIG. 77, the outer gear 439 is fixed to the transmission case by fastening bolts that are passed through the fastening openings 448.

Figure 81:
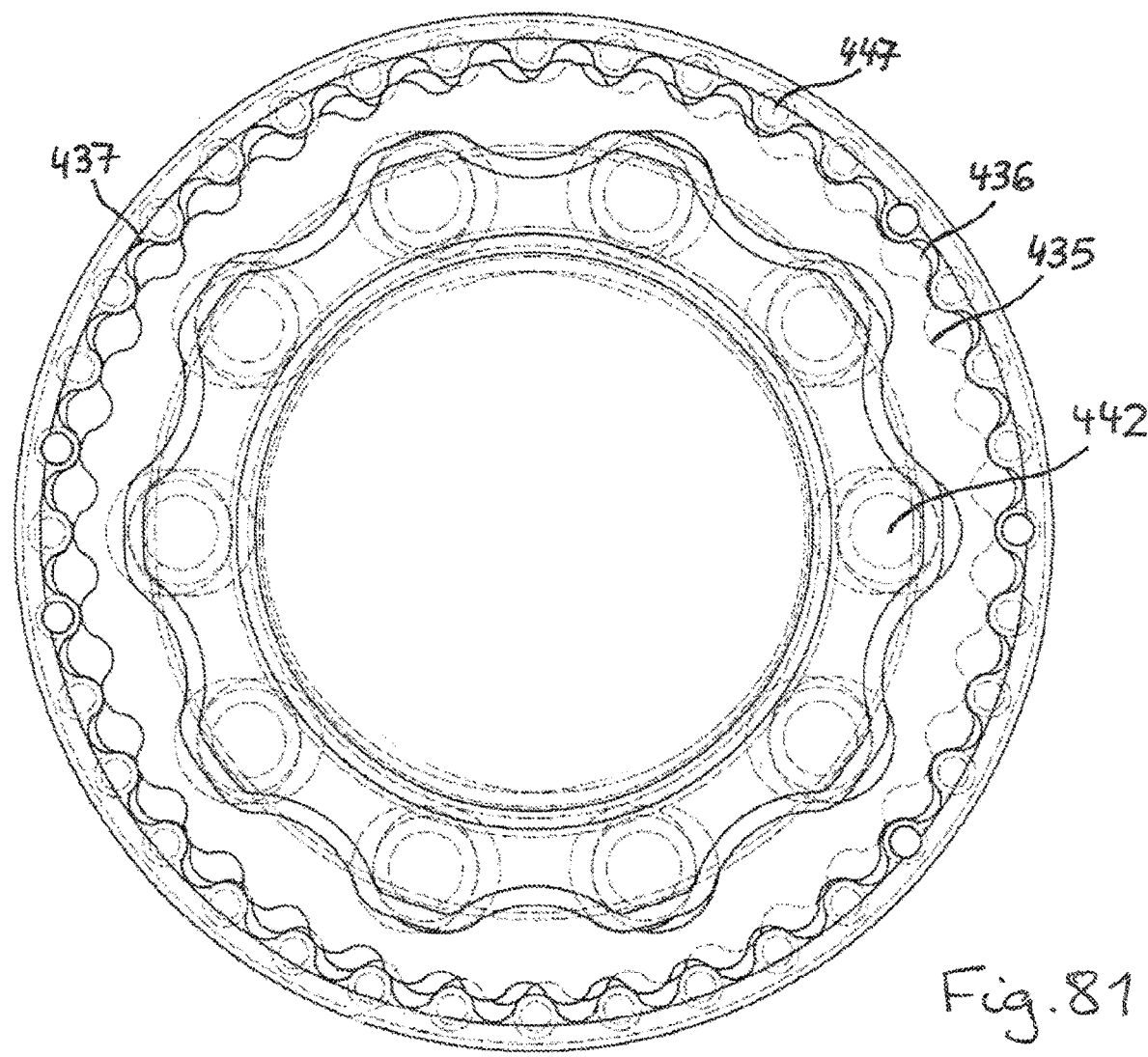
FIG. 81 is the side view of FIG. 79, in which components hidden in FIG. 79 are indicated by dashed lines.

FIG. 81 shows a side view of a detail of the cycloidal gear of FIG. 77, in which also hidden components are visible. In the view of FIG. 81 it can be seen that all the tooth heads of the two inner gears are in engagement or in contact with the internal toothing of the stationary outer gear. Furthermore, FIG. 81 shows at the same time an alternative embodiment in which, instead of an internal toothing, the outer gear comprises an arrangement of stationary pins or bolts with rollers arranged thereon.

In the following, an assembling of the cycloidal drive will be described by way of example with reference to the preceding FIGS. 77-81.

The elements that are on the drive side of the rotor shaft 427 in the motor housing 22 are inserted into the motor housing 22 or attached to the motor housing 22. Among other things, the drive side rotor ball bearing 29, the load cell 47, the drive side pedal shaft ball bearing 45 and a stator assembly of the motor are inserted into the motor housing 22. The outer gear 439 is screwed onto the motor housing 22.

The rotor shaft 427 is attached to the output shaft 426 on the drive side. The drive side inner gear 433 and the first ball bearing 423 are placed on the drive side eccentric disk 428 from the drive side. The rotor packet is placed on the inner rotor shaft 27' from the drive side and the pressure ring 452 is screwed to the rotor packet. Then, the assembly of the rotor shaft 427 and the output shaft 426 with the components mounted thereon is inserted from the output side into the motor gear unit.

The second ball bearing 242 and the output side inner gear 434 are placed on the output side eccentric disk 429 from the output side. The ring 441 is placed on the centered circular disk 430 and the third ball bearing 425 is placed on the ring 441.

The carrier rollers 443 are placed on the carrier pins 442 of the output ring 440 and the output ring 440 is placed on the third ball bearing 425, such that an inner shoulder of the output ring 440 rests on the outer ring of the third ball bearing 425. In this case, the carrier pins 442 and the carrier rollers 443 are guided through the circular openings 444 of the output side inner gear 433 and the drive side inner gear 434. The ball bearing 31 is mounted to a shoulder of the output pulley and the transmission cover is screwed together with the outer gear to the motor housing 22, wherein the fastening openings of the transmission cover and the outer gear overlap.

The rotor packet 26 and the inner rotor shaft 27' are rotated by energizing the stator 22. This rotation is transmitted to the eccentric disks 428, 429. The eccentric disks 428, 429 in turn set the inner gears 433, 434 disposed thereon in an eccentric circular movement, whereby the toothings of the inner gears 433, 434 are moved past the toothing of the stationary outer gear 439. As a result, the internal toothing 437 of the outer gear 439 exert a reaction force on the inner gears 433, 434. By this reaction force of the outer gear 439, the inner gears 433, 434 are set in rotation about their own axis of rotation. This rotation is tapped by the carrier pins 442 and transmitted to the output pulley, whereby the movement of the inner gears 433, 434 is converted into a centered circular motion. From there, the rotation is transmitted directly to a load, such as in a geared motor, or, as for example in the case of an electric bicycle, initially transmitted to an output shaft 39 via a freewheel 40.

FIGS. 82-88 show a tension shaft transmission and a motor gear unit with a tension shaft transmission according to the present description.

Figure 82:
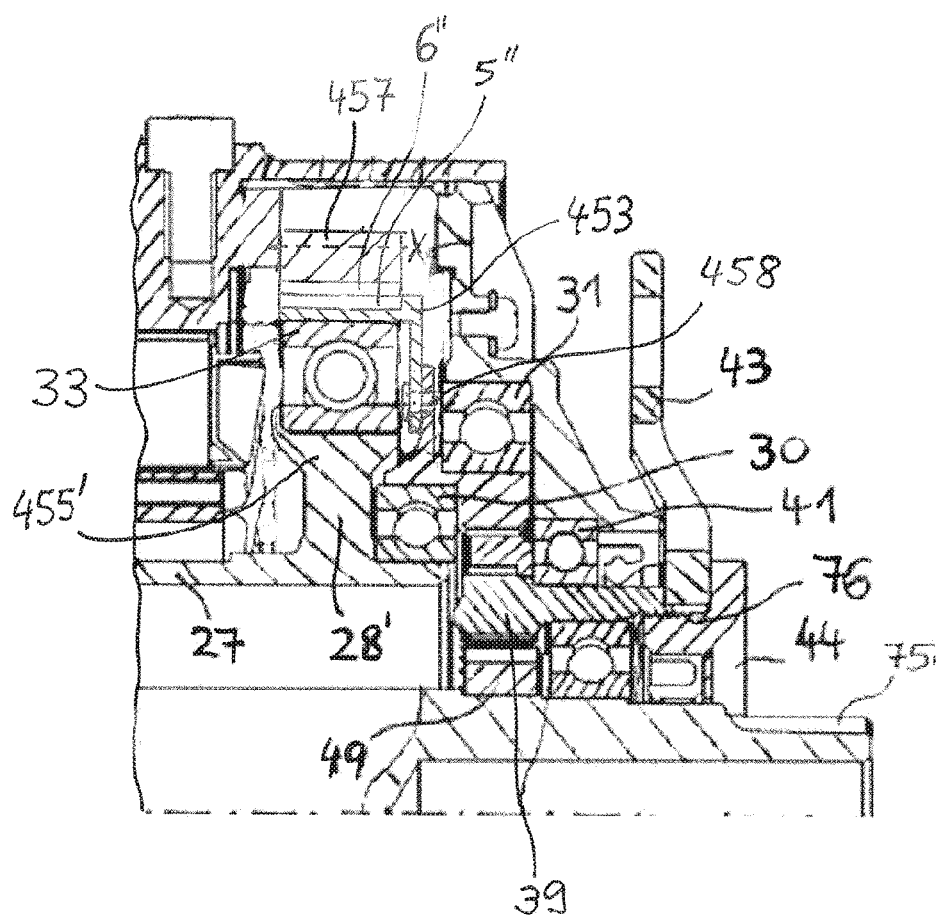
FIG. 82 shows a cross section of a motor gear unit with a tension shaft transmission.

FIG. 82 shows a cross-section of a motor gear unit with the tension shaft or flexspline transmission according to the present description. The elements not shown here correspond to those of FIG. 1.

An external toothing 5" of a tensioning shaft 453 is arranged between a cam disk 455' with a flexible ball bearing 33 and an outer gear 457 with an internal toothing 6", which is screwed to a motor housing 22. The tensioning shaft is fastened via a fastening region with rivets to an output shaft 458, which is mounted on the diagonally opposite ball bearings 31 and 30.

FIG. 83 shows an exploded view of the tension shaft or flexspline transmission of FIG. 82, in which a stationary outer gear 8" is provided with the toothing referred to below as toothing for the HPD-F transmission. As a result, a particularly good engagement of the two toothings can be achieved.

Thereafter, the internal toothing of the outer gear is substantially an outer equidistant to the gear trajectory that is defined by $$x(t)=r1*\cos(t)+r2*\cos((n+1)*t)+r3*\cos((n+3)*t) \text{ and}$$

$$y(t)=r1*\sin(t)-r2*\sin((n+1)*t)+r3*\sin((n+3)*t),$$

wherein t is between 0 and 2 pi/Z_outer or 360°/Z_outer, respectively, and where the equidistant, for example, has a distance of a pin radius to the gear trajectory.

The opposite external toothing of the tensioning shaft is derived from the geometry of a pin ring with cylindrical pins. Thus, a cross section of the tooth tips in a plane perpendicular to the axial direction corresponds to a sector of a circle, preferably a semicircle. This can be seen in FIG. 87.

The exploded view of FIG. 83 shows, viewed from left to right or from the output side to the drive side, respectively, the stationary outer gear 8" or the outer ring 8", the cup-shaped tensioning shaft 453 with the internal toothing 6" and the fastening region 454, the flexible ball bearing 33 and the drive cylinder 455 with oval circumference and fastening flange 456. The drive cylinder of FIG. 83 is suitable, for example, for a geared motor and deviates from the cam disk 455' of FIG. 82, which is arranged on an inner rotor shaft.

In the present specification, "oval" preferably denotes an oval having two mutually perpendicular mirror symmetries or major axes, such as an ellipse or a sinusoidal superimposed circular shape. However, it may also, for example, designate an oval with three axes of symmetry, in which the distance of the axes is maximum, so that three engagement regions are generated instead of two engagement regions with complete tooth engagement.

The fastening region 454 of the tensioning shaft is suitable for fastening an output shaft. Furthermore, the stationary outer gear 8" comprises a fastening region 457 for attachment to a transmission housing and the drive cylinder 455 comprises a flange 456 for fastening a drive axle. In an embodiment of the tension shaft transmission for an electric bicycle, the drive cylinder 455 may also be formed as part of an inner rotor shaft and need not have a fastening flange 456 in this case.

FIG. 84 shows a side view of the tension shaft transmission of FIG. 82 from the drive side in the assembled state, in which, from inside to outside, the fastening region of the tensioning shaft, the driving cylinder, the flexible ball bearing, the external toothing of the tensioning shaft, the internal toothing of the outer gear and the outer gear are shown.

FIG. 85 shows a cross-section along the cross-sectional line A-A of FIG. 84, which runs along a semiminor axis of the drive cylinder 455. In the cross-sectional view of FIG. 85, it can be seen that the tensioning shaft 453 is biased inwards, so that it rests against the outer ring of the flexible ball bearing 33 in the region of the semiminor axis of the drive cylinder 455.

FIG. 86 shows a cross-section along the cross-sectional line B-B of FIG. 84, which extends along a semi major axis of the drive cylinder 455. As shown in the cross-sectional views of FIGS. 85 and 86, the outer gear 8''' and the tensioning shaft 453 each comprise smooth, cylindrical holes or openings, whereas the drive cylinder 455 comprises threaded holes.

Figure 87:
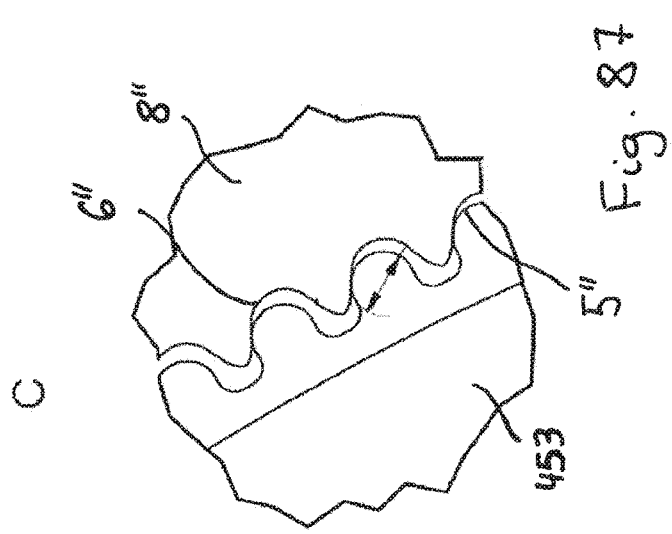
FIG. 87 shows a detail enlargement of the detail "C" of FIG. 84.

FIG. 87 shows an enlarged detail designated "C" in the previous FIG. 84, in which the shape of the eccentric toothing can be seen.

Figure 88:
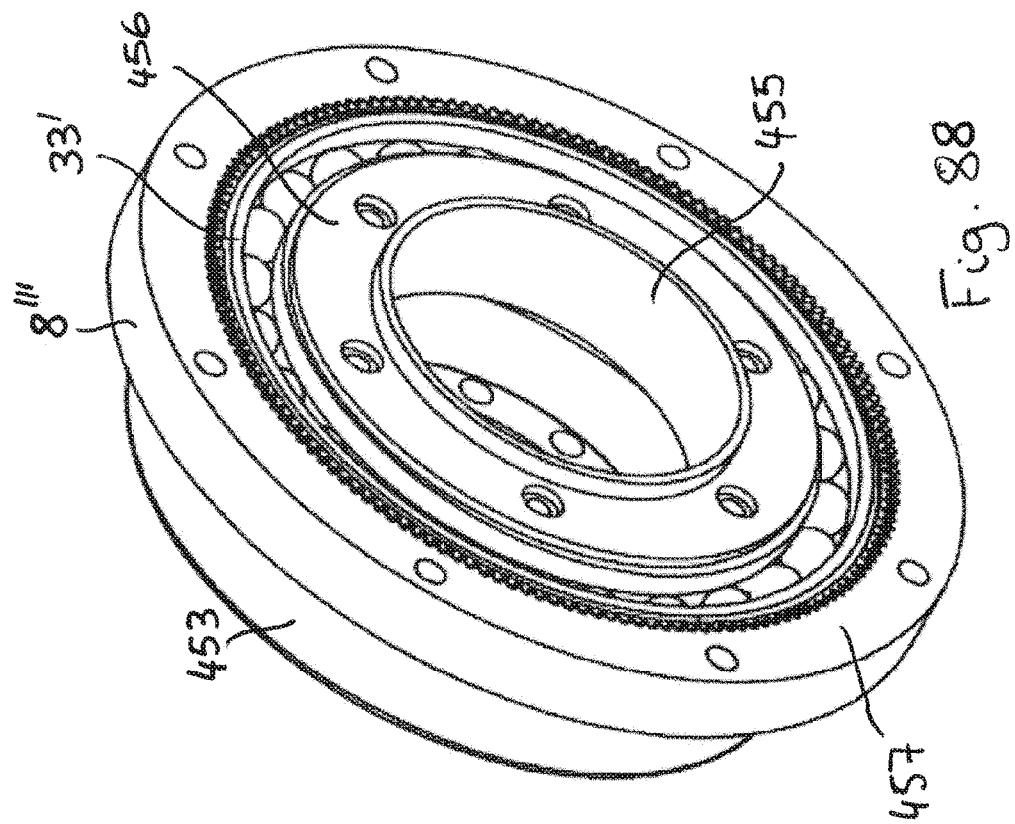
FIG. 88 shows a drive-side perspective view of the tension shaft transmission in the assembled state.

FIG. 88 shows the tension shaft transmission of FIG. 82 in the assembled state.

FIGS. 89-93 show a two-stage reduction gear with a two-part one-piece pin ring 102' and two outer gears 8''', 8$^{(4)}$, wherein the two-part one-piece pin ring 102' is mounted on an eccentric disk.

The two-part one-piece pin ring 102 comprises a first external toothing 5''' on a first portion and a second external toothing 5$^{(4)}$ on a portion arranged next to it. The first external toothing 5''' of the pin ring 102' is arranged opposite a first internal toothing 6''' of a rotatably mounted outer gear 8''' and the second external toothing 5$^{(4)}$ of the pin ring 102' is arranged opposite a second internal toothing 6$^{(4)}$ of a stationary outer gear 8$^{(4)}$.

A number of teeth of the first external toothing 5''' is less than a number of teeth of the internal toothing 6''' and a number of the teeth of the second external toothing 5$^{(4)}$ is less than a number of the teeth of the internal toothing 6$^{(4)}$. In an exemplary embodiment of a high-reduction gear, a number of the teeth of the first external toothing 5''' is equal to 28 and a number of the teeth of the internal toothing 6''' of the movable outer gear 8''' is equal to 29, and a number of the teeth of the second external toothing is equal to 29 and a number of the teeth of the internal toothing 6$^{(4)}$ of the stationary outer gear is equal to 30.

Thus, in this embodiment, a reduction of a drive side first gear stage is greater than a reduction of an output side second gear stage and a number of teeth of the respective outer gear is greater than a number of teeth of the respective radially opposite toothing of the pin ring. As a result, the inner external toothing moves in the reference frame of the outer internal toothing opposite to the drive. Thus, the internal toothing of the movable outer gear moves in the direction of the drive and reduces the reduction of the first gear stage. In a general case, the number of teeth of opposing toothings may be different.

When using an eccentric disk, the difference in the number of teeth must be at least one. Furthermore, the ball bearing and a transmission element arranged thereon, such as a pin ring, need not be deformable. In an alternative embodiment, which comprises an oval disk instead of an eccentric disk and a flexible ball bearing, which is arranged on the eccentric disk, the difference of the numbers of teeth of opposing toothings is a multiple of two.

In embodiments without a transmission means disposed between an inner and an outer gear, in which a transmission means simultaneously acts as an inner gear with external toothing, as for example in the tension shaft transmission of FIG. 83 or in the two-stage eccentric gear of FIG. 89 the difference of the numbers of teeth refers to the toothing of the transmission means and the toothing opposite the transmission means.

FIG. 89 shows a side view of the two-stage reduction gear from the output side.

FIG. 90 shows a cross-section along the cross-sectional line A-A in FIG. 89 in the viewing direction designated in FIG. 89. Thus, the upper half of FIG. 90 shows a true cross section, whereas the lower half of FIG. 90 shows a side plan view.

FIG. 91 shows a side view of the two-stage reduction gear of FIG. 82, wherein hidden components are indicated by dashed lines to illustrate the engagement of the opposing toothings.

FIG. 92 is a partially cutaway perspective view of the two-stage reduction gear of FIG. 82 viewed from the output side or the side of the movable outer gear 8''', respectively.

FIG. 93 is a partially cutaway perspective view of the two-stage reduction gear of FIG. 82 viewed from the drive side or the side of the stationary outer gear 8$^{(4)}$, respectively. The stationary outer gear 8$^{(4)}$ comprises a fastening region for attachment to a transmission housing, which is not shown in FIGS. 89 to 93. Similarly, the movable outer gear 8''' comprises a fastening region for fixing an output shaft, which is not shown in FIGS. 89 to 93.

The two-part pin ring of the two-stage pin ring transmission of FIGS. 89-93 differs from an externally toothed tension shaft according to the prior art inter alia by the form of the toothing. The form of the toothing of the two toothings pin rings is essentially an inner equidistant to a gear trajectory which is determined by formula (1) given below for a gear trajectory of a harmonic pin ring transmission with an eccentric disk, where the equidistant preferably has a distance of a pin radius to the gear trajectory (1).

The harmonic pin ring transmission is also referred to as HPD-E transmission. Formula (1) describes a non-retrograde epicyclic trajectory with one epicycle.

Correspondingly, the toothing of the stationary outer gear 8$^{(4)}$ and of the movable outer gear 8'' is an external equidistant to the gear trajectory indicated by formula (1), preferably at a distance of a pin radius. The number of teeth is determined by the parameter "n" of the formula (1). It may suffice for both the external toothing and the internal toothing if only the tooth heads are determined by formula (1).

Preferably, the toothings of the two-stage transmission of FIGS. 89-93 are configured such that a highly geared transmission is formed in which a reduction of the first gear stage is further reduced by the second gear stage in that the second angular velocity generated by the second gear stage is in opposite direction to a first angular velocity generated by the first gear stage. In addition, the second angular velocity is less than twice the first angular velocity, so that the resulting angular velocity at the transmission output is smaller in magnitude than the angular velocity of the first gear stage.

The second angular velocity can also be greater than the first angular velocity, whereby a reversal of the direction of rotation is generated, so that the output now takes place in the same direction as the drive. The reversal of the direction of rotation can be favorable, for example, for a generator mode in a hybrid vehicle or else to superimpose the rotational movements of drive and output.

In operation, the eccentric disk is rotated by a motor, for example an electric motor. This rotational movement is converted via the ball bearing to an eccentric movement of the two-part pin ring. As a result, the teeth of the two-part pin ring are guided past the external toothings of the two outer gears or drawn in the external toothings.

This results in a rotational movement of the pin ring relative to the stationary outer gear and a rotational movement of the movable outer gear relative to the moving pin ring, which overlap to an output rotational movement.

The two-stage reduction gear can also be built with an oval transmitter, a deformable ball bearing and a deformable two-part pin ring. In this case, another internal toothing is preferably used than shown in FIGS. 89-93. For example, the toothing geometry of the tension shaft transmission shown in FIGS. 83-87 may be used.

In particular, the two-stage reduction gear can also be operated in the opposite direction and used for a speed-up transmission. For example, a high gear ratio may be useful for a streak camera with a rotating mirror that can have several thousand revolutions per second.

A two-stage transmission gear with output outer gear can also be used in the cycloidal gear. In this case, the output pulley with the carrier pins is eliminated. Instead, at least one inner gear is configured as a split inner gear with two different toothings, wherein an internal toothing of the rotatable outer gear is arranged opposite to the second of the two toothings.

The description of the following FIGS. 94-118 discloses inner gear and outer gear toothings which may be used in conjunction with the transmissions of the present description, in particular with the harmonic pin ring transmissions.

In particular, the present description discloses a harmonic pin ring transmission with eccentric disk, which is also referred to as "HPD-E transmission". The HPD-E transmission comprises a first gear with a first toothing, a second gear with a second toothing and a pin ring with round engagement regions.

The pin ring may be formed by a flexible pin retaining ring with cylindrical pins inserted therein. It may also be made in one piece, wherein the one-piece pin ring comprises an annular portion, from which pin-like extensions protrude in the axial direction to the side.

In particular, when a third gear is provided as a support gear and when the pins or pin-like extensions are non-rotatably connected to the annular portion or the flexible pin retaining ring, the pins or pin-like extensions on the side of the support gear may be configured only on one side as a round engagement region.

For example, in a configuration having an outer gear and an inner gear, a second outer gear may be provided as a support gear concentrically aligned with the first outer gear, wherein a radius of the toothing of the second outer gear coincides with the first outer gear and the toothing of the second outer gear is aligned with the toothing of the first outer gear such that the tooth heads lie one behind the other in the axial direction.

According to a further embodiment, the pin ring is formed in one piece and has an internal toothing and an external toothing with round tooth heads.

The round engagement region of the pin ring comprises a segment of circle like cross section and may generally be formed by the pins of the pin ring, the pin-like extensions of the pin ring or by round-shaped tooth heads of the pin ring. The segment of circle like cross section is preferably unchanged along an axial direction of the transmission. In particular, the segment of circle like cross section may take the form of a semicircle or a full circle.

Furthermore, the HPD-E transmission comprises a revolving transmitter for drawing the engagement regions of the pin ring into the first toothing of the first gear and into the second toothing of the second gear. In this case, the first gear, the transmitter and the second gear are arranged concentrically with each other and the transmitter is arranged radially inside the pin ring.

The pin ring is arranged between the first gear and the second gear. When the first gear and the second gear are in the same axial plane, as is the case with an arrangement with an inner gear and an outer gear, an arrangement between the first gear and the second gear should be understood to mean that the round engagement regions, the pins or the pin-like extensions are arranged in the radial direction at least partially between the first gear and the second gear.

When the first gear and the second gear are in different axial plane, as is the case with an arrangement with two outer gears in which one of the outer gears is driven and the other outer gear is stationarily connected to the housing, an arrangement between the first gear and the second gear should be understood to mean that the pin-retaining ring or a portion of the pin ring corresponding to the pin retaining ring is arranged in the axial direction between the first gear and the second gear.

The transmitter comprises a transmitter disk or cam disk arranged eccentrically to a transmission central axis, wherein the disk may be configured in particular as a circular disk. Here, an annular structure, such as a ring which is attached via struts on a shaft of the transmitter, is also considered as a disk. In operation, the transmitter deforms the pin ring so that the outer and inner gears rotate relative to each other.

The first toothing of the first gear and the second toothing of the second gear are respectively formed in accordance with an epicyclic construction which will be explained in more detail below with respect to an inner gear or an outer gear according to the epicyclic construction.

According to the epicyclic construction, locations on the respective tooth surface of the first toothing or the second toothing are each determined by a radial distance from the transmission central axis as a function of a cycle angle.

The radial distance is in turn determined by an equidistant to a gear trajectory, wherein locations on the gear trajectory are each determined by the vector sum of a cycle vector and an epicycle vector. In this case, a tail of the cycle vector lies on the transmission central axis and a tail of the epicycle vector lies in the tip of the cycle vector.

Furthermore, an epicycle angle of the epicycle vector is n times the cycle angle, and a length of the cycle vector is larger than a length of the epicycle vector, wherein n is a number of round engagement regions of the harmonic pin ring transmission which is at least three.

This profile shape can also be summarized by the following formula, where the plus sign refers to the inner gear toothing and the minus sign to the outer gear toothing.

$$\vec{P} = \begin{pmatrix} x_P \\ y_P \end{pmatrix} = \begin{pmatrix} r_1 * \cos(\alpha) + r_2 * \cos(n * \alpha) \\ r_1 * \sin(\alpha) \pm r_2 * \sin(n * \alpha) \end{pmatrix}$$

Depending on the design of the pin ring, the round engagement region given above refers to the pins, to the pin-like extensions or to the round tooth heads of the toothings of the pin rings.

According to an embodiment, the first gear is an inner gear with an external toothing and the second gear is an outer gear with an internal toothing. Thus, the first toothing is the external toothing of the inner gear and the second toothing, the internal toothing of the outer gear. In this embodiment, the inner gear is disposed radially inside of the outer gear.

In the external toothing of the inner gear, the epicycle angle is measured in the same direction as the cycle angle and the equidistant is an inner equidistant. In contrast, in the internal toothing of the outer gear, the epicycle angle is measured in the opposite direction to the cycle angle, and the equidistant is an outer equidistant. This configuration of the toothings will be explained in more detail below with respect to an inner gear and an outer gear, respectively.

According to a further exemplary embodiment of an HPD-E transmission, the first gear and the second gear are each an outer gear with an internal toothing. Thus, the first toothing is formed by an internal toothing of a first outer gear and the second toothing is formed by an internal toothing of a second outer gear.

In the internal toothings of the two outer gears, the epicycle angle is measured in the opposite direction to the cycle angle and the equidistant is an outer equidistant.

In particular, the respective equidistant of the first toothing or of the second toothing may be an equidistant at a distance of the sum of a radius of the round engagement regions and a correction value, the correction value being dependent on a back lash. For cylindrical pins, the radius of the round engagement region is equal to the pin radius of the pins. For approximately cylindrical pins, the radius corresponds to a radius of a round engagement region of the pins. The correction value is greater than or equal to zero, in particular it can also be equal to zero. If the correction value is greater than zero, the correction factor corresponds to a fraction of the radius of the round engagement region, for example 5% or 10%.

According to an embodiment, the harmonic pin ring transmission may comprise a rolling bearing, which rests on the transmitter disk, wherein the cycle radius is equal to half the diameter of the rolling bearing. According to another embodiment, in which the round engagement regions of the pin ring rest directly on the transmitter disk, the cycle radius is equal to half the diameter of the transmitter disk. In this case, the transmitter disk may be rotatably mounted on an inner side.

In particular, the epicycle radius may be equal to half the eccentric offset by which the transmitter disk is offset with respect to the transmission central axis.

Different combinations of drive and output are possible for the HPD-E transmission. These options are available for both the HPD-E transmission and the HPD-F transmission. The drive shaft may be configured in particular as a rotor of an electric motor.

In particular, a drive shaft may be connected to the transmitter. In this case, an output shaft may be connected to either the first gear, the second gear or the pin ring. When the output shaft is connected to the first or the second gear, then the respective other gear is generally fixed to the housing or connected to the transmission housing.

When the output torque is received from the pins, this can for example be done by a can-shaped component comprising openings for inserting the pins. The can-shaped or cylindrical component can in turn be mounted on the transmission housing for stabilization. In this case, usually either the outer gear or the inner gear moves along with the pin ring, while the other gear is fixed to the transmission housing. It is also possible in this case to omit the wheel, which moves along only with the pin ring.

Furthermore, the present description discloses an inner gear for the "HPD-E transmission" with a single eccentric comprising a pin ring with round engagement regions. The inner gear comprises an external toothing, wherein geometric locations on the tooth surface of the external toothing are each determined by a radial distance from a central axis of the inner gear as a function of a cycle angle α (=symbol alpha).

The radial distance is in turn determined by an inner equidistant to a gear trajectory. Geometric locations on the gear trajectory are each determined by the vector sum of a cycle vector and an epicycle vector. In this case, a tail of the cycle vector lies on a central axis of the outer gear, and a tail of the epicycle vector lies in the tip of the cycle vector. Furthermore, the cycle vector and the epicycle vector or the epicycle vectors are located in a common plane which is perpendicular to the central axis.

The cycle angle and an epicycle angle of the epicycle vector are determined relative to a reference line which extends perpendicular to the central axis of the inner gear and through the central axis of the inner gear. This also applies to the cycle angles and epicycle angles mentioned below, which are determined relative to a reference line which extends perpendicular to the central axis of the respective gear and through the central axis of the respective gear. In the installed state of the gear or the inner or outer gear, this central axis coincides with the transmission central axis.

An epicycle angle of the epicycle vector is n times as large as the cycle angle, wherein the epicycle angle is measured in the same direction as the cycle angle and wherein n is a number of pins of the harmonic pin ring transmission greater than two. A number Z_inner of teeth of the inner gear is at least two and preferably one less than the number of pins. Thus, based on the number of teeth of the inner gear, the epicycle angle is (Z_inner+1) times as large as the cycle angle, with Z_inner being at least two.

A length of the cycle vector is greater than a length of epicycle vector. In particular, the radii or the lengths of the sum vectors may be selected such that the gear trajectory is non-retrograde, that is to say has no self-intersections.

This profile shape of the toothing of the inner gear can also be summarized by the following formula $$\vec{P} = \begin{pmatrix} r_1 * \cos(\alpha) + r_2 * \cos((n-1)*\alpha) + r_3 * \cos((n-3)*\alpha) \\ r_1 * \sin(\alpha) + r_2 * \sin((n-1)*\alpha) - r_3 * \sin((n-3)*\alpha) \end{pmatrix}$$

Furthermore, the present description discloses an outer gear for a harmonic pin ring transmission with a single eccentric wherein the pins preferably have a circular cross-section. The outer wheel comprises an internal toothing, wherein geometric locations on the tooth surface of the internal toothing are each determined by a radial distance from a central axis of the outer gear as a function of a cycle angle α.

The radial distance is in turn defined by an outer equidistant to a gear trajectory, the terms "inner equidistant" and "outer equidistant" being understood in relation to the distance from the respective central axis of the gear.

The geometric locations on the gear trajectory are each determined by the vector sum of a cycle vector and an epicycle vector, wherein a tail of the cycle vector lies on a central axis of the outer gear, and a tail of the epicycle vector lies in the tip of the cycle vector.

Furthermore, an epicycle angle of the epicycle vector is n times as large as the cycle angle, and the epicycle angle is measured in the opposite direction to the cycle angle, wherein n is a number of pins of the harmonic pin ring transmission greater than two. The number Z_outer of the teeth of the outer gear is preferably one greater than the number of pins. Thus, based on the number Z_outer of the teeth of the outer gear, the epicycel angle is (Z outside−1) times as large as the cycle angle, with Z_outer being at least four.

A length of the cycle vector is greater than a length of epicycle vector. In particular, the lengths of the vectors or the ratio of the vector lengths may be selected such that the gear trajectory has no self-intersections.

In the epicyclic construction, the length of the cycle vector determines the mean distance of the toothing from the central axis, i.e. the pitch circle while the length of the epicycle vector or the epicycle vectors determines the height of the teeth.

Preferably, the tooth geometry, i.e. the radial distance from the central axis of the gear, is independent of a position in the axial direction on the central axis. If pins are provided, a cross section of the pins is preferably independent of a position on the longitudinal axis of the pins. The cross section of the pins is preferably circular, but it may be other than circular. For example, the pins may comprise a slightly larger diameter in a circumferential direction of the pin ring than perpendicular thereto. Accordingly, a cross section of the round engagement regions is preferably independent of an axial position.

This profile shape of the toothing of the outer gear can also be summarized by the following formula:

$$\vec{P} = \begin{pmatrix} r_1 * \cos(\alpha) + r_2 * \cos((n+1)*\alpha) + r_3 * \cos((n+3)*\alpha) \\ r_1 * \sin(\alpha) - r_2 * \sin((n+1)*\alpha) + r_3 * \sin((n+3)*\alpha) \end{pmatrix}$$

In another aspect, the present description discloses an inner gear for a harmonic pin ring transmission with an oval transmitter or a double eccentric, wherein oval also refers to oval-like designs, for example with an elliptical shape. This transmission is also referred to as "HPD-F transmission".

The inner gear comprises an external toothing, wherein a tooth surface of the external toothing is determined by a radial distance from a central axis of the outer gear as a function of a cycle angle α. The radial distance from the central axis is in turn determined by an inner equidistant to a gear trajectory.

A geometric location on the gear trajectory is determined by the vector sum of a cycle vector, a first epicycle vector and a second epicycle vector. A tail of the cycle vector lies on the central axis of the inner gear, a tail of the first epicycle vector lies in the tip of the cycle vector, and a tail of the second epicycle vector lies in the tip of the first epicycle vector.

In a two epicycle design, the first epicycle vector is also referred to as a first order epicycle vector and the second epicycle vector is also referred to as a second order epicycle vector. Accordingly, the associated epicycles are also referred to as first or second order epicycles, respectively. In a design with only one epicycle, accordingly, only a first order epicycle is present.

Furthermore, an epicycle angle of the first epicycle vector is (n−1) times as large as the cycle angle and an epicycle angle of the second epicycle vector is (n−3) times as large as the cycle angle. Here, n is a number of pins of the harmonic pin ring transmission, which is greater than two, so at least three. The first epicycle angle is measured in the same direction as the cycle angle, and the second epicycle angle is measured in an opposite direction to the cycle angle. The inner gear comprises at least two teeth and preferably comprises two teeth less than the number of pins.

Thus, based on the number of teeth Z_inner of the inner gear, the first epicycle angle is (Z_inner+2−1)=(Z_inner+1) times as large as the cycle angle and the second epicycle angle is (Z_inner+2−3)=(Z_inner−1) times as large as the cycle angle, where Z_inner is at least two.

Here, a length of the cycle vector is greater than the sum of the lengths of the first epicycle vector and the second epicycle vector, and a length of the first epicycle vector is greater than a length of the second epicycle vector. In particular, the ratios of the lengths or radii should be chosen such that the gear trajectory has no self-intersections.

Furthermore, the present description discloses an outer gear for a harmonic pin ring transmission with an oval eccentric or a double eccentric or for a HPD-F transmission. The outer gear comprises an internal toothing, wherein geometric locations on the tooth surface of the internal toothing are each determined by a radial distance from a central axis of the outer gear as a function of a cycle angle α.

The radial distance is in turn defined by an outer equidistant to a gear trajectory, wherein geometric locations on the gear trajectory are in each case determined by the vector sum of a cycle vector, a first epicycle vector and a second epicycle vector.

A tail of the cycle vector lies on the central axis, a tail of the first epicycle vector lies in the tip of the cycle vector, and a tail of the second epicycle vector lies in the tip of the first epicycle vector.

Furthermore, an epicycle angle of the first epicycle vector is (n+1) is times as large as the cycle angle, and an epicycle angle of the second epicyclic vector is (n+3) times as large as the cycle angle. Here, n is a number of pins of the harmonic pin ring transmission, which is greater than three, that is at least four.

Preferably, the number Z_outer of the teeth of the outer gear is larger by two than the number of pins. Thus, based on the number Z_outer of the teeth of the outer gear, the first epicycle angle is (Z_outer−2+1)=(Z_outer−1) times as large as the cycle angle, and the second epicycle angle is (Z_outer−2+3)=Z_outer+1 times as large as the cycle angle, where Z_outer is at least 2+2+2=six in order to express this relationship with the minimum numbers.

The first epicycle angle is measured in an opposite direction to the cycle angle, and the second epicycle angle is measured in the same direction as the cycle angle. Furthermore, a length of the cycle vector is greater than the sum of the lengths of the first epicycle vector and the second epicycle vector, and a length of the first epicycle vector is greater than a length of the second epicycle vector. Preferably, the ratios of the lengths or radii is chosen such that the gear trajectory has no self-intersections.

Further, the present description discloses a harmonic pin ring transmission with an inner gear with the external toothing previously described with respect to the HPD-F transmission and an outer gear with the internal toothing previously described with respect to the HPD-F transmission.

Furthermore, the transmission comprises a pin ring with round engagement regions. In particular, the round engagement regions can be formed by pins or pin-like extensions, which preferably comprise a circular cross-section. A revolving transmitter is provided for drawing round engagement regions of the pin ring in the internal toothing of the outer gear and in the external toothing of the inner gear. The inner gear, the transmitter and the outer gear are arranged concentrically with each other and the transmitter is arranged radially inside the pin ring.

The pin ring or are the round engagement regions or the pins or pin-like extensions of the pin ring are arranged radially between the inner gear and the outer gear. The transmitter comprises an oval-shaped cam disk or a double eccentric. In operation, the cam disk or the double eccentric deforms the pin ring so that the outer gear and the inner gear rotate relative to each other.

In the configuration with a pair of an inner gear and an outer gear, the inner gear and the outer gear are arranged in a first axial plane. A portion of the pin ring, which corresponds to a pin retaining ring and which is in contact with the transmitter, is arranged in a second axial plane. Expediently, a further outer gear is provided in a third axial plane for supporting the pin ring, wherein the second outer gear has substantially the same dimensions and the same tooth shape as the first outer gear and wherein the toothing is aligned with that of the first outer gear. The second axial plane lies between the first and the third axial plane. These designs apply to both the HPD-E and the HPD-F transmission.

In another embodiment, the present description discloses a harmonic pin ring transmission having a first outer gear according to the previously with respect to the HPD-F described internal toothing and a second outer gear according to the previously with respect to the HPD-F described internal toothing.

In addition, the harmonic pin ring transmission comprises a pin ring with round engagement regions and a revolving transmitter for drawing the round engagement regions of the pin ring in the internal toothing of the first outer gear and in the internal toothing of the second outer gear.

In this transmission, the transmitter, the first outer gear and the second outer gear are arranged concentrically with each other, and the transmitter is arranged radially inside the pin ring. Other than in the above-described pair of inner gear and outer gear, the first outer gear and second outer gear are in different axial planes, and the pin ring, or a middle portion of the pin ring corresponding to a pin retaining ring, is arranged in the axial direction between the first outer gear and the second outer gear.

As with the HPD-E transmission, the HPD-F transmission also has various options for connecting a drive shaft and an output shaft.

Among others, a drive shaft may be connected to the transmitter. In this case, an output shaft may be connected to the pin ring. Furthermore, in the configuration with a pair of inner gear and outer gear, an output shaft may be connected to the inner gear or to the outer gear.

As with the HPD-E transmission described above, there are also various possibilities in the previously described HPD-F transmission to connect a drive shaft and an output shaft, wherein the drive shaft may be configured in particular as a rotor of an electric motor.

In the configuration with two outer gears, in particular one of the outer gears may be driven off and the other fixed to the housing. To this end, an output shaft may be connected to the output outer wheel. In the two outer gears configuration, there is no need to have an inner gear facing an outer gear in the radial direction. The respective nondriven off gears are expediently connected to the housing or fixed to the housing.

In the configuration with two outer gears, the second outer gear serves to receive the rotational motion from the pin ring. In this case, the number of teeth of the second outer gear may correspond to the number of round engagement regions of the pin ring in order to ensure a better engagement. In this case, the pin ring slightly twists because the number of teeth of the first outer gear is larger than the number of pins or of the round engagement regions of the pin ring.

Both in the arrangement with two outer gears and in the arrangement with a pair of inner gear and outer gear and a further outer gear, it is expedient to use a pin ring which comprises a central region, of which the pins, the pin-like extensions or the round engagement regions protrude on two opposite sides in the axial direction. In particular, if the pin ring is made of one piece, the round engagement regions may however also extend continuously from one side to the other.

The respective equidistant of the epicyclic construction may be an equidistant at a distance of the sum of a radius of the round engagement regions and a correction value, the correction value being determined by a back lash. In this case, the round engagement regions may be formed in particular by pins or pin-like extensions.

According to an embodiment, the transmitter of the previously described harmonic pin ring transmission comprises an oval shaped cam disk and a flexible rolling bearing, wherein oval in particular also includes oval-like. Oval-like shapes are, for example, the sinusoidal superimposed circular shapes resulting from a Taylor expansion of the ellipse equation.

The flexible rolling bearing rests on the oval shaped cam disk. The cycle radius for the respective epicyclic construction of the tooth shapes is equal to the sum of half a diameter of the flexible rolling bearing and a correction factor. The diameter of the flexible rolling bearing corresponds to a reference circle diameter of the pin ring or the pin arrangement formed by the pin ring in the undeformed state.

According to a further embodiment, the harmonic pin ring transmission comprises a first circular disk arranged eccentrically to a transmission central axis and a second circular disk arranged eccentrically to a transmission central axis. In this transmission, the cycle radius is equal to the sum of a mean radius of the envelope of the two eccentrically arranged circular disks and a correction factor. The envelope is the curve which is formed by the inner circumference of a traction mechanism such as a pin ring when the traction mechanism is clamped onto the circular disks.

According to another embodiment, the first epicycle radius is less than or equal to the sum of a half pin ring stroke and a second correction factor, the second correction factor being less than or equal to zero. The pin stroke is determined by the difference between the largest and the smallest radius of the flexible rolling bearing in the deformed state. In particular, the first epicycle radius may be greater than ¼ of the pin ring stroke, and in particular equal to ⅜ of the pin stroke.

The pin ring stroke is the stroke of the round engagement regions of the pin ring, i.e. the distance which the round engagement regions move in the radial direction when the pin ring is deformed by the transmitter.

According to a further embodiment, the length of the second epicycle vector is about one third of the length of the first epicycle vector, where "about" may refer in particular to a range of plus or minus 10% or 5%.

The tolerances of the transmission of the present description correspond to the usual technical tolerances for length dimensions and angular dimensions, such as DIN 7168 T1 or T2, or for toothing accuracy between pins and teeth, such as DIN 3961 or DIN 3976.

The tolerance values calculated according to a predetermined standard may be used in particular to determine whether a given toothing matches a toothing according to the present description within the tolerance. For this purpose, a normalized photographic view of a gear profile may be used or a gear measuring machine, such as a flank testing device which scans the gear surface mechanically or optically.

The tolerances can be related in particular to the tooth thickness or to the center distance. The corresponding fit systems are also called "unit center distance" or "unit tooth thickness" fit system. For example, a measured tooth profile may be considered coincident with a predetermined tooth profile according to the present description if a distance from a tooth flank does not exceed 5% or 1% of the predetermined tooth thickness.

The distance can be measured, for example, perpendicular to the tooth surface or as a distance in the direction of a central axis of the gear. Compliance with the tolerance can also apply in the static sense, for example, with a probability of 90% if a standard probability distribution such as a Gaussian curve is used. This can also be taken into account model-independent in that only a predetermined percentage of measuring points, for example 90%, needs to be within the tolerance limit. Therefore, it is assumed that a sufficient number of measuring points is distributed sufficiently evenly over the tooth surface in order to approximately detect the tooth profile.

The toothings are explained in more detail below with reference to the following FIGS. 94-118.

FIGS. 94 and 95 show, by way of example, two types of transmissions of harmonic pin ring transmissions, for which corresponding tooth geometries are disclosed in the present description.

FIG. 94 shows a harmonic pin ring transmission (HPRD-F) 510 with a cam disk and a deformable bearing resting thereon. The HPRD 510 comprises a rotor 513, which is supported on a transmission housing via a ball bearing (not shown here). An outer ring or outer gear 508, which is arranged concentrically outside the rotor 513, comprises a first outer gear toothing or outer toothing 506 formed as internal toothing on a first side.

The outer ring 508 is attached to a cylindrical housing part 509. If the outer ring is driven off, this housing part in turn is rotatably mounted on the transmission housing. A second outer gear toothing or outer toothing 506' formed as an internal toothing is formed on a second outer ring 508', which is inserted into the cylindrical housing part 509 on a side opposite the first side.

A first inner gear toothing or inner toothing 505 formed as an external toothing is formed on a periphery of an inner ring or inner gear 507 and arranged concentrically within the first outer toothing 506. Similarly, a second inner gear toothing or inner toothing 505' formed as an external toothing is formed on a periphery of a second inner ring 507' and arranged concentrically within the second outer toothing 506'.

The inner toothing 505, 505' and the outer toothing 506, 506' are arranged concentrically to a transmission central axis, wherein the inner toothing 505, 505' is rotatable about the transmission central axis. In other embodiments, the outer toothing 506, 506' or the outer and the inner toothing may be rotatable about the transmission central axis or the inner toothing may be attached to the transmission housing, depending via which toothing the output or the drive takes place.

A flexible thin section ball bearing 502 is mounted on a specially shaped flange 504 of the rotor shaft 513. The flange 504 forms a transmitter and may be formed, for example, as an oval, oval-like or sinusoidal superimposed circular shape.

Instead of a flange 504 formed on the rotor shaft 513, a correspondingly shaped disk or ring may be provided on the motor shaft.

Instead of a cam disk and a flexible bearing applied thereto, the transmitter in the transmission type of FIG. 94 may also have a so-called double eccentric, which is formed by two circular disks arranged eccentrically to the transmission central axis. The circular disks may be rotatably mounted about their respective axis of symmetry, wherein the pin ring is mounted on the circular disks. Alternatively, the circular disks may be attached to the rotating transmitter and a flexible rolling bearing may be mounted on the circular disks, wherein the pin ring rests on the roller bearing.

A flexible pin retaining ring 503 is disposed between the flexible thin section ball bearing 502 and the outer toothing 506, 506'. On an inner side, the flexible pin retaining ring 503 comprises grooves for receiving pins 501, which are arranged on the pin retaining ring 503 at regular intervals. The pins are cylindrically shaped and have a circular cross-section.

The pin retaining ring 503 is made flexible so that it can deform in accordance with an angular position of the flange 504. Due to the rigidity, the pin ring formed by the pin retaining ring 503 and the pins 501 acts both as a pulling means, which pulls the output transmission part, and as a pressure means, which pushes the output transmission part.

FIG. 94 shows a three-row arrangement in which a first pair 507, 508 of inner gear and outer gear is located in a first axial plane, a second pair 507', 508' of inner gear and outer gear is located in a second axial plane and a transmitter is located in a third axial plane located between the first axial plane and the second axial plane.

Likewise, a two and a half row arrangement with a pair of inner gear and outer gear and another outer gear is possible. This is advantageous, in particular in the case of a driven inner gear, because then the output of the second inner gear can generally not be led to the outside. In this case, in a three-row arrangement, the second inner gear only runs to support the pins.

For reasons of stability, it is advantageous if the pin ring is supported both inwardly and outwardly. However, both for an HPD-F transmission and for a HPD-E transmission, an arrangement with only two outer gears or with only two inner gears, which are arranged concentrically to the transmission central axis, is also possible, wherein one gear is fixed to the transmission housing and the other gear is rotatable. In these arrangements, the pin ring is arranged axially between the two inner gears or between the two outer gears and the pins engage in the respective inner gears or outer gears.

FIG. 95 shows an exploded view of a harmonic pin ring transmission 510' with a single eccentric disk, also referred to for brevity as "HPD-E" transmission. Components similar to those of FIG. 94 have the same reference numerals or reference numerals with an apostrophe "'". The HPD-E transmission 510' of FIG. 95 has a particularly simple design in which the inner gear comprises only 2 teeth and the outer gear comprises 4 teeth. In general, the outer gear always comprises two teeth more than the inner gear in this type of transmission.

In the transmission arrangement of FIG. 95, a two-toothed inner gear 505 is concentrically disposed within a first four-toothed outer gear 506' and concentric with a transmission central axis 515 in a first axial plane and a second outer gear 506 which is essentially identical to the first outer gear 506', is arranged concentrically with the transmission central axis 515 in a second axial plane. In a third axial plane lying axially between the first axial plane and the second axial plane, a disk 514 arranged eccentrically on the transmission central axis, and a pin retaining ring 503 are arranged. The eccentrically arranged disk 514 is arranged on a shaft (not shown here), which may be, for example, the rotor shaft of a motor.

The pin retaining ring 503 comprises three semicircular recesses 516, which at regular intervals on an inner circumference of the pin retaining ring 503. The three pins 501 are disposed in the semicircular recesses 516 such that they protrude from the pin retaining ring 503 on two opposite sides in the axial direction and project into the first and second axial planes, respectively, so as to engage the outer gear toothings 506, 506' and the inner gear toothing.

In a harmonic pin transmission with a single eccentric, the outer gear comprises 2 teeth more than the inner gear and the number of pins is the arithmetic mean of the numbers of teeth. In the simplest case, this results in a transmission with 2 inner gear teeth, 3 pins and 4 outer gear teeth, as shown in FIG. 95. In principle, the difference in the number of teeth can also be a multiple of two, but a smaller difference in the number of teeth results in higher reduction and better support of the torque.

A harmonic pin transmission with a single eccentric, in which a pin ring is pressed only at one blade location in the toothing of an outer gear, is hereinafter also referred to as "HPD-E transmission". In extended form, this term also refers to harmonic pin transmissions with multiple outer gears where only one such blade location is available per outer gear. In particular, this is the case when a common eccentric is provided for two or more outer gears, as in the embodiment of FIG. 2.

Figure 96:
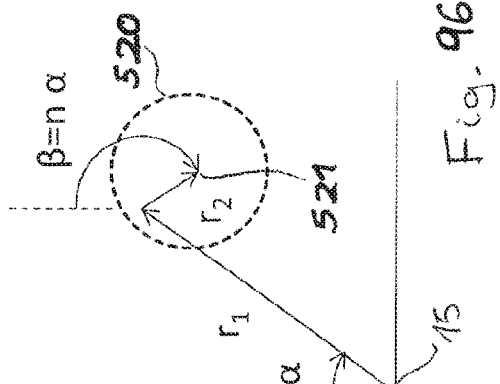
FIG. 96 shows an epicyclic construction for an inner gear toothing of an HPD-E transmission.
Figure 97:
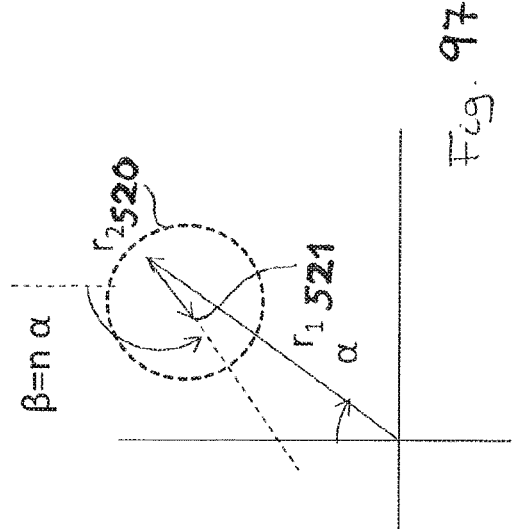
FIG. 97 shows an epicyclic construction for an outer gear toothing of an HPD-E transmission.
Figure 98:
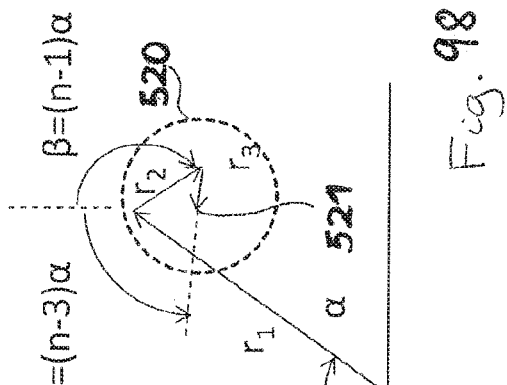
FIG. 98 shows an epicyclic construction for an inner gear toothing of an HPD-F transmission.
Figure 99:
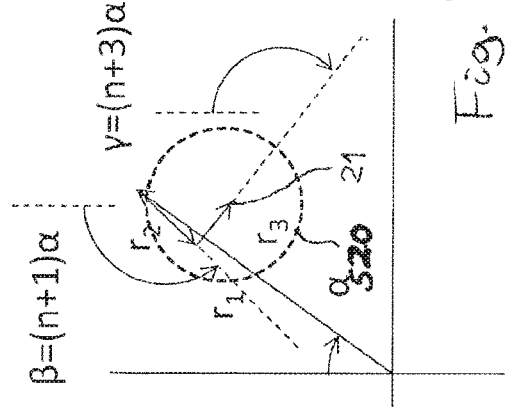
FIG. 99 shows an epicyclic construction for an outer gear toothing of an HPD-F transmission.

FIGS. 3 to 6 show epicyclic constructions for generating a tooth geometry according to the present description, wherein FIG. 96 refers to the inner gear toothing of the HPD-E transmission, FIG. 97 refers to the outer gear tooting of the HPD-E transmission, FIG. 98 refers to the inner gear toothing of the HPD-F transmission and FIG. 99 refers to the outer gear tooting of the HPD-F transmission. These epicyclic constructions are explained in more detail below.

In FIGS. 96 to 99, the cross section of a pin is symbolized by a circle 520 and the position vector of the gear trajectory is designated by the reference numeral 521. The circular pin cross section has its center in the position vector 521. When the cycle vector and the epicycle vector or the cycle vector and the two epicycle vectors revolve at the angle $\alpha$ according to the angle indications of FIGS. 95 to 99, the pin cross section 520 specifies two envelopes which define an inner and an outer equidistant to the gear trajectory and which determine the respective inner gear toothing and outer gear toothing of the transmission. In the angle indication, "n" denotes a pin number.

According to the present description, a gear trajectory is generated by an epicyclic construction, and from this gear trajectory in turn results the tooth geometry of the HPD-E transmission as an envelope of the circular pins or as equidistant, respectively.

The gear trajectory of an inner gear toothing of an HPD-E transmission results from the fact that a radius of a cycle rotates by 360 degrees about the transmission axis, while a radius of an epicycle rotates in the same direction by n*360 degrees relative to the reference system of the transmission axis, wherein n is the number of pins. On the other hand, relative to the connecting line from the point of origin to the center of the epicycle, the epicycle radius rotates by (n−1)*360 degrees, where n−1 is the number of teeth of the inner gear. The n−1 revolutions of the epicycle radius result in n−1 maxima and n−1 minima of the total radius, which correspond to the teeth and the recesses or tooth root surfaces in between.

Here, the radius r_1 of the cycle is equal to the radius of the bearing on which the pins rest plus the radius of the pins. This radius is also called "first-order radius". The radius r_2 of the epicycle is equal to half the pin radius. The tip of the epicycle describes the pin trajectory. An inner rolling curve results as the equidistant to the pin trajectory at a distance that results from the sum of the pin radius and a bearing clearance. This inner rolling curve is equal to the tooth geometry of the inner gear toothing.

The tooth shape of the outer gear toothing of the HPD-E transmission results from a similar construction whereby a radius of a cycle rotates by 360 degrees about the transmission axis, while a radius of an epicycle rotates in the opposite direction by n*360 degrees. On the other hand, relative to the connecting line from the point of origin to the center of the epicycle, the epicycle radius rotates by (n+1)*360 degrees, where n+1 is the number of teeth of the inner gear. The n+1 revolutions of the epicycle radius result in n+1 maxima and n+1 minima of the total radius, which correspond to the teeth and the recesses or tooth root surfaces in between.

Expressed in formulas, the gear trajectory of the HPD-E transmission is described by $$\overrightarrow{D_1D_2} = f(r_1; \alpha) = \begin{pmatrix} r_1 * \cos(\alpha) \\ r_1 * \sin(\alpha) \end{pmatrix}$$

$$\overrightarrow{D_2P} = g(r_2; \beta) = \begin{pmatrix} r_2 * \cos(\beta) \\ \pm r_2 * \sin(\beta) \end{pmatrix} = \begin{pmatrix} r_2 * \cos(n*\alpha) \\ \pm r_2 * \sin(n*\alpha) \end{pmatrix}$$

wherein the plus sign refers to the inner gear toothing and the minus sign to the outer gear toothing.

$$\vec{P} = \begin{pmatrix} x_P \\ y_P \end{pmatrix} = \begin{pmatrix} r_1 * \cos(\alpha) + r_2 * \cos(n*\alpha) \\ r_1 * \sin(\alpha) \pm r_2 * \sin(n*\alpha) \end{pmatrix} \quad (1)$$

This is a parameter representation of the gear trajectory with the parameter a. Since the normal of the trajectory is perpendicular to the tangent, the equidistant at distance d can be obtained from a parametric representation by the following formulas (2a) and (2b):

$$x_d(\alpha) = x(\alpha) \pm \frac{d * y'(\alpha)}{\sqrt{x'(\alpha)^2 + y'(\alpha)^2}} \quad (2a)$$

$$y_d(\alpha) = y(\alpha) \mp \frac{d * x'(\alpha)}{\sqrt{x'(\alpha)^2 + y'(\alpha)^2}} \quad (2b)$$

where the upper sign applies for the gear trajectory of the external toothing and the lower sign applies for the gear trajectory of the internal toothing when the angle is run through counterclockwise. Here, the symbol x' or y' means the respective derivative with respect to the angle.

In the specific case of the HPD-E transmission, this results in:

$$x_d(\alpha) = r_1 * \cos(\alpha) \pm r_2 * \cos(n*\alpha) +$$

-continued $$\frac{d*(r_1*\cos(\alpha) \pm nr_2*\cos(n*\alpha))}{\sqrt{r_1^2 + 2nr_1r_2(\sin(\alpha)\sin(n\alpha) \pm \cos(\alpha)\cos(n\alpha)) + n^2r_2^2}} =$$

$$r_1*\cos(\alpha) \pm r_2*\cos(n*\alpha) + \frac{d*(r_1*\cos(\alpha) \pm nr_2*\cos(n*\alpha))}{\sqrt{r_1^2 \mp 2nr_1r_2\cos((n\pm 1)\alpha) + n^2r_2^2}}$$

$$y_d(\alpha) = r_1*\sin(\alpha) \mp r_2*\sin(n*\alpha) - \frac{d*(nr_2*\sin(n*\alpha) + r_1*\sin(\alpha))}{\sqrt{r_1^2 \mp 2nr_1r_2\cos((n\pm 1)\alpha) + n^2r_2^2}}$$

The following boundary conditions apply to the HPD-E transmission:

$$n*d_{pin} < h(D_1; r_1)$$

$$0 < d_{pin} < r_1,$$

where h (D1, r1) is the perimeter length of the pin ring.

For example, for an HPD-E transmission, the following values of Table 1 may be given concretely.

| Variable | Amount | Unit | Meaning/Purpose |
|---|---|---|---|
| n | 58 | 1 | Number of pins |
| tkpin | 103 | mm | Reference circle diameter of the pin arrangement |
| dpin | 3 | mm | Diameter of a pin |
| Exver | 0.75 | mm | Eccentric offset of the pin arrangement |
| Bzinner | 3 | mm | Inner width of gear |
| Bzouter | 3 | mm | Outer width of gear |
| Lpin | 3 | mm | Length of pin |
| Gsi | 0.0 | mm | Additional inner back lash between pin and gear |
| Gsa | 0.0 | mm | Additional outer back lash between pin and gear |

From the first four values n, tkpin, dpin and Exver, the following derived values of Table 2 result:

| Variable | Amount | Unit | Formula | Meaning/Purpose |
|---|---|---|---|---|
| r1i | 51.5 | mm | tkpin/2 | Radius of the cycle |
| r1a | 51.5 | mm | tkpin/2 | Radius of the cycle |
| r3 | 0.75 | mm | Exver | Radius of the epicycle |
| tpin | 5.579 | mm | tkpin*π/n | Pitch of the pins (tangential) |
| Z_inner | 148 | 1 | n − 1 | Inner number of teeth |
| Z_outer | 152 | 1 | n + 1 | Outer number of teeth |
| i1 | 37 | 1 | Z_inner/2 | Transmission with fixed outer gear |
| i2 | 38 | 1 | Z_outer/2 | Transmission with fixed inner gear |

Similar to what has been done above for an HPD transmission with eccentric, for an HPD transmission with oval cam disk and deformable bearing, the tooth geometry can be obtained by an epicyclic construction, but by using first and second order epicycles. Such a transmission is also referred to as "HPD-F" transmission for the sake of brevity.

For the internal toothing of the HPD-F transmission, the gear trajectory results as a superposition of a cycle with radius r_1, a first order epicycle with radius r_2 and a second order epicycle with radius r_3. Here, the first order epicycle rotates (n−1) times as fast in the same direction as the cycle and the second order epicycle rotates (n−3) times as fast and in opposite directions to the cycle.

$$\overrightarrow{D_1D_2} = f(r_1; \alpha) = \begin{pmatrix} r_1*\cos(\alpha) \\ r_1*\sin(\alpha) \end{pmatrix}$$

$$\overrightarrow{D_2D_3} = g(r_2; \beta) = \begin{pmatrix} r_2*\cos(\beta) \\ r_2*\sin(\beta) \end{pmatrix} = \begin{pmatrix} r_2*\cos((n-1)*\alpha) \\ r_2*\sin((n-1)*\alpha) \end{pmatrix}$$

$$\overrightarrow{D_3P} = h(r_3; \gamma) = \begin{pmatrix} r_3*\cos(\gamma) \\ -r_3*\sin(\gamma) \end{pmatrix} = \begin{pmatrix} r_3*\cos((n-3)*\alpha) \\ -r_3*\sin((n-3)*\alpha) \end{pmatrix}$$

As a superposition of these three movements, the gear trajectory of the inner toothing of the HPD-F transmission results in:

$$\vec{P} = \begin{pmatrix} x_P \\ x_P \end{pmatrix} = \begin{pmatrix} r_1*\cos(\alpha) + r_2*\cos(\beta) + r_3*\cos(\gamma) \\ r_1*\sin(\alpha) + r_2*\sin(\beta) - r_3*\sin(\gamma) \end{pmatrix} \quad (3)$$

and thus $$\vec{P} = \begin{pmatrix} r_1*\cos(\alpha) + r_2*\cos((n-1)*\alpha) + r_3*\cos((n-3)*\alpha) \\ r_1*\sin(\alpha) + r_2*\sin((n-1)*\alpha) - r_3*\sin((n-3)*\alpha) \end{pmatrix}$$

For the simplest case with 2 internal teeth, 4 pins and 6 external teeth, the gear trajectory of the inner toothing results in:

$$\vec{P} = \begin{pmatrix} x_P \\ x_P \end{pmatrix} = \begin{pmatrix} r_1*\cos(\alpha) + r_2*\cos(3*\alpha) + r_3*\cos(\alpha) \\ r_1*\sin(\alpha) + r_2*\sin(3*\alpha) - r_3*\sin(\alpha) \end{pmatrix} =$$

$$\begin{pmatrix} (r_1+r_3)*\cos(\alpha) + r_2*\cos(3*\alpha) \\ (r_1-r_3)*\sin(\alpha) + r_2*\sin(3*\alpha) \end{pmatrix}$$

For the values of r_1, r_2 and r_3, the following values may be used in particular: r_1 can correspond to half the diameter or half the diameter of the reference circle of the undeformed pin arrangement, r_2 can correspond to three eighths of the pin stroke and r_3 to one third of the radius r_2. The pin stroke is again given by the difference between the largest and the smallest radius of the cam disk.

According to another embodiment, correction terms are inserted, which are determined by parameters a and b. According to this correction, the radius r_1 is replaced by the effective radius r_1+(a+b)/2 and the radius r_2 is replaced by the effective radius r_2−(b−a)/2. Taking this correction into account results in:

$$\vec{P}(x, y, a, b) = \quad (4)$$

$$\begin{pmatrix} r_{1,eff}*\cos(\alpha) + r_{2,eff}*\cos((n-1)*\alpha) + r_3*\cos((n-3)*\alpha) \\ r_{1,eff}*\sin(\alpha) + r_{2,eff}*\sin((n-1)*\alpha) - r_3*\sin((n-3)*\alpha) \end{pmatrix}$$

wherein $$r_{1,eff} = r_1 + (a+b)/2$$

and $$r_{2,eff} = r_2 - (b-a)/2.$$

Like with the HPD-E transmission mentioned above, the tooth geometry results as an equidistant to the gear trajectory at the distance of the pin radius, to which a positive correction factor may be added to account for a back lash.

Accordingly, external toothing results as a superposition of a cycle with radius r_1, a first order epicycle with radius r_2 and a second order epicycle with radius r_3. Here, the first order epicycle rotates (n+1) times as fast and in opposite directions to the cycle and the second order epicycle rotates (n+3) times as fast in the same direction as the cycle.

Thus, the following formula results for the gear trajectory of the external toothing of the HPD-F transmission:

$$\vec{P} = \begin{pmatrix} x_p \\ y_p \end{pmatrix} = \begin{pmatrix} r_1 * \cos(\alpha) + r_2 * \cos(\beta) + r_3 * \cos(\beta) \\ r_1 * \sin(\alpha) - r_2 * \sin(\beta) + r_3 * \sin(\gamma) \end{pmatrix} = \quad (5)$$

$$\begin{pmatrix} r_1 * \cos(\alpha) + r_2 * \cos((n+1)*\alpha) + r_3 * \cos((n+3)*\alpha) \\ r_1 * \sin(\alpha) - r_2 * \sin((n+1)*\alpha) + r_3 * \sin((n+3)*\alpha) \end{pmatrix}$$

The above-mentioned correction terms also apply accordingly to the gear trajectory of the external toothing so that the following formula results:

$$\vec{P}(x, y, a, b) = \quad (6)$$

$$\begin{pmatrix} r_{1,\text{eff}} * \cos(\alpha) + r_{2,\text{eff}} * \cos((n+1)*\alpha) + r_3 * \cos((n+3)*\alpha) \\ r_{1,\text{eff}} * \sin(\alpha) - r_{2,\text{eff}} * \sin((n+1)*\alpha) + r_3 * \sin((n+3)*\alpha) \end{pmatrix}$$

The following conditions apply for the ratio of the epicycle radius and the pin radius as well as for the ratio of the epicyclic trajectory of the first order epicycle to the pin diameter:

$$0 < r_{pin} < 2 * r_2$$

$$n * d_{pin} < f(r_1; r_2; \alpha; \beta)$$

Thus, r_2 is always greater than half the pin radius and f is always greater than the n-fold pin diameter, which is a lower limit for the circumference of the pin ring.

For example, the following values of Table 3 may be given concretely for an HPD-F transmission.

| Variable | Amount | Unit | Meaning/Purpose |
|---|---|---|---|
| n | 150 | 1 | Number of pins |
| tkPnom | 111.5 | mm | Reference circle diameter of the pin arrangement nominal (undeformed) |
| dpin | 1.4 | mm | Diameter of a pin |
| Stroke | 1.29 | mm | Stroke of the pins (from transmission center) |
| aedFL | 12.5 | mm | equidistant flexible bearing (outer contour to cam disk) |
| bFL | 13 | mm | Width flexible bearing |
| kwKS | 0 | mm | Correction value cam disk (for compensation of backlash in flexible ball bearing and deformation of the cam disk) |
| Bzinner | 2.9 | mm | Inner width of gear |
| Bzouter | 3 | mm | Outer width of gear |
| Lpin | 3 | mm | Length of pin |
| a | 0.03 | mm | Tooth correction a, adaption with respect to major axis and shaping under load |
| b | 0.07 | mm | Tooth correction b, adaption with respect to minor axis and shaping under load |
| Gsi | 0.0 | mm | Additional inner back lash between pin and gear |
| Gsa | 0.0 | mm | Additional outer back lash between pin and gear |

From the first five values n, tkPnom, dpin, Hub and aedFl of the above table, the following derived values of Table 4 result for the HPD-F transmission:

| Variable | Amount | Unit | formula | Meaning/Purpose |
|---|---|---|---|---|
| daLnom | 110.1 | mm | tkPnom − dPin | Outer diameter flexible bearing nominal, undeformed) |
| diLnom | 85.1 | mm | daLnom − 2 aedfl | Inner diameter flexible bearing (nominal, undeformed) |
| KSA | 86.39 | mm | diLnom + Stroke | Cam disk, major axis "A" |
| KSa | 83.81 | mm | diLnom − Stroke | Cam disk, minor axis "a" |
| r1 | 55.75 | mm | tkPnom/2 | Radius of the cycle |
| r2 | 0.484 | mm | Hub*3/8 | Radius of the first order epicycle |
| r3 | 0.161 | mm | r2/3 | Radius of the second order epicycle |
| tpin | 2.335 | mm | tkPnom*π/n | Pitch of the pins (tangential) |
| Zinner | 148 | 1 | n − 2 | Inner number of teeth |
| Zouter | 152 | 1 | n + 2 | Outer number of teeth |
| i1 | 37 | 1 | Zinner/4 | Transmission with fixed outer gear |
| i2 | 38 | 1 | Zouter/4 | Transmission with fixed inner gear |

A trajectory formed by the pin centers of the HPD-F transmission is derived from the sinusoidal superimposed circular form formed by the following two vectors $$\overrightarrow{D_1 D_2} = f(r_1; \alpha) = \begin{pmatrix} r_1 * \cos(\alpha) \\ r_1 * \sin(\alpha) \end{pmatrix}$$

$$\overrightarrow{D_2 M_{Pin}} = h(r_2 + r_3; \beta) = \begin{pmatrix} (r_2 + r_3) * \cos(3\alpha) \\ (r_2 + r_3) * \sin(3\alpha) \end{pmatrix}$$

The trajectory of the pin center points is obtained by adding the two vectors:

$$\begin{pmatrix} x_{M\_Pin} \\ y_{M\_Pin} \end{pmatrix} = \begin{pmatrix} r_1 * \cos(\alpha) + (r_2 + r_3) * \cos(3\alpha) \\ r_1 * \sin(\alpha) + (r_2 + r_3) * \sin(3\alpha) \end{pmatrix} \quad (7)$$

For the HPD-E transmission, the trajectory of the pin center points is a circle with the radius r1, which is offset by half the pin stroke or by the eccentric offset in relation to the transmission central axis 515. The respective trajectory of the pin center points rotates at the speed of the input shaft around the transmission central axis 515 with a driven transmitter. This also results in the trajectory of the individual pins, which rotate around this rotating trajectory with the angular velocity of the output transmission part.

FIGS. 7-10 show the generation of a gear trajectory and an equidistant thereto for an inner gear toothing of an HPD-E transmission with 2 inner gear teeth and 4 outer gear teeth. Similarly, FIGS. 11-14 show the generation of a gear trajectory and an equidistant thereto for an outer gear toothing of the HPD-E transmission.

The tooth surface of the inner gear toothing is generated by an equidistant 519 to a gear trajectory 518 at a distance of half a pin radius. In FIGS. 100-103, the cross section of a pin is symbolized by a circle 520. Here, the inner equidistant, which is closer to the transmission central axis 515 is meant by equidistant.

A location 21 on the gear trajectory 518 is given, as also shown in FIG. 96, as the sum or superimposition of the cycle vector with the epicycle vector.

The tooth surface of the external gear toothing is generated by an equidistant 519 to a gear trajectory 518 at a distance of half the pin radius. In FIGS. 104-107, the cross section of a pin is symbolized by a circle 520. Here, the outer equidistant, which is farther away from the transmission central axis 515 is meant by equidistant.

FIG. 108 shows a tooth geometry for an inner gear and an outer gear obtained for the HPD-E transmission with three pins using the following parameters of Table 5.

| Variable | Amount | Meaning |
| --- | --- | --- |
| dbearing | 50 mm | Diameter of the bearing |
| dpin | 20 mm | Pin diameter |
| Exver | 5 mm | Eccentric offset |
| Stroke | 10 mm | Pin stroke (= Exver x 2) |
| Tkpin | 70 mm | Pin pitch circle |

The cycle radius is set at 0.5*(dbearing+dpin)=35 mm and the epicycle radius is set equal to the eccentric offset Exver 5 mm.

FIGS. 16 to 18 show various views of the HPD-E transmission 510' with 3 pins shown in exploded view in FIG. 95.

Figures 109, 110:
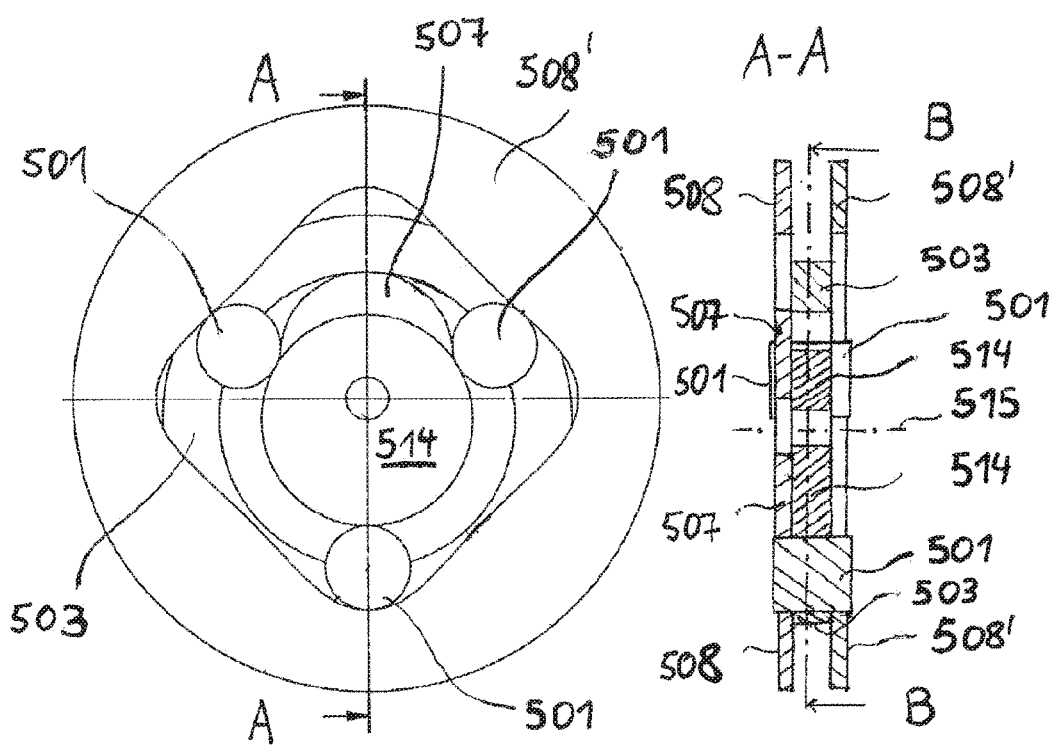
FIG. 109 is a top view of the transmission of FIG. 95 on the output side.
FIG. 110 shows a cross-sectional view of the transmission of FIG. 2.

FIG. 109 shows a top view of the HPD-E transmission 510' from the side of the eccentric 514.

FIG. 107 shows a cross-sectional view through the HPD-E transmission 510' along the cross-sectional line A-A shown in FIG. 16.

Figure 111:
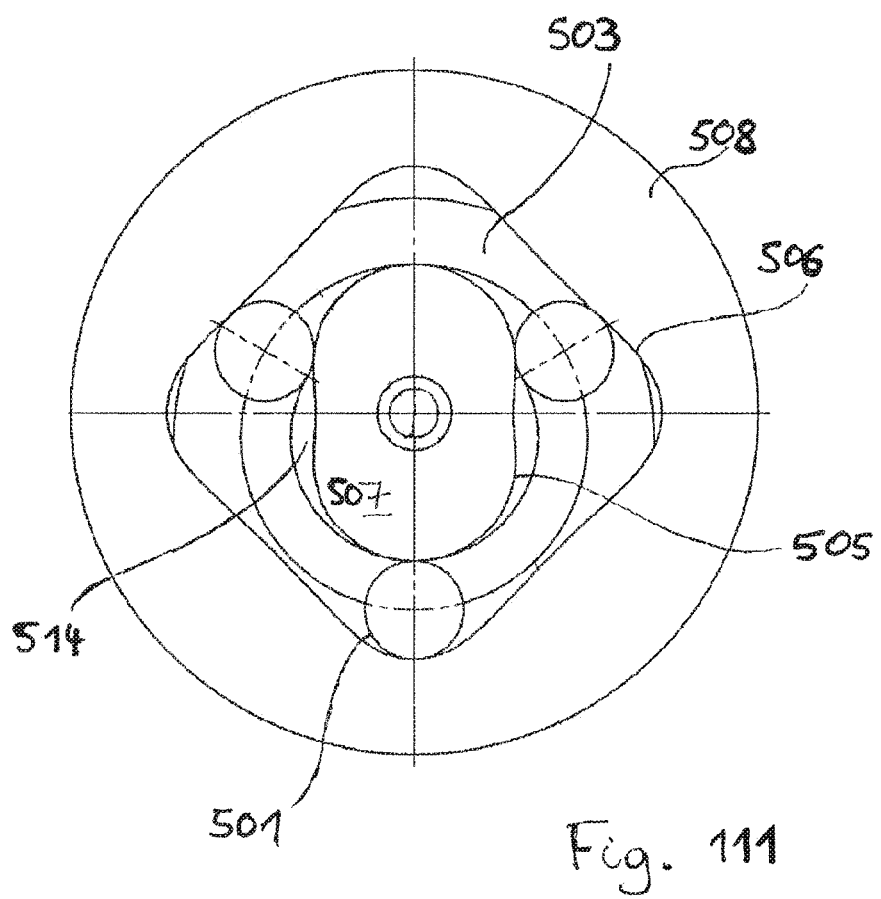
FIG. 111 is a top view of the transmission of FIG. 95 on the drive side.

FIG. 111 shows a top view of the HPD-E transmission 510' from the side of the inner gear 507.

Figure 112:
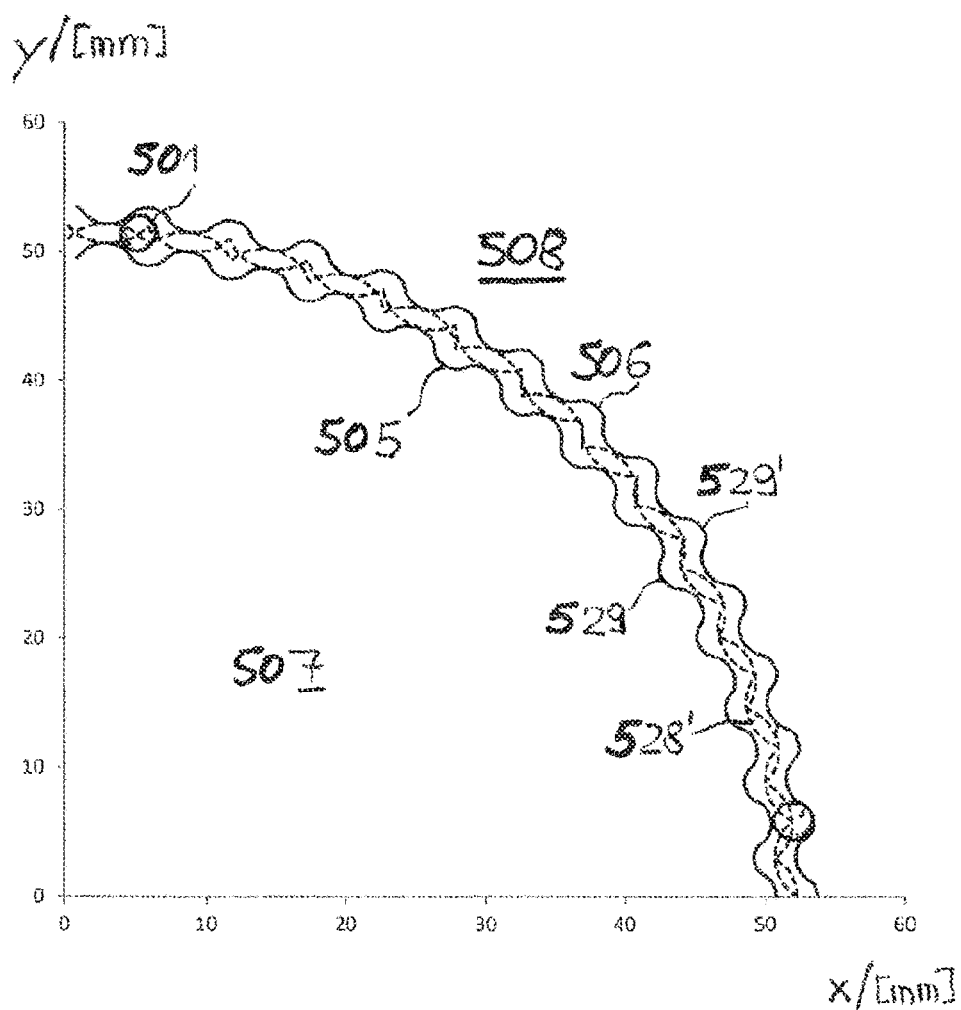
FIG. 112 shows a toothing geometry for another HPD-E transmission with 55 pins and the associated gear trajectories according to the construction of FIG. 96 and FIG. 97.

FIG. 112 shows another tooth geometry that results for the HPE-E transmission with 58 pins with the parameters given above. Here, the inner gear toothing results from the equidistant 529 to the gear trajectory 528 of the inner gear and the outer gear toothing from the equidistant 529' to the gear trajectory 528' of the outer gear.

Figure 113:
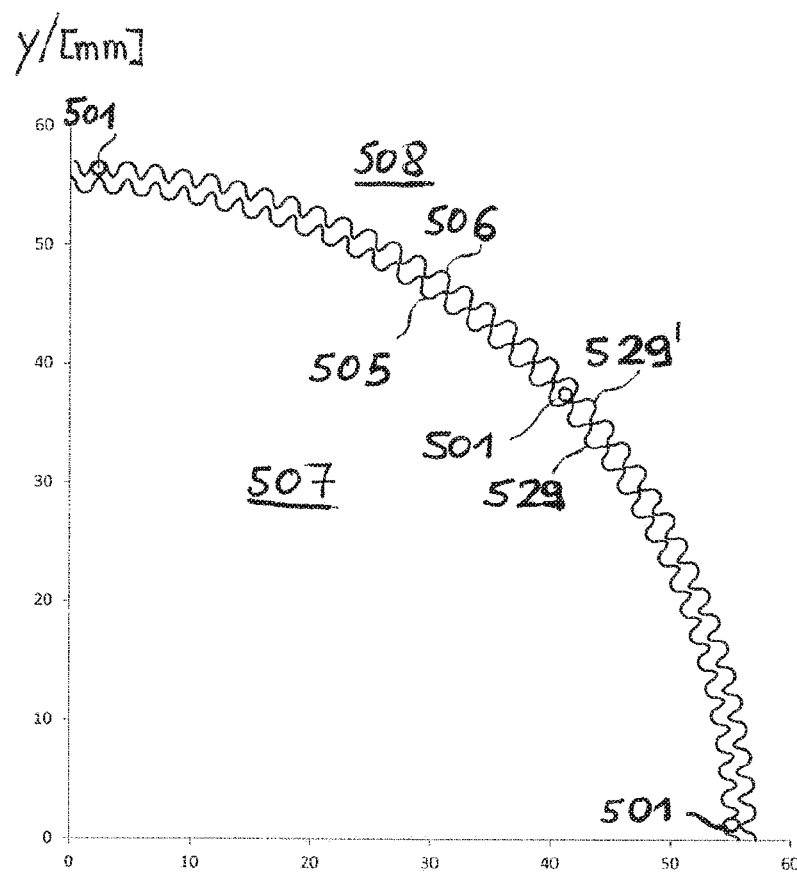
FIG. 113 shows a toothing geometry for a HPD-F transmission with 150 pins according to the construction of FIG. 98 and FIG. 99.

FIG. 113 shows another tooth geometry that results for the HPD-F transmission with 150 pins with the parameters given above. Here, for reasons of clarity, the associated gear trajectories are not shown, but only the equidistants 529, 529', which define the tooth geometry.

For illustration, two pins 1 of the total of 58 pins are shown in FIG. 112 and in FIG. 113 three pins 1 of the total of 150 pins are shown. The respective center point of the pins 1 is in the vicinity of intersections of the gear trajectory 528 of the inner gear and the gear trajectory 528' of the outer gear, as can be seen in FIG. 112.

Figure 114:
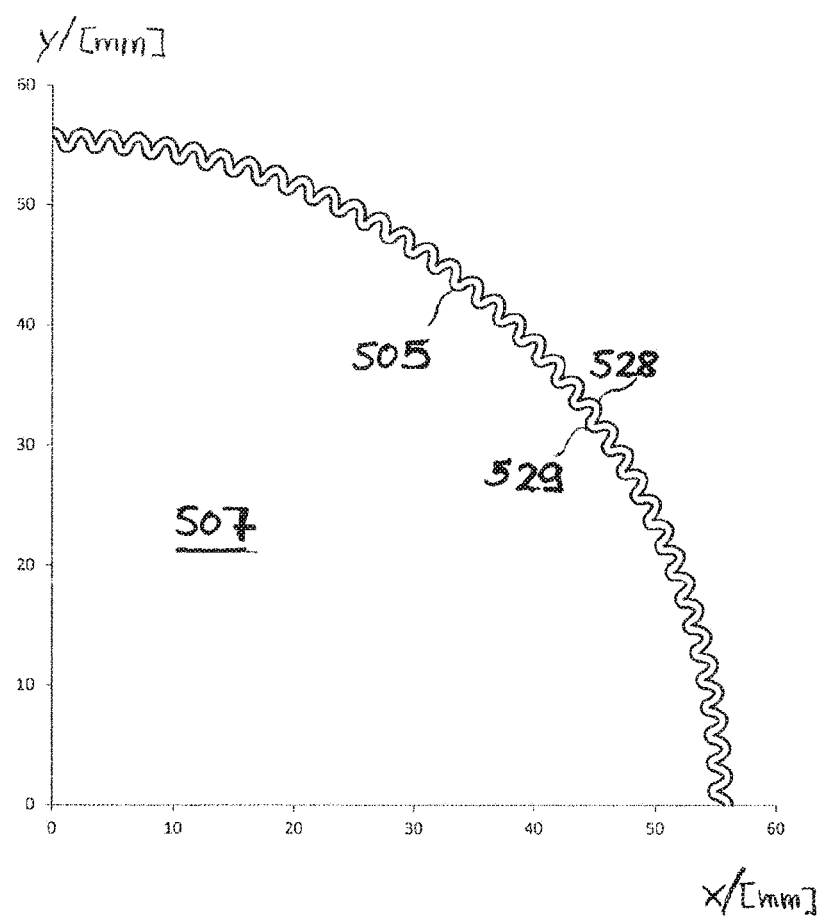
FIG. 114 shows a toothing geometry of the inner gear toothing of FIG. 113 and the associated gear trajectory.

FIG. 114 shows a gear trajectory 528 of the inner gear of the transmission of FIG. 113 and the associated equidistant 529.

Figure 115:
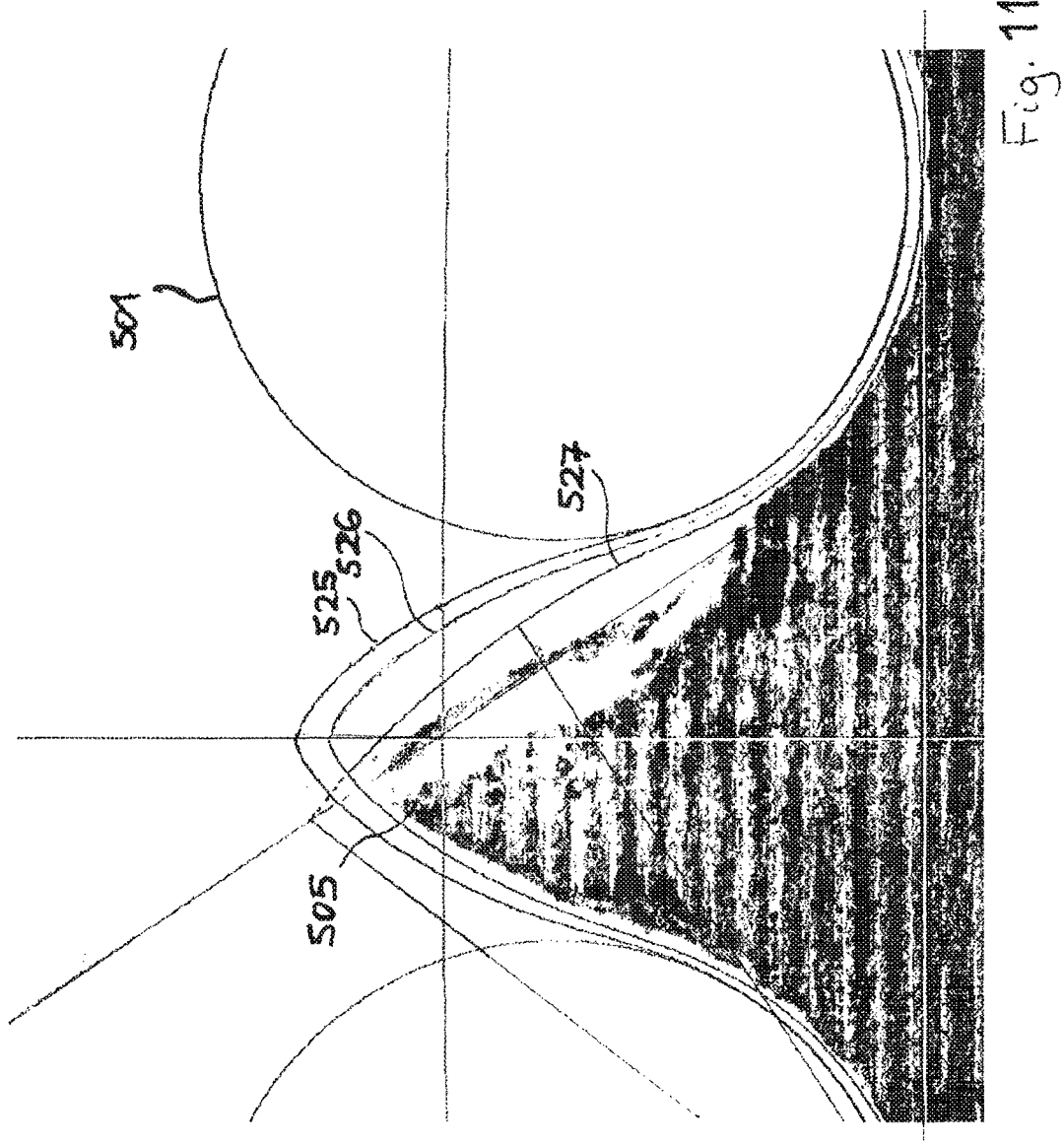
FIG. 115 shows a worn out toothing of a transmission according to FIG. 94 and an accordingly adapted tooth geometry.

FIG. 115 shows a zero contour 525 of a toothing which was manufactured according to an epicyclic construction without corrections, a worn out toothing 527 after 147 hours of operation and a corrected toothing 526 in which the effect of shrinkage is already taken into account by a provision. During the running in of the transmission, the torque was transmitted only in one direction, so that the wear took place predominantly on the right-hand tooth flank. For better illustration, FIG. 115 contains additional auxiliary lines, such as the root circle or the symmetry axis of the zero contour 525.

This provision can be taken into account, for example, by the correction factors a and b given above for the HPD-F transmission. The correction is particularly relevant for the toothing of the HPD-F transmission, as it results in more pointed tooth shapes, which change more due to the rounding off during the operation than the rounder tooth form of the HPD-E transmission The one-sided stress on the tooth flanks, as in the example of FIG. 22, is typically given in a vehicle drive. If there is a one-sided stress, it may be useful to apply an asymmetric correction. In the epicyclic construction, this can be considered by an angle-dependent radius of an epicycle or the epicycles, wherein the epicycle radius is chosen such that for the inner gear toothing, a smaller radius is obtained and for the outer gear toothing a larger radius is obtained when a starting angle is reached, wherein the starting angle lies before the tooth center in the selected direction of rotation.

This radius is then continuously approximated to the radius of the zero contour 525 until an end angle is reached, wherein the end angle can be given in particular by the angular position of the tooth base. For example, the difference between the epicycle radius of the zero curve and the corrected curve may decrease to zero according to a linear function, a polynomial, a Gaussian curve, an exponential function, or an angular function.

Figure 116:
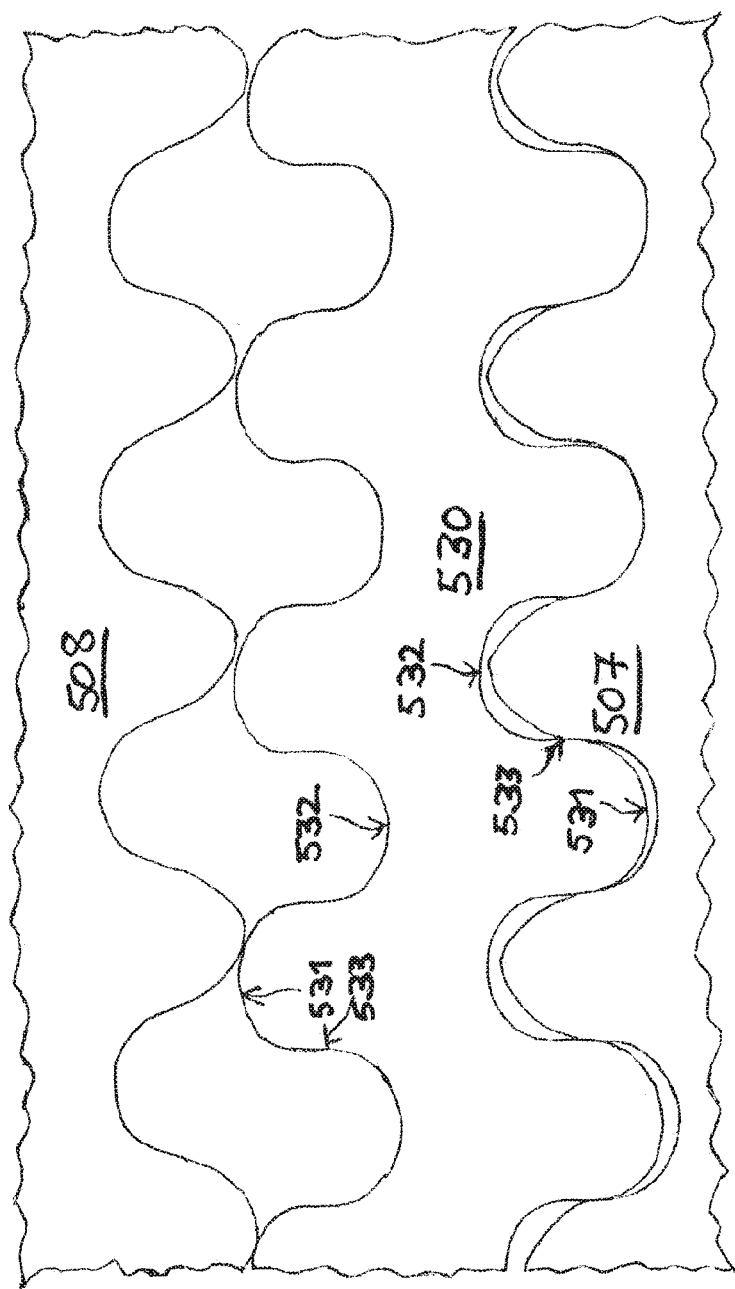
FIG. 116 shows a detail of an HPD-F transmission with a toothing according to the epicyclic constructions shown in FIGS. 98 and 99 and an integrally formed pin ring.

In a two and a half row transmission arrangement with two outer gears and only one inner gear, as shown for example in FIG. 95, a larger force is transmitted to the inner gear than to the outer gear. As a result, more wear occurs on the inner gear. For this reason, it may be useful to provide the correction only for the inner gear toothing. Furthermore, it may be useful to manufacture the inner gear of a harder material than the two outer gears. For example, the inner gear may be made of steel and the outer gear or the outer gears of plastic. Suitable materials include, for example, chromium-molybdenum steel and polyamide. FIG. 116 shows a detail of an HPD-F transmission with a toothing according to the epicyclic constructions shown in FIGS. 98 and 99 and an integrally formed pin ring 530. Unlike the embodiment of FIG. 113, the traction mechanism is not formed by cylindrical pins 501 inserted in an elastic pin retaining ring 503 but by an integrally formed pin ring 530. The integrally formed pin ring 530 comprises an internal toothing and external toothing in which the tooth tips are round in a force transmitting region.

Instead of the pins 501, the integrally formed pin ring 530 comprises an internal toothing and an external toothing, wherein the internal toothing and the external toothing each comprise segment of circle like outer regions or teeth 531 and segment of circle like inner regions or tooth bases 532, which are interconnected by transition regions 533.

A tooth base 532 of the outer toothing of the pin ring 530 is in each case opposite a tooth 531 of the inner toothing and a tooth 531 of the inner toothing is in each case opposite a tooth base 532 of the outer toothing. The number of teeth 531 of the outer and the inner toothing corresponds to the number of pins in the embodiment of FIG. 113. Thus, the toothings of the pin ring 530 each comprise two teeth more than the inner gear and two teeth less than the outer gear.

The integral pin ring 530 is formed from an elastic material such as rubber, plastic or metal or a composite elastic material. In particular, it may be formed by milling from an annular element. The pin ring 530 may also be used for an HPD-E transmission, wherein the number of teeth is one greater than the number of teeth of the inner gear and one smaller than the number of teeth of the outer gear.

FIG. 117 shows a tolerance range 535 defined by an inner envelope curve 533 and an outer envelope curve 534 of a predetermined tooth profile 536. According to a first measurement method, a tooth profile 537 to be measured is considered to coincide with the predetermined tooth profile

536 if it lies within the envelopes 536, 537, which have the distance A (delta) from the predetermined tooth profile 536.

The distance A may, for example, be a fraction of a tooth width s, a fraction of a tooth pitch p, a fraction of a distance r from a central axis of the gear or predetermined absolutely. In this case, the tooth width s, for example, may be measured halfway between the tooth base and tooth tip or at the level of the inflection points of the profile curve 536. Depending on the dimension of the toothing, the value delta can be, for example, 0.5 mm, 0.2 mm or 0.08 mm, or it can be, for example, 5%, 1%, 0.5% or 0.2% of the tooth width s.

According to a further comparison method, a comparison value is determined by an average of the distances to the given profile at predetermined measuring points, for example as an arithmetic mean value or as a quadratic mean value. Depending on the dimension of the toothing, for example, a comparison value of <=0.5 mm, <=0.2 mm or <=0.08 mm can be regarded as a good match with the predetermined profile 536. The distance may be measured in particular perpendicular to the predetermined profile curve 536. Further comparison methods can be taken from the industrial standards given above.

In particular, the predetermined tooth profile 536 may be a tooth profile given according to the present description, which is predefined by the equations (1), (3) or (5) given above, for example. Equations (1), (3) and (5) describe an array of curves of profile curves from which the profile curve is to be selected in which a comparison value between the toothing to be measured and the selected profile curve is minimized under the given boundary conditions. For example, boundary conditions, which are determined from the toothing to be measured, can already specify the sum of the radii and the number n in the argument of the trigonometric functions.

In this approach, further deviations of the measured toothings compared to the predetermined toothing, such as flank line deviations, pitch deviations, and runout remain unconsidered. This can be achieved, inter alia, by comparing only individual teeth in a given side view or by including such deviations in the measured deviation.

FIG. 118 shows a tolerance range 535' of a tooth profile defined by profile displacements. An outer curve 536' is given by the profile 536 displaced outward by the distance delta in the radial direction, and an inner curve 535' is given by the profile 536 displaced inwards in the radial direction by the distance delta.

As with the example of FIG. 117, a tooth profile to be measured may be considered consistent with the given profile if it is located at all measurement points or statistically, for example for 95% of all measurement points, within the tolerance range defined by the outer curve 536' and the inner curve 535'.

According to a bearing concept of the present description, which relates in particular to the bearing of the rotor shaft, an output element and an output shaft connected thereto, three bearings are provided, on which the aforementioned components are mounted in the housing. In particular, the output element and the output shaft are configured such that they are supported by two diagonally opposite bearings inwardly relative to the rotor shaft and outwardly relative to the housing.

In addition, if there is a pedal shaft supported by two further bearings in the rotor shaft, the three-bearing arrangement expands to a five-bearing arrangement. In this case, the hollow output shaft connected to the output element forms an outer hollow output shaft, which is connected via an outer freewheel with a further hollow output shaft. Furthermore, the pedal shaft is connected to the hollow output shaft via an inner freewheel, wherein a speed-up transmission, such as by the planetary gears shown in FIGS. 67 to 76, may be switched between the pedal shaft and the output shaft.

Advantageously, the inner gear and the output shaft may be made of one piece by two interconnected hollow shafts, wherein the hollow output shaft comprises a smaller diameter than the inner gear. An inner bearing may then be disposed on an inner shoulder of the hollow output shaft and a diagonally opposite outer bearing may be disposed on an outer shoulder of the hollow output shaft, wherein the outer shoulder is located in the connection region between the inner gear and the hollow output shaft.

In the present description, ball bearing may also be used generally for a rolling bearing. Roller bearings may be used in particular for bearings that serve for support. For the bearing of the reduction gear, which is arranged on the cam disk or eccentric disk, a ball bearing with balls is preferably used, but a roller bearing can also be used.

Figure 119:
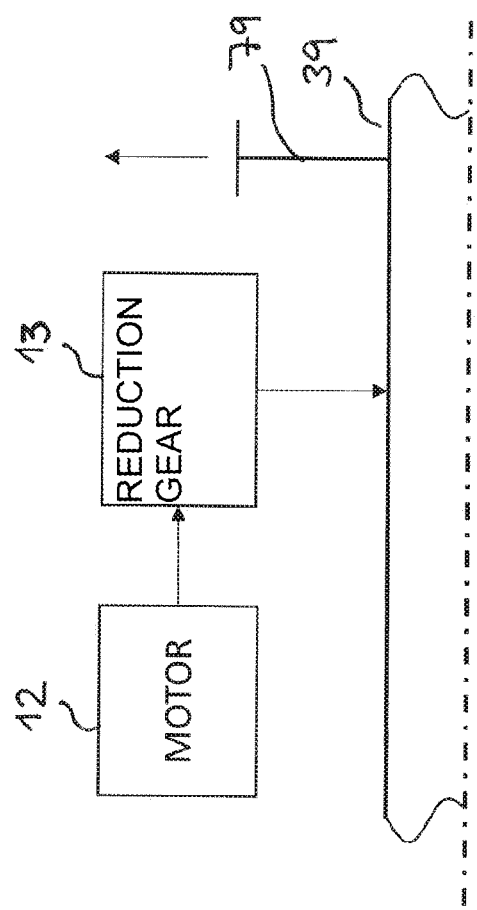
FIG. 119 shows a schematic drawing of a first drive.

FIG. 119 shows a schematic drawing of a first drive.

In this drive, a drive torque is transmitted from a motor to a reduction gear and from there to an output shaft, wherein the reduction gear is a transmission of the types described in the present specification, as indicated for example in the schematic drawings 121-124.

In particular, the motor may be an electric motor such as a three-phase external rotor motor. All of the reduction gears mentioned in the present description can also be installed in a motor gear unit without a crankshaft, as shown in FIG. 119, for example in a geared motor. In this case, the components arranged on the pedal shaft are eliminated. Such a design is suitable for example for a robot arm.

Figure 120:
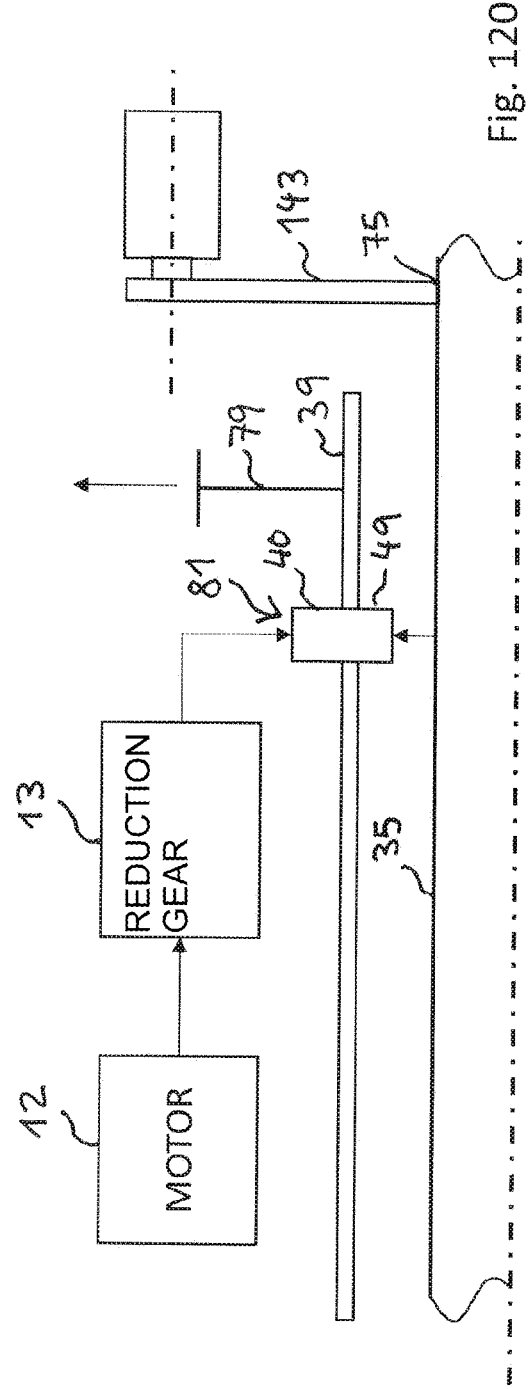
FIG. 120 shows a schematic drawing of a further drive.

FIG. 120 shows a schematic drawing of another drive.

In this drive, a driving torque is transmitted from a motor to a reduction gear and from there to an outer freewheel of a double freewheel and to an output shaft.

Another drive torque is transmitted from a pedal shaft to an inner freewheel of a double freewheel and to the output shaft. Instead of a pedal shaft, also another type of crankshaft or generally a drive shaft may be provided. In general, the inner drive shaft may also be driven by another motor or by another mechanical drive such as wind or water power.

FIG. 121 shows a schematic drawing of a flexspline or tensioning shaft drive according to the present description. In the flexspline drive, a motor torque is transferred to a transmitter and from there to a flexspline. The flexspline is rotatably mounted on the transmitter, for example by a deformable ball bearing.

The flexspline is supported on a stationary outer gear, which is fixed to a housing. This support is indicated by a double arrow. The outer gear and the housing thus absorb the reaction force of the output.

FIG. 122 shows a schematic drawing of a harmonic pin ring drive according to the present description. A motor power is transmitted to a transmitter and from there to a pin ring. The pin ring is rotatably mounted on the transmitter, for example by a deformable ball bearing.

The output torque is transmitted from the pin ring to a rotatably mounted inner gear and from there to an output shaft. The pin ring is supported on a stationary outer gear, which is fixed to a housing, which is also indicated by a double arrow. The outer gear and the housing thus absorb the reaction force of the output.

Figure 123:
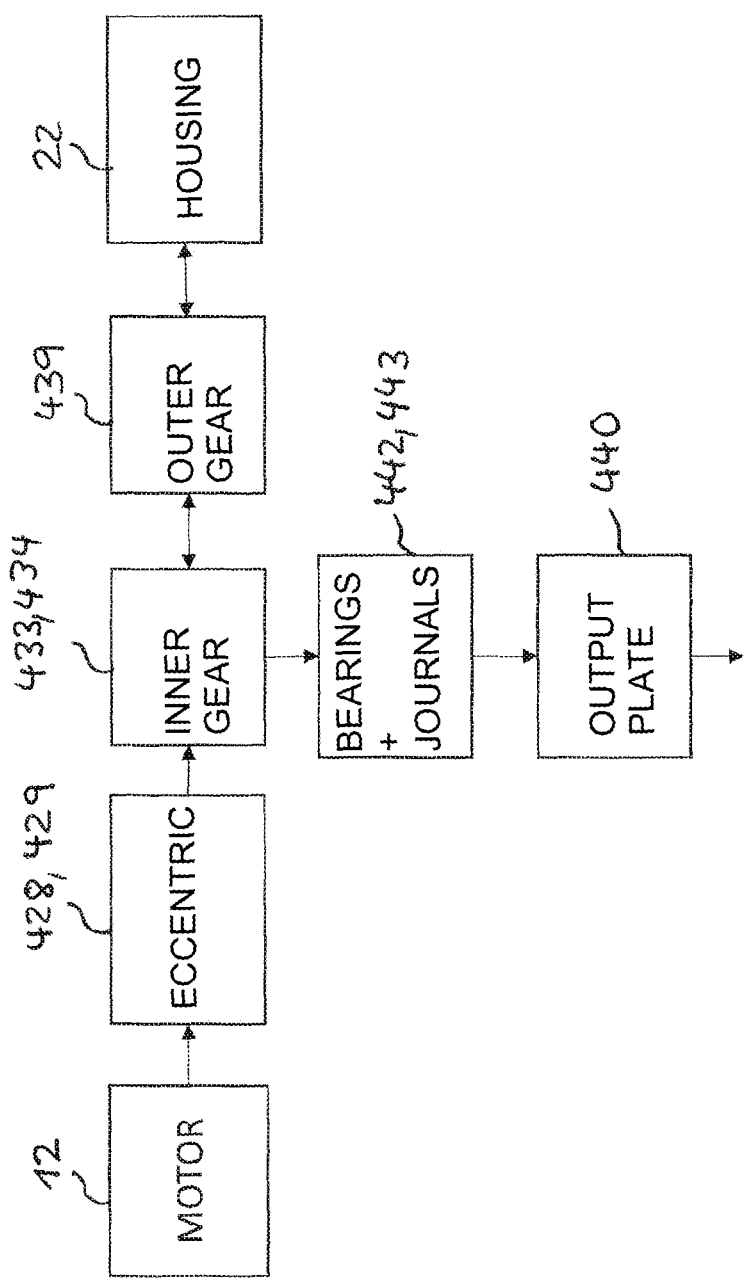
FIG. 123 shows a schematic drawing of an eccentric drive.

FIG. 123 shows a schematic drawing of an eccentric transmission according to the present description. A motor torque is transmitted to one or more eccentrics and from there to one or more inner gears. The inner gears are each rotatably supported by a bearing on the eccentrics. By means of an arrangement of bearings and journals, the torque is transmitted to an output plate.

The arrangement of bearings and journals represents a centering device or a centering transmission with a 1:1 ratio. In particular, two eccentrics mutually offset by 180° may be provided.

Figure 125:
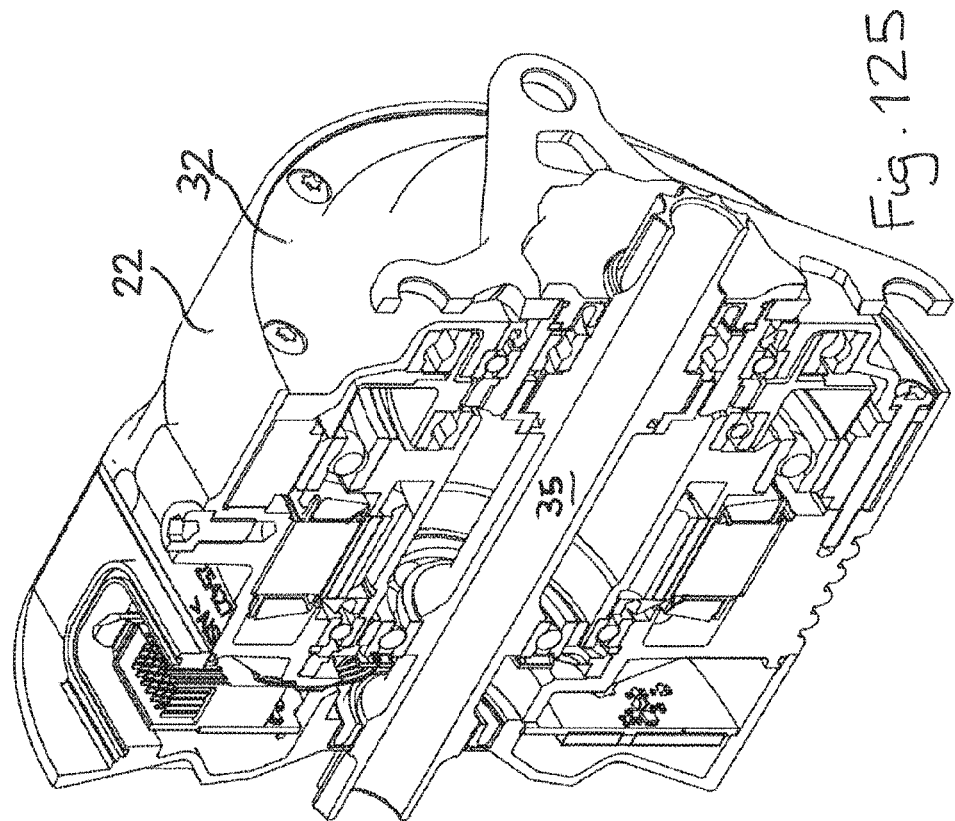
FIG. 125 is a perspective cross-sectional view of the motor gear unit of FIG. 124, cut along intersection line A-A of FIG. 124.
Figure 124:
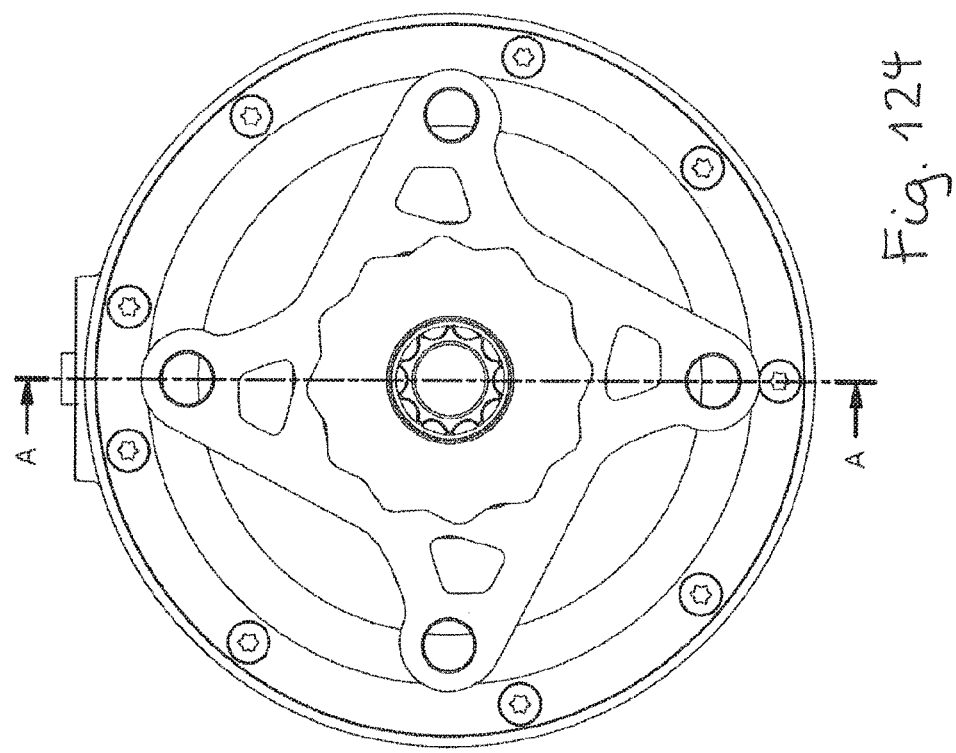
FIG. 124 shows a driven-side view of a motor gear unit with a strain wave gearing which is similar to the strain wave gearing of FIG. 83.
Figure 126:
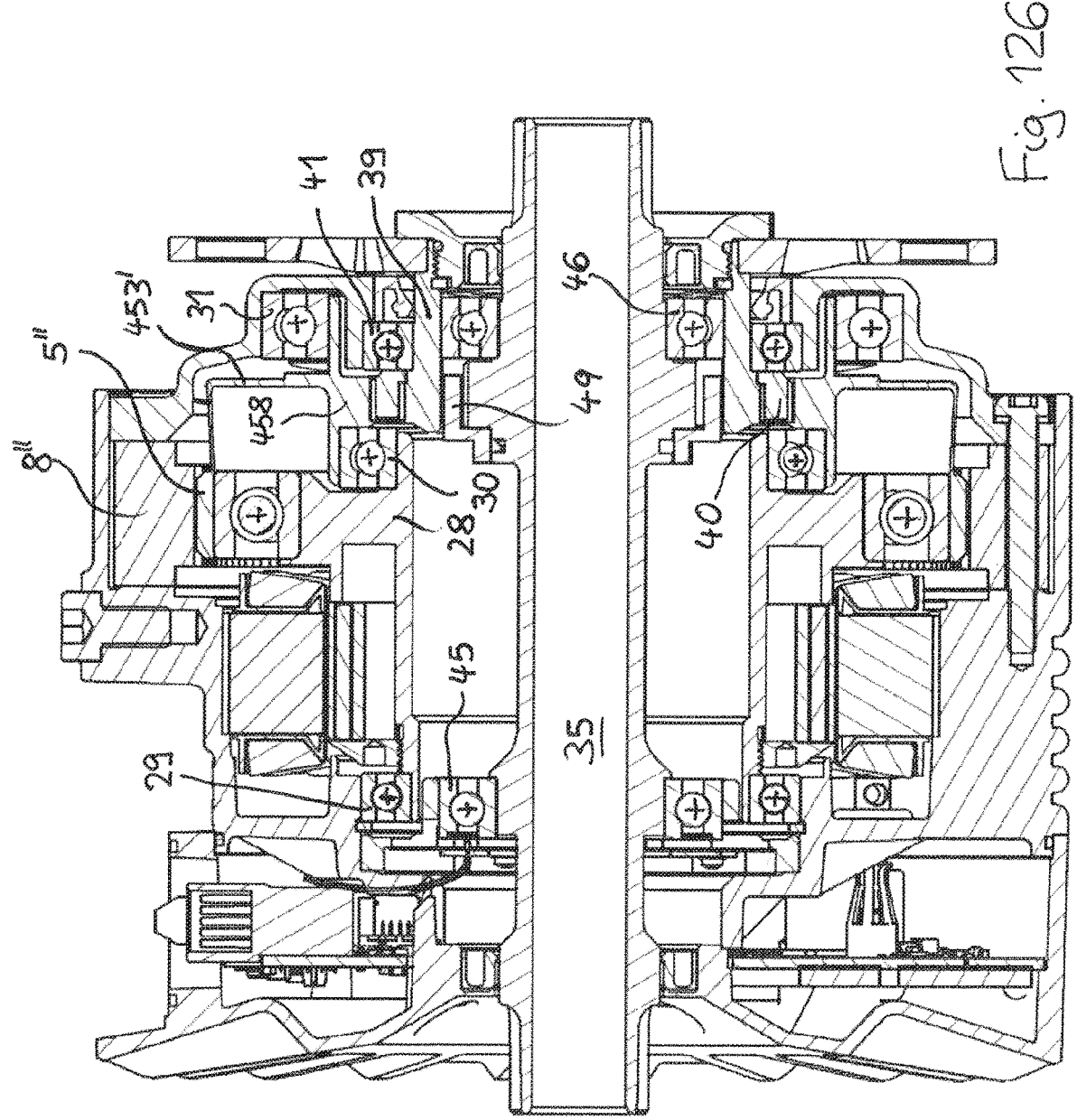
FIG. 126 shows a cross section along the intersection line A-A of FIG. 124.

FIGS. 124 to 126 show a further motor transmission unit with a tensioning shaft transmission. Unlike the embodiment of FIG. 82, the tensioning shaft 453' here is formed on an outer output shaft 458, rather than a tensioning shaft 453 being attached to an outer output shaft 458 with rivets. The outer output shaft 458 with the tensioning shaft 435 is supported on diagonally opposite ball bearings 30 and 31. This corresponds to a three-bearing arrangement with the ball bearings 30, 31 and 29 or a five-bearing arrangement with the ball bearings 30, 31, 29, 45 and 46. Like the outer output shaft 458, the output shaft 39 is also mounted in a space-saving manner on only two ball bearings 46, 41, which are offset from each other diagonally.

Components which have already been described previously, for example in connection with FIG. 1, will not be described again here and, for reasons of clarity, are generally not provided separately with reference numerals.

The features of the embodiments of FIGS. 94-123 are also disclosed in the features of the following listing, which may be combined with other features of the description. In particular, the aforementioned toothing geometries can be combined with all transmissions of the present description, wherein the toothing based on the epicycle gear trajectory with two epicycles is preferably used in transmissions with an oval transmitter, and wherein the toothing based on the gear trajectory with one epicycle is preferably used in eccentric transmissions.

The dimensioning of opposing toothings and, if present, an intermediate transmission means may be chosen according to the present description in particular such that there is a complete tooth engagement, both in a pin ring transmission as well as in a tension shaft transmission or in a cycloidal gear, wherein the pin ring transmission and the tension shaft transmission can be built as a design with an eccentric transmitter or as a design with an oval transmitter.

1. Harmonic pin ring transmission, comprising
   a first gear with a first toothing and
   a second gear with a second toothing,
   a pin ring with round engagement regions,
   a revolving transmitter for drawing the engagement regions of the pin ring in the first toothing of the first gear and in the second toothing of the second gear,
   wherein the first gear, the transmitter and the second gear are arranged concentrically with each other and the transmitter is arranged radially inside the pin ring and wherein the pin ring is disposed between the first gear and the second gear, wherein the transmitter comprises a transmitter disk disposed eccentrically to a transmission central axis, wherein the first toothing of the first gear and the second toothing of the second gear are shaped according to an epicyclic construction,
   where locations on the respective tooth surface of the first toothing and the second toothing are each determined by a radial distance from the transmission central axis as a function of a cycle angle,
   wherein the radial distance is in turn determined by an equidistant to a gear trajectory,
   wherein locations on the gear trajectory are respectively determined by the vector sum of a cycle vector and an epicycle vector, wherein a tail of the cycle vector lies on the transmission central axis and a tail of the epicyclic vector lies in the tip of the cycle vector, wherein an epicycle angle of the epicycle vector is n times as large as that cycle angle and a length of the cycle angle is greater than a length of the epicycle angle, wherein n is a number of the round engagement portions of the harmonic pin ring transmission which is at least three.

2. Harmonic pin ring transmission according to item 1, wherein the first gear is an inner gear with an external toothing and the second gear is an outer gear with an internal toothing, wherein for the external toothing of the inner gear, the epicycle angle is measured in the same direction as the cycle angle and the equidistant is an inner equidistant,
   and wherein for the internal toothing of the outer gear, the epicycle angle is measured in the opposite direction to the cycle angle and the equidistant is an outer equidistant.

3. Harmonic pin ring transmission according to item 1, wherein the first gear and the second gear are each an outer gear with an internal toothing,
   wherein for the internal toothing of the two outer gears, the epicycle angle is measured in the opposite direction to the cycle angle and the equidistant is an outer equidistant.

4. Harmonic pin ring transmission according to item 3, wherein the respective equidistant is an equidistant at a distance of the sum of a radius of the round engagement regions and a correction value, wherein the correction value depends on a back lash.

5. Harmonic pin ring transmission according to item 3 or 4, wherein the harmonic pin ring transmission comprises a rolling bearing which rests on the transmitter disk, wherein the cycle radius is equal to half the diameter of the rolling bearing.

6. Harmonic pin ring transmission according to item 3 or 4, wherein the cycle radius is equal to half the diameter of the transmitter disk.

7. Harmonic pin ring transmission according to any of items 3 to 6, wherein the epicycle radius is equal to a half an eccentric offset by which the transmitter disk is offset from the transmission central axis.

8. Harmonic pin ring transmission according to any of items 3 to 7, wherein a drive shaft is connected to the transmitter.

9. Harmonic pin ring transmission according to item 8, wherein an output shaft is connected to the first gear.

10. Harmonic pin ring transmission according to item 8, wherein an output shaft is connected to the second gear.

11. Harmonic pin ring transmission according to item 8, wherein an output shaft is connected to the pin ring.

12. Inner gear for a harmonic pin ring transmission with an external toothing, wherein the tooth surface of the external toothing is determined by a radial distance from a central axis of the inner gear as a function of a cycle angle, wherein the radial distance from the central axis is in turn determined by an inner equidistant to a gear trajectory,
    wherein a location on the gear trajectory is determined by the vector sum of a cycle vector, a first epicycle vector and a second epicycle vector, wherein a tail of the cycle vector lies on the central axis, a tail of the first epicycle vector lies in the tip of the cycle vector, and a tail of the second epicycle vector lies in the tip of the first epicycle vector,
    and wherein an epicycle angle of the first epicycle vector is n−1 times as large as the cycle angle and an epicycle angle of the second epicycle vector is n−3 times as large as the cycle angle, wherein n is a number of pins of the harmonic pin ring transmission which is at least four, wherein the first epicycle angle is measured in the same direction as the cycle angle and the second epicycle angle is measured in an opposite direction to the cycle angle, and wherein a length of the cycle vector is greater than the sum of the lengths of the first epicycle vector and the second epicycle vector, and a length of the first epicycle vector is greater than a length of the second epicycle vector.

13. Outer gear for a harmonic pin ring transmission with an internal toothing, wherein locations on the tooth surface of the internal toothing are each determined by a radial distance from a central axis of the outer gear as a function of a cycle angle,
wherein the radial distance is in turn defined by an outer equidistant to a gear trajectory,
wherein locations on the gear trajectory are each determined by the vector sum of a cycle vector, a first epicycle vector and a second epicycle vector, wherein a tail of the cycle vector lies on the central axis, a tail of the first epicycle vector lies in the tip of the cycle vector, and a tail of the second epicycle vector lies in the tip of the first epicycle vector,
and wherein an epicycle angle of the first epicycle vector is n+1 times as large as the cycle angle and an epicycle angle of the second epicycle vector is n+3 times as large as the cycle angle, wherein n is a number of pins of the harmonic pin ring transmission which is at least four, wherein the first epicycle angle is measured in an opposite direction to the cycle angle and the second epicycle angle is measured in the same direction as the cycle angle, and wherein a length of the cycle vector is greater than the sum of the lengths of the first epicycle vector and the second epicycle vector, and a length of the first epicycle vector is greater than a length of the second epicycle vector.

14. Harmonic pin ring transmission, comprising
an inner gear according to item 12 and
an outer gear according to item 13,
a pin ring with round engagement regions,
a revolving transmitter for drawing the engagement regions of the pin ring in the internal toothing of the outer gear and in the external toothing of the inner gear, wherein the inner gear, the transmitter and the outer gear are arranged concentrically with each other, the transmitter is arranged radially inside the pin ring and wherein the pin ring is disposed between the inner gear and the outer gear.

15. Harmonic pin ring transmission, comprising
a first outer gear according to item 13 and
a second outer gear according to item 13,
a pin ring with round engagement regions,
a revolving transmitter for drawing the engagement regions of the pin ring in the internal toothing of the first outer gear and in the internal toothing of the second outer gear,
wherein the transmitter, the first outer gear and the second outer gear are arranged concentrically with each other, the transmitter is arranged radially inside the pin ring and wherein the pin ring is arranged in the axial direction between the first outer gear and the second outer gear.

16. Harmonic pin ring transmission according to item 14 or item 15, wherein a drive shaft is connected to the transmitter.

17. Harmonic pin ring transmission according to item 16, wherein an output shaft is connected to the pin ring.

18. Harmonic pin ring transmission according to item 14, wherein
a drive shaft is connected to the transmitter and an output shaft is connected to the inner gear.

19. Harmonic pin ring transmission according to item 14, wherein
a drive shaft is connected to the transmitter and an output shaft is connected to the outer gear.

20. Harmonic pin ring transmission according to item 15, wherein
a drive shaft is connected to the transmitter and an output shaft is connected to one of the two outer gears.

21. Harmonic pin ring transmission according to any of items 14 to 20, wherein the respective equidistant is an equidistant at a distance of the sum of a radius of the round engagement regions and a correction value, wherein the correction value is determined by a back lash.

22. Harmonic pin ring transmission according to any of items 14 to 21, wherein the transmitter comprises an oval shaped cam disk and a flexible rolling bearing resting on the oval shaped cam disk, wherein the cycle radius is equal to the sum of half the diameter of the flexible rolling bearing and a correction value.

23. Harmonic pin ring transmission according to any of items 14 to 21, wherein the transmitter comprises a first circular disk arranged eccentrically to a transmission central axis and a second circular disk arranged eccentrically to the transmission central axis, wherein the cycle radius is equal to the sum of a mean radius of the envelope of the two eccentrically arranged circular disks and a correction value.

24. Harmonic pin ring transmission according to any of items 14 to 23, wherein the first epicycle radius is less than or equal to the sum of half a pin ring stroke and a second correction value, wherein the second correction value is less than or equal to zero.

25. Harmonic pin ring transmission according to any of items 14 to 24, wherein the length of the second epicycle vector is one third of the length of the first epicycle vector.

The features of the embodiments of FIGS. 1-92 are also disclosed in the features of the following listing, which may be combined with all other features of the description.

1. Harmonic pin ring transmission having an input shaft and an output shaft, the transmission comprising:
a first outer gear, an inner gear concentrically disposed with respect to the first outer gear in a first axial plane,
a second outer gear arranged in a second axial plane,
a traction mechanism extending between the first outer gear and the inner gear,
a revolving transmitter which lifts the traction mechanism from an outer circumference of the inner gear and presses it against an inner circumference of the first outer gear,
wherein the transmitter comprises a hollow drive shaft and a cam disk, wherein the cam disk is disposed in a third axial plane located between the first axial plane and the second axial plane, and
wherein the cam disk is formed in one piece with the hollow drive shaft.

2. Harmonic pin ring transmission according to item 1, wherein the traction mechanism is formed as a pin ring, wherein pins protrude from a middle portion on two opposite sides, wherein the middle portion is disposed in the third axial plane, and wherein the revolving transmitter lifts the pins from an outer circumference of the inner gear and presses them against an inner circumference of the first outer gear.
3. Harmonic pin ring transmission according to item 1 or item 2, wherein a circumference of the cam disk has an oval shape.
4. Harmonic pin ring transmission according to item 1 or item 2, wherein a circumference of the cam disk has a circular shape and is arranged eccentrically to a transmission central axis.
5. Harmonic pin ring transmission according to any of items 1 to 4, wherein a rolling bearing is arranged between the cam disk and the traction mechanism.
6. Harmonic pin ring transmission according to any of items 1 to 5, wherein the transmitter consists essentially of aluminum.
7. Harmonic pin ring transmission according to any of items 1 to 6, wherein the transmitter comprises a ring which is connected via connecting struts with the hollow drive shaft.
8. Harmonic pin ring transmission having an input shaft and an output shaft, the transmission comprising:
a first outer gear, an inner gear concentrically disposed with respect to the first outer gear in a first axial plane,
a second outer gear arranged in a second axial plane,
a traction mechanism extending between the first outer gear and the inner gear,
a revolving transmitter which lifts the traction mechanism from an outer circumference of the inner gear and presses it against an inner circumference of the first outer gear,
wherein the transmitter comprises a hollow drive shaft and a cam disk, wherein the cam disk is disposed in a third axial plane located between the first axial plane and the second axial plane, and wherein the first outer gear is formed by a first outer ring and the second outer gear is formed by a second outer ring, wherein the first ring and the second ring are inserted into a support ring.
9. Harmonic pin ring transmission according to item 8, wherein the first outer ring and the second outer ring are each made of plastic.
10. Harmonic pin ring transmission according to item 8 or item 9, wherein the first outer ring and the second outer ring each comprise radially outwardly projecting journals which are distributed over the circumference of the respective outer ring, and wherein the support ring comprises matching recesses into which the journals are inserted.
11. Harmonic pin ring transmission according to any of items 8 to 10, wherein the support ring is made of aluminum.
12. Harmonic pin ring transmission according to any of items 8 to 11, wherein the support ring comprises two partial rings, which abut in the axial direction.
13. Harmonic pin ring transmission according to any of items 8 to 12, wherein the first outer ring, the second outer ring and the support ring comprise screw holes matching each other.
14. Harmonic pin ring transmission according to item 13, wherein screws are passed through screw holes of a transmission cover and through the matching screw holes of the first outer ring, the support ring and the second outer ring and are screwed into a thread of a transmission housing of the harmonic pin ring transmission.
15. Harmonic pin ring transmission having an input shaft and an output shaft, the transmission comprising:
a first outer gear, an inner gear concentrically disposed with respect to the first outer gear in a first axial plane,
a second outer gear arranged in a second axial plane,
a traction mechanism extending between the first outer gear and the inner gear,
a revolving transmitter which lifts the traction mechanism from an outer circumference of the inner gear and presses it against an inner circumference of the first outer gear,
wherein the transmitter comprises a hollow drive shaft and a cam disk, wherein the cam disk is disposed in a third axial plane located between the first axial plane and the second axial plane,
and comprising a hollow output shaft which is mounted in the inner gear via a motor freewheel, and a pedal shaft, which is mounted in the hollow output shaft via a pedal shaft freewheel, wherein the pedal shaft comprises a receiving region for the motor freewheel on an outer circumference and comprises a receiving region for the pedal shaft freewheel on an inner circumference.
16. Harmonic pin ring transmission according to item 15, wherein the motor freewheel is configured as a clamp roller freewheel and the pedal shaft freewheel is configured as a pawl freewheel.
17. Harmonic pin ring transmission according to item 15 or item 16, wherein the output shaft extends in the axial direction on the output side of the hollow drive shaft, wherein a ball bearing is arranged between the hollow output shaft and the pedal shaft, and wherein the hollow output shaft comprises a fastening region for an output element.
18. Freewheel assembly having an outer clamp roller freewheel and an inner pawl freewheel, comprising:
a hollow drive shaft,
a hollow output shaft,
a pedal shaft, wherein the pedal shaft, the hollow output shaft and the hollow drive shaft are arranged concentrically to one another, the hollow output shaft is arranged radially inside the hollow drive shaft and the pedal shaft is arranged radially inside the hollow output shaft,
wherein the hollow output shaft comprises a stair-shaped pawl engagement region at an inner circumference and comprises a stair-shaped clamp roller rolling region at an outer circumference,
wherein the pedal shaft comprises a star-shaped receiving region for pawls, wherein the star-shaped receiving region comprises pawl seats and spring seats arranged adjacent to the pawl seats.
19. Freewheel assembly according to item 18, wherein the stair-shaped clamp body rolling region on the outer circumference of the hollow output shaft and the stair-shaped pawl engagement region on the inner circumference of the hollow output shaft are located in essentially the same axial plane.
20. Freewheel assembly according to item 18 or item 19, wherein the hollow drive shaft comprises a disk-shaped region with an external toothing, which is provided on an outer circumference of the disk-shaped region.
21. Freewheel assembly according to any of items 18 to 20, wherein the hollow output shaft comprises an annular thickening at a first end and comprises a fastening region for an output means at a second end opposite the first end.
22. Freewheel assembly according to any of items 18 to 21, wherein the outer circumference of the hollow output shaft comprises a bearing region for a ball bearing.

23. Freewheel assembly according to any of items 18 to 22, wherein the inner circumference of the hollow output shaft comprises a bearing region for a ball bearing.
24. Freewheel assembly according to any of items 18 to 23, wherein the inner circumference of the hollow output shaft comprises an internal thread at one end.
25. Freewheel assembly according to any of the preceding items 18 to 24, further comprising:
    pawls which are rotatably mounted in the pawl seats and spring elements which are arranged in the spring seats and connected to the pawls,
    a freewheel cage with webs and clamp rollers arranged between the webs, wherein the freewheel cage and the clamp rollers are arranged radially between the clamp roller rolling region of the hollow output shaft and an inner circumference of the hollow drive shaft.
26. Freewheel assembly according to any of items 18 to 25, wherein the pawl seats are cylindrically shaped, are closed at one end by a wall and are open at an opposite end.
27. Freewheel assembly according to any of items 18 to 26, wherein the stair-shaped clamp body rolling region and the freewheel cage each comprise at least two receiving regions for spring elements and wherein in each case a spring element is arranged between a receiving region of the clamp body rolling region and a receiving region of the freewheeling cage.
28. Freewheel assembly according to any of items 18 to 27, wherein the pedal shaft comprises a force sensor unit, wherein the force sensor unit comprises a load cell and a pedal shaft ball bearing, wherein the load cell is arranged on the pedal shaft ball bearing.
29. Freewheel assembly according to item 28, wherein the load cell comprises an inner annular portion which is attached via fastening lugs to an outer annular portion, wherein the pedal shaft ball bearing is inserted into the inner annular portion.
30. Freewheel assembly according to item 29, wherein the inner portion and the outer portion of the load cell are radially offset to each other, wherein the fastening lugs are laterally bounded by radial slots, and wherein at least two of the fastening lugs comprise a strain gauge.
31. Freewheel assembly according to item 29 or item 30, wherein an axial thickness of the outer ring is reduced in the region of the fastening lugs.
32. Pedal shaft for a freewheel assembly, wherein the pedal shaft comprises a first fastening region for a pedal crank at a first end and a second fastening region for a pedal crank at a second end opposite thereto,
    and wherein the pedal shaft comprises a star-shaped receiving region for pawls in the vicinity of the first end.
33. Pedal shaft according to item 32, wherein the star-shaped receiving region comprises steps, wherein the steps each comprise a first side surface, a second side surface, a pawl support region inclined in a predefined direction relative to the circumferential direction and comprising a spring seat, an upper surface essentially parallel to the circumference, and an end region with a pawl seat, wherein the pawl seat is cylindrically shaped, axially open to one side and closed to an axially opposite side.
34. Harmonic pin ring transmission having an input shaft and an output shaft, the transmission comprising:
    a first outer gear, an inner gear concentrically disposed with respect to the first outer gear in a first axial plane,
    a second outer gear arranged in a second axial plane,
    a traction mechanism extending between the first outer gear and the inner gear,
    a revolving transmitter which lifts the traction mechanism from an outer circumference of the inner gear and presses it against an inner circumference of the first outer gear,
    wherein the transmitter comprises a hollow drive shaft and a cam disk, wherein the cam disk is disposed in a third axial plane located between the first axial plane and the second axial plane,
    and comprising a hollow output shaft which is mounted in the inner gear via a motor freewheel, and a pedal shaft, which is mounted in the hollow output shaft via a pedal shaft freewheel, wherein the pedal shaft comprises a receiving region for the motor freewheel on an outer circumference and comprises a receiving region for the pedal shaft freewheel on an inner circumference.
35. Harmonic pin ring transmission according to item 34, wherein the motor freewheel is configured as a clamp roller freewheel and the pedal shaft freewheel is configured as a pawl freewheel.
36. Harmonic pin ring transmission according to item 34 or item 35, wherein the output shaft extends in the axial direction on the output side of the hollow drive shaft, wherein a ball bearing is arranged between the hollow output shaft and the pedal shaft, and wherein the hollow output shaft comprises a fastening region for an output element.
37. Harmonic pin ring transmission having an input shaft and an output shaft, the transmission comprising:
    a first outer gear, an inner gear concentrically disposed with respect to the first outer gear in a first axial plane,
    a second outer gear arranged in a second axial plane,
    a pin ring with pins extending between the first outer gear and the inner gear,
    a revolving transmitter which lifts the pins of the pin ring from an outer circumference of the inner gear and presses them against an inner circumference of the first outer gear,
    wherein the transmitter comprises a hollow drive shaft and a cam disk, wherein the cam disk is disposed in a third axial plane located between the first axial plane and the second axial plane,
    and wherein the pin ring is formed in one piece and is made of metal, wherein the pins are formed by projections which protrude from two opposite sides of a central region of the pin ring, wherein the central region comprises an inner bearing surface for resting on a bearing.
38. Harmonic pin ring transmission according to item 37, wherein the projections are cylindrical on a first side of the two opposite sides and wherein the projections are partially cylindrical on a second of the two opposite sides, wherein a cylindrically shaped region is located in the radial direction on the outside of the pin ring.
39. Harmonic pin ring transmission according to item 37, wherein the projections comprise an inner rounded engagement region and an outer rounded engagement region on a first side of the two opposite sides,
    and wherein the projections comprise an outer rounded engagement region on a second of the two opposite sides.
40. Harmonic pin ring transmission according to any of items 37 to 39, wherein a bearing is arranged between the cam disk and the pin ring, and wherein the pin ring comprises a shoulder on an inner side for supporting the bearing.
41. Pin ring for a harmonic pin ring transmission which is formed in one piece and is made of metal, wherein the pin ring comprises pins formed by projections protruding from two opposite sides of a central region of the pin ring, wherein the central region comprises an inner bearing surface for resting on a bearing outer bearing surface.

42. Pin ring according to item 41, wherein the projections are cylindrical on a first side of the two opposite sides and wherein the projections are partially cylindrical on a second of the two opposite sides, wherein a cylindrically shaped region is located in the radial direction on the outside of the pin ring.

43. Pin ring according to item 41, wherein the projections comprise an inner rounded engagement region and an outer rounded engagement region on a first side of the two opposite sides,
    and wherein the projections comprise an outer rounded engagement region on a second of the two opposite sides.

44. Pin ring according to item 41, wherein a web is located in each case between the projections on the first side of the opposite two sides, wherein an outer boundary line of the projections smoothly merges into an outer boundary line of the web.

45. Harmonic pin ring transmission according to any of items 41 to 44, wherein a bearing is arranged between the cam disk and the pin ring, and wherein the pin ring comprises a shoulder on an inner side for supporting the bearing.

46. Harmonic pin ring transmission having an input shaft and an output shaft, the transmission comprising:
    a first outer gear, an inner gear concentrically disposed with respect to the first outer gear in a first axial plane,
    a second outer gear arranged in a second axial plane,
    a traction mechanism extending between the first outer gear and the inner gear,
    a revolving transmitter which lifts the traction mechanism from an outer circumference of the inner gear and presses it against an inner circumference of the first outer gear,
    wherein the transmitter comprises a hollow drive shaft and a cam disk, wherein the cam disk is disposed in a third axial plane located between the first axial plane and the second axial plane,
    wherein a pedal shaft is disposed radially inside the output shaft, and wherein the pedal shaft is mounted via a drive side pedal shaft ball bearing and a load cell in the motor housing.

47. Harmonic pin ring transmission according to item 46, wherein the load cell comprises an inner annular portion which is attached via fastening lugs to an outer annular portion, wherein the pedal shaft ball bearing is inserted into the inner annular portion and wherein the outer annular portion is inserted into a cylindrical region of the motor housing.

48. Harmonic pin ring transmission according to any of items 46 to 47, wherein a wave spring is arranged between the load cell and the drive side rotor ball bearing.

49. Harmonic pin ring transmission having an input shaft and an output shaft, the transmission comprising:
    a first outer gear, an inner gear concentrically disposed with respect to the first outer gear in a first axial plane,
    a second outer gear arranged in a second axial plane,
    a traction mechanism extending between the first outer gear and the inner gear,
    a revolving transmitter which lifts the traction mechanism from an outer circumference of the inner gear and presses it against an inner circumference of the first outer gear,
    wherein the transmitter comprises a hollow drive shaft and a cam disk, wherein the cam disk is disposed in a third axial plane located between the first axial plane and the second axial plane, wherein a pedal shaft is disposed radially inside the output shaft and wherein further a planetary gear and a pedal shaft freewheel are arranged in the flow of forces between the pedal shaft and the output shaft.

50. Harmonic pin ring transmission according to item 49, wherein a planet carrier of the planetary gear is connected to the pedal shaft, a ring gear of the planetary gear comprises a connection region for connection to a transmission housing, a sun gear of the planetary gear is mounted on the pedal shaft and wherein the pedal shaft freewheel is disposed between a hollow shaft connected to the sun gear and the output shaft.

51. Harmonic pin ring transmission according to item 49, wherein the pedal shaft freewheel is arranged between the crankshaft and a planet carrier of the planetary gear, wherein a ring gear of the planetary gear is rotatably mounted in the harmonic transmission and wherein a sun gear of the planetary gear is adapted for attachment to a stationary housing part.

52. Tension shaft transmission, the tension shaft transmission comprising:
    an outer gear with an internal toothing, wherein the outer gear comprises a fastening region for attachment to a transmission housing,
    a tensioning shaft having an external toothing, wherein the tensioning shaft is concentrically disposed with respect to the outer gear in an axial plane,
    a revolving transmitter which presses the tensioning shaft against the internal toothing of the outer gear,
    wherein the transmitter comprises a hollow drive shaft and a cam disk, wherein a ball bearing is arranged on a circumference of the cam disk,
    wherein a cross section of the tooth crests of the external toothing of the tensioning shaft corresponds essentially to a sector of a circle
    and wherein, with respect to an axis of the outer gear, the internal toothing of the outer gear is essentially defined by an outer equidistant to the gear trajectory defined by the formulas $x(t)=r1*\cos t(t)+r2*\cos((n+1)*t)+r3*\cos((n+3)*t)$ and $y(t)=r1*\sin(t)-r2*\sin((n+1)*t)+r3*\sin((n+3)*t)$, wherein n+1 is the number of teeth of the internal toothing of the outer gear, wherein the radii r1, r2 and r3 are greater than zero, and wherein for the scale of the radii $r2>r3$ and $r1>r2+r3$ applies.

53. Tension shaft transmission according to item 52, wherein the tensioning shaft is formed in a cup shape, wherein at the bottom of the cup shape, a fastening region is formed for fastening an output shaft.

54. Tension shaft transmission according to item 53, wherein a central circular opening is formed at the bottom of the cup shape and wherein the fastening region of the tensioning shaft comprises fastening holes arranged around the central circular opening.

55. Tension shaft transmission according to item 52, wherein the tensioning shaft has the shape of a circular cylinder, and wherein comprises a second outer gear which comprises a fastening region for fastening an output shaft, wherein the internal toothing of the outer gear is determined by the same construction as the internal toothing of the first outer gear.

56. Tension shaft transmission, the tension shaft transmission comprising:

an outer gear with an internal toothing, wherein the outer gear comprises a fastening region for attachment to a transmission housing, a tensioning shaft having an external toothing, wherein the tensioning shaft is concentrically disposed with respect to the outer gear in an axial plane, wherein a cross section of the tooth crests of the external toothing of the tensioning shaft corresponds essentially to a sector of a circle, a revolving transmitter which presses the tensioning shaft against the internal toothing of the outer gear, wherein the transmitter comprises a hollow drive shaft and a cam disk, wherein the tooth surface of the internal toothing of the outer gear is determined by a radial distance from a central axis of the inner gear as a function of a cycle angle, wherein the radial distance from the central axis is in turn determined by an inner equidistant to a gear trajectory, wherein locations on the gear trajectory are each determined by the vector sum of a cycle vector, a first epicycle vector and a second epicycle vector, wherein a tail of the cycle vector lies on the central axis, a tail of the first epicycle vector lies in the tip of the cycle vector, and a tail of the second epicycle vector lies in the tip of the first epicycle vector, and wherein an epicycle angle of the first epicycle vector is n+1 times as large as the cycle angle and an epicycle angle of the second epicycle vector is n+3 times as large as the cycle angle, wherein n is a number of pins of the harmonic pin ring transmission which is at least four, and wherein a length of the cycle vector is greater than the sum of the lengths of the first epicycle vector and the second epicycle vector, and a length of the first epicycle vector is greater than a length of the second epicycle vector.

57. Two-stage reduction gear, the two-stage reduction gear comprising:
a stationary outer gear with a first internal toothing, wherein the outer gear comprises a fastening region for attachment to a transmission housing,
a rotatable outer gear with a second internal toothing, wherein the outer gear comprises a fastening region for attachment to an output shaft,
a two-part one-piece pin ring, wherein the two-part one-piece pin ring comprises a first external toothing and a second external toothing, wherein the first external toothing of the two-part one-piece pin ring engages in the internal toothing of the stationary outer gear and wherein the second external toothing of the two-part one-piece pin ring engages in the internal toothing of the rotatable outer gear,
a revolving transmitter which presses the two-part one-piece pin ring against the internal toothing of the stationary outer gear and against the internal toothing of the rotatable outer gear.

58. Two-stage reduction gear according to item 57, wherein the number of teeth of the internal toothing of the stationary outer gear is greater than the number of teeth of the first external toothing, and the number of teeth of the internal toothing of the rotatable outer gear is greater than the number of teeth of the second external toothing,
and wherein the number of teeth of the stationary outer gear is greater than the number of teeth of the rotatable outer gear and the number of teeth of the first external toothing is greater than the number of teeth of the second external toothing.

59. Two-stage reduction gear according to item 57 or item 58, wherein the transmitter comprises a circular ring eccentric to the axis of the stationary outer gear.

60. Two-stage reduction gear according to any of items 57 to 59, wherein a cross section of the tooth crests of the first external toothing and a cross section of the tooth crests of the second external toothing essentially correspond to a sector of a circle.

61. Two-stage reduction gear according to any of items 57 to 60, wherein a cross section of the tooth crests of the first external toothing and a cross section of the tooth crests of the second external toothing essentially correspond to an equidistant to the gear trajectory defined by the formula $x(t)=r1*\cos(t)+r2*\cos(nt)$ and $y(t)=r1*\sin(t)+r2*\sin(nt)$, wherein the following applies for the radii r1, r2: $r1>0$, $r2>0$ and $r1>r2$.

62. Two-stage reduction gear according to any of items 57 to 61, wherein a cross section of the tooth crests of the first external toothing and a cross section of the tooth crests of the second external toothing essentially correspond to an equidistant to the gear trajectory defined by the formula $x(t)=r1*\cos(t)+r2*\cos(nt)$ and $y(t)=r1*\sin(t)r2*\sin(nt)$, wherein the following applies for the radii r1, r2: $r1>0$, $r2>0$ and $r1>r2$.

63. A load cell for determining a radial force acting on a crankshaft, the load cell comprising:
a receiving sleeve for receiving a ring of a bearing,
a fastening ring for attaching the load cell in a transmission housing,
axial support areas provided on the fastening ring for axially supporting the ring of the bearing,
measuring regions for receiving radial forces of the receiving sleeve and which connect the receiving sleeve with the fastening ring, wherein strain sensors are attached to at least two of the measuring regions.

64. Freewheel assembly having an outer transmission freewheel and an inner pedal shaft freewheel, comprising:
a hollow drive shaft,
a hollow output shaft,
a pedal shaft, wherein the pedal shaft, the hollow output shaft and the hollow drive shaft are arranged concentrically with each other, the hollow output shaft is disposed radially inside the hollow drive shaft, and the pedal shaft is disposed radially inside the hollow output shaft, wherein the pedal shaft freewheel is arranged between the pedal shaft and the hollow output shaft and wherein the transmission freewheel is arranged opposite the pedal shaft freewheel on the hollow output shaft and wherein the hollow output shaft comprises adapted areas on an inner side and on an outer side in the region of the respective freewheel.

65. One-piece pin ring made of metal, wherein a pin retaining ring and an arrangement of pins which protrude in axial direction from the pin retaining ring on two opposite sides are made in one piece.

66. One-piece pin ring according to item 65, wherein the pins are connected to each other in the circumferential direction.

67. One-piece pin ring according to item 65 or 66, wherein on a first of the two opposite sides, the pins are formed as half pins, which are adapted to engage an internal toothing, and wherein on a second of the opposite side, the pins are formed as whole pins, which are suitable for engaging in an internal toothing and for engaging in an external toothing opposite the internal toothing.

68. One-piece pin ring made of metal, wherein the one-piece pin retaining ring comprises a smooth inner circumference on an inner side and comprises rounded bulges on an outer side, which are made in one piece with the pin retaining ring.
69. One-piece pin retaining ring according to item 68, wherein at least one head region of the rounded bulges comprises a semicircular cross section.
70. Support ring assembly for a reduction gear having a first outer gear and a second outer gear comprising a support ring, a first outer gear having a first internal toothing and a second outer gear having a second internal toothing, wherein the first outer gear and the second outer gear are inserted into the support ring on opposite sides, and wherein the support ring comprises a fastening region for attachment to a transmission housing.
71. Support ring assembly according to item 70,
    Wherein at least the first outer gear and the second outer gear are made of plastic.
72. Support ring assembly according to any of items 71 or 72, wherein the first outer gear and the second outer gear are each connected with the support wheel via a pin-groove connection.
73. One-piece rotor-transmitter element for a reduction gear comprising a hollow shaft comprising a fastening region on a first side for fastening a rotor package, and comprising a cam disk on a second side opposite to the first side, wherein an outer circumference of the cam disk is configured as a receiving area for a ball bearing.
74. One-piece rotor-transmitter element according to item 73, wherein the one-piece rotor-transmitter element is made of aluminum.
75. One-piece rotor-transmitter element according to item 73 or 74, wherein the hollow shaft is dimensioned such that a pedal shaft can be passed through the hollow shaft.
76. One-piece rotor-transmitter element according to any of items 73 to 75, wherein the cam disk comprises a circular circumference arranged eccentrically relative to the central axis of the hollow shaft.
77. One-piece rotor-transmitter element according to any of items 73 to 75, wherein the cam disk comprises an oval circumference to the central axis of the hollow shaft.
78. Drive shaft with a planetary gear arranged on the drive shaft, wherein a planet carrier of the planetary gear is fixedly connected to the drive shaft, a ring gear of the planetary gear comprises a fastening region for attachment to a transmission housing and a receiving region for a torque sensor, and a sun gear of the planetary gear is configured as a ring gear, which is arranged concentrically to the drive shaft, and wherein the sun gear is connected to a hollow output shaft of the planetary gear, which is rotatably mounted on the drive shaft.
79. Drive shaft with a planetary gear arranged on the drive shaft, wherein a planet carrier of the planetary gear is mounted on the drive shaft via a freewheel, a sun gear of the planetary gear comprises a fastening region for attachment to a transmission housing and a receiving region for a torque sensor, and a ring gear of the planetary gear comprises a receiving region for a ball bearing for supporting on a transmission housing.
80. Drive shaft with a planetary gear arranged on the drive shaft, wherein a planet carrier of the planetary gear comprises a fastening region for attachment to a transmission housing, wherein a hollow shaft of the planetary gear is fixedly connected to the drive shaft is, and wherein a sun gear of the planetary gear is configured as a hollow shaft which is arranged concentrically to the drive shaft and rotatably mounted on the drive shaft.
81. Cycloidal gear, the cycloidal gear comprising the following components:
    a transmission housing,
    an outer gear having an internal toothing which is fixed to the transmission housing,
    an input shaft arranged concentric with the outer gear, wherein the input shaft comprises a drive side eccentric disk, on which a first ball bearing is arranged, and an output side eccentric disk, on which a second ball bearing is arranged,
    a drive-side inner gear with an external toothing which is mounted on the first ball bearing and an output-side inner gear with an external toothing which is mounted on the second ball bearing,
    wherein the drive side inner gear and the output side inner gear are disposed inside the outer gear, and wherein the external toothings of the drive side inner gear and the output-side outer gear respectively engage with the internal toothing of the outer gear.
82. Cycloidal gear according to item 81, wherein the cycloidal gear comprises a crankshaft which is mounted within the input shaft, and a load cell according to item 63 which is mounted on the crankshaft on the drive side.
83. Cycloidal gear according to any of items 81 or 82, wherein the input shaft is configured as a one-piece rotor transmitter element according to any of items 73 to 77.
84. Cycloidal gear according to any of items 81 to 83, wherein the cycloidal gear comprises a crankshaft which is mounted within the input shaft, and wherein the crankshaft comprises planetary gears according to the items 78 to 80, wherein the crankshaft forms the drive shaft of the planetary gear.
85. Cycloidal gear according to any of items 81 to 84, wherein a third ball bearing is disposed on the input shaft on the output side of the output side eccentric disk, wherein a driven pulley is arranged on the third ball bearing, wherein the driven pulley comprises carrier pins which engage in openings of the drive side inner gear and the output side inner gear, wherein an output shaft is formed radially inside on the driven pulley.
86. Cycloidal gear according to item 85, wherein an output shaft is formed radially inside on the driven pulley, wherein the third ball bearing is arranged on an inner shoulder of the output shaft and wherein an inner gear ball bearing is arranged diagonally opposite to the third ball bearing on an outer shoulder of the output shaft, wherein the inner gear ball bearing is supported on the transmission housing.
87. Cycloidal gear according to any of items 81 to 83, wherein at least one of the inner gears comprises a first toothing and a second external toothing and wherein the cycloidal gear comprises a rotatable outer gear having an internal toothing, wherein the second external toothing engages in the internal toothing of the rotatable outer gear, and wherein the rotatable outer gear comprises a fastening region for mounting an output shaft.

The objects of the present description may also be described by the above enumeration. The particular feature combinations disclosed in the enumeration may be considered as independent items that may also be combined with other features of the present description.

In particular, the features of FIGS. 21 to 40 relating to a torque measuring device, the features of FIGS. 45 to 59 relating to a freewheel device and the features of FIGS. 67 to 76 relating to a crank gear may be combined with the harmonic pin ring transmissions shown in FIGS. 1 to 10, 11 to 20 and 61 to 66 as well as with the other reduction gears or motor gear units shown in FIGS. 77 to 93 and 124 to 126. These features can also be combined with transmissions or reduction gears not shown here.

Furthermore, the bearing arrangement shown in FIG. 1 can also be combined with the other transmission units shown in the present description. The same applies to the one-piece rotor-transmitter element and the support ring arrangement for the outer gear or the outer gears, as well as for the one-piece pin ring, insofar as the transmission comprises a pin ring.

Further, example aspects of the present disclosure can comprise:

1. Load cell (47) for determining a radial force acting on a crankshaft (35), the load cell (47) comprising:
   a receiving sleeve (96) for receiving a ring of a bearing (45),
   a fastening ring (97) for attaching the load cell (47) in a transmission housing (22),
   axial support areas (91) provided on the fastening ring (97) for axially supporting the ring of the bearing (45),
   measuring regions (90) for receiving radial forces of the receiving sleeve (96) and which connect the receiving sleeve (96) with the fastening ring (97), wherein strain sensors (92) are attached to at least two of the measuring regions (90), wherein the axial support areas (91) are separated from the measuring regions (90) by radial slots (95), and wherein the axial support areas (91) are each separated from the receiving sleeve (96) by a circumferential slot (104), wherein a first radial slot (95), a circumferential slot (104) and a second radial slot (95) together form a confining slot which separates an axial support area (91) from the receiving sleeve (96) and from adjacent measuring regions (90) and wherein the axial support areas (91) project radially inwardly over an inner surface of the receiving sleeve (96).
2. Load cell (47) according to item 1, wherein the measuring regions (90) comprise measuring lugs (90) formed as angle brackets.
3. Load cell (47) according to item 2, wherein the measuring lugs (90) comprise a radial region and an axial region adjoining the radial region,
   wherein the radial region is connected to the fastening ring (97), wherein the axial region is connected to the receiving sleeve (96) and wherein the radial region is arranged to the axial region at an angle of approximately 90 degrees.
4. Load cell (47) according to item 3, wherein the axial region is flush with a cylindrical inner surface of the receiving sleeve (96).
5. Load cell (47) according to any of items 1 to 4, wherein at least one of the strain sensors (92) is configured as a strain gauge (92).
6. Load cell (47) according to any of items 1 to 5,
   wherein a strain sensor (92) is attached to each of the measuring regions (90).
7. Load cell (47) according to any of items 1 to 6,
   wherein at least two of the measuring regions (90) comprise lowered areas for attaching the strain sensors (92).
8. Load cell (47) according to any of items 1 to 7,
   wherein the load cell (47) comprises four measuring regions (90), which are arranged at intervals of 90 degrees.
9. Load cell (47) according to any of items 1 to 8, wherein the fastening ring (97) comprises fastening regions in which fixing holes (98) are provided.
10. Load cell (47) according to any of the preceding items 1 to 9, wherein the fastening ring (97) comprises recesses, and wherein the measuring regions (90) are arranged in the recesses.
11. Load cell (47) according to any of the preceding items 1 to 10,
    wherein an angular range of the measuring lugs (90) and of the slots (95) delimiting the measuring lugs (90) corresponds approximately to an angular range of the axial support areas (91).
12. Load cell (47) according to any of the preceding items 1 to 11, wherein an angular extent of the measuring regions (90) in a circumferential direction is less than or equal to 30 degrees.
13. Load cell according to any of the preceding items 1 to 12,
    wherein the load cell (47) is made integrally of metal.
14. Measuring device for determining a force acting on a crankshaft (35), comprising
    a crankshaft (35) with a bearing (45) arranged on the crankshaft (35),
    a load cell (47) according to any of the preceding claims, wherein the receiving sleeve (96) of the load cell (47) is arranged on an outer ring of the bearing (45), and wherein the axial support areas (91) of the load cell (47) are supported in an axial direction on the outer ring of the bearing (45),
    an evaluation electronics (48) which is connected to the strain sensors (90) of the load cell (47).
15. Transmission arrangement with a measuring device according to item 14 with a transmission housing (22) and a crankshaft (35), wherein the crankshaft (35) is mounted in the transmission housing (22) via a first bearing (45) and a second bearing (46),
    wherein the first bearing (45) is received in the transmission housing (22) via the load cell (47) of the measuring device, wherein the load cell (47) is received in the transmission housing (22) via the fastening ring (97), wherein the receiving sleeve (96) receives an outer ring of the first bearing (45) and wherein the axial support areas (91) are supported on the outer ring of the first bearing (45).
16. Transmission arrangement according to item 15, wherein the crankshaft (35) comprises a first step (223) and a second step (226) and wherein an inner ring of the first bearing (45) of the measuring device rests against the first step (223) of the crankshaft (35) and wherein an inner ring of the second bearing (46) rests against the second step (226) of the crankshaft (35) such that an X-arrangement of an obliquely mounted bearing is formed.
17. Transmission arrangement according to item 15 or item 16, wherein the first bearing (45) of the measuring device and the second bearing (46) of the measuring device are each configured as single-row angular contact ball bearings.
18. Transmission arrangement according to any of items 15 to 17, wherein the second bearing (46) is supported by a wave spring (70) on the second step (226) of the crankshaft (35) or on the housing.
19. Transmission arrangement according to item 18, wherein the second bearing (46) is supported further by a spacer disk (69) on the second step (226) of the crankshaft (35) or on the housing.
20. Transmission arrangement according to any of items 15 to 19, further comprising:

a motor (12), a reduction gear (13) connected to the motor (12), and a hollow output shaft (39) connected to the reduction gear (13), wherein the crankshaft (35) is configured as pedal shaft (35), wherein the first bearing (45) and the second bearing (46) are each configured as rolling bearings, wherein the pedal shaft (35) is passed through the hollow output shaft (39), and wherein a freewheel (49) is provided between the pedal shaft (35) and the hollow output shaft (39) for decoupling the pedal shaft (35) from the hollow output shaft (39).

21. Electrically driven vehicle with a transmission arrangement according to item 20, wherein the motor (12) is configured as an electric motor (12), and wherein a battery of the electrically driven vehicle is connected to the electric motor (12).

In the following, items of the disclosure are expressed in structured form. These items can be made the subject of independent or dependent claims either alone, or in arbitrary combination among each other, and in combination with other items disclosed herein.

1. Load cell for determining a radial force acting on a crankshaft, the load cell comprising:
    a receiving sleeve for receiving a ring of a bearing,
    a fastening ring for attaching the load cell in a transmission housing,
    axial support areas provided on the fastening ring for axially supporting the ring of the bearing,
    measuring regions for receiving radial forces of the receiving sleeve and which connect the receiving sleeve with the fastening ring, wherein strain sensors are attached to at least two of the measuring regions.
2. Load cell according to item 1, wherein the axial support areas are separated from the measuring regions by radial slots, and wherein the axial support areas are separated from the receiving sleeve by a circumferential slot.
3. Load cell according to item 1 or item 2, wherein the measuring regions comprise measuring lugs formed as angle brackets.
4. Load cell according to item 3, wherein the measuring lugs comprise a radial region and an axial region adjoining the radial region,
    wherein the radial region is connected to the fastening ring, wherein the axial region is connected to the receiving sleeve and wherein the radial region is arranged to the axial region at an angle of approximately 90 degrees.
5. Load cell according to item 4, wherein the axial region is flush with a cylindrical inner surface of the receiving sleeve.
6. Load cell according to any of items 1 to 5, wherein the axial support areas project radially inwardly over an inner surface of the receiving sleeve.
7. Load cell according to any of items 1 to 6, wherein at least one of the strain sensors is configured as a strain gauge.
8. Load cell according to any of items 1 to 7,
    wherein a strain sensor is attached to each of the measuring regions.
9. Load cell according to any of items 1 to 8,
    wherein at least two of the measuring regions comprise lowered areas for attaching the strain sensors.
10. Load cell according to any of items 1 to 9,
    wherein the load cell comprises four measuring regions, which are arranged at intervals of 90 degrees.
11. Load cell according to any of items 1 to 10, wherein the fastening ring comprises fastening regions in which fixing holes are provided.
12. Load cell according to any of the preceding items, wherein the fastening ring comprises recesses, and wherein the measuring regions are arranged in the recesses.
13. Load cell according to any of the preceding items,
    wherein an angular range of the measuring lugs and of the slots delimiting the measuring lugs corresponds approximately to an angular range of the axial support areas.
14. Load cell according to any of the preceding items, wherein an angular extent of the measuring regions in a circumferential direction is less than or equal to 30 degrees.
15. Load cell according to any of the preceding items,
    wherein the load cell is made integrally of metal.
16. Measuring device for determining a force acting on a crankshaft, comprising
    a crankshaft with a bearing arranged on the crankshaft,
    a load cell according to any of the preceding items, wherein the receiving sleeve of the load cell is arranged on an outer ring of the bearing, and wherein the axial support areas of the load cell are supported in an axial direction on the outer ring of the bearing,
    an evaluation electronics which is connected to the strain sensors of the load cell.
17. Transmission arrangement with a measuring device according to item 16 with a transmission housing and a crankshaft, wherein the crankshaft is mounted in the transmission housing via a first bearing and a second bearing,
    wherein the first bearing is received in the transmission housing via the load cell of the measuring device, wherein the load cell is received in the transmission housing via the fastening ring, wherein the receiving sleeve receives an outer ring of the first bearing and wherein the axial support areas are supported on the outer ring of the first bearing.
18. Transmission arrangement according to item 17, wherein the crankshaft comprises a first step and a second step and wherein an inner ring of the first bearing of the measuring device rests against the first step of the pedal shaft and wherein an inner ring of the second bearing rests against the second step of the crankshaft such that an X-arrangement of an obliquely mounted bearing is formed.
19. Transmission arrangement according to item 17 or item 18, wherein the first bearing of the measuring device and the second bearing of the measuring device are each configured as single-row angular contact ball bearings.
20. Transmission arrangement according to any of items 17 to 19, wherein the second bearing is supported by a wave spring on the second step of the pedal shaft or on the housing.
21. Transmission arrangement according to item 20, wherein the second bearing is supported further by a spacer disk on the second step of the pedal shaft or on the housing.
22. Transmission arrangement according to any of items 17 to 21, further comprising:
    a motor, a reduction gear connected to the motor, and a hollow output shaft connected to the reduction gear,
    wherein the crankshaft is configured as pedal shaft, wherein the first bearing and the second bearing are each configured as rolling bearings, wherein the pedal shaft is passed through the hollow output shaft, and wherein a freewheel is provided between the pedal shaft and the hollow output shaft for decoupling the pedal shaft from the hollow output shaft.

23. Electrically driven vehicle with a transmission arrangement according to item 22, wherein the motor is configured as an electric motor, and wherein a battery of the electrically driven vehicle is connected to the electric motor.

| Reference numerals | |
|---|---|
| 5 | external toothing |
| 5' | external toothing |
| 6 | internal toothing |
| 6' | internal toothing |
| 7 | inner gear |
| 8 | outer gear |
| 8' | outer gear |
| 9 | step |
| 10 | motor gear unit |
| 11 | step |
| 12 | motor |
| 13 | reduction gear |
| 20 | stator |
| 21 | coil |
| 22 | motor housing |
| 23 | printed circuit board |
| 24 | cooling cover |
| 25 | terminal |
| 26 | outer rotor shaft |
| 27 | inner rotor shaft |
| 28 | cam disk |
| 28' | eccentric disk |
| 29 | drive side rotor ball bearing |
| 30 | output side rotor ball bearing |
| 31 | inner gear ball bearing |
| 32 | housing cover |
| 33 | flexible ball bearing |
| 33' | ball bearing |
| 34 | fastening screws |
| 35 | pedal shaft |
| 36 | support ring |
| 37 | drive side spacer disk |
| 38 | output side spacer disk |
| 39 | output shaft |
| 40 | transmission freewheel |
| 41 | output ball bearing |
| 41' | drive side output ball bearing |
| 42 | O-ring |
| 43 | chainring adapter |
| 44 | output nut, transmission cover |
| 45 | drive side pedal shaft ball bearing |
| 46 | output side pedal shaft ball bearing |
| 47 | load cell |
| 48 | annular printed circuit board/PCB force sensor |
| 49 | pedal shaft freewheel |
| 50 | inner shaft seal ring |
| 51 | outer shaft seal ring |
| 52 | drive side shaft seal ring |
| 53 | Journal |
| 54 | radial slots |
| 55 | screw holes |
| 56 | transmitting region |
| 57 | step |
| 58 | round recesses |
| 59 | plateaus |
| 60 | screw thread |
| 61 | wave spring |
| 62 | spacer ring |
| 63 | ribbon cable |
| 64 | cylindrical rollers |
| 65 | clamping body cage |
| 66 | coil springs |
| 67 | raceway |
| 68 | sensor ring |
| 69 | spacer |
| 70 | wave spring |
| 71 | steps |
| 72 | coil springs |
| 73 | pawls |
| 74 | fastening region |
| 75 | fastening region |
| 76 | O-ring |
| 80 | pedal shaft assembly |
| 81 | freewheel assembly |
| 82 | sensor assembly |
| 90 | measuring lug |
| 91 | support lug |
| 92 | strain gauge |
| 93 | outer portion |
| 94 | inner portion |
| 95 | radial slot |
| 96 | sleeve |
| 97 | outer ring |
| 98 | fastening holes |
| 99 | recessed area |
| 101 | pins |
| 102 | pin ring |
| 103 | pin retaining ring |
| 104 | slots |
| 105 | circumferential slots |
| 106 | drive side step |
| 107 | output side step |
| 109 | bottom bracket bearing |
| 110 | torque measuring device |
| 111 | pedal shaft |
| 112 | first rolling bearing |
| 113 | second rolling bearing |
| 114 | sleeve |
| 115 | end face |
| 116 | portion |
| 117 | strain gauges |
| 118 | strain gauges |
| 119 | strain gauges |
| 120 | outer surface |
| 121 | slip rings |
| 122 | transmitter |
| 124 | strain gauges |
| 130 | torque measuring device |
| 131 | strain gauges |
| 132 | strain gauges |
| 133 | strain gauges |
| 134 | strain gauges |
| 135 | housing |
| 136 | printed circuit board |
| 137 | transmitter ring |
| 138 | sensor |
| 139 | protrusion |
| 140 | thread |
| 141 | step |
| 142 | O-ring |
| 220 | receiving region |
| 222 | step, drive side |
| 223 | step, drive side |
| 224 | step, output side |
| 225 | step, output side |
| 226 | step, output side |
| 227 | star arrangement |
| 228 | rolling region |
| 229 | rolling region |
| 230 | step |
| 231 | step |
| 232 | step |
| 233 | internal thread |
| 234 | hollow shaft portion |
| 235 | disk-shaped region |
| 236 | bore |
| 237 | chamfer |
| 243 | rolling region |
| 244 | end portion |
| 245 | pawls receiving region |
| 246 | hinge portion |
| 247 | hinge portion |
| 248 | plate-shaped portion |
| 249 | edge |
| 250 | webs |
| 251 | receiving region |
| 252 | receiving region |
| 255 | first region |

-continued

| Reference numerals | |
|---|---|
| 257 | sensor ring |
| 258 | rotation speed sensor |
| 262 | O-ring |
| 343 | O-ring |
| 344 | O-ring |
| 345 | sensor ring |
| 346 | inner housing |
| 347 | screws |
| 348 | support cylinder |
| 349 | webs |
| 352 | hollow shaft |
| 353 | Hall sensor |
| 354 | grooves |
| 355 | journals |
| 400, 400' | planetary gear assembly |
| 401, 401' | ring gear |
| 402 | fastening flange |
| 403 | sun gear |
| 405 | planet gear |
| 406 | planetary axis |
| 407 | planet carrier |
| 408 | rolling bearing |
| 409 | hollow shaft |
| 410 | hollow shaft |
| 423 | ball bearing |
| 424 | ball bearing |
| 425 | ball bearing |
| 426 | drive shaft |
| 427 | rotor shaft |
| 428 | eccentric disk |
| 429 | eccentric disk |
| 430 | centered circular disk |
| 433 | inner gear |
| 434 | inner gear |
| 435 | external toothing |
| 436 | external toothing |
| 437 | internal toothing |
| 440 | output pulley |
| 442 | carrier pins |
| 443 | carrier rollers |
| 441 | ring |
| 444 | circular opening |
| 445 | spacer |
| 446 | ridge |
| 447 | stationary pins |
| 448 | fastening opening |
| 450 | external thread |
| 451 | pressure disk |
| 452 | pressure ring |
| 453 | tensioning shaft |
| 454 | fastening region |
| 455 | drive cylinder |
| 456 | fastening flange |
| 457 | fastening region |
| 458 | output shaft |
| 501 | pins |
| 502 | flexible thin section ball bearing |
| 503 | pin retaining ring |
| 504 | flange |
| 505, 505' | inner gear toothing |
| 506, 506' | outer gear toothing |
| 507 | Inner ring or inner gear |
| 508 | outer ring or outer gear |
| 509 | cylindrical housing part |
| 510 | HPRD-transmission |
| 513 | rotor |
| 514 | eccentric disk |
| 515 | transmission central axis |
| 516 | semicircular recesses |
| 518 | gear trajectory |
| 519 | equidistant |
| 520 | pin cross section |
| 521 | position of the gear trajectory |
| 525 | zero contour |
| 526 | contour with provision |
| 527 | worn out contour |
| 528 | gear trajectory of the inner gear |
| 528' | gear trajectory of the outer gear |
| 529 | equidistant of the gear trajectory of the inner gear |
| 529' | equidistant of the gear trajectory of the outer gear |
| 530 | integrally formed pin ring |
| 531 | tooth of the pin ring |
| 532 | tooth base of the pin ring |
| 533 | inner envelope curve |
| 534 | outer envelope curve |
| 536 | predetermined tooth profile |
| 537 | tooth profile to be measured |

That which is claimed is:

1. A measuring device for determining a force acting on a crankshaft, the measuring device comprising:
   the crankshaft with a bearing arranged on the crankshaft; and
   a load cell for determining a radial force acting on the crankshaft, the load cell comprising:
      a receiving sleeve for receiving a ring of the bearing;
      a fastening ring for attaching the load cell in a transmission housing;
      axial support areas provided on the fastening ring for axially supporting the ring of the bearing; and
      measuring regions for receiving radial forces of the receiving sleeve and which connect the receiving sleeve with the fastening ring, wherein strain sensors are attached to at least two of the measuring regions;
   wherein the receiving sleeve of the load cell is arranged on an outer ring of the bearing, and wherein the axial support areas of the load cell are supported in an axial direction on the outer ring of the bearing; and
   wherein an evaluation electronics is connected to the strain sensors of the load cell.

2. The measuring device of claim 1, wherein the axial support areas are separated from the measuring regions by radial slots, and wherein the axial support areas are separated from the receiving sleeve by a circumferential slot.

3. The measuring device of claim 1, wherein the measuring regions comprise measuring lugs formed as angle brackets.

4. The measuring device of claim 3, wherein:
   the measuring lugs comprise a radial region and an axial region adjoining the radial region;
   the radial region is connected to the fastening ring;
   the axial region is connected to the receiving sleeve; and
   the radial region is arranged to the axial region at an angle of approximately 90 degrees.

5. The measuring device of claim 4, wherein the axial region is flush with a cylindrical inner surface of the receiving sleeve.

6. The measuring device of claim 1, wherein the axial support areas project radially inwardly over an inner surface of the receiving sleeve.

7. The measuring device of claim 1, wherein at least one of the strain sensors is configured as a strain gauge.

8. The measuring device of claim 1, wherein a strain sensor is attached to each of the measuring regions.

9. The measuring device of claim 1, wherein at least two of the measuring regions comprise lowered areas for attaching the strain sensors.

10. The measuring device of claim 1, wherein the load cell comprises four measuring regions, which are arranged at intervals of 90 degrees.

11. The measuring device of claim 1, wherein the fastening ring comprises fastening regions in which fixing holes are provided.

12. The measuring device of claim 1, wherein the fastening ring comprises recesses, and wherein the measuring regions are arranged in the recesses.

13. The measuring device of claim 1, wherein an angular range of the measuring lugs and of slots delimiting the measuring lugs corresponds approximately to an angular range of the axial support areas.

14. The measuring device of claim 1, wherein an angular extent of the measuring regions in a circumferential direction is less than or equal to 30 degrees.

15. The measuring device of claim 1, wherein the load cell is made integrally of metal.

16. A transmission arrangement comprising:
a measuring device comprising:
a crankshaft with a bearing arranged on the crankshaft; and
a load cell for determining a radial force acting on the crankshaft, the load cell comprising:
a receiving sleeve for receiving a ring of the bearing;
a fastening ring for attaching the load cell in a transmission housing;
axial support areas provided on the fastening ring for axially supporting the ring of the bearing; and
measuring regions for receiving radial forces of the receiving sleeve and which connect the receiving sleeve with the fastening ring, wherein strain sensors are attached to at least two of the measuring regions;
wherein the receiving sleeve of the load cell is arranged on an outer ring of the bearing, and wherein the axial support areas of the load cell are supported in an axial direction on the outer ring of the bearing; and
wherein an evaluation electronics is connected to the strain sensors of the load cell;
wherein the crankshaft is mounted in the transmission housing via a first bearing and a second bearing,
wherein the first bearing is received in the transmission housing via the load cell of the measuring device;
wherein the load cell is received in the transmission housing via the fastening ring;
wherein the receiving sleeve receives an outer ring of the first bearing; and
wherein the axial support areas are supported on the outer ring of the first bearing.

17. The transmission arrangement of claim 16, wherein the crankshaft comprises a first step and a second step and wherein an inner ring of the first bearing of the measuring device rests against the first step of the crankshaft and wherein an inner ring of the second bearing rests against the second step of the crankshaft such that an X-arrangement of an obliquely mounted bearing is formed.

18. The transmission arrangement of claim 17, further comprising a motor, a reduction gear connected to the motor, and a hollow output shaft connected to the reduction gear, and wherein:
the crankshaft is configured as a pedal shaft;
the first bearing and the second bearing are each configured as a rolling bearing;
the pedal shaft is passed through the hollow output shaft; and
a freewheel is provided between the pedal shaft and the hollow output shaft for decoupling the pedal shaft from the hollow output shaft.

19. The transmission arrangement according to claim 18, wherein:
the transmission arrangement is configured for use with an electrically driven vehicle;
the motor is configured as an electric motor; and
a battery of the electrically driven vehicle is connected to the electric motor.

20. The transmission arrangement of claim 16, wherein the first bearing of the measuring device and the second bearing of the measuring device are each configured as single-row angular contact ball bearings.

21. The transmission arrangement of claim 16, wherein the second bearing is supported by a wave spring on the second step of the crankshaft or on the transmission housing.

22. The transmission arrangement of claim 21, wherein the second bearing is supported further by a spacer disk on the second step of the crankshaft or on the transmission housing.

* * * * *